(12) United States Patent
Kaufman

(10) Patent No.: US 11,592,190 B2
(45) Date of Patent: Feb. 28, 2023

(54) HOT WATER RECIRCULATION SYSTEM

(71) Applicant: Roger Kaufman, McLean, VA (US)

(72) Inventor: Roger Kaufman, McLean, VA (US)

( * ) Notice: Subject to any disclaimer, the term of this patent is extended or adjusted under 35 U.S.C. 154(b) by 177 days.

(21) Appl. No.: 16/847,590

(22) Filed: Apr. 13, 2020

(65) Prior Publication Data

US 2020/0326076 A1     Oct. 15, 2020

Related U.S. Application Data

(60) Provisional application No. 62/957,005, filed on Jan. 3, 2020, provisional application No. 62/833,313, filed on Apr. 12, 2019.

(51) Int. Cl.
*F24D 17/00* (2022.01)
*F24D 19/10* (2006.01)

(52) U.S. Cl.
CPC ....... *F24D 17/0078* (2013.01); *F24D 17/001* (2013.01); *F24D 19/1051* (2013.01); *F24D 2220/0228* (2013.01); *F24D 2220/0242* (2013.01); *F24D 2220/0292* (2013.01)

(58) Field of Classification Search
CPC ............... F24D 17/0078; F24D 17/001; F24D 19/1051; F24D 2220/0228; F24D 2220/0242; F24D 2220/0292; F24D 2220/235; Y02B 30/18; E03B 7/045; F16K 31/385; F16K 15/03; F16K 15/06; F16K 15/063; F16K 15/064; F16K 15/065; F16K 15/066; F16K 15/067; F16K 15/1825
See application file for complete search history.

(56) References Cited

U.S. PATENT DOCUMENTS

| | | | |
|---|---|---|---|
| 1,247,374 A | 11/1917 | Chubb | 137/337 |
| 2,842,155 A | 7/1958 | Peters | 137/337 |
| 3,776,261 A | 12/1973 | Houghton | 137/337 |
| 4,142,515 A | 3/1979 | Skaats | 126/362 |
| 4,201,518 A | 5/1980 | Stevenson | 417/12 |
| 4,244,554 A * | 1/1981 | DiMauro | F16K 31/385 |
| | | | 251/30.02 |
| 4,321,943 A | 3/1982 | Haws | 137/337 |
| 4,606,325 A | 8/1986 | Lujan, Jr. | 126/362 |
| 4,936,289 A | 6/1990 | Peterson | 126/362 |
| 5,135,163 A * | 8/1992 | Cho | G05D 23/134 |
| | | | 236/100 |

(Continued)

FOREIGN PATENT DOCUMENTS

NZ       554423 A  *  8/2009  ............. E03B 87/04

*Primary Examiner* — Edelmira Bosques
*Assistant Examiner* — Michael James Giordano

(57) ABSTRACT

A hot water recirculation system for a house or other building causes water to be recirculated to a water heater for reheating until the water is above a set-point temperature at which time the heated water is made available for use at a faucet or other hot water plumbing fixture. Recirculation of hot water takes place only when there is demand for hot water at a hot water plumbing fixture. A flow switching module for use in the hot water recirculation system can selectively direct water supplied to the flow switching module from a water heater either to a hot water plumbing fixture or to return piping for returning the water to the water heater. The flow switching module may be operated manually, automatically, or semi-automatically.

19 Claims, 42 Drawing Sheets

(56) References Cited

U.S. PATENT DOCUMENTS

| | | | | |
|---|---|---|---|---|
| 5,205,318 | A | 4/1993 | Massaro et al. | 137/337 |
| 5,261,443 | A | 11/1993 | Walsh | 137/337 |
| 5,277,219 | A | 1/1994 | Lund | 137/337 |
| 5,572,985 | A | 11/1996 | Benham | 126/362 |
| 5,735,291 | A | 4/1998 | Kaonohi | 137/337 |
| 5,775,372 | A | 7/1998 | Houlihan | 137/624.12 |
| 5,829,467 | A | 11/1998 | Spicher | 137/14 |
| 5,829,475 | A | 11/1998 | Acker | 137/337 |
| 6,032,687 | A | 3/2000 | Linn | 137/337 |
| 6,536,464 | B1 | 3/2003 | Lum et al. | 137/337 |
| 6,895,985 | B2 | 5/2005 | Popper et al. | 137/2 |
| 7,036,520 | B2 | 5/2006 | Pearson, Jr. | 137/1 |
| 7,077,155 | B2 | 7/2006 | Giammaria | 137/337 |
| 7,779,857 | B2 | 8/2010 | Acker | 137/337 |
| 8,091,793 | B2 | 1/2012 | Kempf et al. | 262/12.13 |
| 8,505,830 | B2 | 8/2013 | Kempf et al. | 236/12.13 |
| 8,820,652 | B2 | 9/2014 | Kempf et al. | 236/12.13 |
| 9,027,844 | B2 | 5/2015 | Laing | F16K 11/078 |
| 9,151,021 | B2 | 10/2015 | Cuervo-Arango Y De Cachavera | E03B 7/045 |
| 9,863,647 | B1* | 1/2018 | McNamara | F24D 17/0078 |
| 10,036,572 | B1 | 7/2018 | Halff | F24H 9/2007 |
| 10,323,392 | B2* | 6/2019 | Christiansen | E03B 7/045 |
| 2011/0174404 | A1* | 7/2011 | Nutsos | E03C 1/023 29/401.1 |
| 2012/0192965 | A1* | 8/2012 | Popper | E03C 1/0408 137/357 |

* cited by examiner

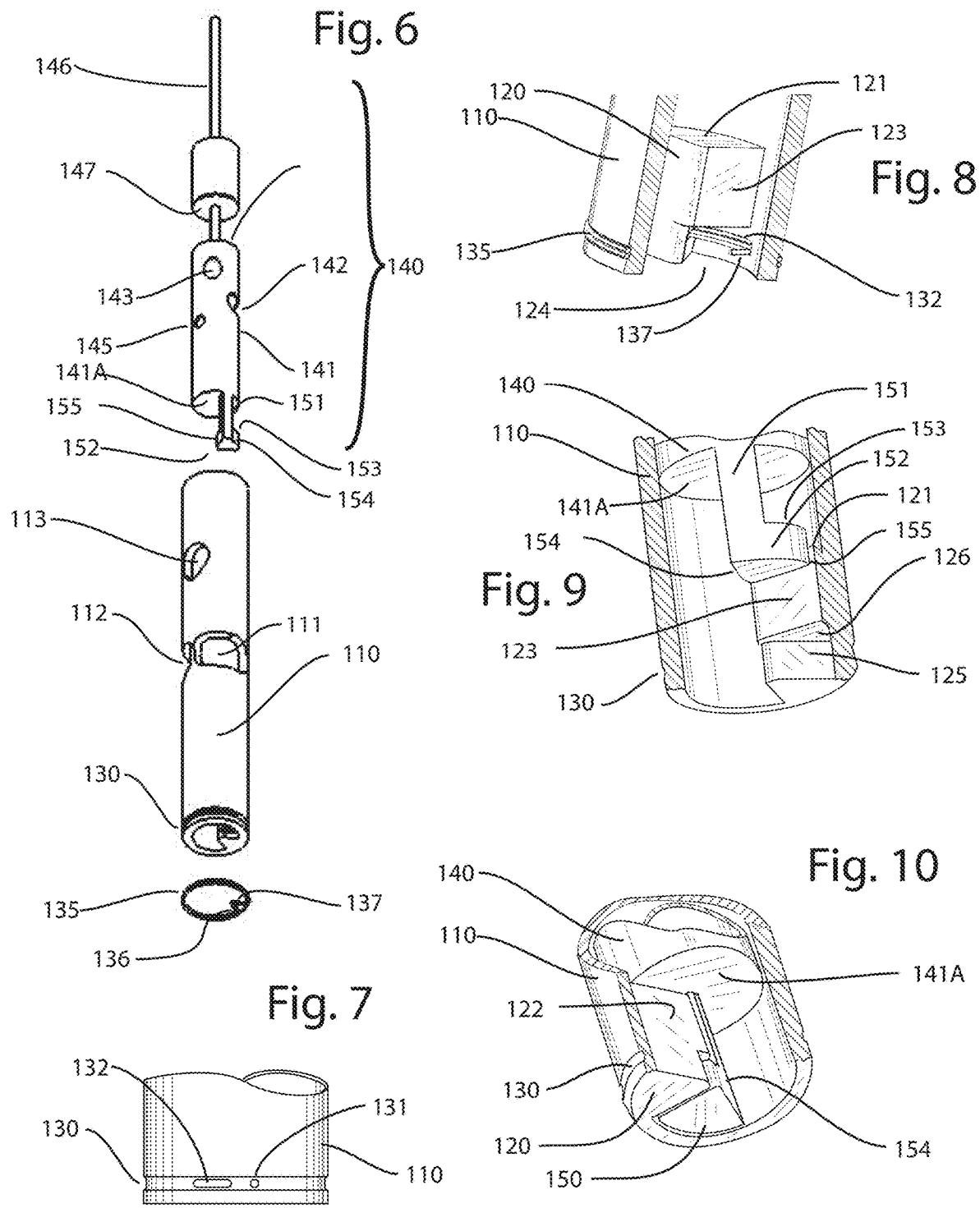

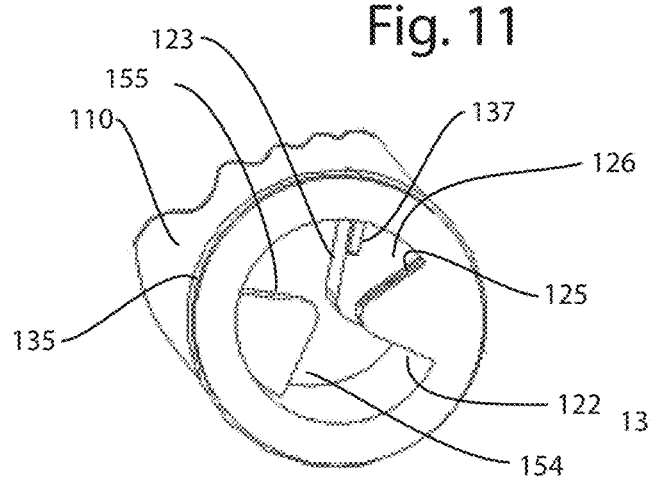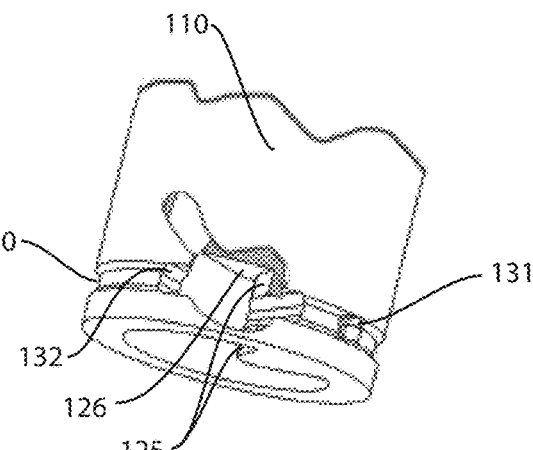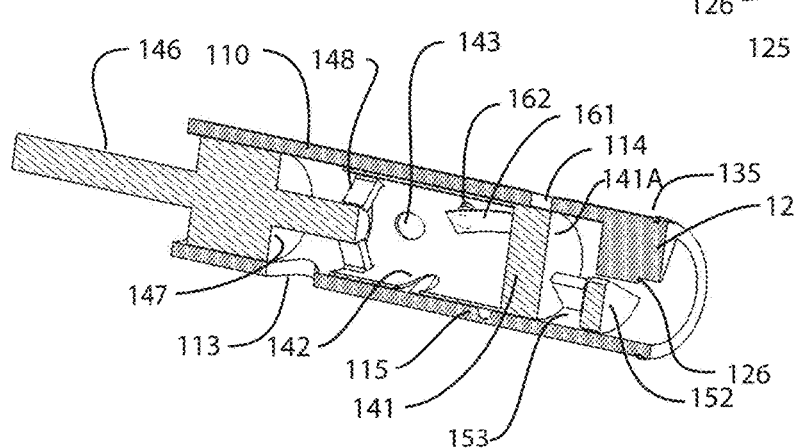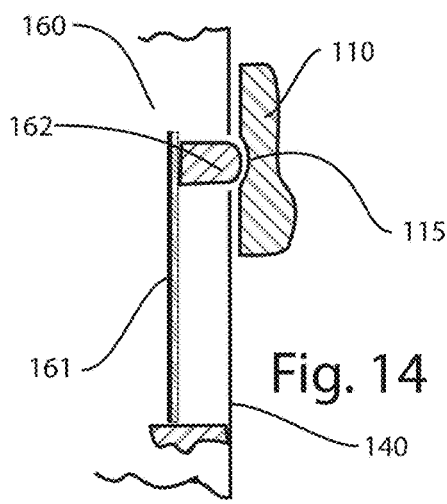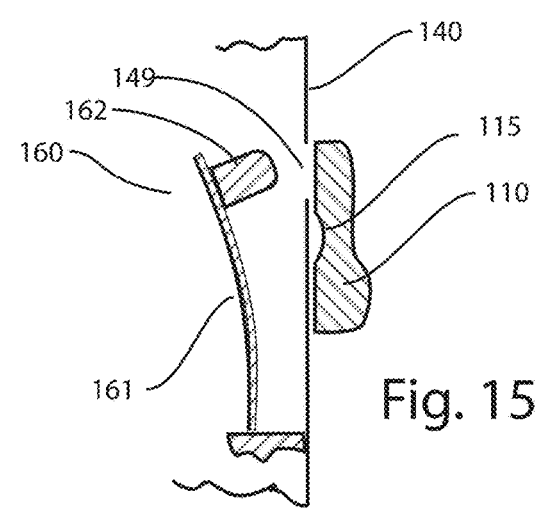

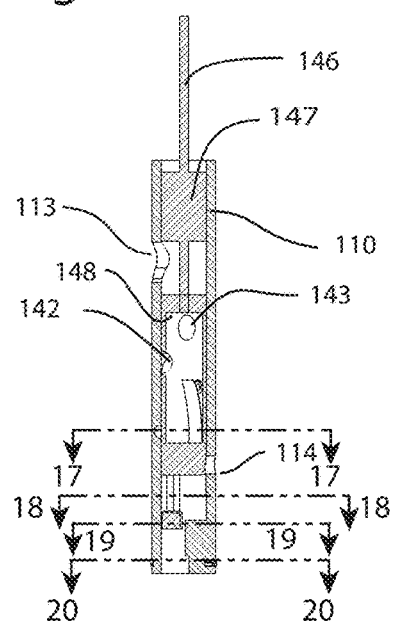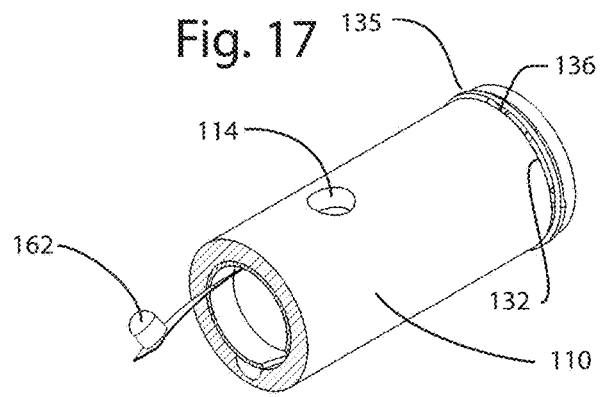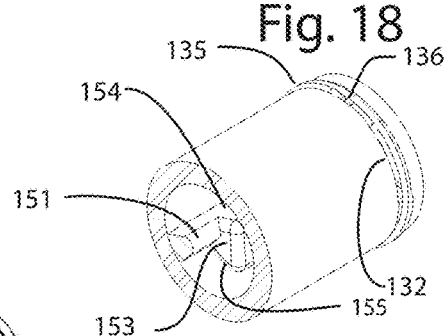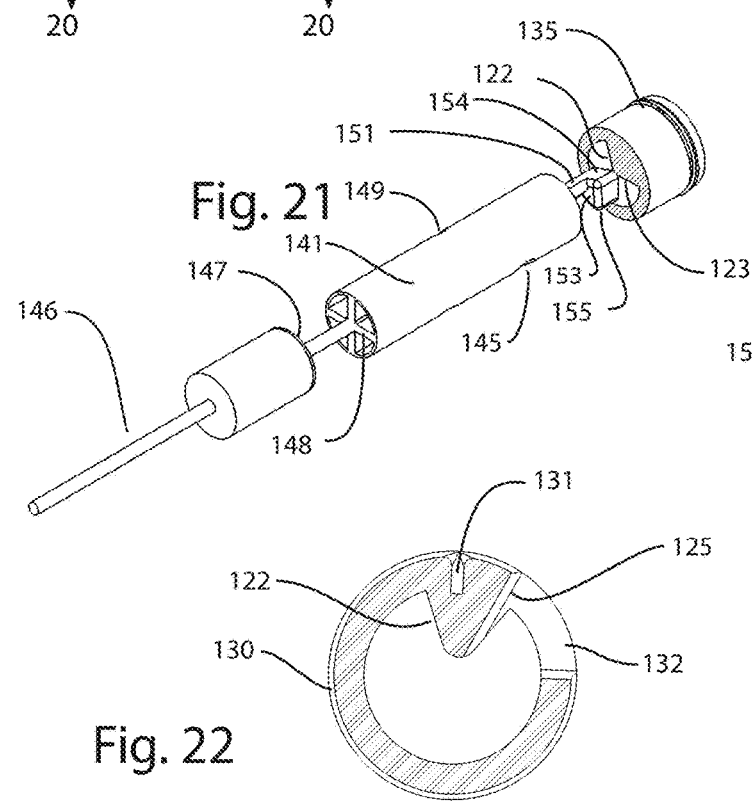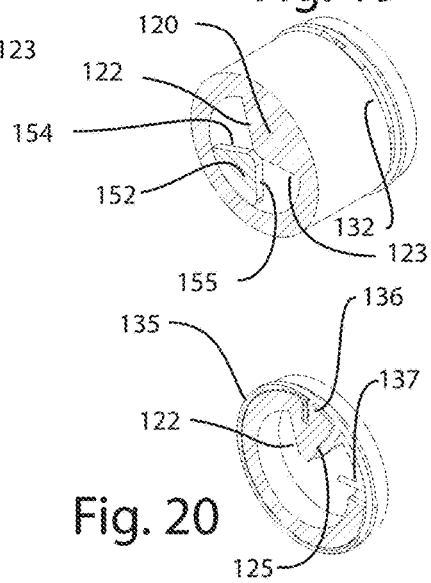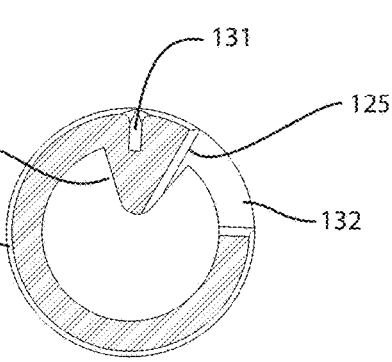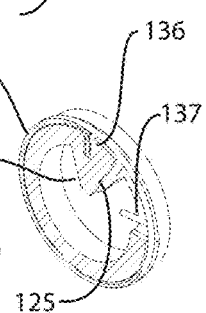

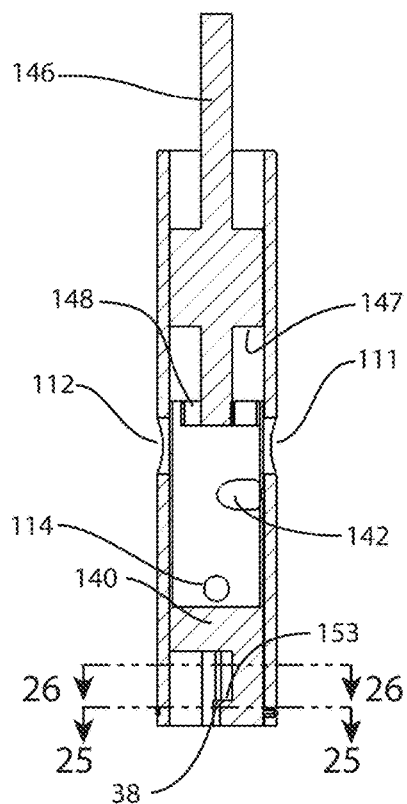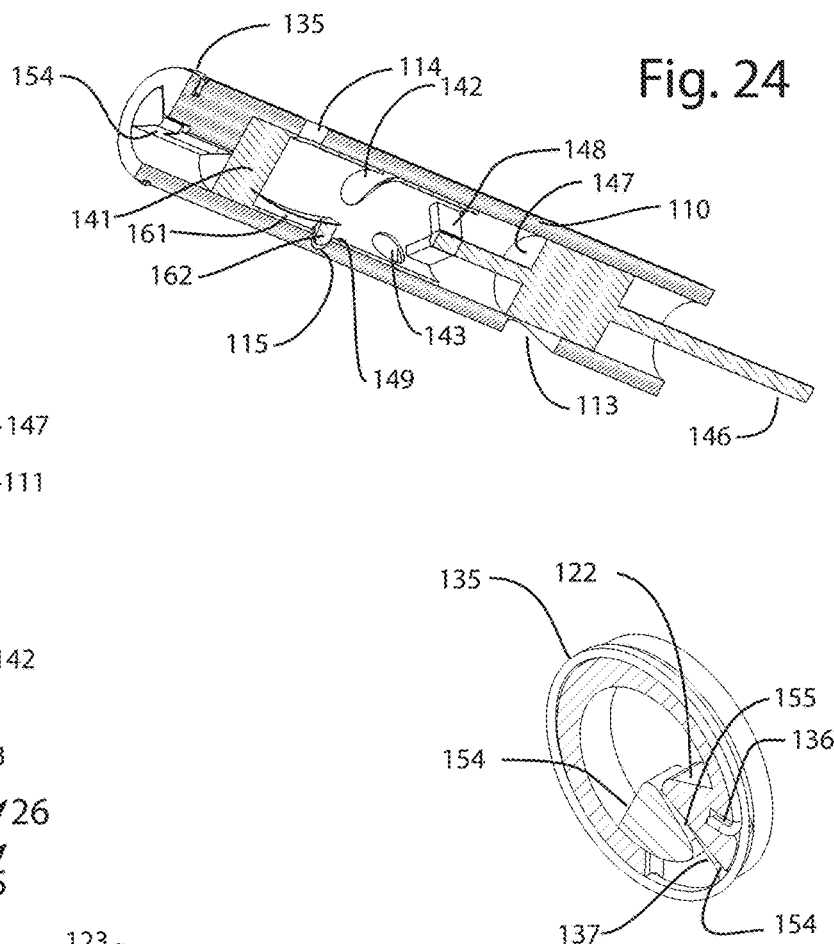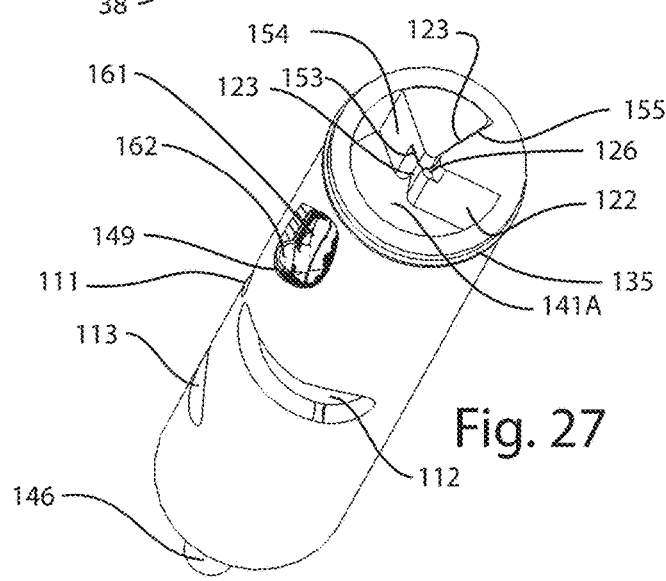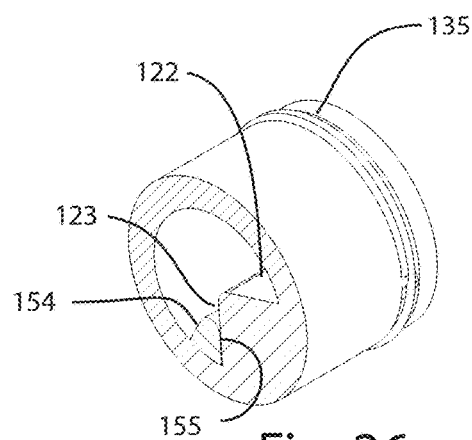

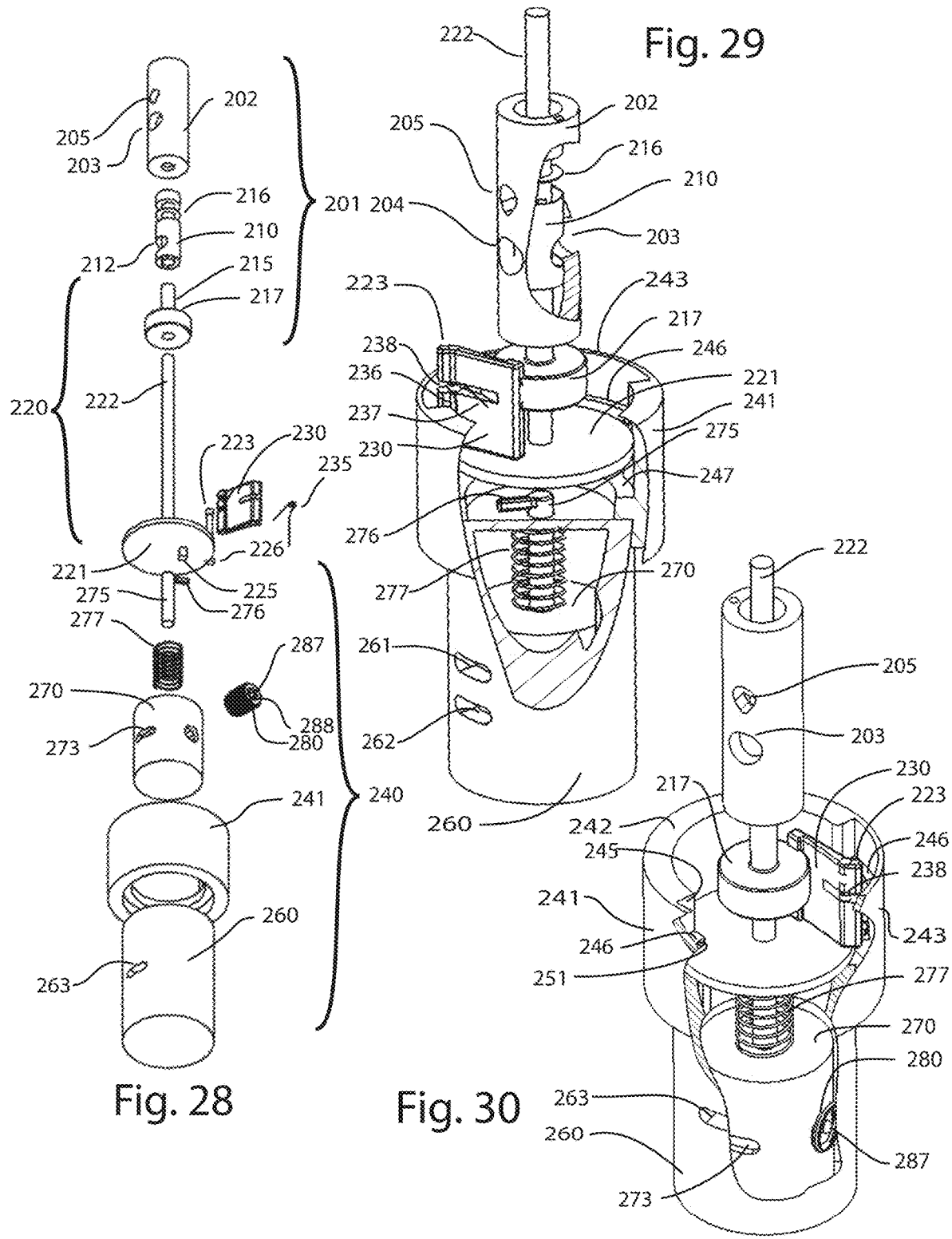

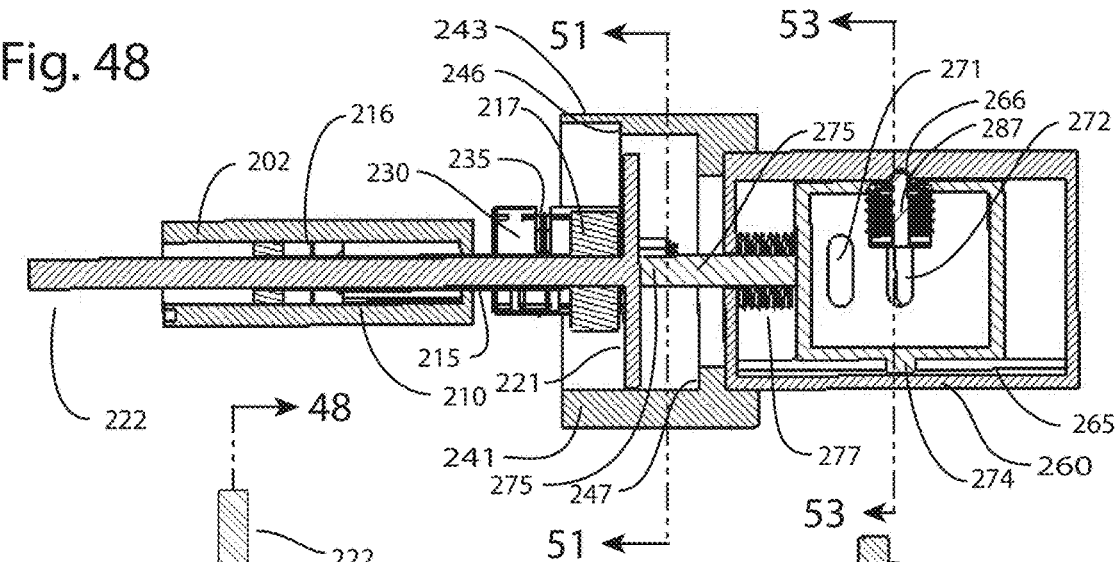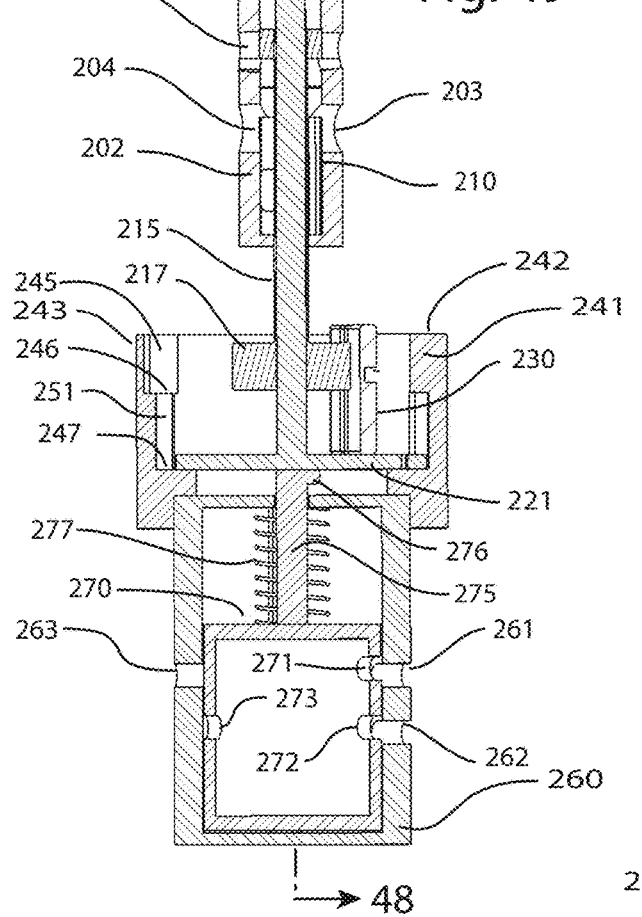

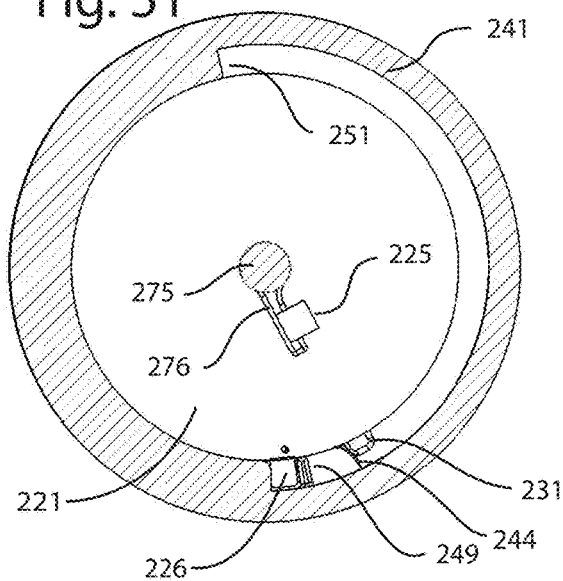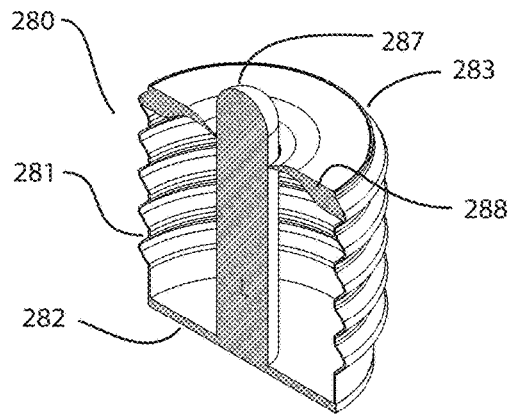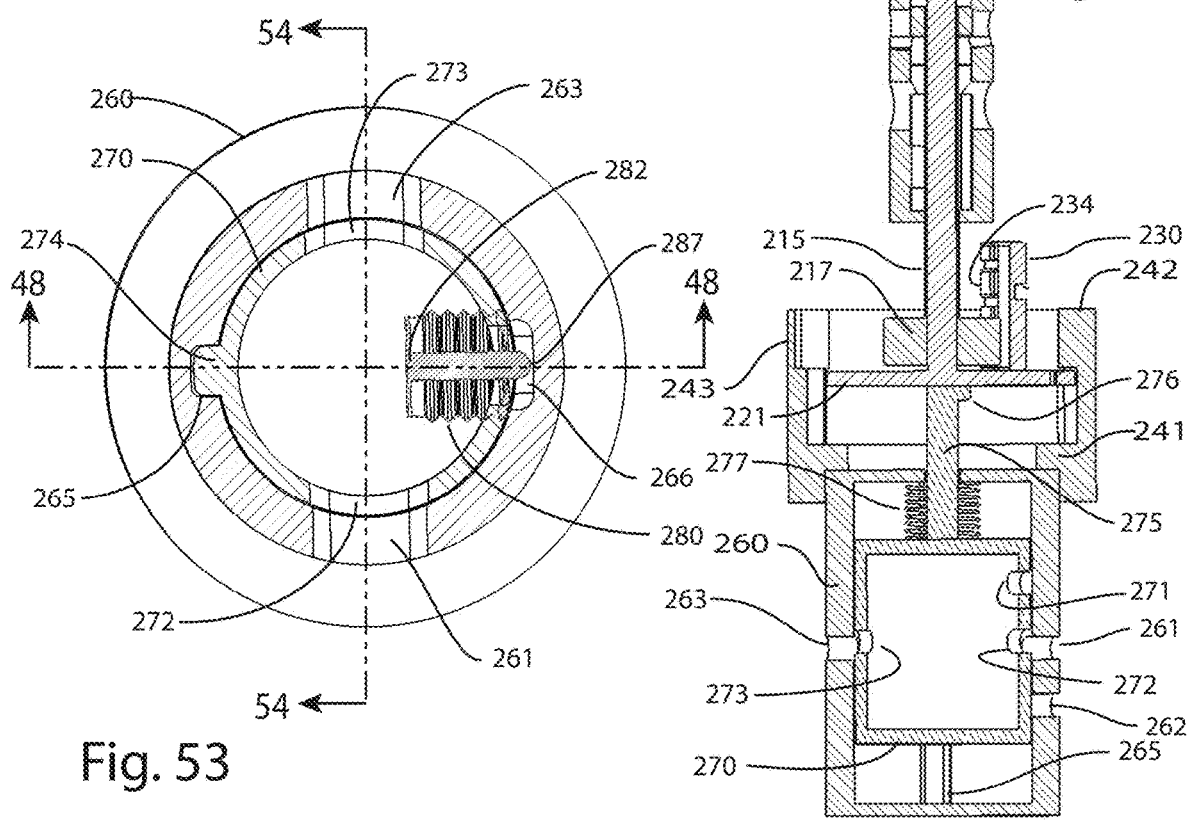

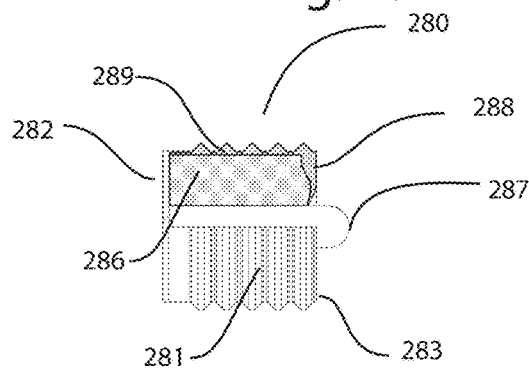
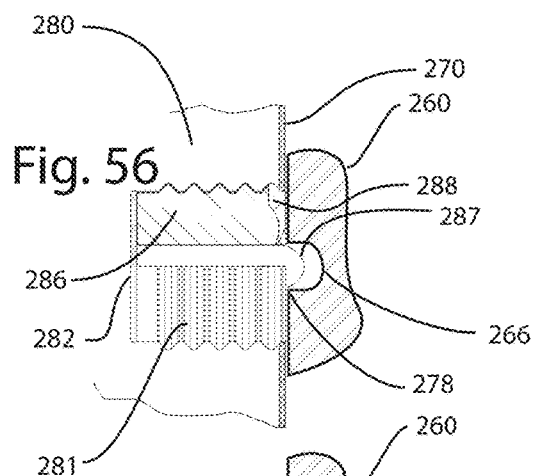
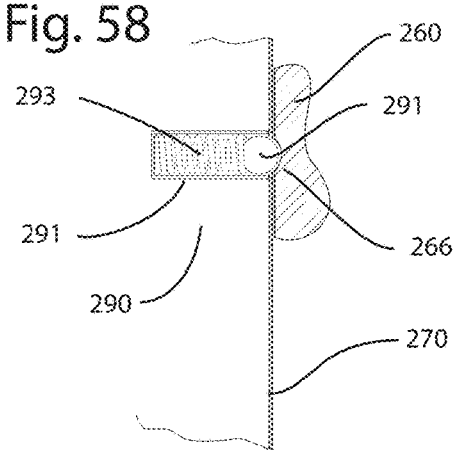
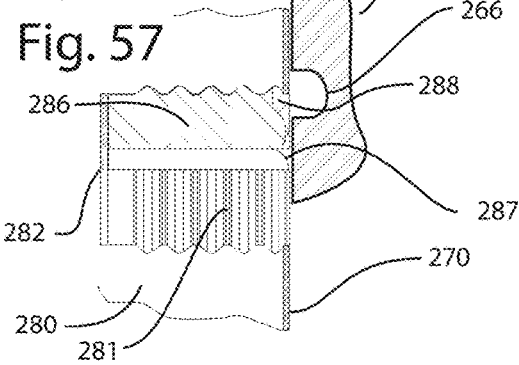
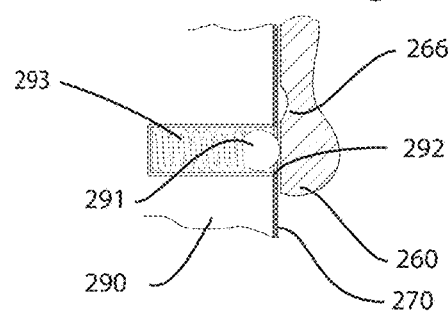

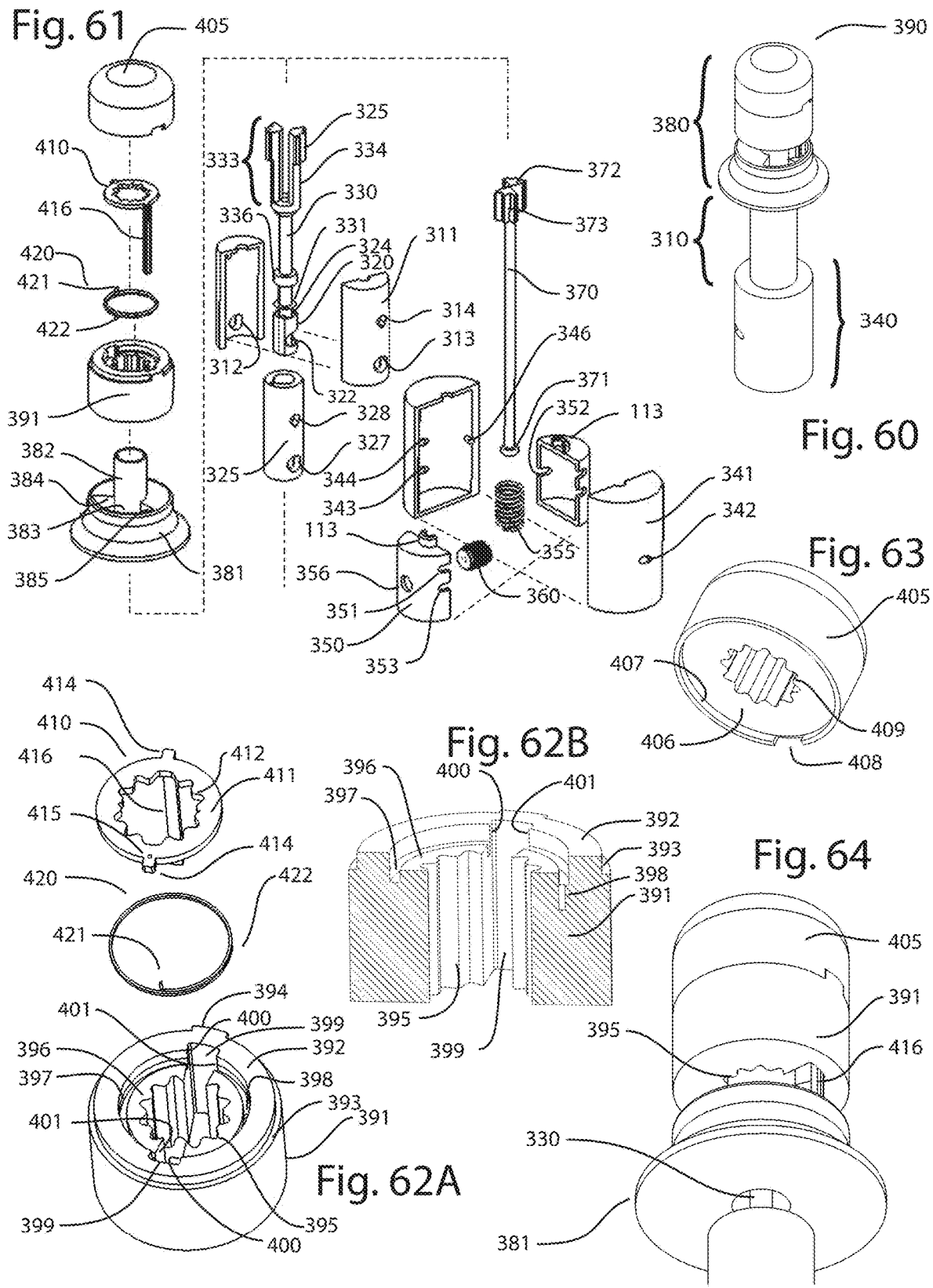

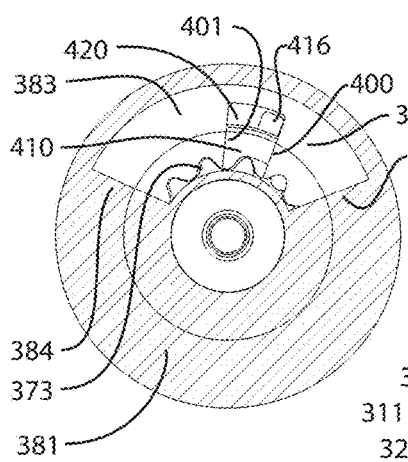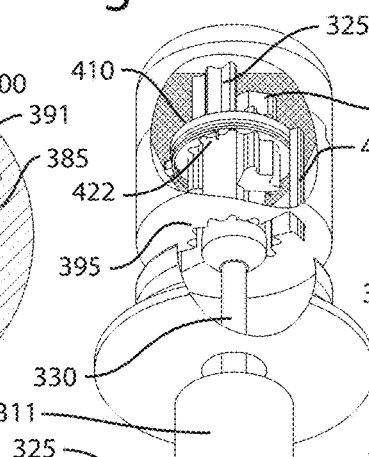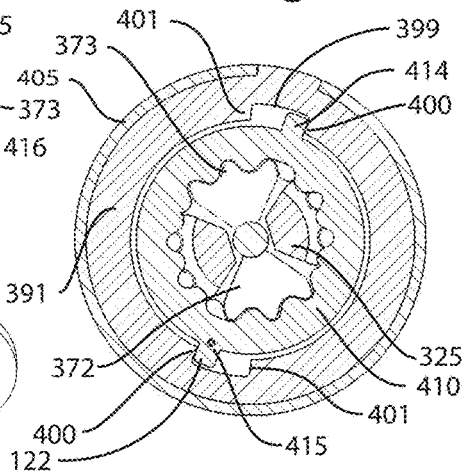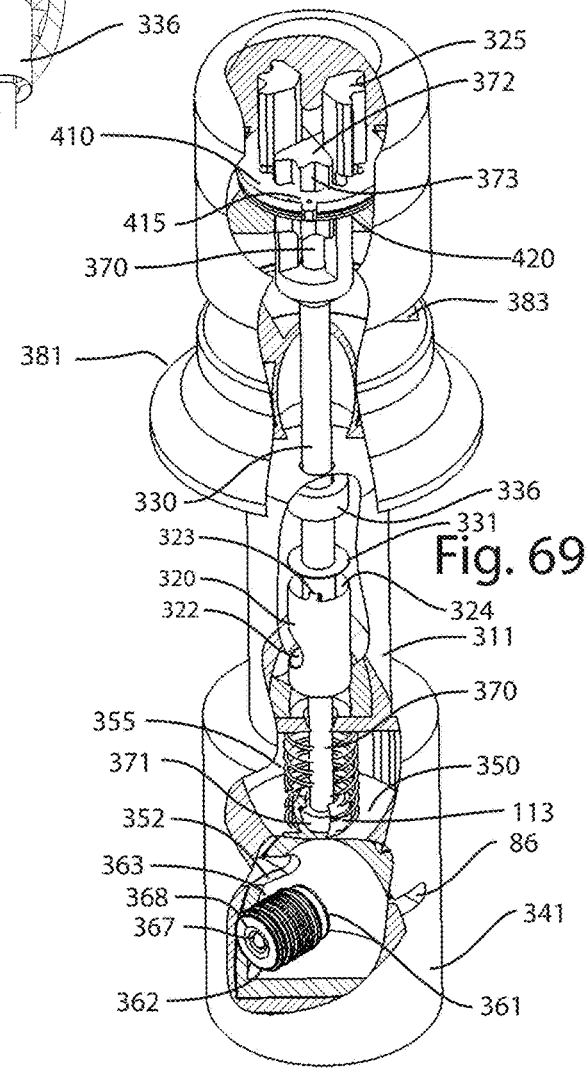

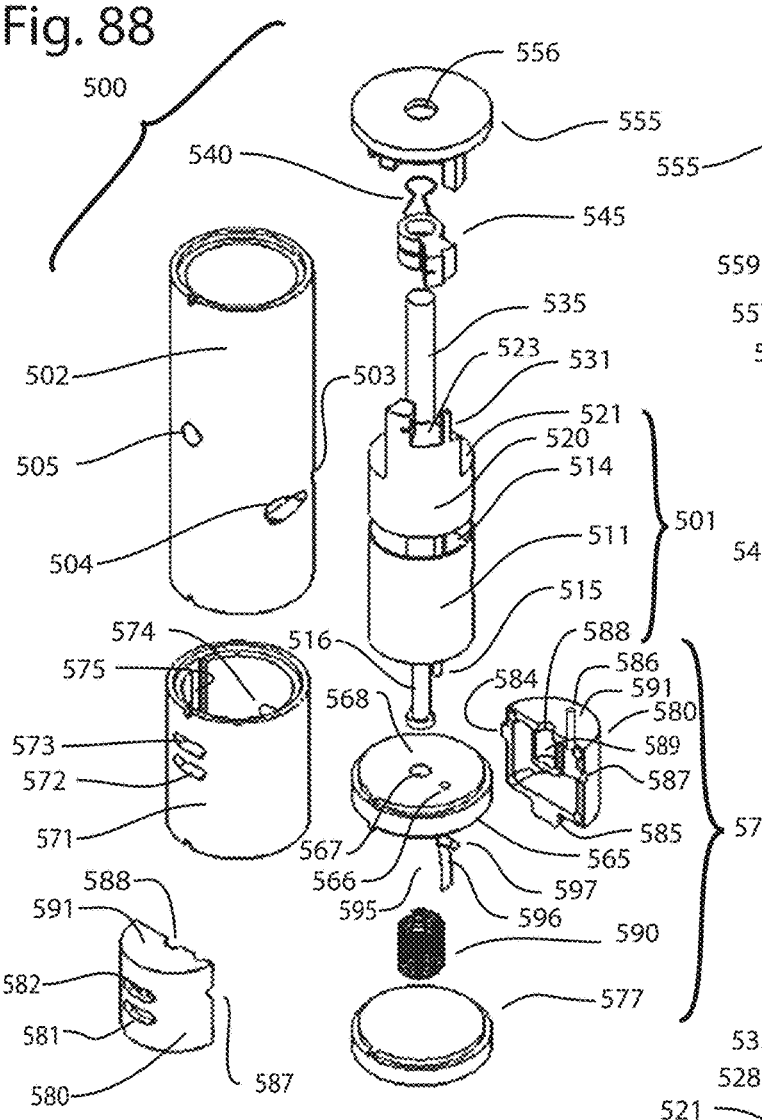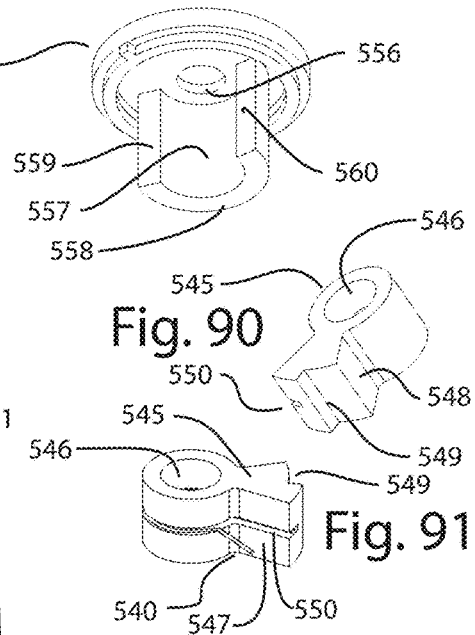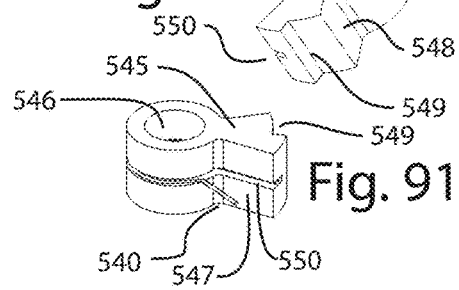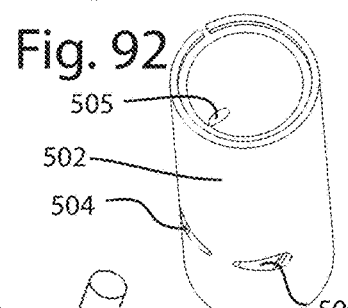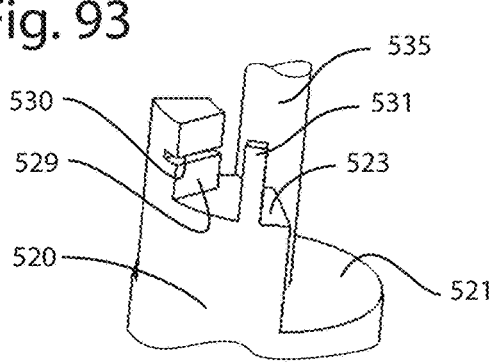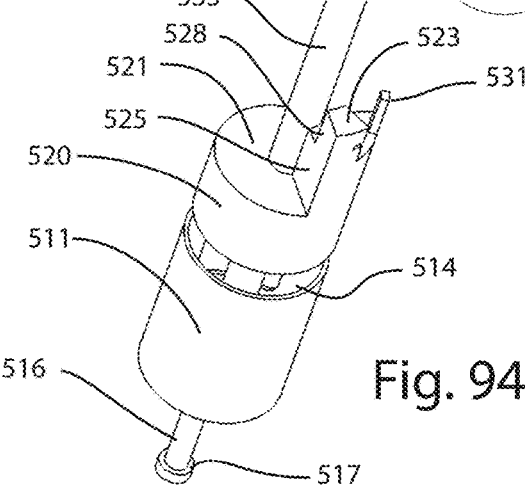

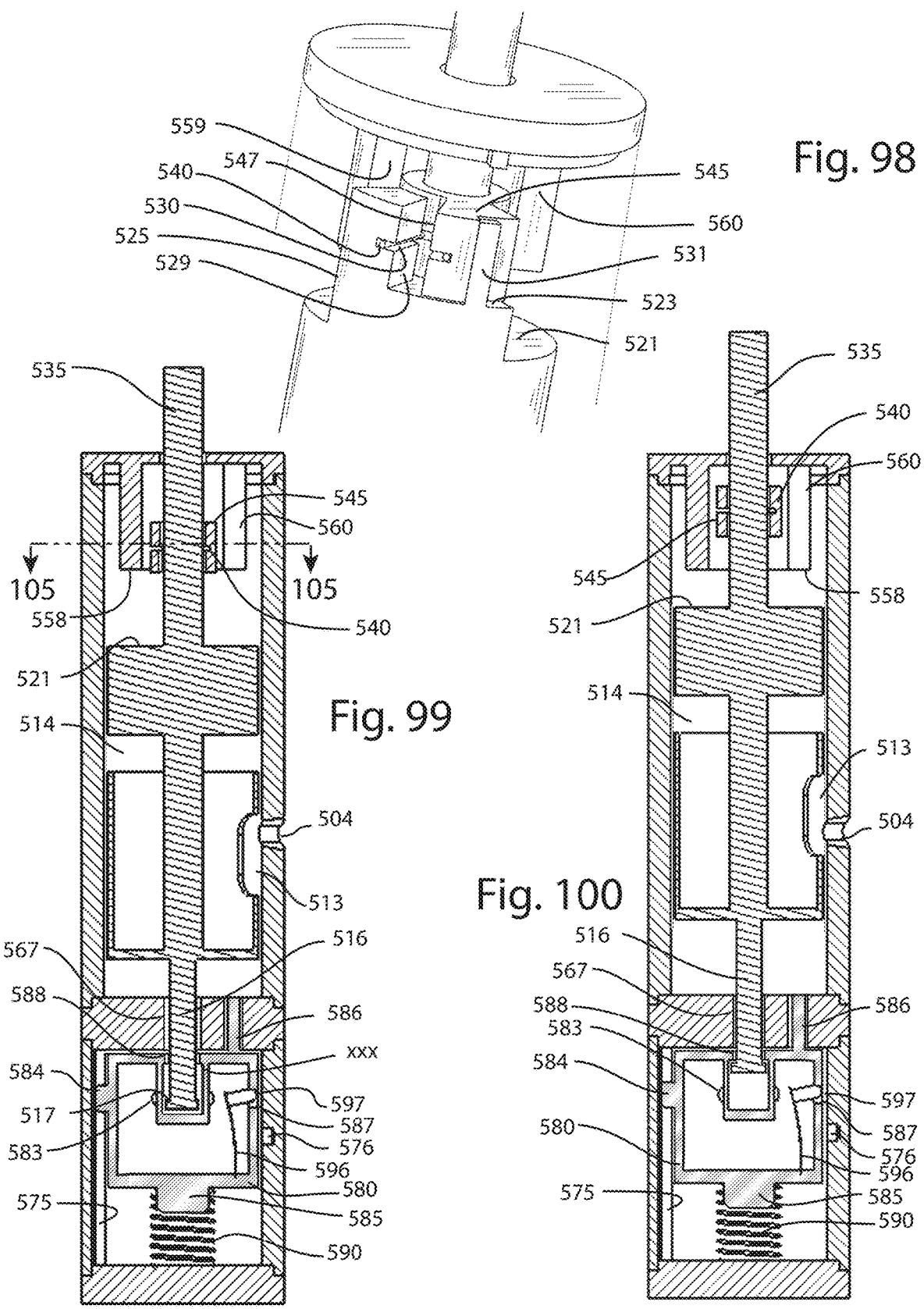

Section during mixing

Fig. 117B
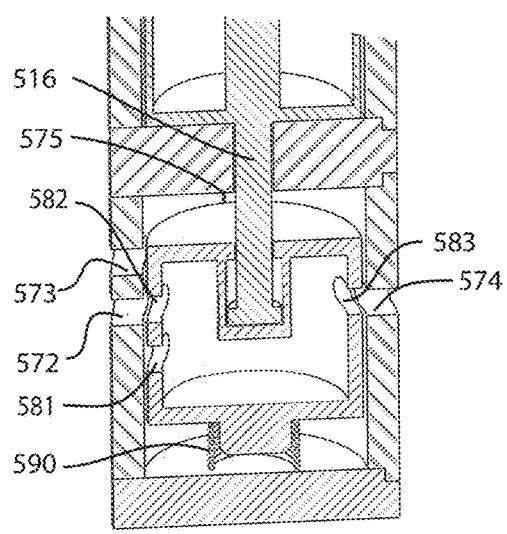
Fig. 118A
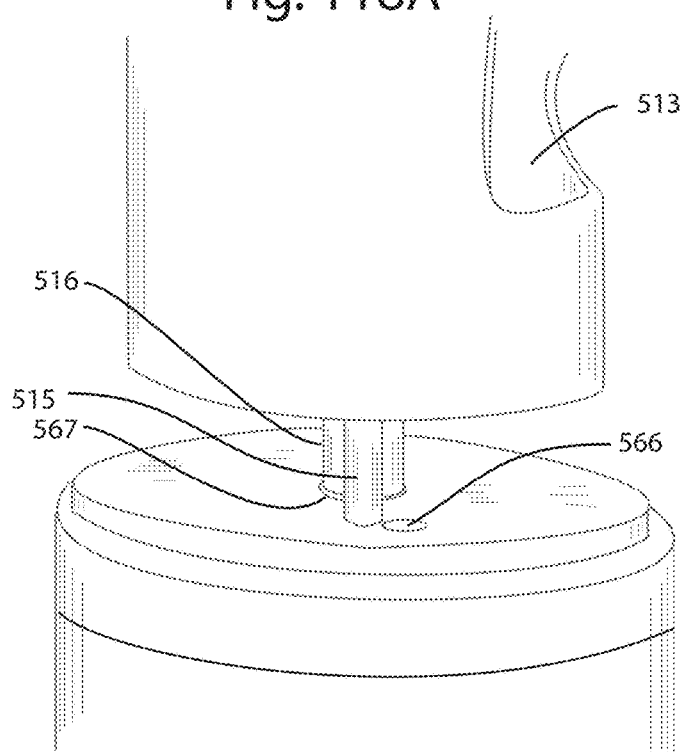
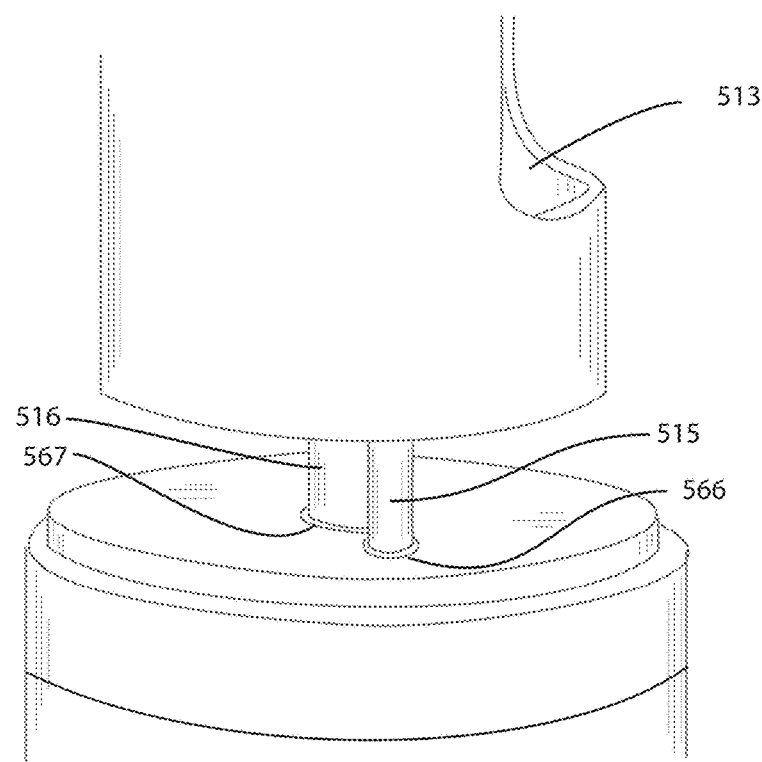
Fig. 118B

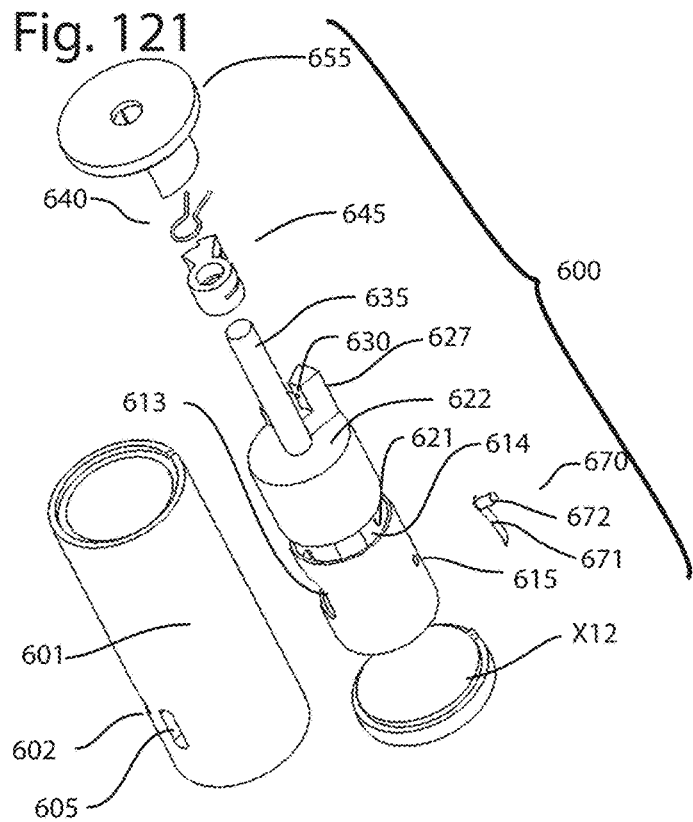
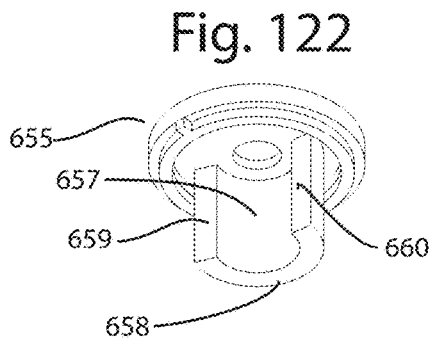
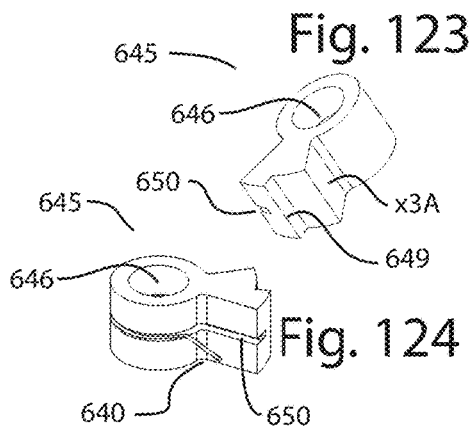
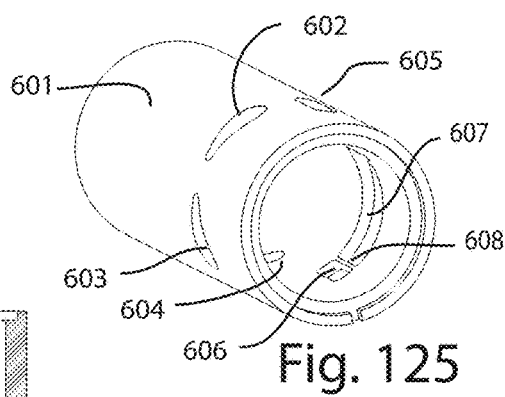
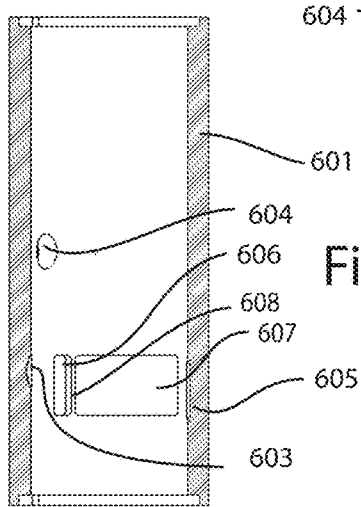
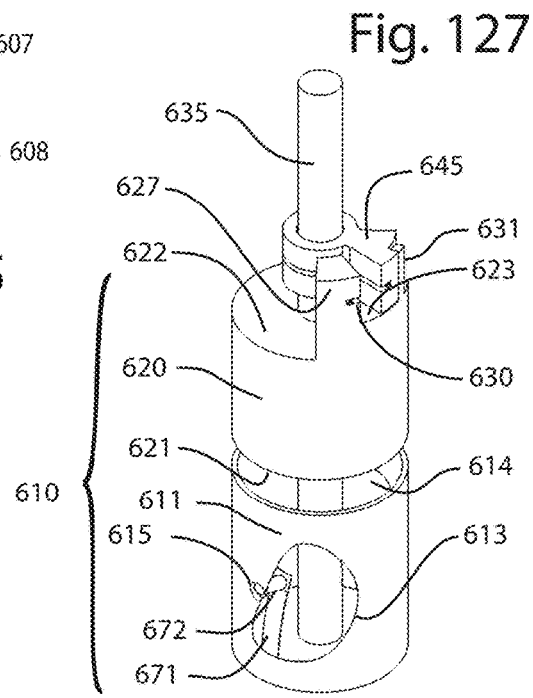

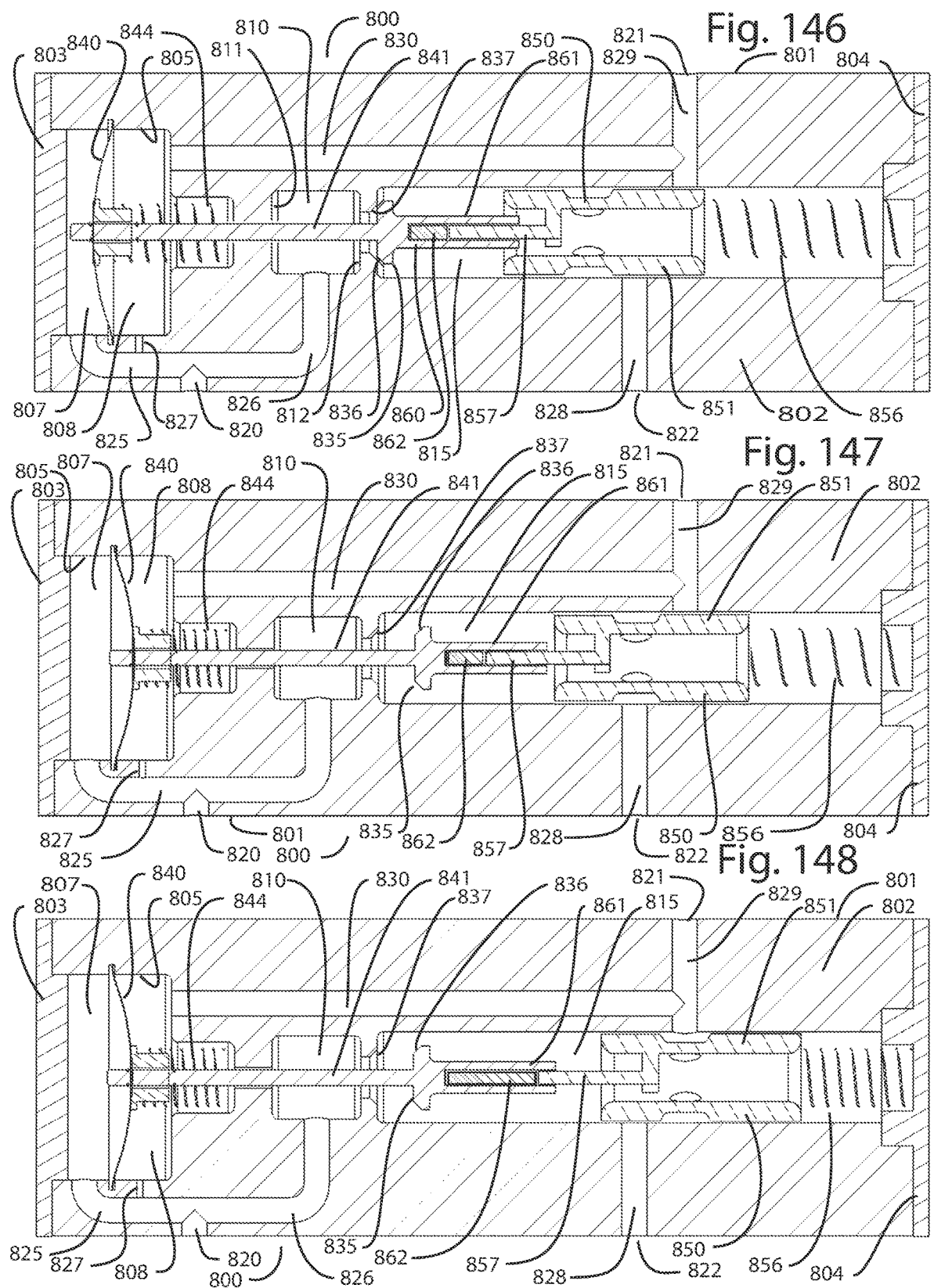

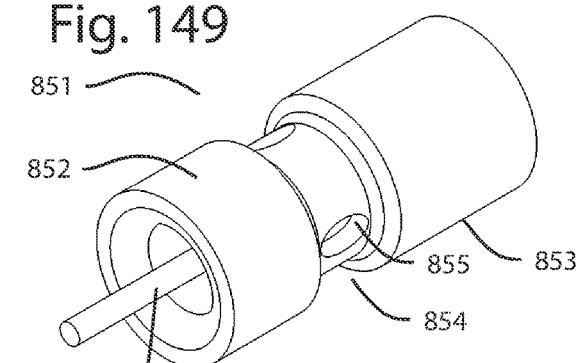
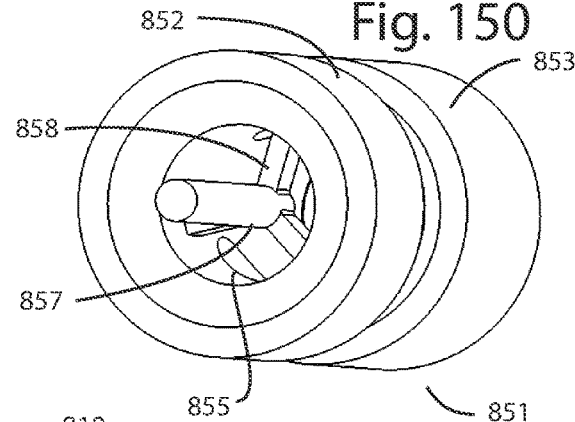
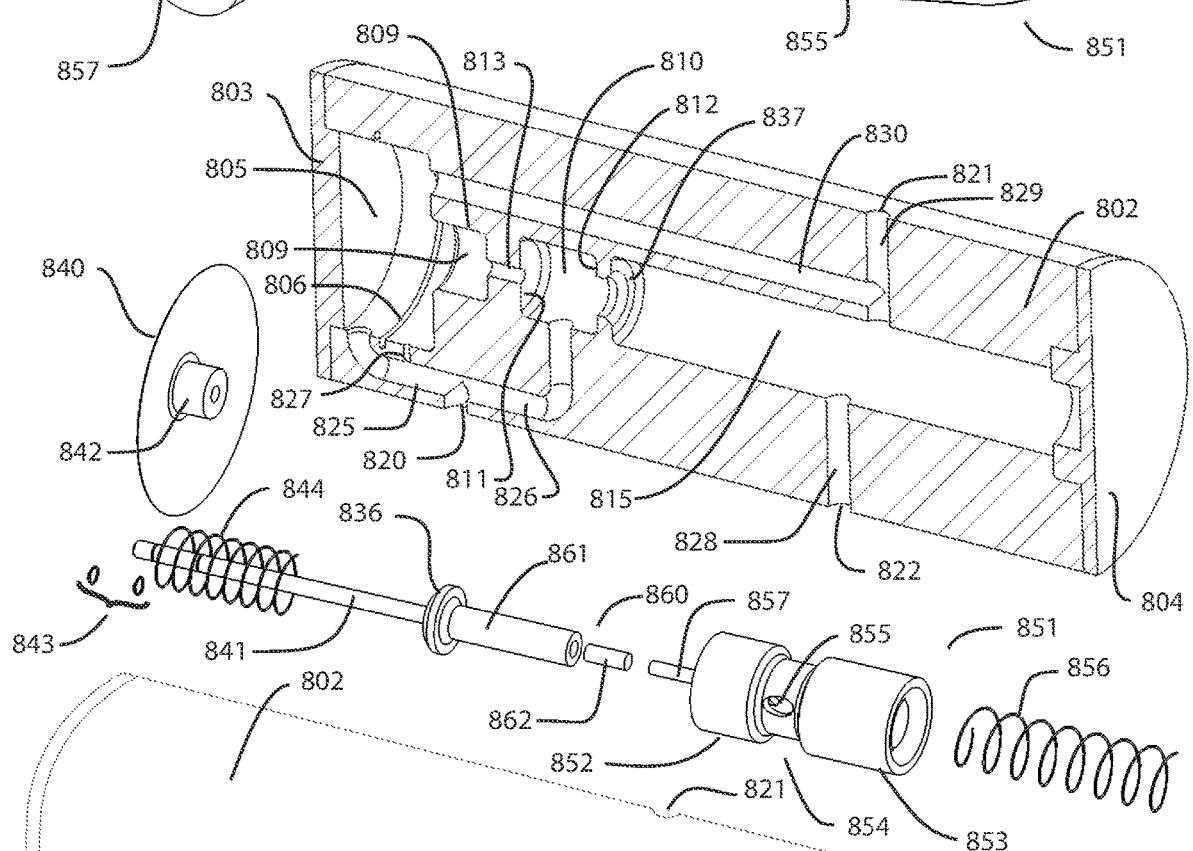

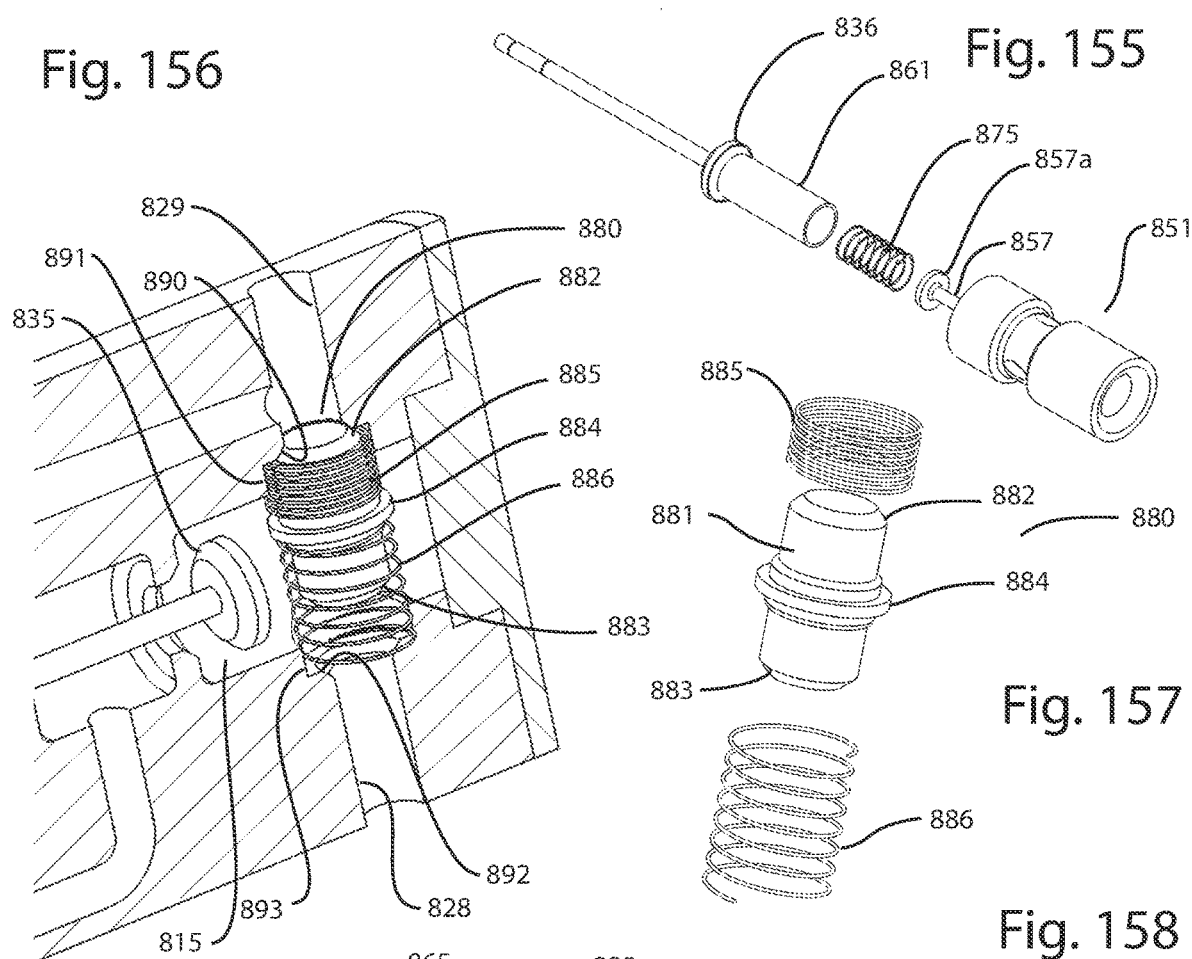
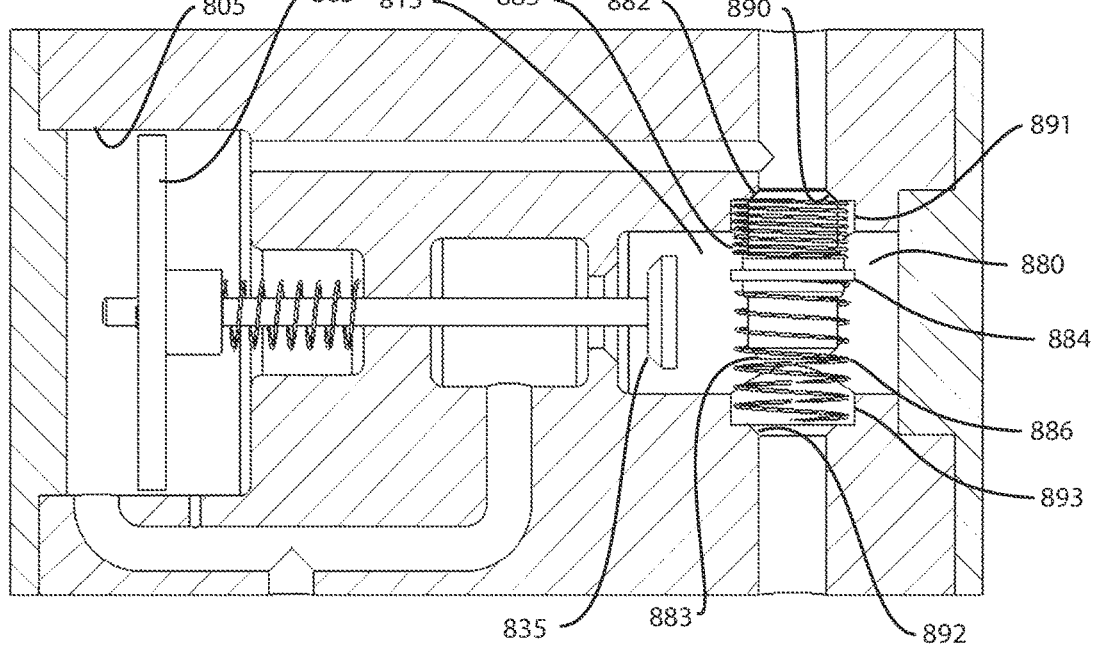

HOT WATER RECIRCULATION SYSTEM

REFERENCE TO RELATED APPLICATIONS

This application claims the benefit of U.S. Provisional Application No. 62/833,313 filed on Apr. 12, 2019 and U.S. Provisional Application No. 62/957,005 filed on Jan. 3, 2020. The disclosures of both provisional applications are incorporated herein by reference.

BACKGROUND OF THE INVENTION

This invention relates to a hot water recirculation system for buildings which conserves water and energy.

In many homes or small apartment buildings, a great deal of water is wasted while a user is waiting for hot water to finally flow from a plumbing fixture such as a faucet or shower. Often it may take several minutes until hot water makes its way through cold pipes, warming them up and flushing cold or lukewarm water from the pipes. Not only is the water which is flushed from the pipes typically lost down the drain, but the heat stored in the water is also lost.

A 2009 EPA estimate found that 280 million gallons of hot water was wasted each day in showering alone. The energy used to heat this wasted water results in annual greenhouse gas emissions equal to that of 1.6 million passenger vehicles.

A typical home may waste about 30 gallons a day while users wait for hot water. Some estimates show that 300 billion gallons of water are lost in this way each year.

Modern building codes do not necessarily help with this situation. With a 50-foot run of ¾-inch pipe from the water heater to a water-conserving faucet, it will take roughly three minutes to get hot water at the faucet, during which time lukewarm water in the pipe and its thermal energy are going down the drain and heat is radiating into the house.

Hotels avoid this problem by having hot water continuously pumped through a closed recirculation loop. Individual hotel faucets are on relatively short branches close to the main recirculation loop, so hot water is quickly available at the faucet. Such a system is obviously not practical in a private home.

Similar recirculating systems have been proposed for home use in which recirculation pumps are only run for a limited time when flow is sensed. These systems can be more efficient and can minimize wear and tear on the pumps by not running continuously, such as when a house is not occupied. Energy is still lost due to the need to heat the entire hot water loop, which acts as a radiator, warming the house and wasting energy.

Other systems use a small pump under a sink or nearby a shower or faucet. With these systems, the user typically presses a button to turn on the pump, which pumps cold or lukewarm water present in piping either into the cold water pipe (in a typical retrofit installation) or else into a return line going to a hot water heater (which is preferred in new installations). When the water reaches a set-point temperature, the pump turns off.

Tankless water heaters only solve this water and energy loss problem if they are located in proximity to a faucet or other plumbing fixture where hot water is needed. Otherwise they have the same problem as conventional heaters in that the cold water in the pipes from the water heater to the faucet must first be displaced by hot water and the pipes must be warmed before the "instant" hot water from the tankless system will flow from the faucet. This is a common problem with tankless systems, since a tankless system is often installed to replace a conventional water heater and is located far from plumbing fixtures in the basement.

Accordingly, there is a need for a hot water recirculation system for buildings which is more energy efficient than existing systems.

SUMMARY OF THE INVENTION

The present invention provides an improved hot water recirculation system which can minimize loss of water and energy while a user is waiting for hot water to be supplied to a hot water plumbing fixture.

The present invention also provides a flow switching apparatus for use in such a hot water recirculation system. In the following description, the flow switching apparatus will be referred to as a flow switching module or simply as a module.

The present invention further provides an ergonomic mixing valve for a faucet or other hot water plumbing fixture that can switch hot water flow to a recirculating network when the incoming water is below a desired temperature.

The present invention also provides a method of operating a hot water recirculation system.

In one form of the present invention, a hot water recirculation system includes a water heater installed in a house or other building, a plumbing fixture which employs hot water (referred to below as a hot water plumbing fixture), hot water supply piping for supplying hot water from the water heater to the hot water plumbing fixture, and return piping for returning water from the hot water plumbing fixture to the water heater. The system further includes a flow switching module associated with the hot water plumbing fixture and fluidly connected to the hot water supply piping and the return piping. The flow switching module can selectively supply water from the hot water supply piping either to the hot water plumbing fixture or divert water to the return piping for return to the water heater. Water which is diverted to the return piping is reheated by the water heater and then resupplied to the flow switching module.

The recirculation system may include one or more hot water plumbing fixtures, and it may also includes one or more flow switching modules. Each flow switching module may be associated with one or more hot water plumbing fixture.

In preferred forms of the present invention, the recirculation system is "demand driven" in that recirculation takes place only with respect to hot water plumbing fixtures which are currently in use by a user. Recirculation can take place with respect to a single hot water plumbing fixture, or a plurality of hot water plumbing fixtures which are simultaneously in use can undergo recirculation at the same time.

In one form of the present invention, recirculation takes place automatically with respect to a hot water plumbing fixture when the hot water plumbing fixture is turned on by a user and the temperature of water being supplied to the hot water plumbing fixture is below a predetermined minimum temperature threshold, which will be referred to below as a "set-point" temperature. Recirculation continues until the temperature of water being supplied to the hot water plumbing fixture reaches the set-point temperature, at which time recirculation is automatically terminated and the hot water plumbing fixture can be operated in a normal manner without recirculation.

In another form of the present invention, recirculation of water with respect to a hot water plumbing fixture takes place only when a user of the hot water plumbing fixture manually sets the flow switching module associated with the hot water plumbing fixture to a preheat setting. Recirculation continues until either the water temperature supplied to the hot water plumbing fixture reaches the set-point temperature or the user turns the hot water plumbing fixture off. At the completion of recirculation, the hot water plumbing fixture can be operated in a normal manner without recirculation.

A recirculation system according to the present invention typically includes a pump connected to the return piping for returning water from one or more hot water plumbing fixtures to the water heater. Since the pump only needs to operate when a hot water plumbing fixture is actually in use and undergoing recirculation, wear of the pump is reduced compared to a recirculation system in which a pump operates continuously or at regular intervals to recirculate water to a water heater.

A hot water recirculation system according to the present invention can be used with a wide variety of hot water plumbing fixtures, including faucets, showers, bathtubs, bidets, bidet seats for toilets, hot tubs, washing machines, and dishwashers, for example. The hot water recirculation system is particularly suitable for residential buildings such as houses or apartment buildings, but it can also be effectively used in commercial buildings such as office buildings, hotels, or stores. The system can be installed in a new building at the time of construction, or it can be retrofitted into an existing building, such as during renovation of an older home.

A flow switching module for a water circulation system according to the present invention may be integrated into the structure of a hot water plumbing fixture or it may be a separate device from a hot water plumbing fixture and fluidly connected to the hot water plumbing fixture on the exterior of the hot water plumbing fixture. When the flow switching module is integrated into the structure of the hot water plumbing fixture, it may function as the main flow control mechanism for the hot water plumbing fixture, controlling both the rate and the temperature of water which is discharged from the hot water plumbing fixture. In preferred embodiments, the flow switching module has an ergonomic design which enables a user to operate the module in much the same manner as a conventional mixing valve for a plumbing fixture, making the operation of the flow switching module both easy and intuitive.

These and other features of the present invention will be set forth in detail in the following description and the accompanying drawings.

BRIEF DESCRIPTION OF THE DRAWINGS

FIG. 6 is an exploded axonometric view of an embodiment of a flow switching module which can function as a mixing valve for a plumbing fixture.

FIG. 7 is an elevation of the lower end of the casing of the embodiment of FIG. 6.

FIG. 8 is a cut-away axonometric view of the lower end of the embodiment of FIG. 6.

FIG. 9 is a cut-away axonometric view of the lower end of the embodiment of FIG. 6 as seen from a different angle.

FIG. 10 is a cut-away axonometric view of the lower end of the embodiment of FIG. 6 as seen from yet another angle.

FIG. 11 is an axonometric view of the lower end of the embodiment of FIG. 6 as seen from below.

FIG. 12 is a cutaway axonometric view of the lower end of the embodiment of FIG. 6.

FIG. 13 is a cutaway axonometric view of the embodiment of FIG. 6.

FIG. 14 is a cross-sectional elevation of a portion of the embodiment of FIG. 6 showing a thermal detent mechanism in an engaged state.

FIG. 15 is a cross-sectional elevation of the thermal detent mechanism of FIG. 14 in a retracted state.

FIG. 16 is a cross-sectional elevation of the embodiment of FIG. 6 when the cartridge is in an on state.

FIG. 17 is a cutaway axonometric view of the lower portion of the embodiment of FIG. 6 which has been cut along line 17-17 of FIG. 16.

FIG. 18 is a cutaway axonometric view of the lower portion of the embodiment of FIG. 6 which has been cut along line 18-18 of FIG. 16.

FIG. 19 is a cutaway axonometric view of the lower portion of the embodiment of FIG. 6 which has been cut along line 19-19 of FIG. 16.

FIG. 20 is a cutaway axonometric view of the lower portion of the embodiment of FIG. 6 which has been cut along line 20-20 of FIG. 16.

FIG. 21 is a cutaway axonometric view of the embodiment of FIG. 6 in which the upper portion of the casing has been omitted.

FIG. 22 is a transverse cross-sectional view of the embodiment of FIG. 6 taken along line 20-20 of FIG. 16.

FIG. 23 is a cross-sectional elevation of the embodiment of FIG. 6 when the cartridge is in a preheat rotational position.

FIG. 24 is a cutaway axonometric view of the embodiment of FIG. 6 when the cartridge is in a preheat rotational position.

FIG. 25 is a cutaway axonometric view of the lower portion of the embodiment of FIG. 6 which has been cut along line 25-25 of FIG. 23.

FIG. 26 is a cutaway axonometric view of the lower portion of the embodiment of FIG. 6 which has been cut along line 26-26 of FIG. 23.

FIG. 27 is a cutaway axonometric view of the embodiment of FIG. 6 as viewed from the lower end of the module.

FIG. 28 is an exploded axonometric view of another embodiment of a flow switching module according to the present invention.

FIG. 29 is a cutaway axonometric view of the embodiment of FIG. 28 in an assembled state.

FIG. 30 is a cutaway axonometric view of the embodiment of FIG. 28 in an assembly state as viewed from another angle.

FIG. 48 is a longitudinal cross-sectional view of the embodiment of FIG. 28 taken along line 48-48 of FIG. 49.

FIG. 49 is a cross-sectional elevation of the embodiment of FIG. 28 taken along line 49-49 of FIG. 45.

FIG. 50 is a cross-sectional elevation of the embodiment of FIG. 28 taken along line 50-50 of FIG. 45.

FIG. 51 is a transverse cross-sectional view of the embodiment of FIG. 28 taken along line 51-51 of FIG. 48.

FIG. 52 is a cutaway axonometric view of the thermal detent mechanism of the embodiment of FIG. 28 with the wax inside the thermal detent mechanism removed for clarity.

FIG. 53 is a transverse cross-sectional view of the embodiment of FIG. 28 taken along line 53-53 of FIG. 48.

FIG. 54 is a cross-sectional elevation of the embodiment of FIG. 28 taken along line 54-54 of FIG. 53.

FIG. 55 is a cutaway side view of the thermal detent mechanism of FIG. 52.

FIG. 56 is a cross-sectional elevation of a lower portion of the embodiment of FIG. 28 showing the thermal detent mechanism of FIG. 52 in an engaged state.

FIG. 57 is a cross-sectional elevation of a lower portion of the embodiment of FIG. 28 showing the thermal detent mechanism of FIG. 52 in a retracted state.

FIG. 58 is a cross-sectional elevation of another example of a thermal detent mechanism which can be employed in the present invention, showing a ball of the thermal detent mechanism engaging a recess in the preheat casing.

FIG. 59 is a cross-sectional elevation of the thermal detent mechanism of FIG. 58, showing a ball of the thermal detent mechanism disengaged from a recess in the preheat casing.

FIG. 60 is an axonometric view of another embodiment of the present invention.

FIG. 61 is an exploded axonometric view of the embodiment of FIG. 60.

FIG. 62A is an exploded axonometric view of the lower portion of the knob of the embodiment of FIG. 60, and FIG. 62B is a cutaway axonometric view of the lower portion of the knob shown in FIG. 62A.

FIG. 63 is an axonometric view of the upper portion of the knob of the embodiment of FIG. 60.

FIG. 64 is an axonometric view of the selector assembly of the embodiment of FIG. 60.

FIG. 65 is a transverse cross-sectional view taken along line 65-65 of FIG. 68 and showing the embodiment of FIG. 60 when the knob is in the normal rotational range.

FIG. 66 is a cutaway axonometric view of the upper portion of the embodiment of FIG. 60 when the knob is in the normal rotational range and the valve cartridge is in a raised position.

FIG. 67 is a transverse cross-sectional view taken along line 67-67 of FIG. 68 and showing the knob in the normal rotational range.

FIG. 68 is a cross-sectional elevation of the embodiment of FIG. 60 showing the knob in the normal rotational range and the valve cartridge in a raised position.

FIG. 69 is a cutaway axonometric view of the embodiment of FIG. 60 showing the knob in the normal rotational range and the valve cartridge in a raised position.

FIG. 88 is an exploded axonometric view of another embodiment of a flow switching module according to the present invention.

FIG. 89 is an axononmetric view of the upper end cap of the embodiment of FIG. 88.

FIG. 90 is an axonometric view of the collar of the embodiment of FIG. 88.

FIG. 91 is another axonometric view of the collar of the embodiment of FIG. 88 as viewed from a different angle.

FIG. 92 is an axonometric view of the valve casing of the embodiment of FIG. 88.

FIG. 93 is an axonometric view of the upper end of the valve cartridge of FIG. 88 with the collar and biasing spring removed.

FIG. 94 is an axonometric view of the entire valve cartridge of the embodiment of FIG. 88 with the collar and biasing spring removed.

FIG. 98 is a schematic axonometric view of the upper portion of the embodiment of FIG. 88 when the valve cartridge is in an off position in the longitudinal direction and in the full cold rotational position with the valve casing shown in outline.

FIG. 99 is a cross-sectional elevation of the embodiment of FIG. 88 when the valve cartridge is in an off position in the longitudinal direction and in the full cold rotational position.

FIG. 100 is a cross-sectional elevation of the embodiment of FIG. 88 when the valve cartridge is in an on position in the longitudinal direction and in the full cold rotational position.

FIG. 117B is a cutaway axonometric view of the preheat assembly of the embodiment of FIG. 88 when the preheat core is in a lowered (preheat) position.

FIG. 118A is an axonometric view of the lower portion of the valve cartridge and the upper portion of the preheat assembly of the embodiment of FIG. 88 when the valve cartridge is in a rotational position slightly offset from the preheat rotational range.

FIG. 118B is an axonometric view similar to FIG. 118A showing the valve cartridge in the preheat rotational range.

FIG. 118C is a transverse cross-sectional view of the embodiment of FIG. 88 taken along line 118C-118C of FIG. 116 and showing the valve cartridge in the preheat rotational range.

FIG. 119 is an enlarged cross-sectional view of the lower end of a rod secured to he lower end of the valve cartridge.

FIG. 120 is a cross-sectional elevation of the lower portion of the embodiment of FIG. 88.

FIG. 121 is an exploded axonometric view of another embodiment of a flow switching module according to the present invention.

FIG. 122 is an axonometric view of the upper end cap of the embodiment of FIG. 121.

FIG. 123 is an axonometric view of the collar of the embodiment of FIG. 121.

FIG. 124 is an axonometric view of the collar of the embodiment of FIG. 121 from another angle.

FIG. 125 is an axonometric view of the casing of the embodiment of FIG. 121.

FIG. 126 is a cross-sectional elevation of the casing of the embodiment of FIG. 121.

FIG. 127 is an axonometric view of the valve cartridge of the embodiment of FIG. 121.

Figure 128:
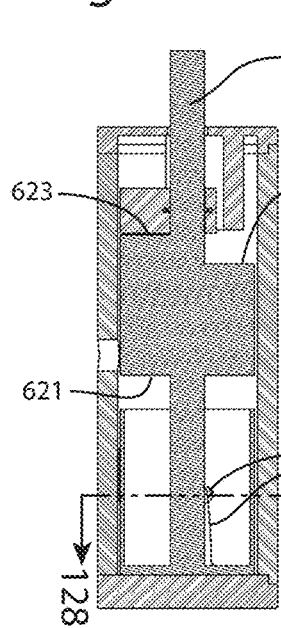

FIG. 128 is a cross-sectional elevation of the embodiment of FIG. 121 when the valve cartridge is in an off position in the longitudinal direction and in the full cold rotational range.

Figure 129:
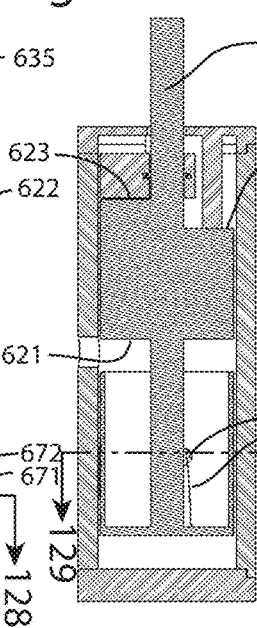

FIG. 129 is a cross-sectional elevation of the embodiment of FIG. 121 when the valve cartridge is in an on position in the longitudinal direction and in the full cold rotational range.

Figure 130:
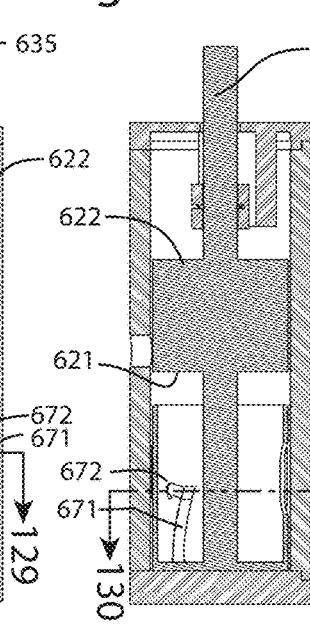

FIG. 130 is a cross-sectional elevation of the embodiment of FIG. 121 when the valve cartridge is in an off position in the longitudinal direction and in the full hot rotational range.

Figure 131:
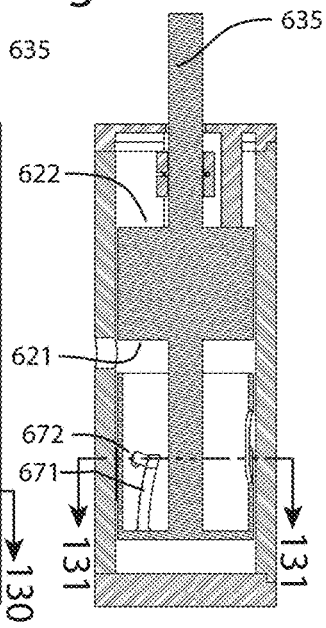

FIG. 131 is a cross-sectional elevation of the embodiment of FIG. 121 when the valve cartridge is in an on position in the longitudinal direction and in the full hot rotational range.

Figure 132:
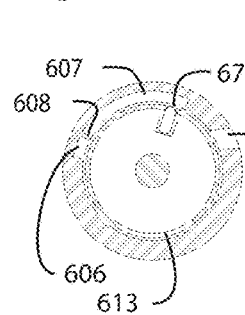

FIG. 132 is a transverse cross-sectional view taken along line 132-132 of FIG. 128.

Figure 133:
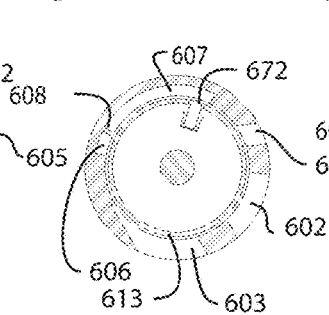

FIG. 133 is a transverse cross-sectional view taken along line 133-133 of FIG. 129.

Figure 134:
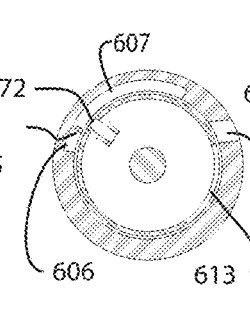

FIG. 134 is a transverse cross-sectional view taken along line 134-134 of FIG. 130.

Figure 135:
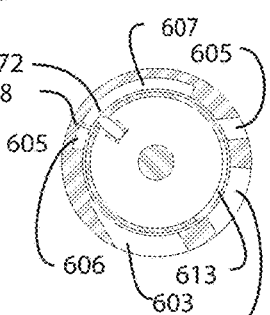

FIG. 135 is a transverse cross-sectional view taken along line 135-135 of FIG. 131.

Figure 136:
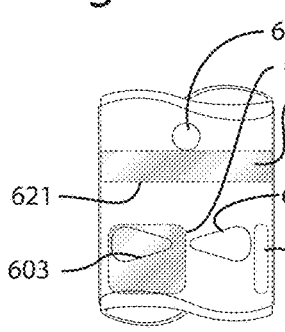

FIG. 136 is a schematic elevation of the midportion of the embodiment of FIG. 121 showing the position of the inlet of the valve cartridge with respect to the casing when the valve cartridge is in an off position in the longitudinal direction and in the full cold rotational range.

Figure 137:
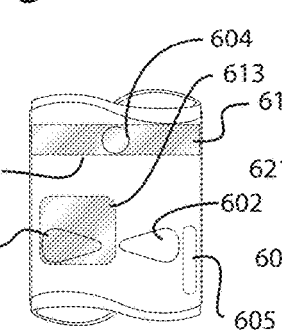

FIG. 137 is a schematic elevation of the midportion of the embodiment of FIG. 121 showing the position of the inlet of the valve cartridge with respect to the casing when the valve cartridge is in an on position in the longitudinal direction and in the full cold rotational range.

Figure 138:
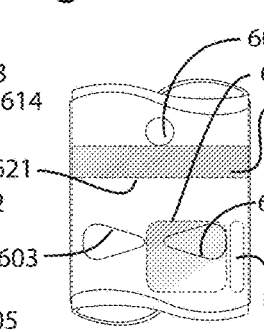

FIG. 138 is a schematic elevation of the midportion of the embodiment of FIG. 121 showing the position of the inlet of the valve cartridge with respect to the casing when the valve cartridge is in an off position in the longitudinal direction and in the full hot rotational range.

Figure 139:
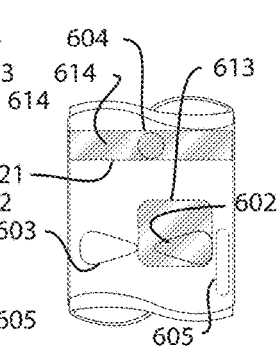

FIG. 139 is a schematic elevation of the midportion of the embodiment of FIG. 121 showing the position of the inlet of the valve cartridge with respect to the casing when the valve cartridge is in an on position in the longitudinal direction and in the full hot rotational range.

Figure 140:
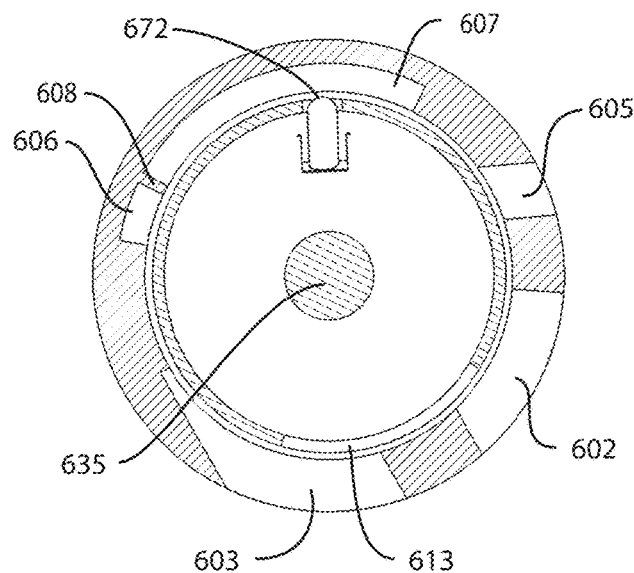

FIG. 140 is a transverse cross-sectional elevation of the embodiment of FIG. 121 when the valve cartridge is in a rotational position between the full cold position and the full hot position.

Figure 141:
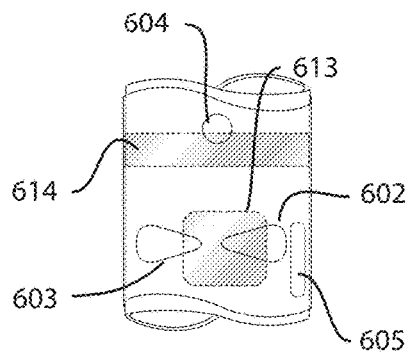

FIG. 141 is a schematic elevation of the midportion of the embodiment of FIG. 121 showing the position of the inlet of the valve cartridge with respect to the casing when the valve cartridge is in a partially on position in the longitudinal direction and in the rotational position shown in FIG. 136.

Figure 142:
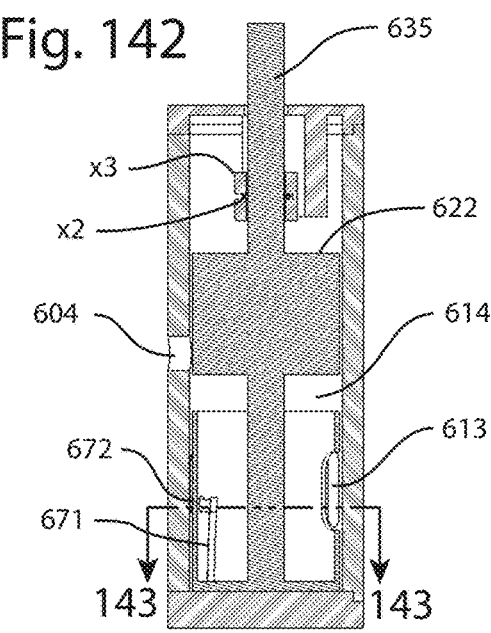

FIG. 142 is a cross-sectional elevation of the embodiment of FIG. 121 when the valve cartridge is in the preheat rotational range.

Figure 143:
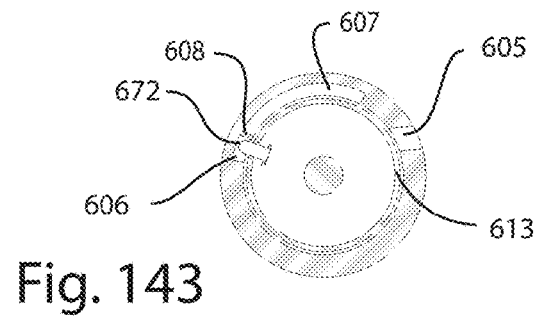

FIG. 143 is a transverse cross-sectional view taken along line 143-143 of FIG. 142.

Figure 144:
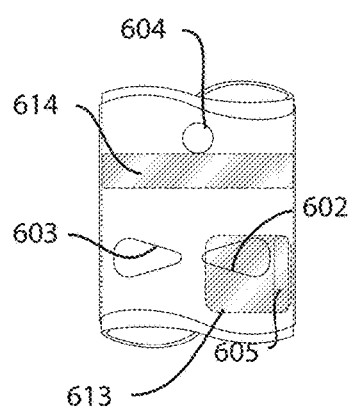

FIG. 144 is a schematic elevation of the midportion of the embodiment of FIG. 121 showing the position of the inlet of the valve cartridge with respect to the casing when the valve cartridge is the preheat rotational range.

Figure 145:
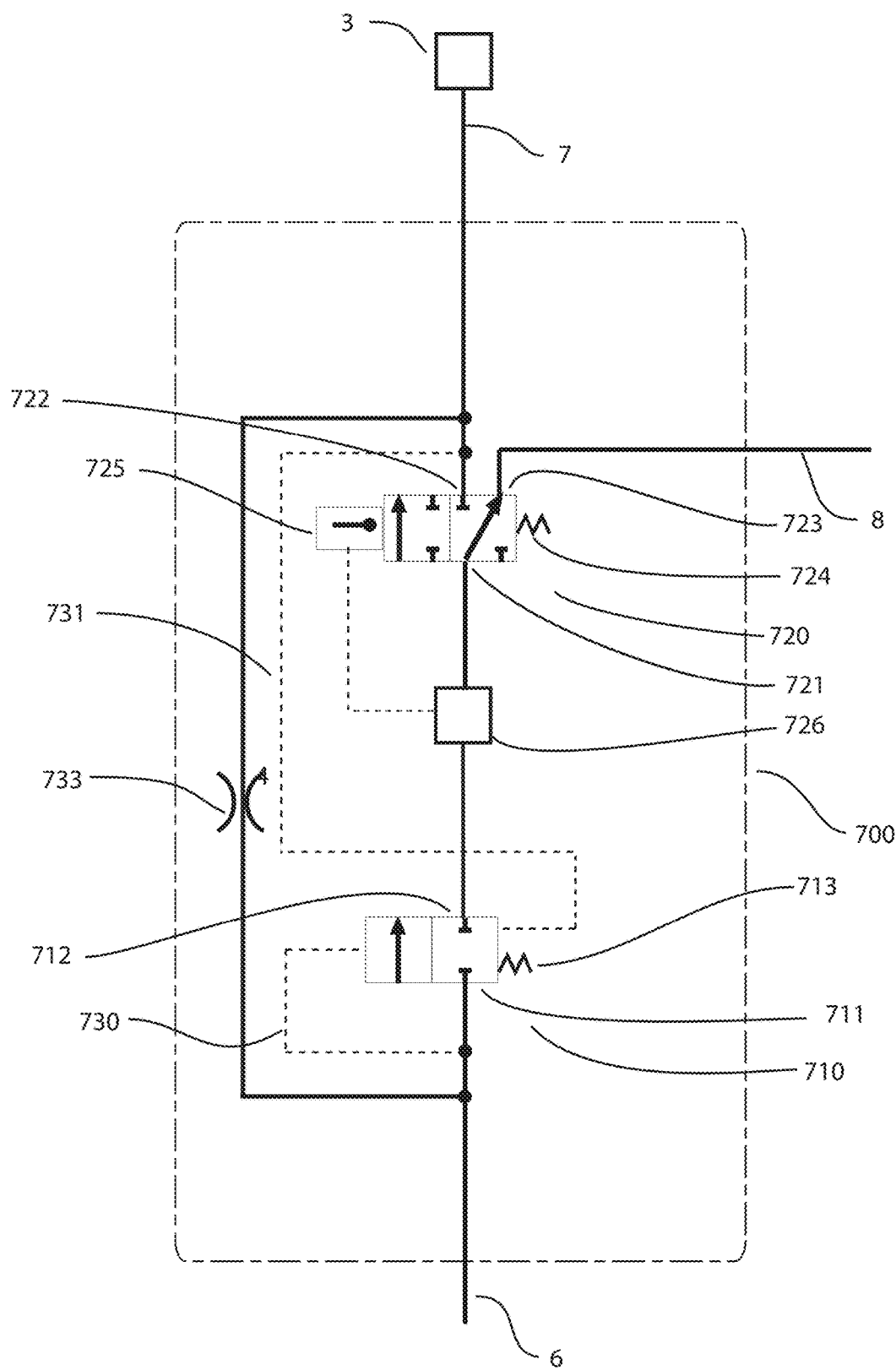

FIG. 145 is a schematic illustration of another embodiment of a flow switching module according to the present invention.

FIG. 146 is a longitudinal cross-sectional view of embodiment of a flow switching module according to the present invention which is a specific example of the embodiment schematically illustrated in FIG. 145 and which shows the module in an off state.

FIG. 147 is a longitudinal cross-sectional view of the embodiment of FIG. 146 in a preheat state.

FIG. 148 is a longitudinal cross-sectional view of the embodiment of FIG. 146 in an on state.

FIG. 149 is an axonometric view of the valve spool of the embodiment of FIG. 146.

FIG. 150 is another axonometric view of the valve spool of the embodiment of FIG. 146.

FIG. 151 is an exploded axonometric view of the embodiment of FIG. 146.

Figure 152:
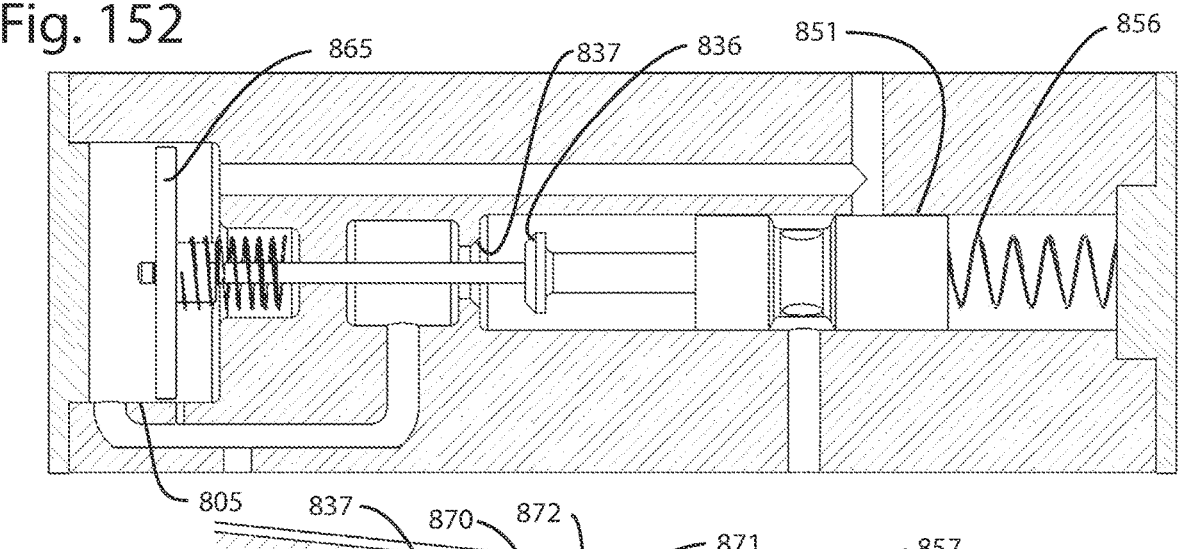

FIG. 152 is a longitudinal cross-sectional view of a modification of the embodiment of FIG. 146 which employs a piston in place of a diaphragm.

Figure 153:
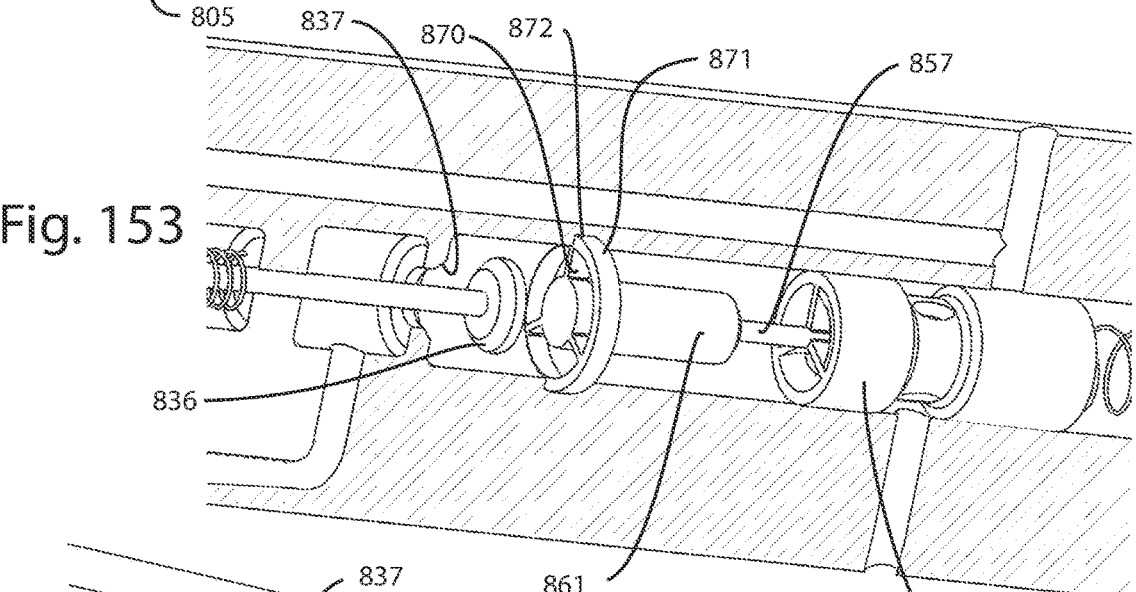

FIG. 153 is an axonometric view of one half of a modification of the embodiment of FIG. 146 in which a first valve and a second valve are not physically connected.

Figure 154:
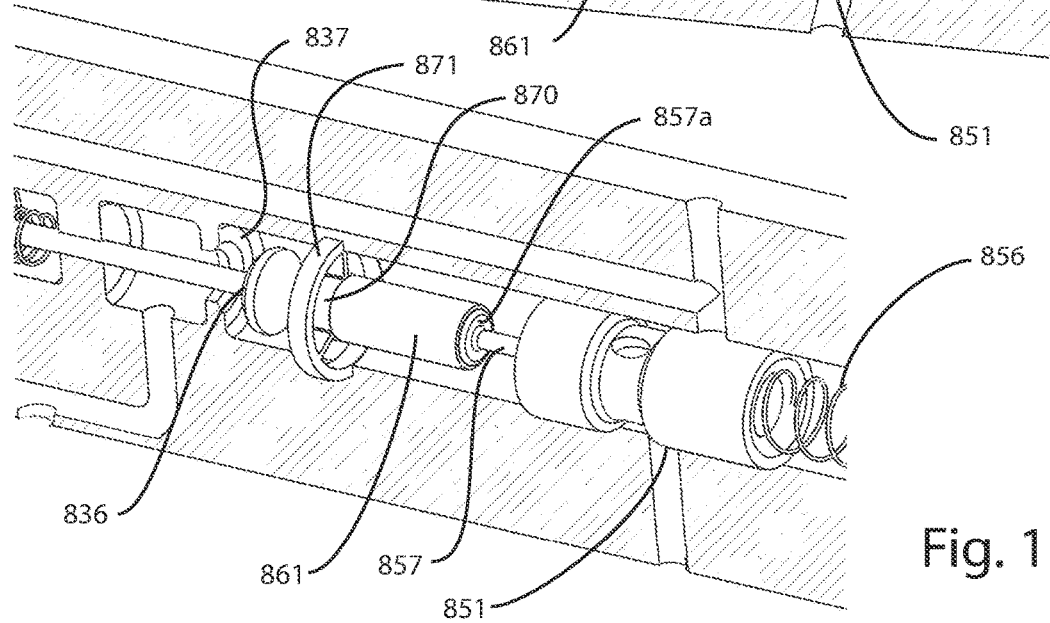

FIG. 154 is an axonometric view of the embodiment of FIG. 153 as viewed from another angle.

FIG. 155 is an exploded axonometric view of moving components of a modification of the embodiment of FIG. 146 in which wax has been replaced by a spring made of a shape memory alloy.

FIG. 156 is an axonometric view of a portion of the interior of a modification of the embodiment of FIG. 146 in which a second valve employs a shape memory alloy.

FIG. 157 is an exploded view of a portion of the second valve of the embodiment of FIG. 156.

FIG. 158 is a longitudinal cross-sectional view of the embodiment of FIG. 156.

Figure 159:
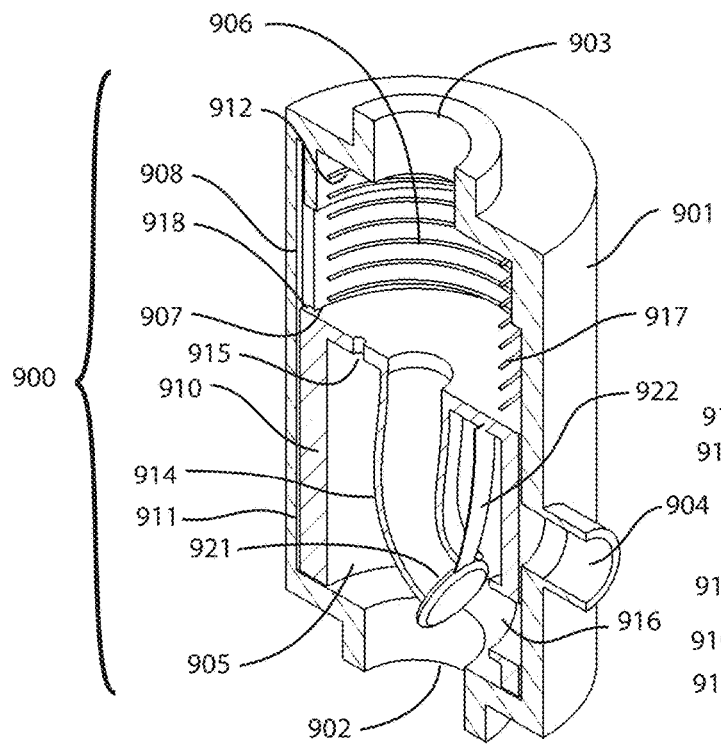

FIG. 159 is a cutaway axonometric view of another embodiment of a flow switching module in an off state.

Figure 160:
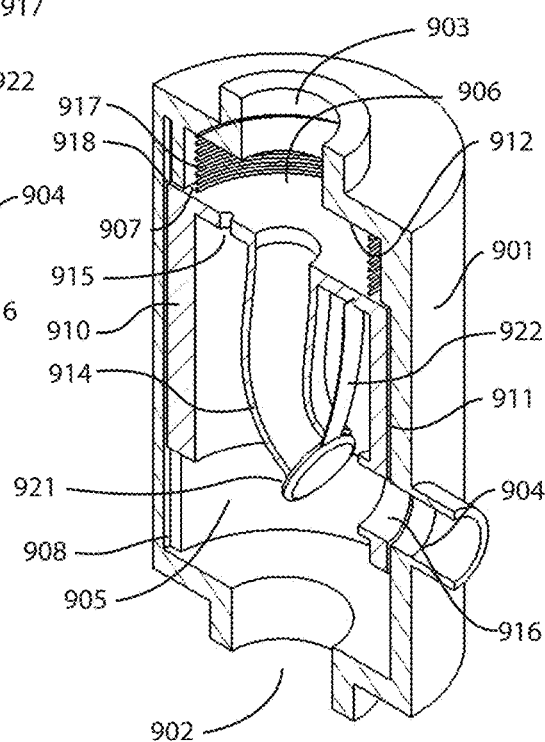

FIG. 160 is a cutaway axonometric view of the embodiment of FIG. 159 in a preheat state.

Figure 161:
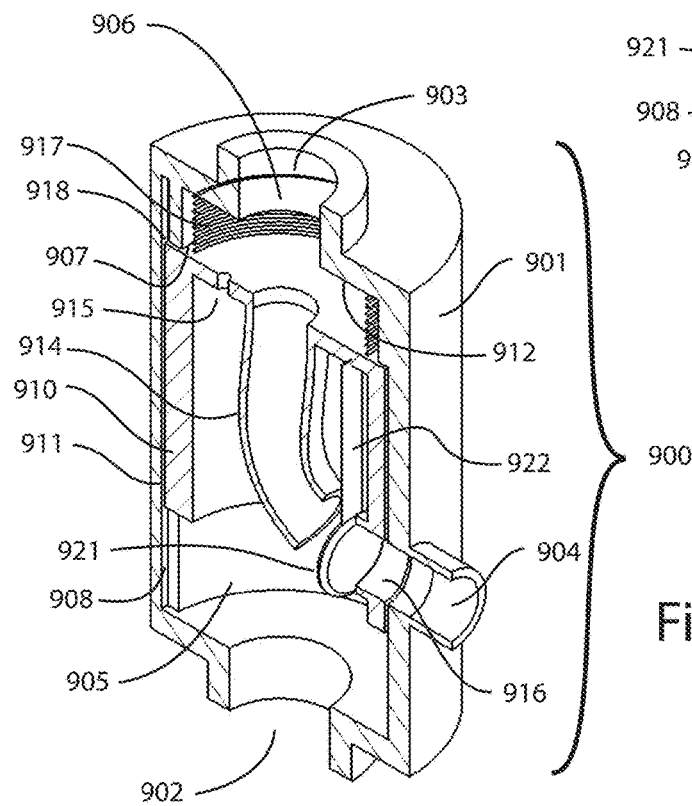

FIG. 161 is a cutaway axonometric view of the embodiment of FIG. 159 in an on state.

Figure 162:
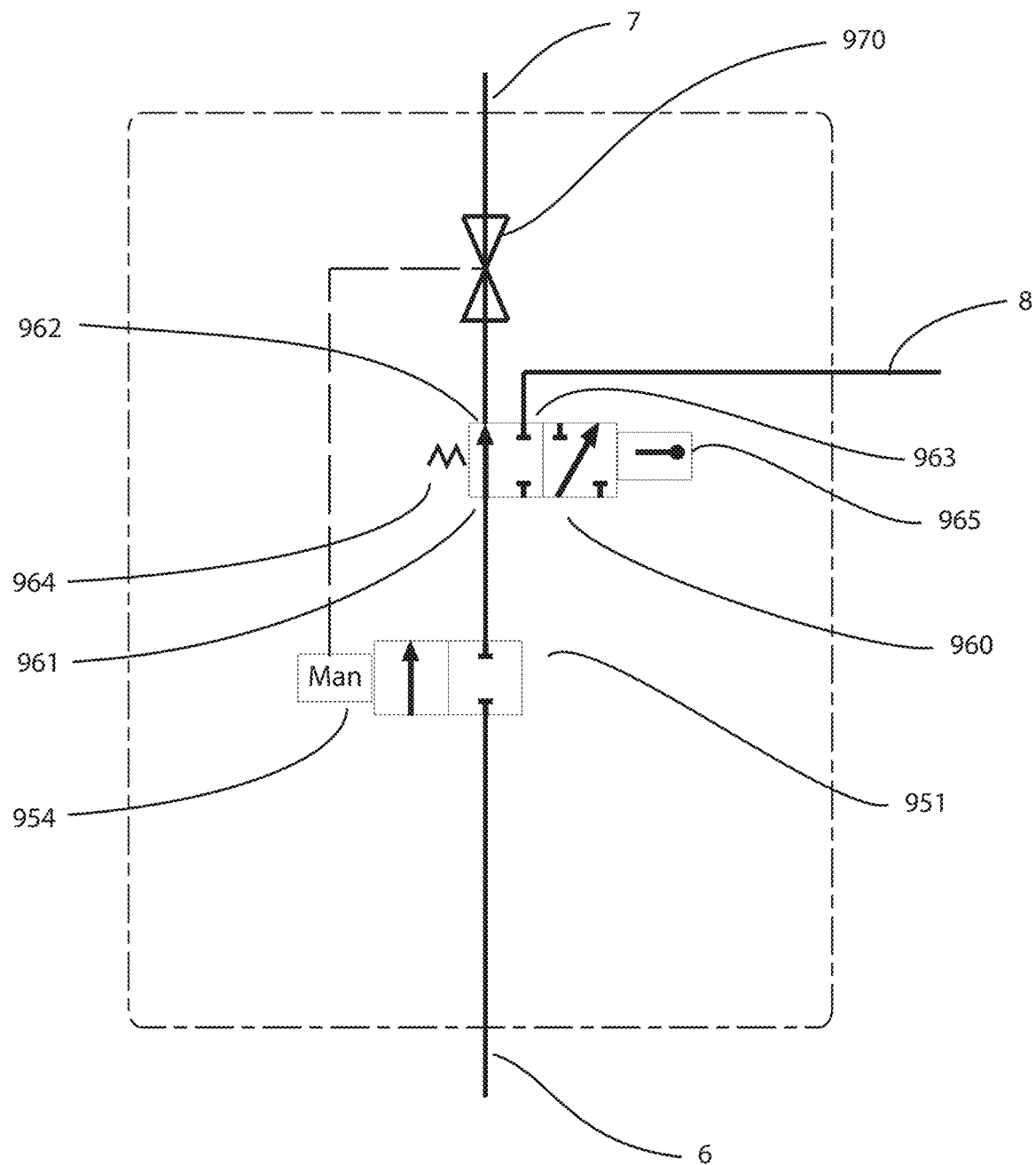

FIG. 162 is a schematic illustration of another embodiment of a flow switching module according to the present invention.

Figure 163:
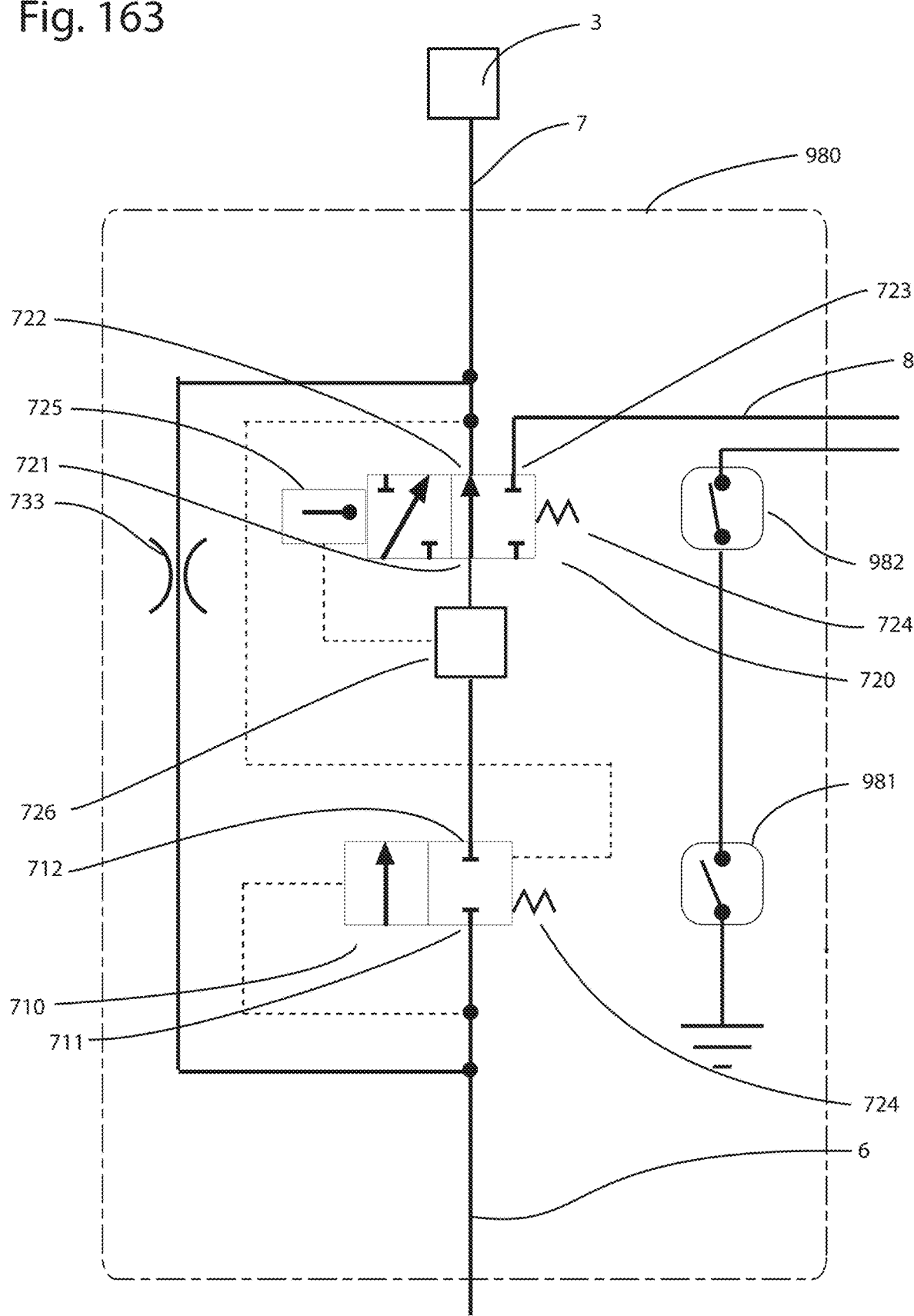

FIG. 163 is a schematic illustration of a modification of the embodiment of FIG. 145 which can generate a signal for controlling a pump.

Figure 164:
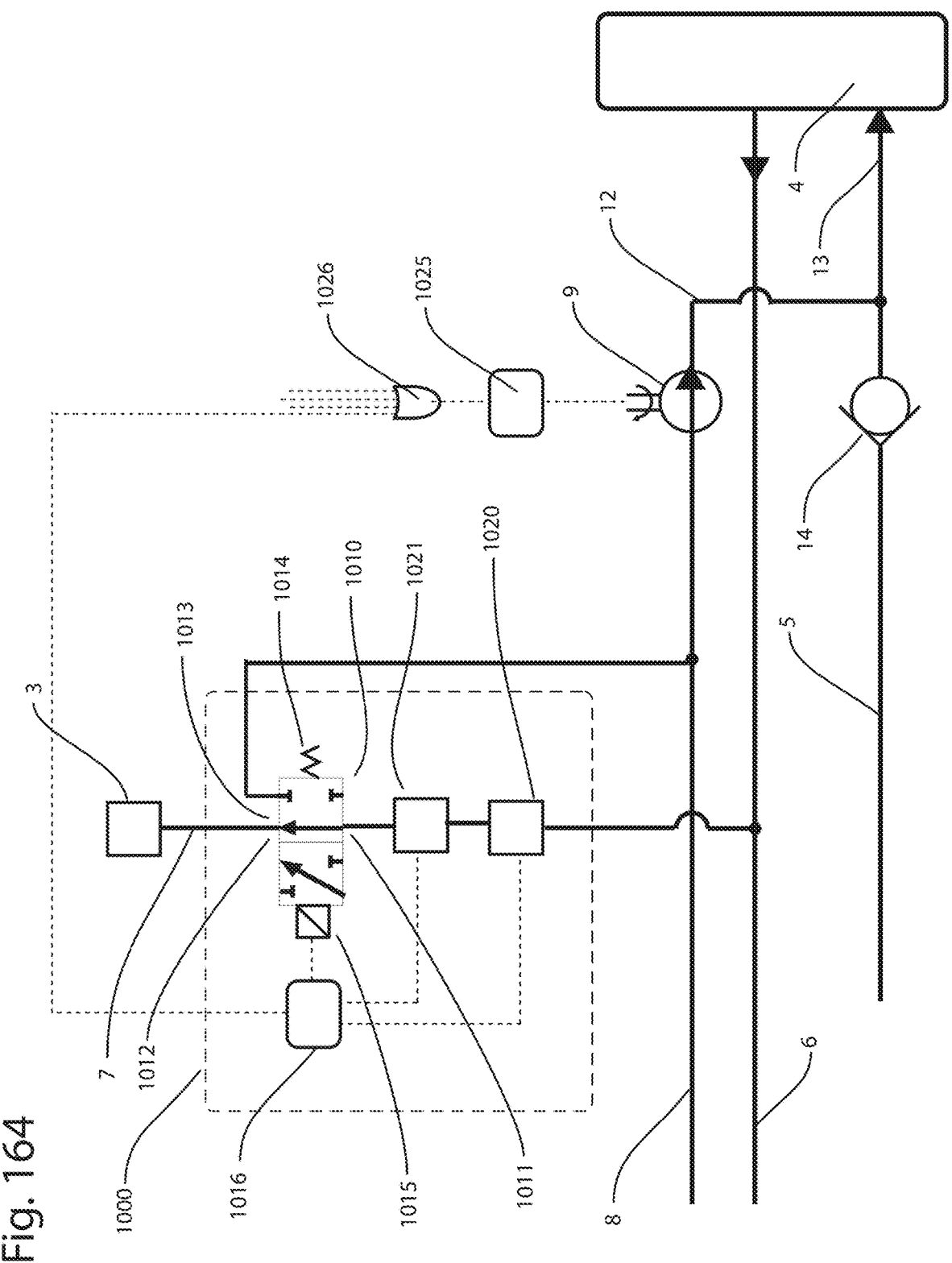

FIG. 164 is a schematic illustration of an embodiment of a hot water recirculation system according to the present invention in which a pump is controlled based on operating conditions within one or more flow switching modules.

Figure 165:
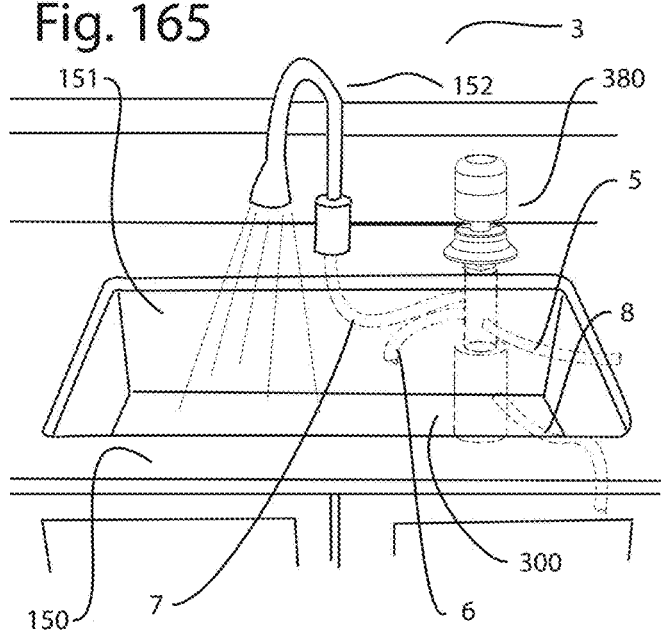
Figure 166:
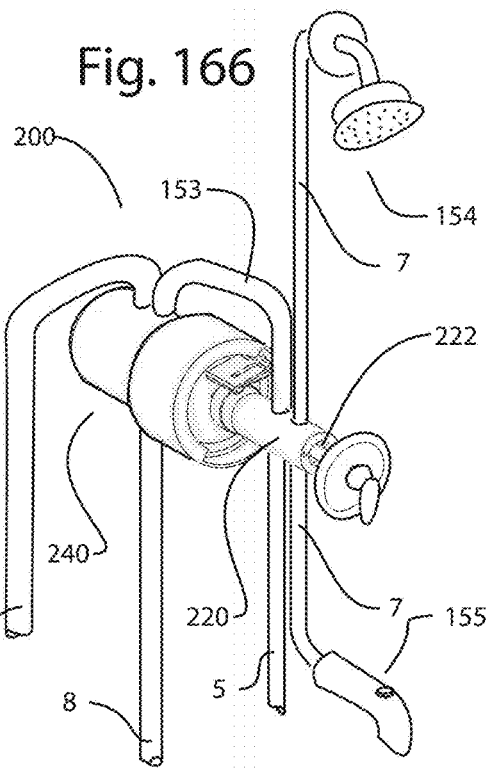
Figure 167:
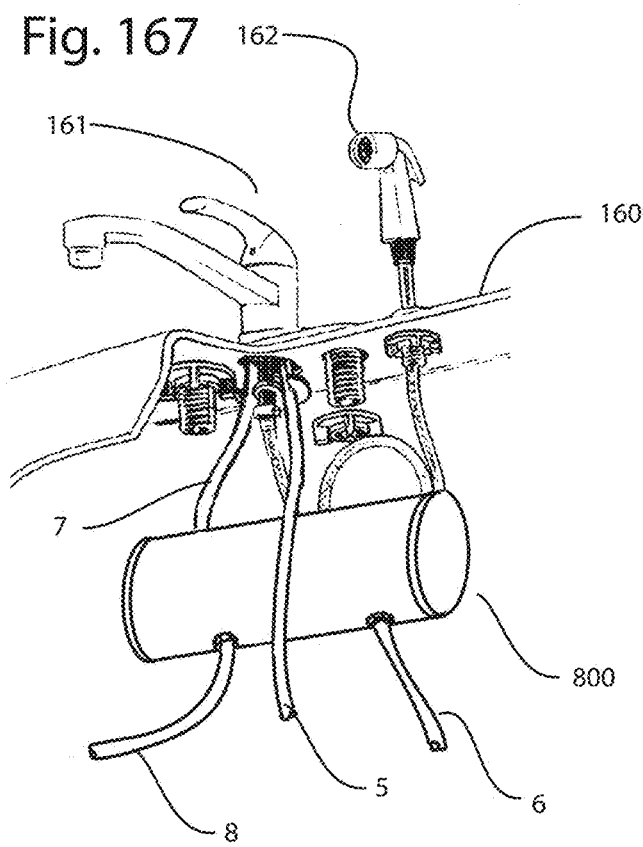

FIGS. 165-167 are schematic axonometric views of various applications of a flow switching module according to the present invention. FIGS. 165 and 167 illustrate a flow switching module installed in a kitchen, and FIG. 166 illustrates a flow switching module installed in a bathroom.

DESCRIPTION OF PREFERRED EMBODIMENTS

Below, a number of preferred embodiments of a hot water recirculation system and a flow switching module according to the present invention will be described while referring to the accompanying drawings, although it will be understood that many variations of these embodiments are possible within the spirit of this invention.

Figure 1:
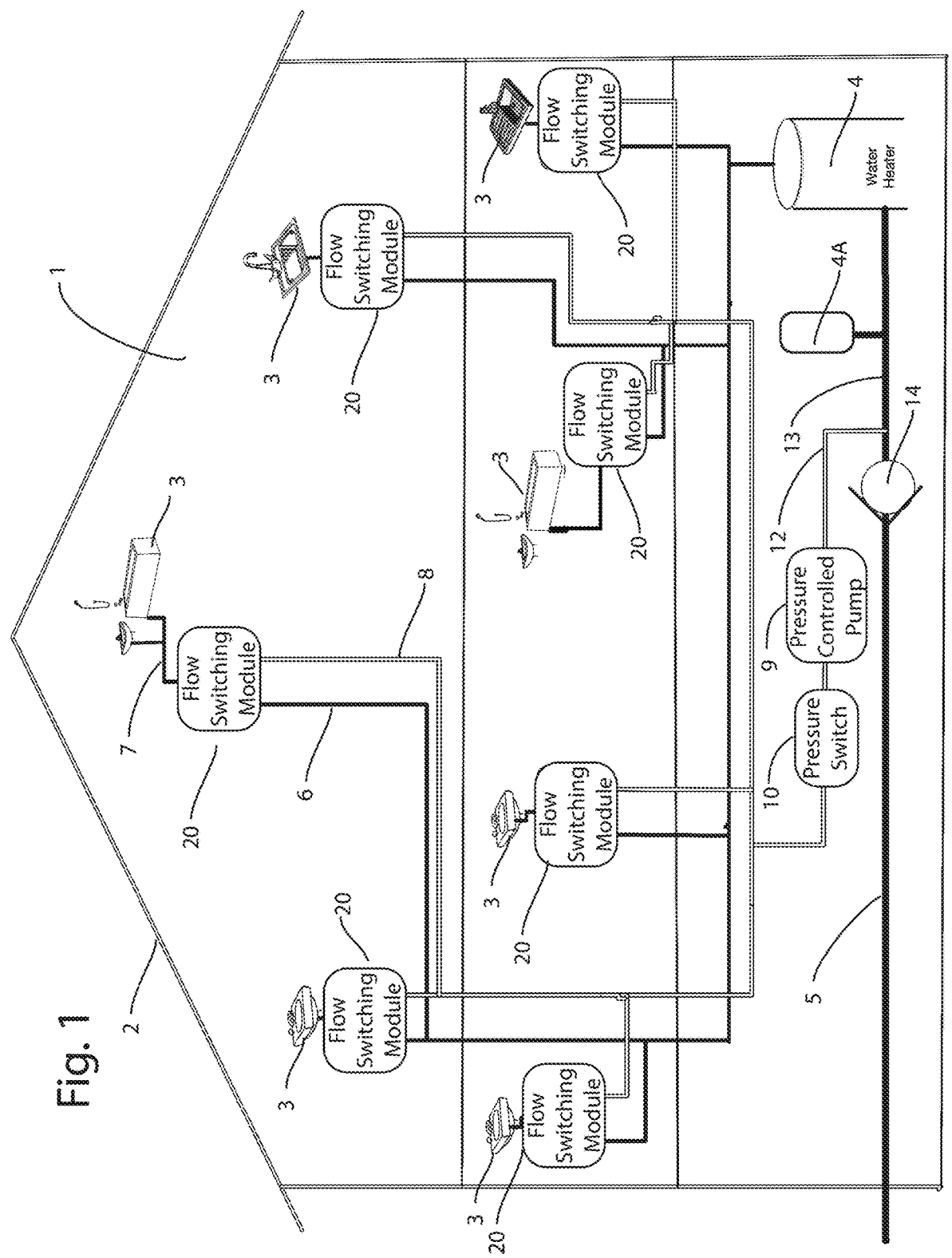
FIG. 1 is a schematic illustration of an embodiment of a hot water circulation system according the present invention as installed in a single-family house.

FIG. 1 shows an illustrative embodiment of a hot water recirculation system 1 according to this invention as it might be installed in a house 2 or other type of building such as an apartment building, an office building, or a store. A plurality of hot water plumbing fixtures 3 such as kitchen or bathtub faucets, laundry faucets, bathtubs, and showers are installed in various locations within the house 2. This embodiment includes a plurality of flow switching modules 20 according to the present invention. Each flow switching module 20 is installed near or as part of one of the hot water plumbing fixtures 3. In the illustrated example, there is one flow switching module 20 for each hot water plumbing fixture, but it is possible for a single flow switching module 20 to be connected to a plurality of hot water plumbing fixtures 3. It is also possible for the house 2 to include hot water plumbing fixtures which are not associated with a flow switching module. For example, a flow switching module might 20 be considered unnecessary for use with a dishwasher or a washing machine.

The house 2 is equipped with a water heater 4 which can be installed in any convenient location within the house 2, such as in a basement or the lowest level of the house 2. The water heater 4 is not restricted to any particular type. For example, it can be a conventional type equipped with a tank or a tankless type. The water heater 4 is fluidly connected to a cold water supply line 5 which forms a portion of cold water piping for the house 2. Of the cold water piping, only the cold water supply line 5 which supplies cold water to the water heater 4 is shown in FIG. 1, but additional unillustrated sections of cold water piping for supplying cold water to the hot water plumbing fixtures 3 can be installed throughout the house 2 in a customary manner.

The water heater 4 is fluidly connected to each of the flow switching modules 20 by hot water piping 6 (shown by solid black lines) which transports hot water from the water heater 4 to each of the flow switching modules 20. Here, the term piping is used to encompass a wide variety of conduits for fluid of any desired material, including pipes, rigid or flexible tubing, and flexible hoses, and the term may refer to a single member, such as a single pipe, or to a plurality of interconnected members, such as a plurality of pipes connected to form a network. The hot water piping 6 can be arranged in the same manner as typical hot water piping in a house. For example, when an existing house is retrofitted to employ a hot water recirculation system according to the present invention, the existing hot water piping can be used with minor adjustments for the flow switching modules 20.

This embodiment also includes return piping 8 for returning water which is to be recirculated from the flow switching modules 20 to the water heater 4. Each of the flow switching modules 20 is fluidly connected to the return piping 8. The individual sections of the return piping 8 may, if desired, all connect together to form a network having any desired configuration dictated by cost and convenience, such as a tree-like network or a blend of loops and branches. In contrast to recirculation systems commonly found in hotels, the return piping 8 in the present embodiment does not need to form a loop.

The return piping 8 from the flow switching modules 20 eventually leads to a pump 9. The output flow from the pump 9 is typically returned to the water heater 4 via a connecting pipe 12 and an entry pipe 13. A check valve 14 is typically installed in the cold water supply line 5 on the upstream side of the junction between the connecting pipe 12 and the entry pipe 13 to prevent backflow into the cold water supply line 5 for the water heater 4.

The illustrated embodiment includes a pump control module 10 for controlling the pump 9. The pump control module 10 may contain a variety of sensors or switches depending upon the criteria for controlling the pump operation. For example, in the illustrated example, the pump control module 10 contains a pressure-sensitive switch which can turn the pump 9 on or off based on a sensed water pressure. Other examples of components which the pump control module 10 may contain are timing elements, flow sensors, temperature sensors, and other devices known in the art.

Figure 2:
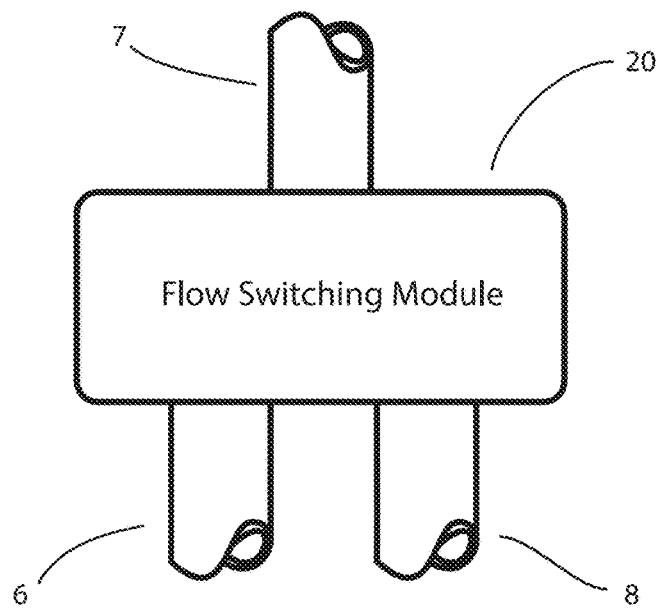
FIG. 2 is a schematic illustration of one of the flow switching modules in the embodiment of FIG. 1.

FIG. 2 is a schematic illustration of any one of the flow switching modules 20 of FIG. 1 showing typical fluid connections to the module 20. At least three passages for water are connected to each module 20. These passages include hot water piping 6 from the water heater 4, a relatively short passageway 7 leading from the module 20 to one or more hot water plumbing fixtures 3 associated with the module 20, and return piping 8 for returning water from the module 20 to the water heater 4 via the pump 9 during recirculation. In some embodiments in which a flow switching module 20 is capable of mixing hot and cold water, the flow switching module 20 is also fluidly connected to cold water piping which supplies cold water to the module 20. In other embodiments, cold water piping bypasses a flow switching module 20 and is connected directly to the hot water plumbing fixtures 3 associated with the flow switching module 20.

Figure 3:
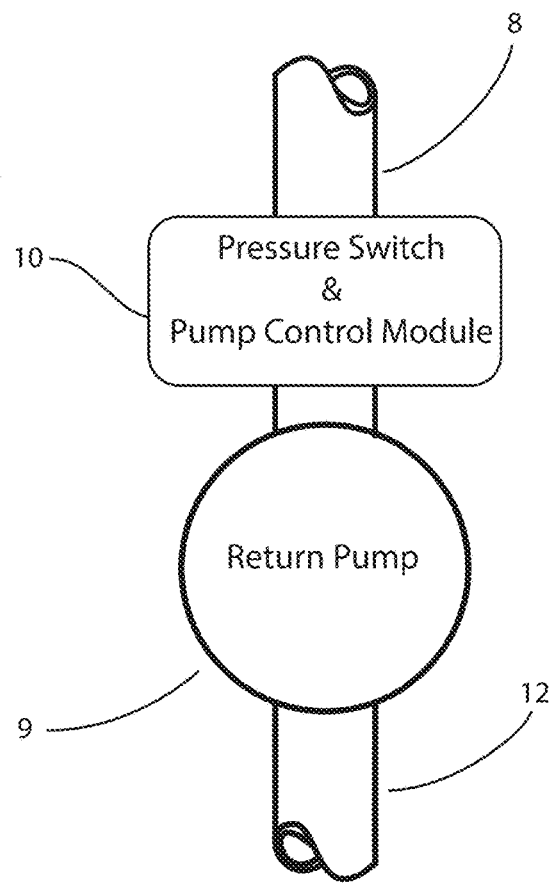
FIG. 3 is a schematic illustration of the pump control module in the embodiment of FIG. 1.

FIG. 3 is a schematic illustration of the pump 9. The inlet side of the pump 9 is fluidly connected to the return piping 8 leading from the flow switching modules 20, and the pump outlet is fluidly connected to the water heater 4 through the connecting pipe 12 shown in FIG. 1. The pump control module 10 is schematically illustrated as being installed in-line with the return piping 8, but all or part of the pump control module 10 may be installed externally of the return piping 8.

In a typical manner of operation of this embodiment, when any one or more of the hot water plumbing fixtures 3 is turned on by a user, components within the flow switching module 20 associated with the hot water plumbing fixtures 3 which were turned on determine if the water in the flow switching module 20 is above or below a desired set-point temperature. If the temperature of water entering the flow switching module 20 from the hot water piping 6 is at least the set-point temperature, the flow switching module 20 supplies the hot water through passageway 7 to the corresponding hot water plumbing fixtures 3 connected to the module 20 as in a conventional plumbing system. On the other hand, if the temperature of water entering the module 20 from the hot water piping 6 is below the set-point temperature, the module 20 diverts the incoming water into the return piping 8 to be pumped back by the pump 9 into the water heater 4 as illustrated in FIG. 1. The residual heat in the water returned to the water heater 4 is recovered and serves to preheat the water entering the water heater 4.

Each flow switching module 20 may comprise discrete devices, devices integrated into a single manifold or component, or devices integrated into the design of a valve for one of the hot water plumbing fixtures 3. The functions of the flow switching module 20 might be automatically controlled by hardware and logic built into the flow switching module 20, or they might be implemented partially by hardware and partially by human interaction with the flow switching module 20 or its attached components.

One of the advantages of this embodiment is that less heat energy in the water returned to the hot water heater 4 is lost when compared to a conventional recirculation system. When a particular hot water plumbing fixture 3 is opened, water is only drawn and recirculated through the portion of the hot water piping 6 leading to that hot water plumbing fixture 3 and from the associated flow switching module 20 back to the pump 9 and water heater 4. Thus, when hot water is requested at a particular hot water plumbing fixture 3, it is only necessary for the water heater 4 to warm up the portion of the hot water piping 6 leading to that plumbing fixture 3, and only a limited amount of cool water is pumped into the water heater 4. Many of the other portions of the hot water piping 6 leading to other of the hot water plumbing fixtures 3 can remain cold. Residual heat in the return flow during recirculation is recovered by being passed back into the water heater 4, preheating the feed water. Since only a limited portion of the return piping 8 is heated and acts as radiators, the air conditioning load on the house 2 is reduced as well.

When the temperature of water in a flow switching module 20 which is performing recirculation reaches the set-point temperature, the flow of water entering the flow switching module 20 from the hot water piping 6 is switched back to the associated hot water plumbing fixture 3 through the corresponding passageway 7, and return flow to the water heater 4 through the return piping 8 stops. If no other of the flow switching modules 20 are sending return flow to the water heater 4, the pump 9 stops as well.

Since the return piping 8 forms a closed system, the pressure in the return piping 8 will only rise when one or more of the flow switching modules 20 is directing incoming flow to the return piping 8. Under those conditions, the pressure in the return piping 8 will tend to rise towards that of the incoming hot water line pressure at the associated tap or taps.

In a preferred embodiment of this invention, the pump control module 10 only energizes the pump 9 when the pressure in the return piping 8 rises above a given set-point value. The pump 9 will then draw water primarily from those branches of the return piping 8 leading to those flow switching modules 20 currently directing flow to the return piping 8.

When no flow switching modules 20 are directing flow to the return piping 8, the pressure in the return piping 8 will drop. In a preferred embodiment of the present invention, when the pressure in the return piping 8 has dropped below a set-point level, the pump control module 10 will turn off the pump 9. Cycling of the pump can be minimized based on well-known control logic or timing devices within the pump control module 10.

It will be appreciated that other criteria such as the temperature of the water reaching the pump control module 10 or electric, optical, or wireless signals from the flow switching modules 20 could be used to control the pump 9 in place of the pressure drop in the return piping 8. A timer incorporated into the pump control module 10 could also be used to ensure that the return pump 9 will not run continuously if the pump control module 10 fails to detect conditions for stopping the pump 9.

Figure 4:
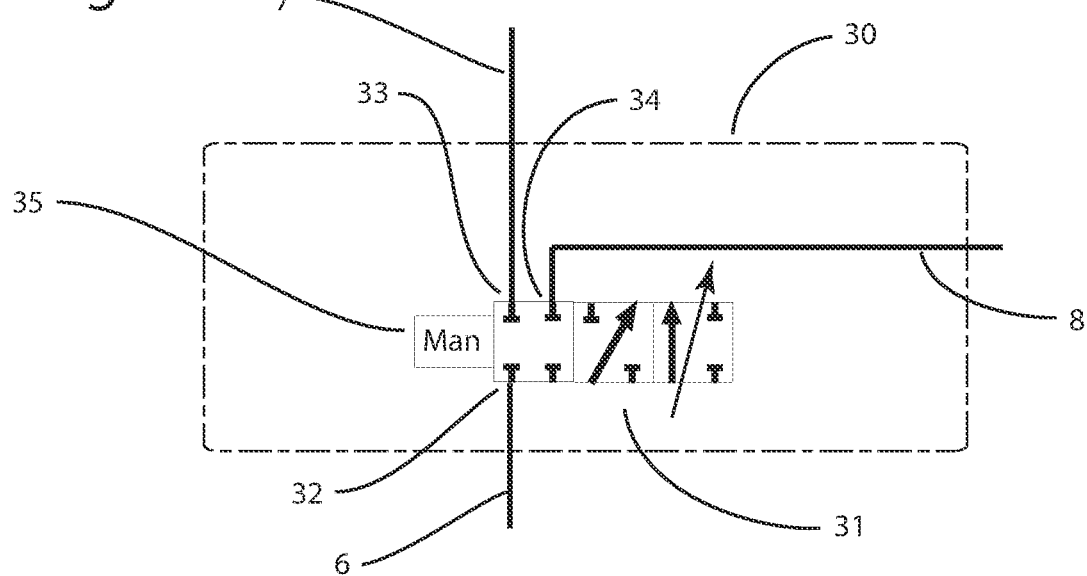
FIG. 4 is a schematic illustration of an embodiment of a manually-operated flow switching module.

FIG. 4 schematically illustrates a first embodiment of a flow switching module 30 according to the present invention which can be employed in a hot water recirculation system according to the present invention, such as in the embodiment shown in FIG. 1. The illustrated flow switching module 30 may be installed upstream of an unillustrated hot water plumbing fixture equipped with a separate flow control valve for controlling the flow of water supplied to the hot water plumbing fixture by the flow switching module 30, or the flow switching module 30 may be integrated into the structure of the hot water plumbing fixture and function as the flow control valve for the hot water plumbing fixture. The illustrated flow switching module 30 comprises a 3-port/3-position valve 31 having a manual control mechanism 35 for switching the valve 31 among its three positions. The valve 31 may be a linearly acting valve, a rotary valve, or a valve having a combined linear and rotary action. Depending upon the structure of the valve 31, the manual control mechanism 35 may, for example, be a linear or rotary device such as a lever or a knob having a single degree of freedom or a joystick type control with multiple degrees of freedom.

The valve 31 includes a first port 32 which is fluidly connected to hot water piping 6, a second port 33 which is fluidly connected to a hot water delivery passage 7, and a third port 34 which is fluidly connected to return piping 8. In a first or off position shown in FIG. 4, none of the ports is fluidly connected to another of the ports, so there is no flow of water through the valve 31. In an unillustrated second or preheat position of the valve 31, the first port 32 and the third port 34 are fluidly connected with each other through the center section of the valve 31, so water from the hot water piping 6 can flow through the center section of the valve 31 to the return piping 8 to enable recirculation to be carried out in which water is returned to a water heater. In an unillustrated third or on position of the valve 31, the first and second ports 32 and 33 are fluidly connected to each other through the righthand section of the valve 31, so water flows through the righthand section of the valve 31 from the hot water piping 6 to the water delivery passageway 7 to be delivered to the outlet of the hot water plumbing fixture, either internally (when the flow switching module 30 forms part of the hot water plumbing fixture) or through an external passageway connecting the flow switching module 30 with the hot water plumbing fixture.

As shown by the diagonal arrow on the righthand section of the valve 31, the valve 31 may have a structure which enables the user to perform proportional control of the flow rate of water through the valve 31 when the valve 31 is in the third (on) position.

It is possible for the valve 31 to include an unillustrated port connected to cold water piping and to include additional components for proportionally mixing hot water from the hot water piping 6 with cold water from the cold water piping and to supply the mixed water to the hot water plumbing fixture.

A user of the flow switching module 30 can manually control the valve 31 based on the desired temperature of hot water discharged from the hot water plumbing fixture. When the user first turns on the hot water plumbing fixture, he will typically switch the valve 31 to its third (on) position in which water from the hot water piping 6 flows through the valve 31 to the hot water plumbing fixture. If the user is satisfied with the initial water temperature, he can maintain the valve 31 in the third (on) position and use the water discharged from the hot water plumbing fixture. However, if the user finds that the water discharged from the hot water plumbing fixture is colder than he prefers, he can switch the valve 31 from the third (on) position to the second (preheat) position so that water from the hot water piping 6 flows into the return piping 8 to return to a water heater. As long as the valve 31 is in the second (preheat) position, the flow switching module 30 will be in a recirculation or preheat mode, and the temperature of water flowing into the valve 31 from the hot water piping 6 will gradually increase. The user can check the temperature of the water supplied to the valve 31 by periodically switching between the third (on) position and the second (preheat) position and feeling the water discharged from the hot water plumbing fixture. If the water temperature has not reached a desired level, the user can switch the valve 31 back to the second (preheat) position. When the user is satisfied with the temperature of the water discharged from the hot water plumbing fixture, the user can maintain the valve 31 in its third (on) position and use the water discharged from the hot water plumbing fixture.

In order to make it unnecessary for a user to switch back and forth between the second and third positions in order to determine the temperature of the water being supplied to the valve 31, the flow switching module 30 may include a temperature sensor which senses the temperature of water flowing through the valve 31 (such as the temperature of water in the hot water piping 6) and a display such as a pop-up tactile button, a rotating knob, or a liquid crystal display which indicates to the user when the water temperature has reached a predetermined level and to indicate to the user when to manually switch the valve 31 to the third (on) position.

Figure 5:
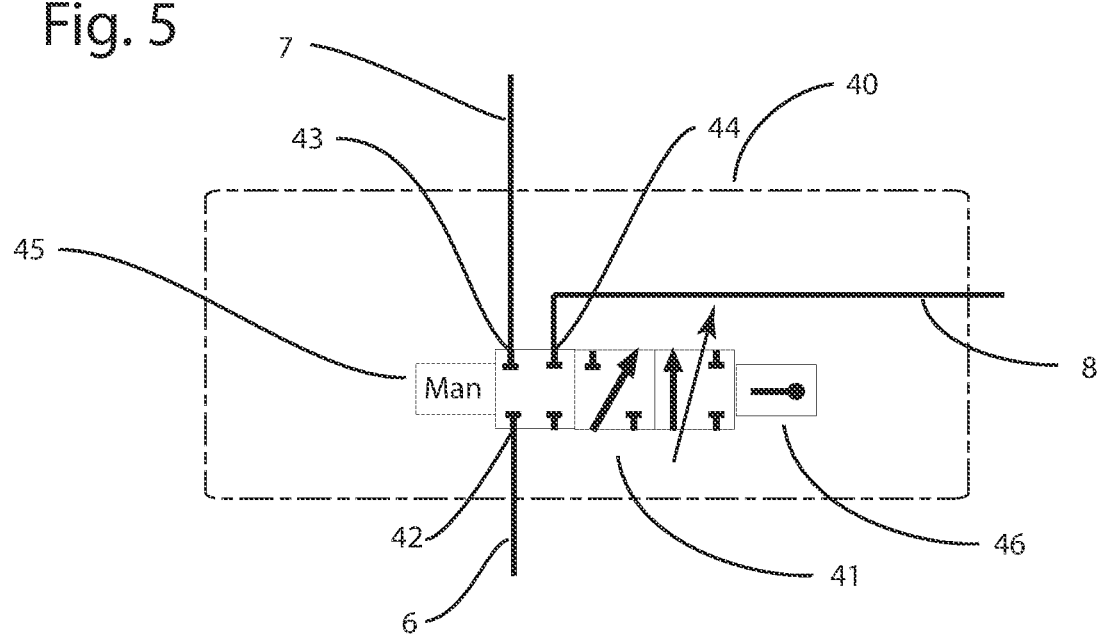
FIG. 5 is a schematic illustration of another embodiment of a manually-operated flow switching module which includes a thermal actuator.

FIG. 5 schematically illustrates another embodiment of a flow switching module 40 according to the present invention which can be employed in a hot water recirculation system according to the present invention. Like the previous embodiment, this embodiment may be integrated into the structure of a hot water plumbing fixture and function as a flow control valve for the hot water plumbing fixture, or it may be a separate device installed upstream of an unillustrated hot water plumbing fixture. Like the embodiment of FIG. 4, this embodiment comprises a 3-port/3-position valve 41 having a manual control mechanism 45. The valve 41 may be a linearly acting valve, a rotary valve, or a valve having a combined linear and rotary action. As is the case with respect to the valve 31 shown in FIG. 4, the manual control mechanism 45 may be a linear or rotary device such as a lever or a knob having a single degree of freedom or a joystick-type control with multiple degrees of freedom, for example.

Like the valve 31 of FIG. 4, the valve 41 shown in FIG. 5 includes a first port 42 which is fluidly connected to hot water piping 6, a second port 43 which is fluidly connected to a hot water delivery passage 7, and a third port which is fluidly connected to return piping 8. The valve 41 can be switched between a first or off position shown in FIG. 5 in which none of the ports is fluidly connected to another of the ports, an unillustrated second or preheat position in which the first port 42 and the third port 44 are fluidly connected with each other through the center section of the valve 41, and an unillustrated third or on position in which the first and second ports 42 and 43 are fluidly connected to each other through the righthand section of the valve 41. Like the valve 31 of FIG. 4, the valve 41 of FIG. 5 may have a structure enabling a user to perform proportional control of the flow rate through the valve 41 when the valve 41 is in the third (on) position. Furthermore, the valve 41 may include an unillustrated port connected to cold water piping and include components for proportionally mixing hot water from the hot water piping 6 with cold water from the cold water piping and supplying the mixed water to a hot water plumbing fixture through the hot water delivery passage 7.

In addition to the features of the valve shown in FIG. 4, the valve 41 in this embodiment includes a temperature sensitive actuator 46 (referred to below as a thermal actuator) which is responsive to the temperature of water flowing through the valve 41. The thermal actuator 46 can automatically switch the valve 41 from the second (preheat) position to the third (on) position when the temperature reaches a predetermined level (a set-point temperature).

As in the previous embodiment, a user of the flow switching module 40 can switch the valve 41 between its three positions using the manual control mechanism 45. If the user finds that the temperature of hot water being discharged from the unillustrated hot water plumbing fixture is lower than desired, the user can switch the valve 41 from the third (on) position to the second (preheat) position to initiate a preheat mode of operation in which water entering the valve 41 from the hot water piping 6 is diverted to the return piping 8 and returned to a water heater. When the valve 41 is in the second (preheat) position and the temperature of water flowing through the valve 41 is below the set-point temperature, the valve 41 will remain in its second (preheat) position. When the thermal actuator 46 senses that the temperature of water flowing through the valve 41 has reached the set-point temperature, the thermal actuator 46 automatically switches the valve 41 from the second (preheat) position to the third (on) position in which water from the hot water piping 6 flows through the valve to the hot water delivery passage. The thermal actuator 46 makes it unnecessary for the user to switch the valve 41 back and forth between the second (preheat) position and the third (on) position in order to ascertain the current temperature of water flowing through the valve 41. As is the case with respect to the embodiment of FIG. 4, the flow switching module 40 may include a temperature sensor which senses the temperature of water flowing through the valve 41 and a display which indicates to the user when the water temperature has reached a predetermined level.

The valve 41 may also include an unillustrated return mechanism such as a spring which is cocked by the motion of the manual control mechanism 45 and held in position by a detent mechanism to ensure that the valve 41 switches from the second (preheat) position to a fully off position when the actuator 46 detects that the water temperature has reached the set-point temperature to avoid the danger of scalding and to ensure that the valve 41 is not accidentally left in the second (preheat) position.

FIGS. 6-27 illustrate a preferred embodiment of a flow switching module 100 according to the present invention in more concrete form. The module 100 can be employed in a hot water recirculation system according to the present invention, such as the system illustrated in FIG. 1. This embodiment is capable of being integrated into the structure of a hot water plumbing fixture. For example, when the plumbing fixture is a shower, the flow switching module 100 may be installed in a wall of a bathroom and controlled by a user to operate a shower head connected to the flow switching module 100. Alternatively, when the plumbing fixture is a kitchen or bathroom faucet, the flow switching module 100 may be mounted in or form a part of the body of the faucet or be installed in a countertop and connected to the spout of the faucet by a suitable passageway.

For clarity, various components which are commonly used in mixing valves and plumbing fixtures such as O-rings, gaskets, retaining rings, threaded connectors, and the like have been omitted from the drawings but may be employed as suitable in this and other embodiments of a flow switching module according to the present invention in a manner well known in the art.

This embodiment has a normal mode of operation in which it is capable of being operated in much the same way as a conventional single-handle faucet or shower controller to control the flow rate of water from a plumbing fixture as well as to perform mixing of hot and cold water to adjust the temperature of water discharged from the plumbing fixture. The flow switching module 100 also has a preheat mode of operation in which hot water which is supplied to the flow switching module 100 is returned to a water heater or other source of hot water to be further heated to a predetermined set-point temperature instead of being discharged from the plumbing fixture. When the temperature of water reaching the flow switching module 100 reaches the set-point temperature, the flow switching module 100 preferably automatically switches from the preheat mode back to the normal mode of operation. The set-point temperature is typically a water temperature which an average user of the plumbing fixture would find comfortable to use as hot water. The set-point temperature can be selected in accordance with the intended use of the plumbing fixture. For example, the set-point temperature for a flow switching module 100 used with a kitchen faucet might be different from the set-point temperature for a flow switching module used with a bathroom shower, since the lowest temperature that a user finds comfortable for washing his hands at a faucet might be different from the lowest temperature which feels comfortable when taking a shower.

FIG. 6 is an exploded axonometric view of the flow switching module 100. As shown in this figure, the flow switching module 100 includes a stationary casing 110 and a valve cartridge 140 which is movably installed in the casing 110 so as to be able to reciprocate with respect to the casing 110 in the longitudinal direction of the casing 110 and rotate with respect to the casing 110 around the longitudinal axis of the casing 110. The flow switching module 100 is illustrated in FIG. 6 with the casing 110 and the valve cartridge 140 extending substantially vertically and with the valve cartridge 140 extending out of the upper end of the casing 110. However, the flow switching module 100 can be installed in any orientation with respect to the vertical, including horizontally or with the flow switching module 100 upside down relative to the orientation shown in the FIG. 6. In the following description, various components of the embodiment may be referred to as being positioned above or below other components in the drawings, but terms such as "above" and "below" are used here merely as a convenient way to describe relative positions as shown in FIG. 6 and do not limit the embodiment to having a particular orientation in space.

As shown in the drawings, the casing 110 is a hollow cylindrical member which is open at both ends. The casing 110 is typically supported by unillustrated structure so as to remain stationary during use. For example, the casing 110 can be supported by an unillustrated bracket secured to a wall or countertop of a house or other building in which the flow switching module 100 is installed, or it can be supported by or form part of the body of a plumbing fixture with which the flow switching module 100 is associated. A hot water supply port 111, a cold water supply port 112, a water delivery port 113, and a return port 114 are formed through the wall of the casing 110 between its inner and outer surfaces. The hot water supply port 111 and the cold water supply port 112 are fluidly connected by unillustrated passageways on the exterior of the casing 110 to a source of hot water and a source of cold water, respectively. In the same manner as shown in FIG. 1, the source of hot water may be a domestic hot water heater, while the source of cold water may be the cold water supply for the house or other building in which the flow switching module 100 is installed. The water delivery port 113 is fluidly connected by an unillustrated passageway on the exterior of the casing 110 to the discharge opening of a plumbing fixture with which the flow switching module 100 is being used, such as the spout of a faucet or a shower head. The return port 114 is fluidly connected by an unillustrated passageway on the exterior of the casing 110 to a return passageway corresponding to the return piping 8 shown in FIG. 1.

As shown in the drawings, the valve cartridge 140 includes a mixing core 141 and a shaft 146 (referred to below as a mixing shaft) which is rigidly secured to the upper end of the mixing core 141. The mixing core 141 comprises a tubular member which is open at its upper end and is closed off at its lower end. The upper end of the mixing core 141 is secured to the mixing shaft 146 in any convenient manner, such as by a plurality of spokes 148 which extend radially between the mixing shaft 146 and the wall of the mixing core 141 as shown in FIG. 21, for example, so that water can flow between the spokes 148 through the upper end of the mixing core 141. The mixing core 141 includes a first inlet 142, a second inlet 143, and a return port 145 each formed through the wall of the mixing core 141 between its inner and outer surfaces. The first inlet 142, which is elongated in the circumferential direction of the mixing core 141, serves as an inlet into the mixing core 141 for water from one or both of the hot water supply port 111 and the cold water supply port 112 of the casing 110 during the normal mode of operation, and the second inlet 143 serves as an inlet into the mixing core 141 for hot water from the hot water supply port 111 during the preheat mode of operation. The mixing core 141 further includes an outlet 144 defined by the spaces between the spokes 148 at the open upper end of the mixing core 141. The interior of the mixing core 141 functions as a mixing chamber in which water supplied through the hot water supply port 111 and the cold water supply port 112 can be mixed to produce water having a desired temperature.

As shown in FIG. 6, a cylindrical baffle 147 is secured to the mixing shaft 146 above the upper end of the mixing core 141 at a location in which it can allow or block flow through the water delivery port 113 of the casing 110 and control the flow rate of water through the water delivery port 113 in a conventional manner as the valve cartridge 140 reciprocates within the casing 110.

An unillustrated knob, handle, or other manual control member which can be grasped by a user may be secured to the upper end of the mixing shaft 146 to enable a user of the flow switching module 100 to translate and rotate the valve cartridge 140 within the casing 110 by hand. Alternatively, the upper end of the mixing shaft 146 may be connected to a lever by a linkage which makes it possible for a user to translate the mixing shaft 146 within the casing 110 in the longitudinal direction of the casing 110 by pivoting the lever about a horizontal axis instead of having to pull or push the mixing shaft 146 directly. Operating mechanisms which enable a user to translate a shaft of a mixing valve by pivoting a lever are well known in the art.

In this embodiment, portions of the exterior of the valve cartridge 140 (such as unillustrated sealing rings) are in sliding contact with the inner surface of the casing 110 as the valve cartridge 140 reciprocates or rotates within the casing 110. However, as is common in valve cartridges for mixing valves, a hollow sleeve may be removably mounted inside the casing 110 between the inner wall of the casing 110 and the outer surface of the valve cartridge 140 to protect the inner surface of the casing 110 against wear caused by movement of the valve cartridge 140. During operation of the flow switching module 100, the sleeve remains stationary with respect to the casing 110, but it can be removed from the casing 110 together with the valve cartridge 140 when it is necessary to replace the valve cartridge 140.

In the same manner as in a conventional mixing valve, the valve cartridge 140 can translate within the casing 110 in the longitudinal direction of the casing 110 to switch the flow switching module 100 between an on state and an off state. FIG. 13 is a cutaway axonometric view of the module 100 which schematically illustrates the flow switching module 100 in the on state, and FIG. 24 is a cutaway axonometric view of the module 100 from another angle which schematically illustrates the module 100 in the off state, respectively. The flow switching module 100 is in the on state when the valve cartridge 140 is positioned within the casing 110 so as to allow liquid to be discharged from the interior of the valve cartridge 140 through the water delivery port 113 of the casing 110. Specifically, as shown in FIG. 13, in the present embodiment, in the on state, the valve cartridge 140 is positioned such that the first inlet 142 of the valve cartridge 140 overlaps the hot water supply port 111 and the cold water supply port 112 in the longitudinal direction of the casing 110 to allow water from one or both of the supply ports to enter the valve cartridge 140 through the first inlet 142, and such that the baffle 147 is raised above the lower end of the water delivery port 113 in the longitudinal direction of the casing 110 to allow water to be discharged from the region of the valve cartridge 140 located below the baffle 147 through the water delivery port 113. When the flow switching module 100 is in the on state, the flow rate through the water delivery port 113 can be varied by raising or lowering the valve cartridge 140 within the casing 110 to adjust the degree to which the baffle 147 obstructs the water delivery port 113.

The flow switching module 100 is in the off state when the valve cartridge 140 is positioned within the casing 110 so as to essentially prevent the flow of liquid out of the casing 110 through the water delivery port 113 of the casing 110. Specifically, as shown in FIG. 24, in the present embodiment, in the off state, the valve cartridge 140 is positioned such that the first inlet 142 does not overlap either the hot water supply port 111 or the cold water supply port 112 in the longitudinal direction of the casing to prevent water from either of the supply ports from entering the valve cartridge 140 through the first inlet 142, and such that the baffle 147 completely blocks the water delivery port 113 of the casing 110 to prevent water from flowing out of the casing 110 through the water delivery port 113 from the region of the casing 110 below the baffle 147. In the off state, the radially outer end of the first inlet 142 of the valve cartridge 140 is blocked by the inner wall of the valve cartridge 140.

The range of movement of the valve cartridge 140 within the casing 110 in the longitudinal direction of the casing 110 can be restricted by suitable stops to define a full on position beyond which the valve cartridge 140 cannot be raised within the casing 110 and a full off position beyond which the valve cartridge 140 cannot be lowered within the casing 110.

The valve cartridge 140 can be rotated within the casing 110 about the longitudinal axis of the casing 110 to a number of rotational positions, including a full cold position and a full hot position. When the valve cartridge 140 is in the full cold position, the first inlet 142 of the valve cartridge 140 overlaps the cold water supply port 112 of the casing 110 in the circumferential direction of the casing 110 but does not overlap the hot water supply port 111. As a result, if the flow switching module 100 is in the on state when the valve cartridge 140 is in the full cold position, water from the cold water supply port 112 can flow into the interior of the valve cartridge 140 through the first inlet 142 of the valve cartridge 140 while water from the hot water supply port 111 is prevented from doing so.

Conversely, when the valve cartridge 140 is in the full hot position, the first inlet 142 of the valve cartridge 140 overlaps the hot water supply port 111 in the circumferential direction of the casing 110 but does not overlap the cold water supply port 112 of the casing 110. As a result, if the flow switching module 100 is in the on state when the valve cartridge 140 is in the full hot position, water from the hot water supply port 111 can flow into the interior of the valve cartridge 140 through the first inlet 142 of the valve cartridge 140 while water from the cold water supply port 112 is prevented from doing so.

When the valve cartridge 140 is rotated to a position between the full hot position and the full cold position, the first inlet 142 of the valve cartridge 140 partially overlaps both the hot water supply port 111 and the cold water supply port 112 in the circumferential direction of the casing 110 to enable water from both supply ports to enter the valve cartridge 140 and undergo mixing if the flow switching module 100 is in the on state. The rotational position of the valve cartridge 140 can be adjusted by a user between the full hot position and the full cold position to vary the ratio of hot to cold water entering the valve cartridge 140 and thereby adjust the temperature of the water discharged from the water delivery port 113 of the casing 110.

In this embodiment, the valve cartridge 140 is rotated in the counterclockwise direction as viewed from above as it is rotated from the full cold position to the full hot position. However, the flow switching module 100 may be structured such that the valve cartridge 140 is rotated in the clockwise direction when being rotated from the full cold to the full hot position.

When the flow switching module 100 is in the on state, the valve cartridge 140 is limited to rotation about the longitudinal axis of the casing 110 from the full hot position to the full cold position. In contrast, when the flow switching module 100 is in the off state, the valve cartridge 140 can be rotated about the longitudinal axis of the casing 110 past the full hot position to a rotational position referred to as a preheat rotational position. The location of the second inlet 143 on the valve cartridge 140 is selected such that when the valve cartridge 140 is in a preheat rotational position, the second inlet 143 of the valve cartridge 140 overlaps the hot water supply port 111 of the casing 110 in both the circumferential and longitudinal directions of the casing 110 so that water from the hot water supply port 111 can enter the valve cartridge 140 through the second inlet 143. When the valve cartridge 140 is in a rotational position other than a preheat rotational position, the radially outer end of the second inlet 143 is blocked by the inner wall of the valve cartridge 140 to prevent water from flowing into the valve cartridge 140 through the second inlet 143. Since the flow switching module 100 is in the off state when the valve cartridge 140 is in a preheat rotational position, water cannot enter the valve cartridge 140 from either the hot water supply port 111 or the cold water supply port 112 through the first inlet 142 at this time.

In addition, when the valve cartridge 140 is in a preheat rotational position, the return port 145 of the valve cartridge 140 overlaps the return port 114 of the casing 110 in both the circumferential and longitudinal directions of the casing 110 to allow water from the interior of the valve cartridge 140 to exit from the valve cartridge 140 through the overlapping return ports 114 and 145 into unillustrated return piping. The flow of water into the return piping produces an increase in the water pressure in return piping and turns on a return pump as described with respect to FIG. 1. As a result, when the valve cartridge 140 is in a preheat rotational position, the flow switching module 100 enters its preheat mode in which water which enters the valve cartridge 140 via the hot water supply port 111 is returned by the return pump to the source of hot water, such as a water heater, through the return piping instead of being supplied to the discharge port of the plumbing fixture so as to gradually increase the temperature of the hot water being supplied to the flow switching module 100, in the manner described with respect to FIG. 1. Having a preheat rotational position of the valve cartridge 140 adjacent to the full hot position makes it easy for a user to learn how to operate the flow switching module 100 and makes it easier for a user to initiate the preheat mode based on tactile cues.

The casing 110 and the valve cartridge 140 may be equipped with rotation limiting members for limiting the rotation of the valve cartridge 140 within the casing 110 about the longitudinal axis of the casing 110. As shown in FIGS. 8-10, which are cutaway views of the lower end of the module 100, in the present embodiment, the casing 110 includes a rotation limiting member in the form of a projection 120 which is formed on the interior of the casing 110 near its lower end and extends in the longitudinal direction of the casing 110. For ease of illustration, the valve cartridge 140 has been omitted from FIG. 8, and the below-described torsion spring 135 has been omitted from FIGS. 9 and 10. As viewed from above, the projection 120 has a roughly triangular shape. It includes a top surface 121, a first side surface 122, and a second side surface 123, each of the side surfaces extending from the inner wall of the casing 110 towards the radial center of the casing 110. The first side surface 122 defines a cold stop surface for limiting the rotation of the valve cartridge 140 from going beyond the full cold position, and the second side surface 123 defines a hot stop surface for limiting the rotation of the valve cartridge 140 from going beyond the full hot position. The top surface 121 of the projection 120 can function as a stopping surface which contacts the bottom surface 141a of the mixing core 141 when the valve cartridge 140 is in its full off position.

As shown in FIG. 9, a recess 124 is formed in the projection 120 at its lower end below the lower end of the second side surface 123. The interior of the recess 124 includes a side surface 125 and an upper surface 126. The side surface 125 of the recess 124 functions as a stopping surface for preventing the valve cartridge 140 from rotating in the counterclockwise direction past a preheat rotational position.

FIGS. 6 and 9 illustrate a rotation limiting member 150 of the valve cartridge 140 which cooperates with the projection 120 of the casing 110. The rotation limiting member 150 has generally the shape of a golf club and includes a shaft 151 which extends downwards from the lower end of the mixing core 141 and a head 152 which is secured to the lower end of the shaft 151. The head 152 has a roughly triangular shape as viewed in plan and includes a top surface 153, a first side surface 154, and a second side surface 155. The shaft 151 is secured to the mixing core 141 in a position such that the projection 120 formed on the casing 110 lies in the path of movement of the head 152 of the rotation limiting member 150 as the valve cartridge 140 is rotated within the casing 110 about the longitudinal axis of the casing 110. The first side surface 154 of the head 152 defines a cold stop surface for limiting the rotation of the valve cartridge 140 in the clockwise direction beyond the full cold position, and the second side surface 155 of the head 152 defines a hot stop surface for limiting the rotation of the valve cartridge 140 in the counterclockwise direction beyond the full hot position. The height of the head 152 measured in the longitudinal direction of the casing 110 is smaller than the height of the recess 124 in the projection 120 measured in the same direction so that at least a portion of the head 152 can be inserted into the recess 124 when the valve cartridge 140 is rotated to a preheat rotational position. When the valve cartridge 140 is rotated to its full cold position, the first side surface 154 of the head 152 contacts the first side surface 122 of the projection 120 and prevents the valve cartridge 140 from rotating in the clockwise direction beyond the full cold position, regardless of whether the flow switching module 100 is in the on state or the off state, i.e., regardless of the position of the valve cartridge 140 in the longitudinal direction of the casing 110. As shown in FIG. 9, when the flow switching module 100 is in the on state and the valve cartridge 140 is rotated to the full hot position, the second side surface 155 of the head 152 contacts the second side surface 123 of the projection 120 and prevents the valve cartridge 140 from rotating in the counterclockwise direction beyond the full hot position. However, when the valve cartridge 140 is in its full off position and the valve cartridge 140 is rotated to the full hot position, the second side surface 155 of the head 152 is positioned below the lower end of the second side surface 123 of the projection 120 and so does not contact the second side surface 123 of the projection 120. As a result, when the valve cartridge 140 is in the full off position, the valve cartridge 140 can be rotated in the counterclockwise direction past the full hot position to a preheat rotational position, at which time a portion of the head 152 enters into the recess 124 of the projection 120 as shown in FIG. 10. The valve cartridge 140 can be prevented from rotating in the counterclockwise direction beyond a preheat position by contact between the second side surface 155 of the head 152 and the side surface 125 of the recess 124.

When the valve cartridge 140 is in a preheat rotational position, the upper surface 126 of the recess 124 lies along a path of movement of the top surface 153 of the head 152 of the rotational limiting member 150 in the longitudinal direction of the casing 110 and prevents the valve cartridge 140 from being raised by a sufficient amount to switch the flow switching module 100 from the off state to the on state, thereby preventing water from being discharged from the water delivery port 113 of the casing 110 during the preheat mode of operation.

FIGS. 16-20 show various views of the module 100 when it is in the on state and the valve cartridge 140 is in a rotational position between the full hot position and the full cold position. FIG. 16 is a cross-sectional elevation of the module 100 at this time, FIGS. 17-20 are axonometric views of portions of the module 100 cut along lines 17-17, 18-18, 19-19, and 20-20, respectively, of FIG. 16, and FIG. 21 is a cutaway axonometric view of the module 100 with all of the casing 110 removed except for the lower end. In the state shown in these figures, the sides surfaces 154 and 155 of the heat 152 of the rotation limiting member 150 of the valve cartridge 140 are spaced from the side surfaces 122 and 123 of the projection 120 of the casing 110, so the valve cartridge 140 is capable of being rotated from the state in either the hot direction or the cold direction.

FIGS. 23-27 show various views of the module 100 when it is in the off state and the valve cartridge 140 is in a preheat rotational position. FIG. 23 is a cross-sectional elevation of the entire module 100 at this time, FIG. 24 is a cutaway axonometric view of the module 100, FIGS. 25 and 26 are axonometric views of the lower portion of the module 100 cut along lines 25-25 and 26-26, respectively, of FIG. 23, and FIG. 27 is an axonometric view of the module 100 as seen from below. As shown by these figures, when the valve cartridge 140 is in a preheat rotational position, the head 152 of the rotation limiting member 150 of the valve cartridge 140 is at least partially disposed inside the recess 124 in the lower end of the projection 120, and the side surface 125 of the recess 124 opposes the second side surface 155 of the head 152 to prevent the valve cartridge 140 from being rotated in the counterclockwise direction past a preheat rotational position.

In order to make it unnecessary for a user to repeatedly switch the flow switching module 100 back and forth between the preheat mode and the normal mode of operation in order to determine whether water being supplied to the flow switching module 100 through the hot water supply port 111 has reached a comfortable temperature, the flow switching module 100 may include a mechanism for holding the valve cartridge 140 in a preheat rotational position until a pre-determined set-point water temperature has been reached and then automatically switching the valve cartridge 140 back to the full hot and full off position. For this purpose, the present embodiment includes a thermal detent mechanism 160 which can releasably hold the valve cartridge 140 in a preheat rotational position and a return spring 135 which can apply a torque to the valve cartridge 140 to rotate the valve cartridge 140 from a preheat rotational position to the full hot position when the thermal detent mechanism 160 is not holding the valve cartridge 140 in a preheat rotational position.

FIGS. 14 and 15 are schematic cross-sectional elevations of the thermal detent mechanism 160, with the valve cartridge 140 shown in outline and a portion of the wall of the casing 110 shown in cross section. As shown in these figures, the thermal detent mechanism 160 in this embodiment comprises a temperature sensitive actuator in the form of a leaf spring 161 which is disposed inside the valve cartridge 140 where it is exposed to water within the valve cartridge 140. The leaf spring 161, which is made of a bimetallic strip, has a fixed end which is secured to the interior of the valve cartridge 140 and a free end to which a detent member 162 such as a pin, a ball, a projection, or the like is formed. The detent member 162 can pass through a through hole 149 (shown in FIG. 15) formed through the wall of the valve cartridge 140. The inner wall of the casing 110 includes a recess 115 for receiving the outer end of the detent member 162. When the valve cartridge 140 is in a preheat rotational position, the through hole 149 in the valve cartridge 140 overlaps the recess 115 in the casing 110 such that the detent member 162 can be inserted into the recess 115 to resist rotation of the valve cartridge 140 with respect to the casing 110 under the force applied by the return spring 135. When the valve cartridge 140 is not in a preheat rotational position, the recess 115 is offset with respect to the through hole 149 in the circumferential direction of the casing 110 by an amount such that either the detent member 162 cannot be inserted into the recess 115 or such that it cannot be inserted into the recess 115 to an extent so as to resist rotation of the valve cartridge 140 with respect to the casing 110 under the force applied by the return spring 135.

In this embodiment, the return spring 135 comprises a torsion spring which is received in a groove 130 formed in the exterior of the casing 110, although any type of spring which can apply a torque to the valve cartridge 140 can be employed, such as a tension or compression spring which can apply a torque to the valve cartridge 140 through a lever. The illustrated return spring 135 has a first end 136 which is held captive in a spring retention hole 131 in the casing 110 and a second end 137 which extends through a slot 132 formed in the casing 110 between the inner and outer surfaces of the casing 110 into a path of movement of some portion of the rotational limiting member 150 of the valve cartridge 140, such as the second side surface of the head 152 of the rotation limiting member 150. FIG. 7 is an elevation of the lower end of the casing 110 with the return spring 135 removed, showing the spring retention hole 131 and the slot 132 in the groove 130. The slot 132 is long enough to allow the second end 137 of the return spring 135 to translate in the circumferential direction of the casing 110 when a force is applied to the second end 137 by the head 152 in the circumferential direction of the casing 110. The second end 137 of the return spring 135 is positioned so as to provide resistance to rotation of the valve cartridge 140 as the valve cartridge 140 rotates from the full hot position towards a preheat rotational position. For example, in the present embodiment, when the head 152 of the rotation limiting member 150 of the valve cartridge 140 is not contacting the return spring 135, a surface of the second end 137 of the return spring 135 is approximately aligned with the second side surface 123 of the projection 120 of the casing 110. When the valve cartridge 140 is in its full off position and is rotated to the full hot position, the second side surface 155 of the head 152 will contact the second end 137 of the return spring 135. If the valve cartridge 140 is rotated beyond the full hot position with the second side surface 155 of the head 152 contacting the second end 137 of the return spring 135, the return spring 135 will torsionally deform to produce a higher resistance to rotation than experienced by a user when the valve cartridge 140 is in a rotational position between the full cold position and the full hot position, thereby providing a tactile signal to the user that the valve cartridge 140 has reached the full hot position.

The user can continue to rotate the valve cartridge 140 in the counterclockwise direction past the full hot position until the valve cartridge 140 reaches a preheat rotational position.

At this point, a portion of the head 152 will have entered the recess 124 in the projection 120. The valve cartridge 140 can be prevented from further rotation in the counterclockwise direction past a preheat rotational position by contact between the second side surface 155 of the head 152 and the side surface 125 of the recess 124.

The leaf spring 161 changes its shape as the water temperature in the valve cartridge 140 increases. The thermal properties, dimensions, and mounting location of the leaf spring 161 are selected such that when the water temperature in the valve cartridge 140 to which the leaf spring 161 is exposed is below the set-point temperature, the shape of the leaf spring 161 is such that the detent member 162 can be inserted by the leaf spring 161 into the recess 115 in the valve cartridge 140 when the valve cartridge 140 is in a preheat rotational position to prevent the valve cartridge 140 from rotating with respect to the casing 110 under the torque exerted on the valve cartridge 140 by the return spring 135, as schematically shown in FIG. 14. On the other hand, when the water temperature to which the leaf spring 161 is exposed reaches the set-point temperature, the leaf spring 161 deforms to a shape (such as the shape schematically shown in FIG. 15) in which the detent member 162 no longer provides sufficient resistance to rotation of the valve cartridge 140 to prevent the valve cartridge 140 from rotating away from a preheat rotational position under the torque applied to the valve cartridge 140 by the return spring 135.

If the valve cartridge 140 is in a rotational position other than a preheat rotational position and the water temperature inside the valve cartridge 140 is below the set-point temperature, the outer end of the detent member 162 is pressed radially outwards by the leaf spring 161 through the through hole 149 in the valve cartridge 140 into sliding contact with the inner wall of the casing 110. At this time, the pressure applied by the detent member 162 to the inner wall of the casing 110 is sufficiently small that it does not provide any substantial resistance to translation or rotation of the valve cartridge 140 within the casing 110. If the valve cartridge 140 is rotated to a preheat rotational position and the water temperature is below the set-point temperature, the radially outward force applied to the detent member 162 by the leaf spring 161 will insert the outer end of the detent member 162 into the recess 115 in the casing 110, as shown in FIG. 14. At this temperature, the resistance to rotation of the valve cartridge 140 produced by engagement between the detent member 162 and the recess 115 is greater than the torque applied to the valve cartridge 140 by the return spring 135, so the valve cartridge 140 remains latched in a preheat rotational position, and the flow switching module 100 operates in the preheat mode.

When the water temperature in the valve cartridge 140 subsequently reaches the set-point temperature, deformation of the leaf spring 161 due to the increase in temperature causes the leaf spring 161 to assume a shape such that the detent member 162 no longer provides sufficient resistance to rotation of the valve cartridge 140 to overcome the restoring force exerted on the valve cartridge 140 by the return spring 135. At this time, the detent member 162 may be entirely withdrawn from the recess 115 by the leaf spring 161, or it may remain at least partially inserted into the recess but with the amount by which the detent member 162 extends into the recess 115 or the radial outwards force applied to the detent member 162 by the leaf spring 161 producing a reduced resistance to rotation of the valve cartridge 140 with respect to the casing 110. In either case, when the water temperature within the valve cartridge 140 reaches the set-point temperature, the return spring 135 can rotate the valve cartridge 140 from a preheat rotational position back to the full hot position. The return of the valve cartridge 140 to the full hot position can serve as a signal to the user (as indicated by a change in the rotational position of the knob attached to the shaft) that sufficiently hot water is now available and that the flow switching module 100 can now be used in the normal mode of operation.

If a user rotates the valve cartridge 140 to a preheat rotational position when the temperature of water inside the valve cartridge 140 is already above the set-point temperature, the leaf spring 161 will already have assumed a shape in which the detent member 162 is not engaged with the recess 115 in the casing 110 at all or in which the detent member 162 extends into the recess 115 but is not engaged with the recess 115 by a sufficient amount or with sufficient force to resist rotation of the valve cartridge 140 from a preheat rotational position under the restoring force of the return spring 135. Therefore, if the user releases his hand from the mixing shaft 146 of the valve cartridge 140 after rotating the valve cartridge 140 to a preheat rotational position, the valve cartridge 140 will automatically rotate from a preheat rotational position back to the full hot position as a result of the torque applied to it by the return spring 135. If the user wishes to continue the preheating mode to further heat the water entering the valve cartridge 140 through the hot water supply port 111, the user can manually hold the valve cartridge 140 in a preheat rotational position by means of the mixing shaft 146 against the torque applied by the return spring 135.

The shapes of the recess 115 in the casing 110 and the radially outer end of the detent member 162 are not restricted as long as the detent mechanism 160 can maintain the valve cartridge 140 in a preheat rotational position against the torque exerted by the return spring 135 when the water temperature inside the valve cartridge 140 is below the set-point temperature. However, the recess 115 and the radially outer end of the detent member 162 are preferably shaped such that a user can disengage the detent member 162 from the recess 115 and terminate the preheat mode when desired by manually applying a moderate torque to the valve cartridge 140 (such as a torque which a typical user could easily apply with one hand) in a direction to rotate the valve cartridge 140 away from a preheat rotational position towards the full hot position. Therefore, if at any time during the preheat mode a user wishes to terminate preheating and return to the normal mode of operation, he can simply rotate the valve cartridge 140 by hand away from a preheat rotational position back towards the full hot position. Formulas for calculating the force to dislodge a spring-loaded detent ball from a recess as well as designs for enabling a detent ball to be disengaged from a recess are well known in the art, and similar formulas and designs can be employed to determine the torque applied to the valve cartridge 140 necessary to disengage the outer end of the detent member 162 from the recess 115 in the casing 110 in accordance with the shape of the recess 115 and the outer end of the detent member 162.

Although the thermal detent mechanism 160 in the illustrated embodiment employs a leaf spring 161 made from a bimetallic strip as a temperature sensitive actuator, a wide variety of other temperature sensitive actuators could be used to retract the detent member 162 from engagement with the casing 110 when the water in the valve cartridge 140 reaches the set-point temperature. Examples of other types of actuators that could be used in a detent mechanism include those based on use of thermal wax, Nitinol, bellows, bimetallic disks, and other temperature sensitive flexures.

If desired, a temperature adjustment device could readily be incorporated into the thermal detent mechanism 160. Such an adjustment device could take the form of an adjusting screw, for example. As one example, such a screw could vary the initial slope at the base of the leaf spring 161. Flexing the cold position of the leaf spring 161 towards or away from the casing 110 would raise or lower the set-point temperature since it would require a greater or lesser expansion on the hot side for the detent member 162 to pull clear of the recess 115 in the casing 110.

In this manner, in a normal mode of operation, a user can operate the flow switching module 100 in substantially the same manner as a conventional mixing valve such as a mixing valve for a faucet or shower by manually rotating and translating the mixing shaft 146 of the valve cartridge 140. When the user desires to switch the flow switching module 100 to preheating mode, the user merely needs to rotate the valve cartridge 140 past the full hot position to a preheat rotational position. The flow switching module 100 is thus easy and intuitive for a user to operate.

FIGS. 28-59 illustrate another embodiment of a flow switching module 200 according to the present invention. Like the previous embodiment, this embodiment is capable of being integrated into the structure of a hot water plumbing fixture in a hot water circulation system according to the present invention and serving as the main flow control device for the plumbing fixture. The flow switching module 200 is also capable of being installed separately from a plumbing fixture and being used as an auxiliary flow control device for the plumbing fixture.

Like the previous embodiment, this embodiment has a normal mode of operation and a preheat mode of operation. In the normal mode of operation, the flow switching module 200 functions in essentially the same manner as a conventional single-handle mixing valve to perform mixing of hot and cold water and control the flow rate of water discharged from a plumbing fixture. In the preheat mode of operation, hot water which is supplied to the flow switching module 200 is returned to a water heater or other source of hot water to be further heated to a predetermined set-point temperature instead of being discharged from the plumbing fixture.

FIG. 28 is an exploded axonometric view of the flow switching module 200, and FIGS. 29 and 30 are cutaway axonometric views of the flow switching module 200 in an assembled state. As shown in these figures, in this embodiment, the flow switching module 200 includes a mixing valve assembly 201, a lifter assembly 220, and a preheat assembly 240. The flow switching module 200 is illustrated with its longitudinal axis extending substantially vertically. However, as is the case with respect to the previous embodiment, this embodiment can be installed with its longitudinal axis at any orientation with respect to the vertical, The mixing valve assembly 201 performs the functions of a conventional mixing valve. It supplies hot water, cold water, or a mixture of hot and cold water to the discharge port of an unillustrated plumbing fixture, such as a shower head of a shower or a spout of a faucet.

The preheat assembly 240 is fluidly connected to a source of hot water, such as an unillustrated hot water heater. When the flow switching module 200 is in its normal mode of operation, the preheat assembly 240 supplies the water from the source of hot water to the mixing valve assembly 201, and when the flow switching module 200 is in the preheat mode of operation, the preheat assembly 240 supplies the hot water to a return passageway for return to the source of hot water.

The lifter assembly 220 is a mechanism which enables a user of the flow switching module 200 to manually control the operation of the mixing valve assembly 201 and the preheat assembly 240 and to switch between the normal mode and the preheat mode of operation.

The mixing valve assembly 201 may have any structure which enables it to perform mixing of hot and cold water in desired proportions and to adjust the flow rate of water discharged from the mixing valve assembly 201. In the present embodiment, the mixing valve assembly 201 includes a stationary casing 202 (referred to here as a valve casing) and a cartridge 210 (referred to here as a valve cartridge) which is movably installed in the valve casing 202 so as to be able to reciprocate with respect to the valve casing 202 in the longitudinal direction of the valve casing 202 and rotate with respect to the valve casing 202 around the longitudinal axis of the valve casing 202. The valve casing 202 is typically supported by unillustrated structure so as to remain stationary during operation of the module 200. For example, the valve casing 202 may be supported by the body of a plumbing fixture or by structural components of a building in which the plumbing fixture is installed. The illustrated valve casing 202 is a cylindrical member having an opening at both of its lengthwise ends. A hot water supply port 203, a cold water supply port 204, and at least one water delivery port 205 (two in the illustrated embodiment) are formed through the wall of the valve casing 202 between its inner and outer surfaces. The cold water supply port 204 is fluidly connected by an unillustrated passageway on the exterior of the valve casing 202 to a source of cold water. The hot water supply port 203 is connected by an unillustrated passageway on the exterior of the valve casing 202 to a water delivery port 262 of the preheat assembly 240, to be described below. The one or more water delivery ports 205 of the valve casing 202 are fluidly connected by one or more unillustrated passageways on the exterior of the valve casing 202 to the discharge port of the plumbing fixture with which the flow switching module 200 is associated.

Figure 32:
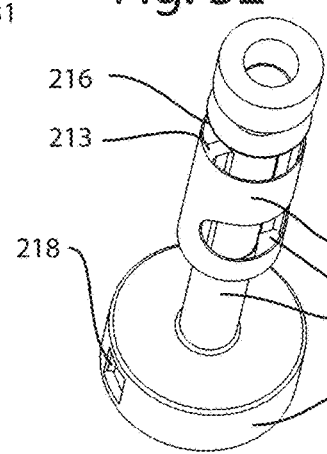
FIG. 32 is an axonometric view of a valve cartridge of the embodiment of FIG. 28.
Figure 33:
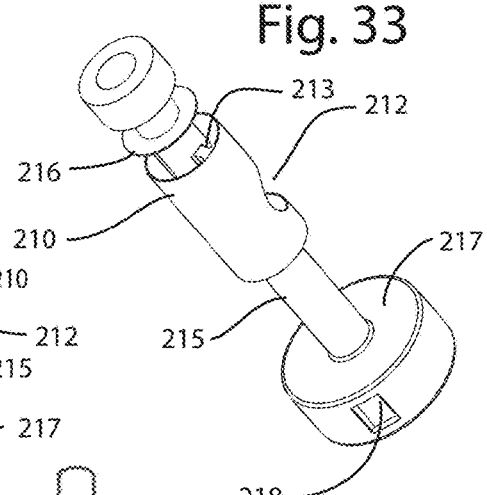
FIG. 33 is an axonometric view of the valve cartridge of FIG. 32 as viewed from another angle.
Figure 34:
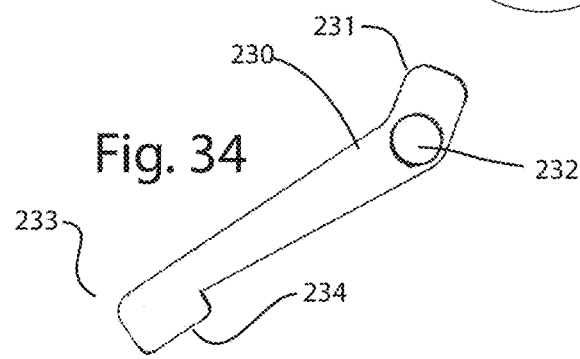
FIG. 34 is an end view of the lever of FIG. 31.

FIGS. 32 and 33 are axonometric views of the exterior of the valve cartridge 210 from different angles. Preferably the valve cartridge 210 is removably installed inside the valve casing 202 so that it can be replaced when desired. The illustrated valve cartridge 210 includes a mixing core 211 which interacts with the valve casing 202 to perform mixing of hot and cold water. It further includes a shaft 215, referred to here as a mixing shaft, to which the mixing core 211 is secured. The mixing core 211 comprises a tubular member having an opening at each of its lengthwise ends. The upper end of the mixing core 211 is secured to the mixing shaft 215 by a plurality of spokes 213 which extend radially between the mixing shaft 215 and the wall of the mixing core 211 so that water can flow between the spokes 213 through the upper end of the mixing core 211. An inlet 212 is formed through the wall of the mixing core 211 between its inner and outer surfaces. Like the first inlet 142 of the mixing core 211 in the previous embodiment, the inlet 212 in this embodiment is elongated in the circumferential direction of the mixing core 211 and serves as an inlet into the mixing core 211 for water from one or both of the hot water supply port 203 and the cold water supply port 204 during the normal mode of operation. The mixing core 211 also includes an outlet 214 defined by the spaces between the spokes 213 at the open upper end of the mixing core 211. The interior of the mixing core 211 functions as a mixing chamber in which water supplied through the hot water supply port 203 and the cold water supply port 204 can be mixed to produce water having a desired temperature.

The mixing shaft 215 is a tubular member which extends out of the upper and lower ends of the mixing core 211. The mixing shaft 215 may comprise a single member which extends over the entire length of the mixing shaft 215, or it may comprises a plurality of coaxial sections which are joined end to end in series. In the present embodiment, the mixing shaft 215 comprises an upper section and a lower section which is coaxial with the upper section and secured to the lower end of the upper section. The upper section of the mixing shaft 215 is secured to the mixing core 211 by the above-mentioned spokes 213, while the lower section of the mixing shaft 215 passes through an opening formed in the lower end of the valve casing 202. An unillustrated seal is typically provided around the outer surface of the lower section of the mixing shaft 215 to prevent water from leaking to the exterior of the valve casing 202 around the lower section of the mixing shaft 215.

As in the previous embodiment, a baffle 216 is secured to the mixing shaft 215 above the upper end of the mixing core 211 at a location in which it can allow or block flow through the water delivery ports 205 of the valve casing 202 and control the flow rate of water through the water delivery ports 205 in a conventional manner as the valve cartridge 210 reciprocates within the valve casing 202.

As shown in FIGS. 32 and 33, a ring 217 having a cylindrical outer surface is secured to the lower end of the lower section of the mixing shaft 215. A recess 218 which is capable of engaging with a portion of the lifter assembly 220 is formed in the outer periphery of the ring 217.

As in the previous embodiment, portions of the exterior of the valve cartridge 210 (such as unillustrated sealing rings) are in sliding contact with the inner surface of the valve casing 202 as the valve cartridge 210 reciprocates or rotates within the valve casing 202. However, as described with respect to the previous embodiment, a hollow sleeve may be removably mounted inside the valve casing 202 between the inner wall of the valve casing 202 and the outer surface of the valve cartridge 210 to protect the inner surface of the valve casing 202 against wear caused by movement of the valve cartridge 210 with respect to the valve casing 202.

Figure 46:
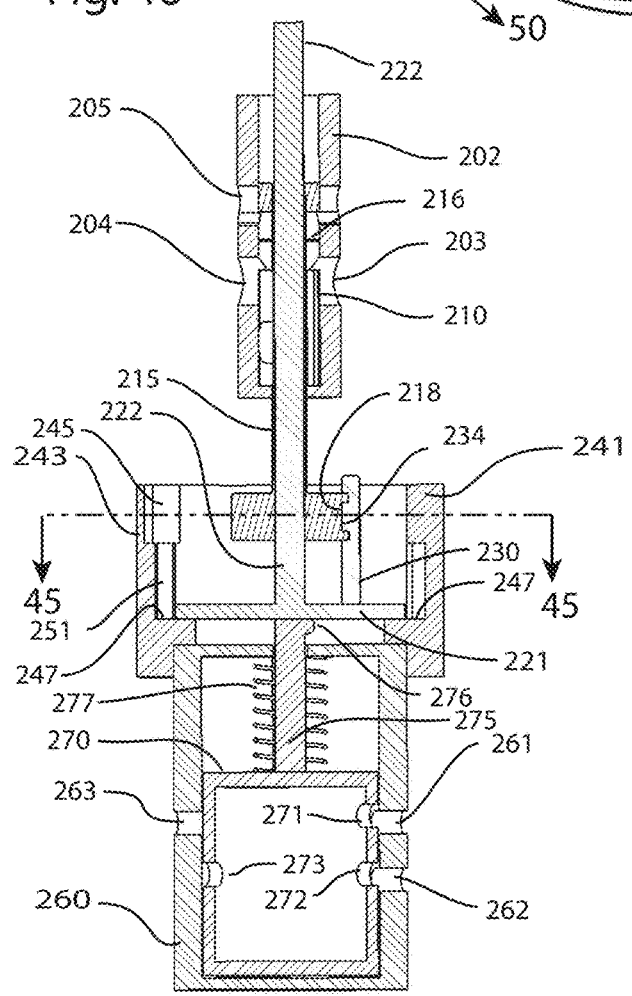
FIG. 46 is a cross-sectional elevation of the embodiment of FIG. 28 showing the lifter shaft in a lowered position.
Figure 47:
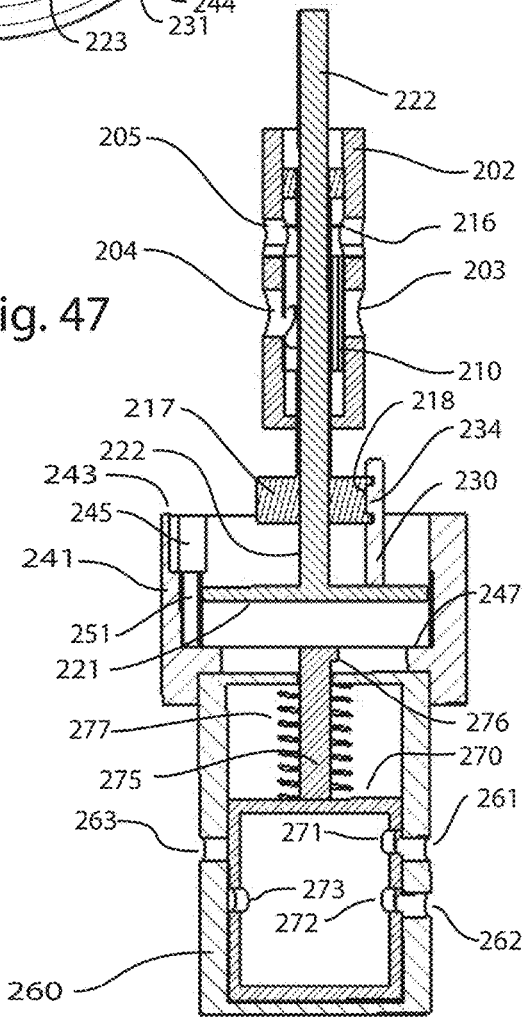
FIG. 47 is a cross-sectional elevation of the embodiment of FIG. 28 taken along line 47-47 of FIG. 45 and showing the lifter shaft in a raised position.
Figure 70:
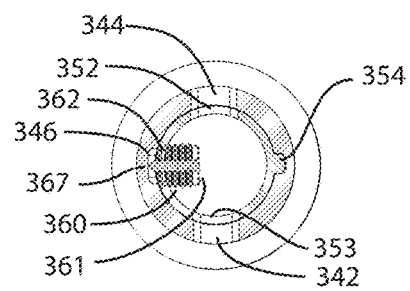
FIG. 70 is a transverse cross-sectional view of the embodiment of FIG. 60 taken along line 70-70 of FIG. 71.
Figure 73:
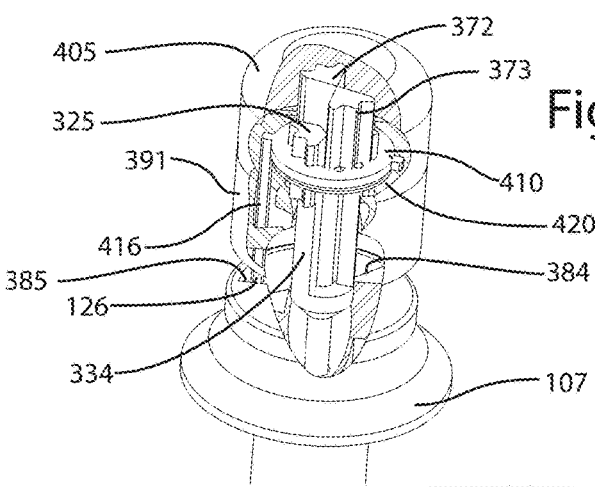
FIG. 73 is a cutaway axonometric view of the upper portion of the embodiment of FIG. 60 in the state shown in FIGS. 71 and 72 in which the preheat core is in a raised (preheat) position.

In the same manner as in the previous embodiment, the valve cartridge 210 can translate within the valve casing 202 in the longitudinal direction of the valve casing 202 to switch the mixing valve assembly 201 between an off state and an on state. FIGS. 46 and 47 are cross-sectional elevations of the module 200 showing the mixing valve assembly 201 in the off state and the on state, respectively. When the mixing valve assembly 201 is in the off state, the valve cartridge 210 is positioned within the valve casing 202 so as to essentially prevent the flow of liquid out of the valve casing 202 through the water delivery ports 205 of the valve casing 202. Specifically, in the present embodiment, in the off state, the valve cartridge 210 is positioned such that the inlet 212 of the mixing core 211 does not overlap either the hot water supply port 203 or the cold water supply port 204 of the valve casing 202 in the longitudinal direction of the valve casing 202 to prevent water from either of the supply ports from entering the valve cartridge 210 through the inlet 212, and such that the baffle 216 of the valve cartridge 210 is positioned below the lower end of the water delivery ports 205 of the valve casing 202 in the longitudinal direction to prevent water from flowing out of the valve casing 202 through the water delivery ports 205 from the region of the valve casing 202 below the baffle 216. In the off state, the radially outer end of the inlet of the valve cartridge 210 is blocked by the inner wall of the valve casing 202.

When the mixing valve assembly 201 is in the on state, the valve cartridge 210 is positioned within the valve casing 202 so as to allow liquid to be discharged from the interior of the valve cartridge 210 through the water delivery ports 205 of the valve casing 202. Specifically, in the present embodiment, in the on state, the valve cartridge 210 is positioned such that the inlet 212 of the valve cartridge 210 overlaps the hot water supply port 203 and the cold water supply port 204 in the longitudinal direction of the valve casing 202 to allow water from one or both of the water supply ports 203 and 204 to enter the valve cartridge 210 through the inlet 212, and such that the baffle 216 is raised above the lower end of the water delivery ports 205 in the longitudinal direction of the valve casing 202 to allow water to be discharged from the region of the valve cartridge 210 located below the baffle 216 through the water delivery ports 205. When the mixing valve assembly 201 is in the on state, the flow rate through the water delivery ports 205 can be varied by raising or lowering the valve cartridge 210 within the valve casing 202 to adjust the degree to which the baffle 216 obstructs the water delivery ports 205 and to adjust the amount of overlap in the longitudinal direction of the valve casing 202 between the inlet 212 and the hot and cold water supply ports 203 and 204.

As in the previous embodiment, the valve cartridge 210 can be rotated within the valve casing 202 about the longitudinal axis of the valve casing 202 between a full cold rotational range and a full hot rotational range. When the valve cartridge 210 is in the full hot rotational range, the inlet 212 of the mixing core 211 overlaps the hot water supply port 203 of the valve casing 202 in the circumferential direction of the valve casing 202 but does not overlap the cold water supply port 204 in the circumferential direction so that when the mixing valve assembly 201 is in the on state, water from the hot water supply port 203 can flow into the interior of the valve cartridge 210 through the inlet 212 while water from the cold water supply port 204 is prevented from doing so. Conversely, when the valve cartridge 210 is in the full cold rotational range, the inlet 212 of the valve cartridge 210 overlaps the cold water supply port 204 of the valve casing 202 in the circumferential direction of the valve casing 202 but does not overlap the hot water supply port 203 in the circumferential direction so that when the mixing valve assembly 201 is in an on state, water from the cold water supply port 204 can flow into the interior of the valve cartridge 210 through the inlet 212 while water from the hot water supply port 203 is prevented from doing so. When the rotational position of the valve cartridge 210 is in an intermediate rotational range between the full hot rotational range and the full cold rotational range, both hot water from the hot water supply port 203 and cold water from the cold water supply port 204 can flow into the interior of the valve cartridge 210 through the inlet 212 when the mixing valve assembly 201 is in an on state. The valve cartridge 210 can be rotated to at least one rotational position in the full hot rotational range, at least one rotational position in the full cold rotational range, and at least one rotational position in the intermediate rotational range. Typically it can be rotated to a plurality of rotational positions in each range. By adjusting the rotational position of the valve cartridge 210 between the full hot rotational range and the full cold rotational range, a user can vary the ratio of hot to cold water entering the valve cartridge 210 and thereby adjust the temperature of the water discharged from the water delivery ports 205 of the valve casing 202.

In this embodiment as in the previous embodiment, the valve cartridge 210 is rotated about its longitudinal axis in the counterclockwise direction as viewed from above in FIGS. 29 and 30 as it rotates from the full cold rotational range to the full hot rotational range. However, the flow switching module 200 may be arranged such that the valve cartridge 210 is rotated in the clockwise direction from the full cold rotational range to the full hot rotational range.

Figure 35:
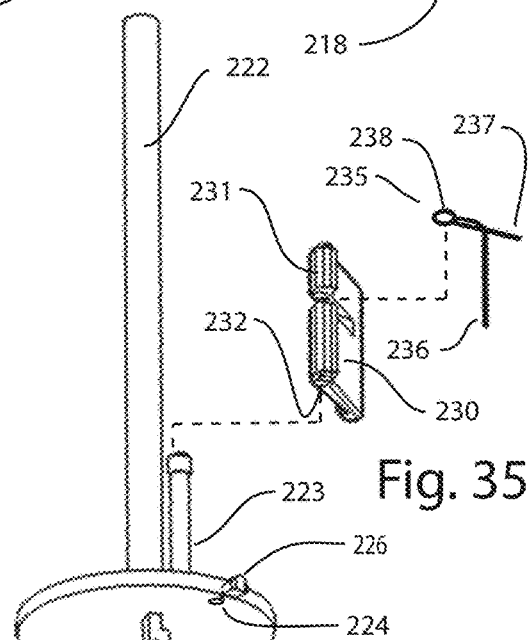
FIG. 35 is an exploded axonometric view of the lifter assembly of the embodiment of FIG. 28.

FIG. 35 is an exploded axonometric view of the lifter assembly 220. The lifter assembly 220 includes a base 221 and an elongated shaft 222 (referred to here as a lifter shaft) which is secured to the base 221 and extends upwards from and perpendicular to the top surface of the base 221. In the present embodiment, the base 221 is in the form of a flat circular disk, but the base 221 is not restricted to any particular shape as long as it is capable of supporting the lifter shaft 222 and is capable of translating and rotating within the preheat assembly 240. As shown in FIGS. 29 and 30, the lifter shaft 222 extends coaxially through the center of the mixing shaft 215 and extends over the entire length of the mixing valve assembly 201, with the upper end of the lifter shaft 222 extending out of the upper end of the valve casing 202 of the mixing valve assembly 201 and with the base 221 disposed beneath the ring 217 at the bottom of the mixing shaft 215. The lifter shaft 222 is supported by the mixing valve assembly 201 so as to be able to translate with respect to the valve casing 202 of the mixing valve assembly 201 in the longitudinal direction of the valve casing 202 and so as to be able to rotate with respect to the valve casing 202 about the longitudinal axis of the valve casing 202. For example, friction between the outer surface of the lifter shaft 222 and unillustrated sealing members mounted on the mixing shaft 215 can provided sufficient resistance to translation of the lifter shaft 222 to enable the valve casing 202 to support the lifter assembly 220 through the mixing shaft 215.

An unillustrated knob, handle, or other manual control member which can be grasped by a user may be secured to the upper end of the lifter shaft 222 to enable a user of the flow switching module 200 to translate and rotate the lifter assembly 220 by hand. Alternatively, the upper end of the lifter shaft 222 can be connected to an unillustrated linkage which enables a user to translate or rotate the lifter shaft 222 by manipulating an unillustrated lever connected to the linkage without the user having to directly push or pull on the lifter shaft 222.

Figure 31:
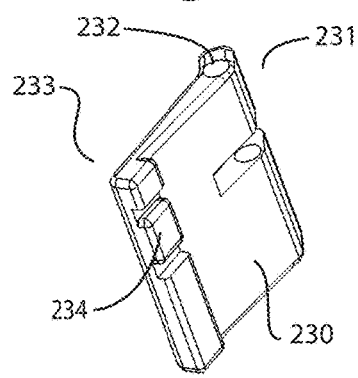
FIG. 31 is an axonometric view of a lever of a lifter assembly of the embodiment of FIG. 28.

The lifter assembly 220 includes a latching mechanism for detachably connecting the lifter assembly 220 to the valve cartridge 210 of the mixing valve assembly 201. In the present embodiment, the latching mechanism comprises a lever 230 which is pivotably supported by the base 221. FIG. 31 is an axonometric view and FIG. 32 is a top plan view of the lever 230. A first end 231 of the lever 230 includes a bore 232 which fits over a pivot pin 223 which extends upwards from the top surface of the base 221 to enable the lever 230 to pivot with respect to the pivot pin 223 and the base 221. A second end 233 of the lever 230 is formed with projections 234 which are shaped for detachable engagement with the recess 218 formed in the outer periphery of the ring 217 mounted at the lower end of the mixing shaft 215 of the valve cartridge 210. The lever 230 can pivot between an engaged state shown in FIGS. 29 and 30 in which the projections 234 on the second 233 of the lever 230 are engaged with the recess 218 in the ring 217 and a disengaged state in which the second 233 of the lever 230 is spaced from the ring 217 and the projections 234 on the second 233 are disengaged from the recess 218 in the ring 217. When the lever 230 is in the engaged state in which the second 233 of the lever 230 is engaged with the ring 217, the valve cartridge 210 and the lifter assembly 220 can translate in the longitudinal direction of the valve casing 202 and rotate about the longitudinal axis of the valve casing 202 as a single unit so that when a user raises or lowers the lifter shaft 222 in its longitudinal direction, both the lifter assembly 220 and the valve cartridge 210 are raised and lowered as a single unit with respect to the valve casing 202, and so that when the user rotates the lifter shaft 222 about its longitudinal axis, the entire lifter assembly 220 and the valve cartridge 210 rotate with respect to the valve casing 202 as a single unit about the longitudinal axis of the valve casing 202. The lever 230 is biased towards the engaged state by a suitable biasing member, such as a spring. In the present embodiment, a biasing member in the form of a torsion spring 235 includes a first end 236, a second 237, and a coiled portion 238 between the two ends. The first end 236 of the torsion spring 235 is inserted into a hole 224 in the top surface of the base 221, the coiled portion 238 fits over the pivot pin 223 for the lever 230, and the second end 237 of the torsion spring 235 is pressed against the exterior of the lever 230 to exert a torque on the lever 230 to urge the lever 230 to the engaged state.

An L-shaped bracket 225 which forms parts of a latching mechanism for detachably engaging the lifter assembly 220 with the below-described preheat assembly 240 may be formed on the bottom surface of the base 221.

As shown in FIG. 35, a tab 226 or other projecting member for use in limiting the rotation of the lifter assembly 220 about the longitudinal axis of the lifter shaft 222 projects outwards from the periphery of the base 221.

The lifter shaft 222 can be rotated about its longitudinal axis to rotational positions within a normal rotational range and a preheat rotational range. When the lifter shift is in the normal rotational range, the lever 230 is engaged with the ring 217 of the valve cartridge 210. Therefore, when the lifter shaft 222 is translated or rotated while in its normal rotational range, the valve cartridge 210 is translated or rotated along with the lifter shaft 222, and the module 200 can operate in its normal mode.

On the other hand, when the lifter shaft 222 is in the preheat rotational range, the lever 230 is in its disengaged state in which it is disengaged from the ring 217 of the valve cartridge 210. In this state, translation or rotation of the lifter shaft 222 does not produce any translation or rotation of the valve cartridge 210. At the same time, when the lifter shaft 222 is in the preheat rotational range, the lifter assembly 220 is engaged with the below-described preheat core 270 of the preheat assembly 240. As a result of this engagement, raising or lowering the lifter shaft 222 when it is in the preheat rotational range raises and lowers the preheat core 270 to initiate or terminate the preheat mode.

When the lifter shaft 222 is in the normal rotational range, the lifter shaft 222 can translate in its longitudinal direction between an on range and an off range. When the lifter shaft 222 is in its on range in the longitudinal direction, the valve cartridge 210 is positioned in the longitudinal direction of the valve casing 202 such that the mixing valve assembly 201 is in its on state, and when the lifter shaft 222 is in its off range in the longitudinal direction, the valve cartridge 210 is positioned in the longitudinal direction of the valve cartridge 210 such that the mixing valve assembly 201 is in its off state.

When the lifter shaft 222 is in the preheat rotational range, the lifter shaft 222 can translate in its longitudinal direction between a raised position and a lowered position. When the lifter shaft 222 is in its raised position, the below-described preheat core 270 of the preheat assembly 240 is raised to a raised or preheat position in which the module 200 in the preheat mode, and when the lifter shaft 222 is in its lowered position, the preheat core 270 of the preheat assembly 240 is in a lowered or normal position which it assumed during the normal mode.

As shown in FIGS. 28-30, the preheat assembly 240 includes a stationary upper casing 241, a stationary lower casing 260 disposed beneath the upper casing 241, and a preheat core 270 which is disposed inside the lower casing 260 for movement with respect to the lower casing 260 in the longitudinal direction of the lower casing 260. Like the valve casing 202 of the mixing valve assembly 201, the upper casing 241 and the lower casing 260 of the preheat assembly 240 are supported by unillustrated structure so as to remain stationary during operation of the module 200. The upper casing 241, the lower casing 260, and the valve casing 202 together define a stationary body of the flow switching module 200 for supporting the movable components of the flow switching module 200.

Figure 36:
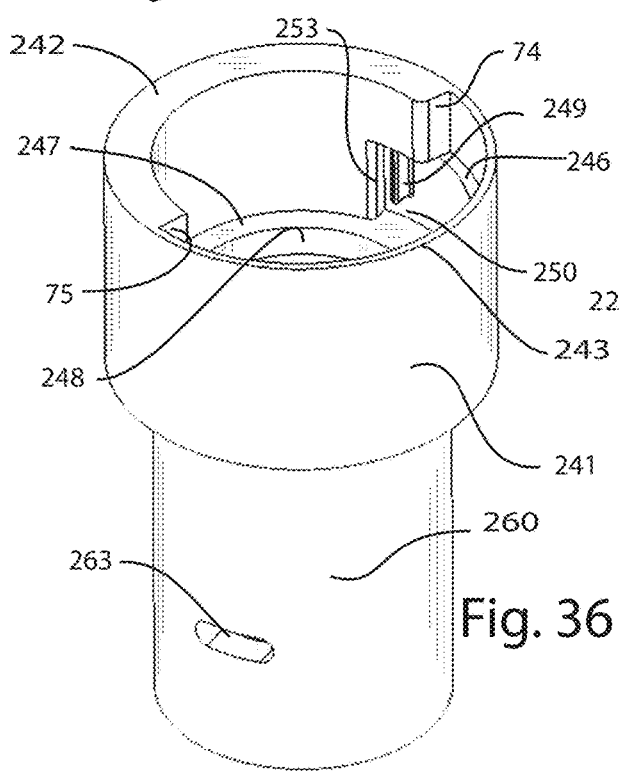
FIG. 36 is an axonometric view of the preheat casing of the embodiment of FIG. 28.
Figure 38:
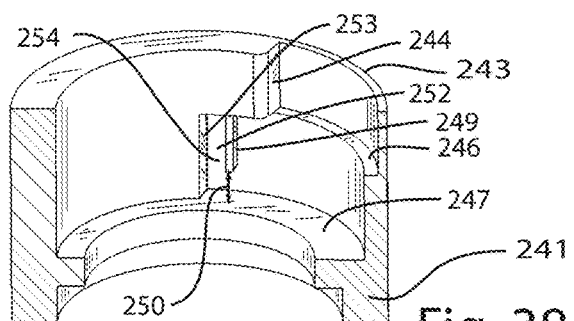
FIG. 38 is a cutaway axonometric view of the upper casing of the preheat assembly of the embodiment of FIG. 28.
Figure 39:
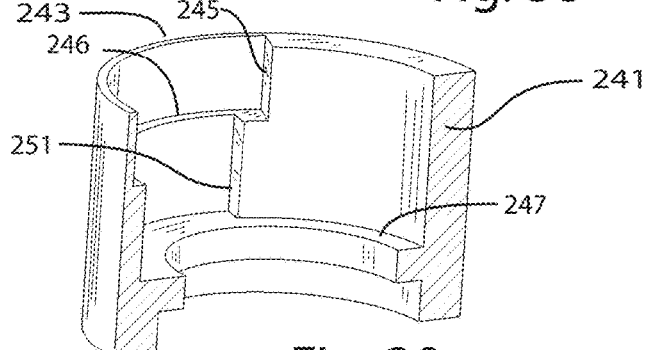
FIG. 39 is a cutaway axonometric view of the upper casing shown in FIG. 38 as viewed from another angle.

As shown in FIGS. 29 and 30, the upper casing 241 of the preheat assembly 240 houses the base 221 and all or a portion of the lever 230 of the lifter assembly 220, depending upon the position of the lifter shaft 222 in the longitudinal direction of the valve casing 202. FIG. 36 is an axonometric view of the upper and lower casings 241 and 260 of the preheat assembly 240, and FIGS. 38 and 39 are cutaway axonometric views of the upper casing 241 as viewed from two different angles.

As shown in these figures, the upper casing 241 is a tubular member having an opening at its upper and lower ends. At its upper end, it includes a thick-walled region 242 and a thin-walled region 243 which each extend roughly half way around the circumference of the upper casing 241. First and second walls 244 and 245 which each project towards roughly the radial center of the upper casing 241 are formed at opposite ends of the thick-walled region 242 along a path of movement of the first end 231 of the lever 230 as the lifter shaft 222 rotates about its longitudinal axis. A first ledge 246 extends in roughly a semicircle in the circumferential direction of the upper casing 241 along the inner periphery of the thin-walled region 243, and a second ledge 247 extends around the entire circumference of the inner periphery of the upper casing 241 at a distance below the first ledge 246. An opening, such as a circular through hole, is formed in the center of the second ledge 247 through its thickness. The inner diameter of the thick-walled region 242 is larger than the outer diameter of the base 221 of the lifter assembly 220. As shown in FIGS. 29 and 30, the base 221 of the lifter assembly 220 is disposed inside the upper casing 241 so that it can rotate with respect to the upper casing 241 about its longitudinal axis.

A third wall 249 and fourth wall 251 are formed in the thick-walled region 242 at a level below the first wall 244 along a path of movement of the tab 226 on the lifter assembly 220. Both walls 249 and 251 project towards roughly the radial center of the upper casing 241. The third wall 249 extends from the level of the first ledge 246 partway towards the second ledge 247. The lower end of the third wall 249 is separated from the top surface of the second ledge 247 by a gap 250 which is tall enough for the tab 226 formed on the base 221 of the lifter assembly 220 to pass through the gap 250, while the fourth wall 251 extends from the first ledge 246 down to the top of the second ledge 247. The height of the gap 250 below the third wall 249 is selected such that the tab 226 can pass through the gap 250 as the lifter shaft 222 rotates only when the lifter shaft 222 is in its off range in the longitudinal direction. As a result, the lifter shaft 222 can rotate between the normal rotational range and the preheat rotational range only when the lifter shaft 222 is in its off range in the longitudinal direction, at which time the mixing valve assembly 201 is in its off state. A slot 252 extending in the longitudinal direction of the upper casing 241 is formed in the thick-walled region 242 of the upper casing 241. Two walls (a fifth wall 253 and a sixth wall 254) define opposite sides of the slot 252. The slot 252 is wide enough for the tab 226 on the lifter assembly 220 to travel vertically within the slot 252 when the lifter shaft 222 is in the preheat rotational range. The fifth wall 253 extends from the level of the first ledge 246 down to the second ledge 247, while the sixth wall 254 extends down to the upper end of the gap 250 beneath the third wall 249. The slot 252 is shown extending upwards to the level of the first ledge 246, but it may extend upwards for a different distance in accordance with the desired amount of translation of the lifter shaft 222 between its raised and lowered position when the lifter shaft 222 is in the preheat rotational range.

The flow switching module 200 may include structure for limiting the distances by which the valve cartridge 210 and the lifter shaft 222 can translate in the longitudinal direction of the lifter shaft 222. In the illustrated embodiment, downwards translation of the lifter shaft 222 is limited by contact between the bottom surface of the base 221 of the lifter assembly 220 and the top surface of the second ledge 247 of the upper casing 241. When the lifter shaft 222 is in its normal rotational range, the valve cartridge 210 and the lifter shaft 222 translate together, so limiting the downwards translation of the lifter shaft 222 also limits the downwards translation of the valve cartridge 210. Upwards translation of the valve cartridge 210 and the lifter shaft 222 when the lifter shaft 222 is in its normal rotational range can be limited by conventional structure commonly used for limiting translation in a mixing valve. For example, a snap ring could be mounted in an internal groove of the valve casing 202 above the upper end of the valve cartridge 210 and along the path of movement of the valve cartridge 210 as it translates within the valve casing 202.

When the lifter shaft 222 is in its preheat rotational range, the preheat assembly 240 is engaged with the below-described preheat core 270 of the preheat assembly 240. Therefore, upwards movement of the lifter shaft 222 which it is in the preheat rotational range can be limited by structure limiting the upwards movement of the preheat core 270. Alternatively, the upwards translation of the lifter shaft 222 could be limited by contact between the tab 226 and the upper end of the slot 252 in the wall of the upper casing 241.

Structure may also be provided for limiting the range of rotation of the lifter shaft 222 about its longitudinal axis. In the present embodiment, the range of rotation of the lifter shaft 222 is limited by contact between the tab 226 on the base 221 of the lifter assembly 220 and various surfaces of the upper casing 241. When the lifter shaft 222 is in the normal rotational range and is in its on range in the longitudinal direction, the lifter shaft 222 can rotate between a position referred to as a full hot position in which the tab 226 on the base 221 of the lifter assembly 220 contacts the third wall 249 of the upper casing 241 and another position referred to as a full cold position in which the tab 226 contacts the fourth wall 251 of the upper casing 241. When the lifter shaft 222 is in the lowest position of its off range in the longitudinal direction in which the base 221 of the lifter assembly 220 sits on the second ledge 247, the lifter shaft 222 can rotate in the clockwise direction as far as the full cold position in which the tab 226 contacts the fourth wall 251 of the upper casing 241. When the lifter shaft 222 is rotated in the counterclockwise direction while in its lowest position in the off range, the tab 226 on the base 221 of the lifter assembly 220 is disposed below the lower end of the third wall 249, so the tab 226 can pass through the gap 250 beneath the third wall 249, and the lifter shaft 222 can rotate from the normal rotational range to the preheat rotational range. When the lifter shaft 222 is in the preheat rotational range, the distance by which it can rotate in the counterclockwise direction is limited by contact between the tab 226 and the fifth wall 253 of the upper casing 241. When the lifter shaft 222 is raised to a raised position while in the preheat rotational range, the rotation of the lifter shaft 222 in the clockwise direction is limited by contact between the tab 226 and the sixth wall 254 of the upper casing 241.

Figure 42:
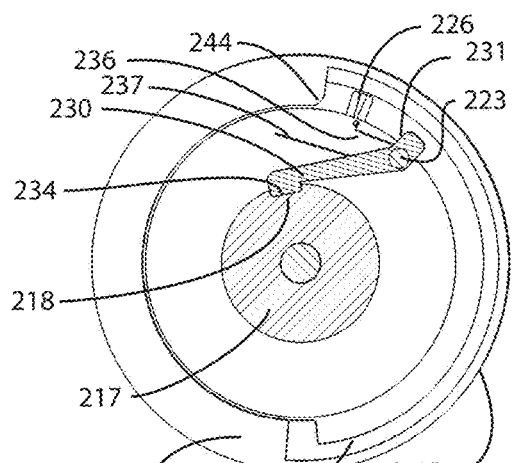
FIG. 42 is transverse cross-sectional view of the embodiment of FIG. 28 when the lifter shaft is in a rotational position between a full hot position and a full cold position.
Figure 43:
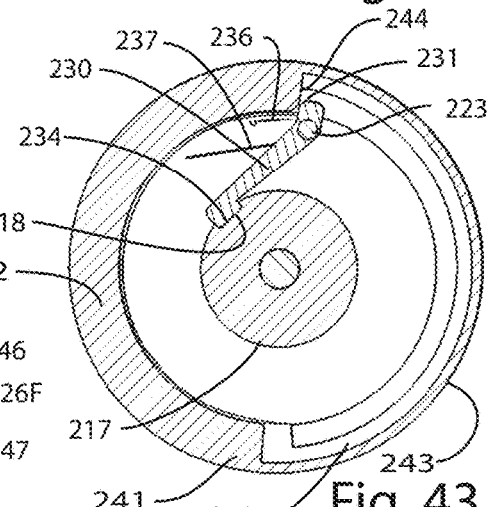
FIG. 43 is transverse cross-sectional view of the embodiment of FIG. 28 when the lifter shaft is in a rotational position in which the lever contacts the first wall of the upper casing.
Figure 44:
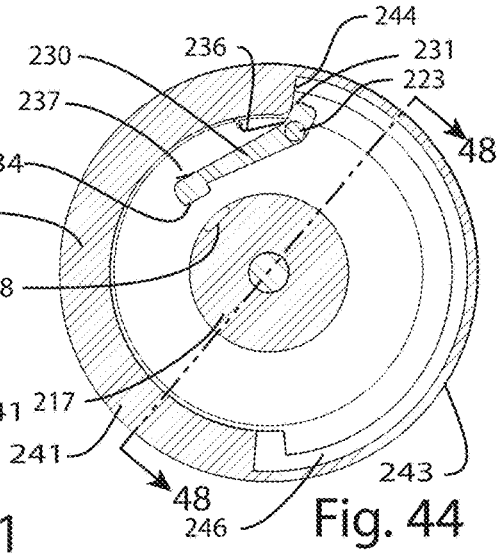
FIG. 44 is transverse cross-sectional view of the embodiment of FIG. 28 when the lifter shaft is in a rotational position in which the lever is disengaged from the mixing valve assembly.
Figure 45:
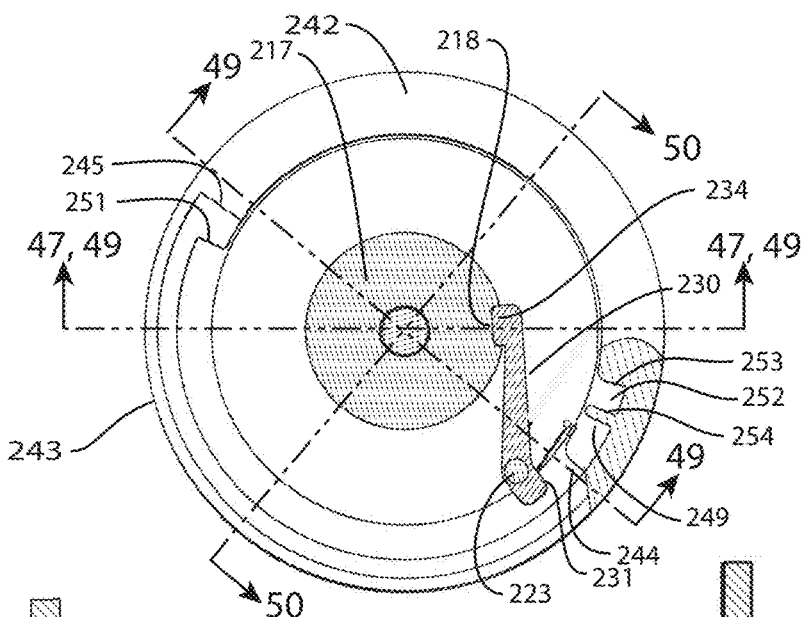
FIG. 45 is a transverse cross-sectional view of the embodiment FIG. 28 taken along line 45-45 of FIG. 46.

The first wall 244 of the upper casing 241 is used in order to pivot the lever 230 from its engaged state to its disengaged state as the lifter shaft 222 rotates about its longitudinal axis. FIGS. 42-44 are transverse cross-sectional views of this embodiment taken along a horizontal plane passing through the ring 217 at the lower end of the mixing shaft 215 and illustrating the interaction between the first wall 244 of the upper casing 241 and the lever 230 at various rotational positions of the lifter shaft 222. FIG. 42 illustrates the lifter shaft 222 at a rotational position between the full hot position and the full cold position within the normal rotational range of the lifter shaft 222. At this rotational position, the first end 231 of the lever 230 is not contacting the first wall 244 of the upper casing 241, and the lever 230 is in its engaged state in which the second end 233 of the lever 230 is engaged with the recess 218 in the ring 217 of the valve cartridge 210. As a result of this engagement, the lifter assembly 220 and the valve cartridge 210 can be raised and lowered in the longitudinal direction of the lifter shaft 222 and rotated about the longitudinal axis of the lifter shaft 222 as a single unit.

FIG. 43 shows the lifter shaft 222 rotated in the counterclockwise direction with respect to the position shown in FIG. 42 to a rotational position in which the first end 231 of the lever 230 is contacting the first wall 244 of the upper casing 241. While it is possible for the contact between the first wall 244 of the upper casing 241 and the first end 231 of the lever 230 to be applying a moment to the lever 230 at this time, the second end 233 of the lever 230 remains engaged with the recess 218 in the ring 217 of the valve cartridge 210.

FIG. 44 shows the lifter shaft 222 rotated in the counterclockwise direction with respect to the position shown in FIG. 43 to a rotational position in which the contact between the first wall 244 and the first end 231 of the lever 230 forces the lever 230 to pivot to a disengaged state in which the second end 233 of the lever 230 is disengaged from the recess 218 in the ring 217 of the valve cartridge 210.

If the lifter shaft 222 is rotated in the clockwise direction from the rotational position shown in FIG. 44 back to the rotational position shown in FIG. 43, the biasing force applied to the lever 230 by the torsion spring 235 will pivot the lever 230 from the disengaged state shown in FIG. 44 back to the engaged state shown in FIG. 43.

In the present embodiment, the second wall 245 of the upper casing 241 serves merely as an end surface of the thick-walled region 242 of the upper casing 241 and does not contact the lifter assembly 220. However, as an alternative to the fourth wall 251 of the upper casing 241 defining the full cold position of the lifter shaft 222 by contacting the tab 226 of the lifter assembly 220, the second wall 245 of the upper casing 241 could be located so that the first end 231 of the lever 230 contacts the second wall 245 when the lifter shaft 222 is rotated in the clockwise direction to a full cold position, and the contact prevents further rotation of the lifter shaft 222 in the clockwise direction. In this case, the fourth wall 251 can be moved to a location in which it does not contact the tab 226 of the lifter assembly 220 when the lifter shaft 222 is rotated to its full cold position.

When a user rotates the lifter shaft 222 from the rotational position shown in FIG. 43 to the rotational position shown in FIG. 44, the torsion spring 235 is elastically deformed as the lever 230 rotates from the engaged state shown in FIG. 43 to the disengaged state shown in FIG. 44. The torque produced by the deformation of the torsion spring 235 generates a clockwise torque which is applied to the lifter shaft 222 through the pivot pin 223 for the lever 230 and the base 221 of the lifter shaft 222. This torque produces an increased resistance to rotation of the lifter shaft 222 in the counterclockwise direction compared to what a user would normally feel when the lever 230 is not contacting the first wall 244 of the upper casing 241, such as when the lifter shaft 222 is in the rotational position shown in FIG. 42. By appropriately selecting the spring constant of the torsion spring 235, the increased resistance to rotation produced by the torsion spring 235 can provide a tactile clue to a user when the lifter shaft 222 is in its off range in the longitudinal direction that the lifter shaft 222 has reached or is in the vicinity of the full hot position. In the present embodiment, the torsion spring 235 has a spring constant which is sufficiently large that the clockwise torque which is applied to the lifter shaft 222 due to the deformation of the torsion spring 235 can rotate the lifter shaft 222 from the preheat rotational range back to the normal rotational range when there is no force other than friction restraining the lifter shaft 222 from rotating in the clockwise direction. For example, if a user rotates the lifter shaft 222 to the rotational position shown in FIG. 44 with the lifter shaft 222 in its lowered position and then releases his hand from the lifter shaft 222, the clockwise torque acting on the lifter shaft 222 will return the lifter shaft 222 to the normal rotational range.

The lower casing 260 of the preheat assembly 240 is a tubular member disposed beneath the upper casing 241. In the present embodiment, the upper casing 241 is shown sitting directly on the lower casing 260, but it is also possible for the upper and lower casings 241 and 260 to be spaced from each other in the longitudinal direction. The lower casing 260 may have any shape which permits the preheat core 270 to translate inside the lower casing 260 in the longitudinal direction of the lower casing 260. In the present embodiment, both the lower casing 260 and the preheat core 270 are generally cylindrical with a circular transverse cross section, but non-circular transverse cross-sectional shapes are also possible, such as polygonal or oval. The structure of the lower casing 260 and the preheat core 270 is best illustrated in above-mentioned FIG. 46, which is a cross-sectional elevation of the module when the mixing valve assembly 201 is in an off state and the lifter shaft 222 is in the normal rotational range during the normal mode of operation, and FIG. 54, which is a cross-sectional elevation of the module 200 when the lifter shaft 222 is in the preheat rotational range during the preheat mode of operation. As shown in these figures, a hot water supply port 261, a water delivery port 262, and a return port 263 are formed in the peripheral wall of the lower casing 260 and extend between the interior and the exterior of the lower casing 260. The hot water supply port 261 is connected by an unillustrated passageway to a source of hot water, such as a hot water heater. The water delivery port 262 is connected by an unillustrated passageway to the hot water supply port 203 of the valve casing 202. The return port 263 is connected by an unillustrated return passageway to the source of hot water. The lower casing 260 is schematically illustrated as a one-piece member, but it may comprise a plurality of sections which are separately formed and then secured to each other either detachably or permanently in a liquid-tight manner.

The preheat core 270 is also a hollow cylindrical member which is closed at both ends. A first port 271, a second port 272, and a third port 273 are formed in the peripheral wall of the preheat core 270 and extend between the interior and exterior of the preheat core 270. The preheat core 270 can translate inside the lower casing 260 in the longitudinal direction of the lower casing 260 between a lowered or normal position shown in FIG. 46 which it assumes during the normal mode of operation and a raised or preheat position shown in FIG. 54 which it assumes during the preheat mode of operation. As is the case with respect to the lower casing 260, the preheat core 270 is schematically illustrated as being a one-piece member, but it may comprise a plurality of sections (such as two half shells) which are separately formed and then secured to each other either detachably or permanently in a liquid-tight manner.

When the preheat core 270 is in a lowered (normal) position as shown in FIG. 46, for example, the first port 271 fluidly communicates with the hot water supply port 261 of the lower casing 260, the second port 272 fluidly communicates with the water delivery port 262 of the lower casing 260, and the third port 273 is blocked by the inner surface of the lower casing 260.

When the preheat core 270 is in a raised (preheat) position as shown in FIG. 54, for example, the first port 271 is blocked by the inner surface of the lower casing 260, the second port 272 fluidly communicates with the hot water supply port 261 of the lower casing 260, and the third port 273 fluidly communicates with the return port 263 of the lower casing 260.

Accordingly, when the preheat core 270 is in a lowered (normal) position, hot water from the source of hot water enters the preheat assembly 240 through the hot water supply port 261 and the first port 271 of the preheat core 270, it flows through the interior of the preheat core 270, and then it is supplied to the hot water supply port 203 of the mixing valve assembly 201 through the second port 272 of the preheat core 270 and the water delivery port 262 of the lower casing 260. When the preheat core 270 is in a raised (preheat) position, hot water from the source of hot water enters the preheat assembly 240 through the hot water supply port 261 of the lower casing 260 and the second port 272 of the preheat core 270, it flows through the interior of the preheat core 270, and then it is diverted to the return passageway through the third port 273 of the preheat core 270 and the return port 263 of the lower casing 260.

Figure 37:
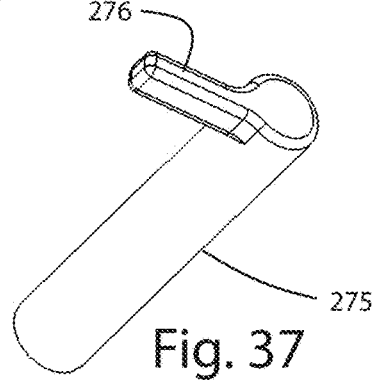
FIG. 37 is an axonometric view of the preheat shaft of the embodiment of FIG. 28.

The flow switching module 200 includes a latching mechanism for detachably connecting the lifter assembly 220 to the preheat core 270 to enable the lifter assembly 220 to raise and lower the preheat core 270 when the lifter shaft 222 is in the preheat rotational range. In the present embodiment, the latching mechanism includes the L-shaped bracket 225 secured to the bottom of the base 221 of the lifter assembly 220 and a shaft 275 (referred to here as a preheat shaft) which is secured to and extends upwards from the upper end of the preheat core 270 and which passes through an opening formed in the upper end of the lower casing 260. The preheat shaft 275 is capable of translating in its axial direction with respect to the opening. FIG. 37 is an axonometric view of the preheat shaft 275. An arm 276 extends radially from the upper end of the preheat shaft 275. The preheat shaft 275 is positioned such that the arm 276 extends into the path of movement of the L-shaped bracket 225 on the bottom surface of the base 221 of the lifter assembly 220 as the base 221 rotates about the longitudinal axis of the lifter assembly 220. The bracket 225 is not engaged with the arm 276 when the lifter shaft 222 is in its normal rotational range, so in the normal rotational range of the lifter shaft 222, raising and lowering the lifter shaft 222 does not produce any translation of the preheat core 270. On the other hand, when the lifter shaft 222 is rotated to its preheat rotational range, the bracket 225 slides over the arm 276 of the preheat shaft 275 and engages it. If the lifter shaft 222 is raised or lowered when the bracket 225 is engaged with the arm 276 of the preheat shaft 275, the preheat core 270 is raised or lowered along with the preheat shaft 275. When the lifter shaft 222 is rotated from its preheat rotational range back to its normal rotational range, the bracket 225 disengages from the arm 276 of the preheat shaft 275. In the present embodiment, the bracket 225 is capable of engaging the arm 276 of the preheat shaft 275 only when the base 221 of the lifter assembly 220 is seated on the second ledge 247 of the upper casing 241, but a latching mechanism which can engage the lifter assembly 220 with the preheat shaft 275 when the lifter shaft 222 is at a variety of heights may also be employed.

In order to prevent the ports 271-273 of the preheat core 270 from becoming offset in the circumferential direction with respect to the ports 261-263 of the lower casing 260 as the preheat core 270 moves between a raised and lowered position, the preheat core 270 may be guided along a path as it translates within the lower casing 260. As shown in FIG. 50, which is a cross-sectional elevation of the module 200, in the present embodiment, a linear groove 265 which extends in the longitudinal direction of the lower casing 260 is formed in the inner periphery of the lower casing 260, and a tab 274 which projects into and slidably engages with the groove 265 is formed on the exterior of the preheat core 270. The groove 265 guides the preheat core 270 along a linear path and prevents it from rotating with respect to the lower casing 260 as it translates between lowered and raised positions. Alternatively, a groove could be formed in the outer periphery of the preheat core 270, and a spline which slidably engages with the groove in the preheat core 270 could be formed on the inner surface of the lower casing 260. As another alternative, the lower casing 260 and the preheat core 270 could have transverse cross-sectional shapes, such as oval or polygonal shapes, which prevent the preheat core 270 from rotating with respect to the lower casing 260.

Figure 40:
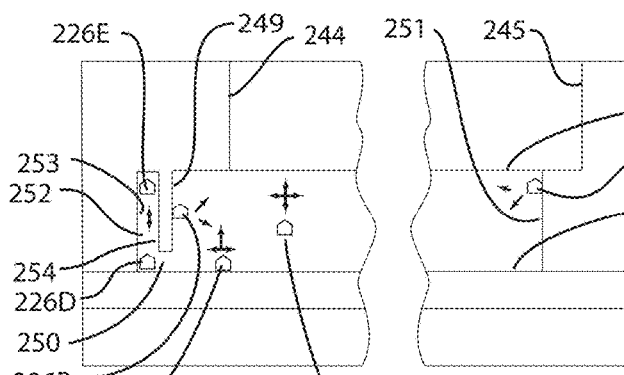
FIG. 40 is a schematic elevation of the interior of a portion of the upper casing of FIG. 38.

FIG. 40 is a schematic elevation of a portion of the interior of the upper casing 241 of the preheat assembly 240 illustrating how the tab 226 on the lifter assembly 220 interacts with the upper casing 241. The small pentagons marked 226A-226F illustrate the location of the tab 226 of the lifter assembly 220 when the lifter shaft 222 is at various rotational positions. 226A indicates the position of the tab 226 when the lifter shaft 222 is in its on range in the longitudinal direction and is in its normal rotational range at some point between the full cold position and the full hot position. 226B indicates the position of the tab 226 when the lifter shaft 222 is in its on normal rotational range and has been rotated to the full hot position in which the tab 226 contacts the third wall 249 of the upper casing 241. 226C indicates the position of the tab 226 when the lifter shaft 222 has been rotated to a position between the full hot position and the full cold position and the lifter shaft 222 is in its off range in the longitudinal direction with the tab 226 contacting the top surface of the second ledge 247 of the upper casing 241. 226D indicates the position of the tab 226 when the lifter shaft 222 has been rotated from the position shown by 226C to the preheat rotational range and is in a lowered position. 226E indicates the position of the tab 226 when the lifter shaft 222 is in the preheat rotational range and has been raised from a lowered position to a raised position. When the tab 226 is in the position shown by 226D, the lifter shaft 222 will rotate back to the normal rotational range under the above-described clockwise torque applied to the lifter shaft 222 by the torsion spring 235 unless the user holds the lifter shaft 222 in the preheat rotational range. On the other hand, when the tab 226 is in the position shown by 226E, the sixth wall 254 forming a side wall of the slot 252 limits movement of the tab 226 to the right in the figure and therefore prevents the lifter shaft 222 from rotating from the preheat rotational range back to the normal rotational range. 226F indicates an example of the position of the tab 226 when the lifter shaft 222 has been rotated to the full cold position and the lifter shaft 222 is in its on range in the longitudinal direction.

The heights of the tab 226 above the surface of the second ledge 247 indicated by 226A, 226B, and 226F are merely examples of possible positions of the tab 226, and the heights of the tab 226 may be different from those shown in FIG. 40. The tab 226 is shown contacting the top surface of the second ledge 247 at the positions shown by 226C and 226D. However, depending upon the size of the gap 250 at the lower end of the third wall 249, the tab 226 need not contact the top surface of the second ledge 247 when passing through the gap 250.

Figure 41:
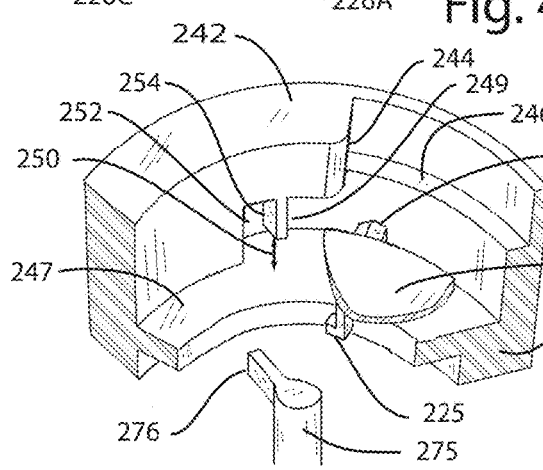
FIG. 41 is a cutaway axonometric view of the upper casing of FIG. 38 showing how the base of the lifter assembly interfits with the upper casing and the lifter shaft.

FIG. 41 is a cutaway axonometric view of the upper casing 241 of the preheat assembly 240, illustrating how the base 221 of the lifter assembly 220 is disposed inside the upper casing 241 and how the lifter shaft 275 extends from below into the upper casing 241 where it can engage with the bracket 225 on the bottom of the base 221.

The flow switching module 200 will remain in the preheat mode of operation as long as the preheat core 270 is in a raised (preheat) position. The preheat core 270 may be moved between a lowered (normal) position and a raised (preheat) position entirely manually, with a user raising the lifter shaft 222 when he wishes to initiate the preheat mode and lowering the lifter shaft 222 by hand when he wishes to terminate the preheat mode. However, the flow switching module 200 preferably includes a mechanism for maintaining the flow switching module 200 in the preheat mode until a predetermined set-point water temperature has been reached inside the preheat core 270 and then automatically lowering the preheat core 270 to a lowered (normal) position to terminate the preheat mode. For this purpose, the present embodiment includes a thermal detent mechanism 280 which can hold the preheat core 270 in a raised (preheat) position until a set-point water temperature has been reached and a biasing member which can move the preheat core 270 from a raised (preheat) position to a lowered (normal) position when the detent mechanism is no longer holding the preheat core 270 in the raised position.

A biasing member for the preheat core 270 is not restricted to any particular type. In the present embodiment, the biasing member comprises a compression spring 277 which is disposed around the preheat shaft 275 between the upper exterior surface of the preheat core 270 and the upper interior surface of the lower casing 260 and which exerts a downwards force on the top surface of the preheat core 270 to urge the preheat core 270 towards a lowered (normal) position.

The thermal detent mechanism 280 is also not limited to any particular type, and any of the thermal detent mechanisms described with respect to the previous embodiment can be employed, such as the above-described thermal detent mechanism 160 employing a leaf spring made of a bimetallic strip as an actuator. In the present embodiment, the thermal detent mechanism 280 is one which employs a bellows as an actuator. FIGS. 48 and 50 are longitudinal cross-sectional views of the flow switching module 200 showing a thermal detent mechanism 280 installed on the preheat core 270, and FIGS. 56 and 57 are enlarged longitudinal cross-sectional views of the thermal detent mechanism 280 in the states shown in FIGS. 48 and 50, respectively. In FIG. 50, the preheat core 270 is shown in a lowered (normal) position, and in FIG. 48, the preheat core 270 is shown in a raised (preheat) position with the thermal detent mechanism 280 holding the preheat core 270 in that position. The thermal detent mechanism 280 is also illustrated in FIGS. 52, 53, and 55. FIG. 52 is a cutaway elevation of the thermal detent mechanism 280, FIG. 53 is a transverse cross-sectional view of the module 200 taken along line 53-53 of FIG. 48, and FIG. 55 is a longitudinal cross-sectional view of the thermal detent mechanism 280. As shown in these figures, the thermal detent mechanism 280 comprises a bellows disposed inside the preheat core 270. The bellows has a generally cylindrical corrugated wall 281 having first and second ends. The first end of the wall 281 of the bellows is connected in a liquid-tight manner to a flat, circular first end plate 282, and the second end of the wall 281 of the bellows is connected in a liquid-tight manner to a flat, circular second end plate 283 which is secured to the peripheral wall of the preheat core 270. The second end plate 283 can be secured to the wall of the preheat core 270 in any suitable manner which prevents leakage of fluid along the outer periphery of the second end plate 283. An elongated detent member in the form of a pin 287 is secured to the first end plate 282 and extends perpendicular to the first end plate 282 towards the second end plate 283. The pin 287 slidably passes through a hole 285 formed in the second end plate 283 and through a through hole 278 formed in the wall of the preheat core 270. A liquid-tight seal is preferably formed between the pin 287 and the second end plate 283, such as by a lip seal or a diaphragm extending between the pin 287 and the second end plate 283. The bellows contains a conventional wax 286 or other temperature-sensitive material having a melting temperature at approximately the set-point temperature of the flow switching module 200. The wax 286 has been omitted from FIG. 52 in order to better illustrate the internal structure of the bellows but is shown in FIGS. 55-57. An optional smooth flexible liner may be disposed along the inner periphery of the corrugations in the wall 281 of the bellows to prevent the wax 286 from filling the corrugations. The volume of wax 286 contained inside the bellows and the softness of the wax 286 are selected so that when the temperature inside the preheat core 270 is below the melting point of the wax 286, the corrugated wall 281 of the bellows is able to act like a spring and apply an axial force on the pin 287 through the first end plate 282 which urges the outer end of the pin 287 (the end remote from the first end plate 282) into contact with the inner peripheral wall of the lower casing 260.

As shown in FIGS. 56 and 57, a recess 266 for receiving the outer end of the pin 287 is formed in the inner surface of the lower casing 260 of the preheat assembly 240. The recess 266 is located such that when the preheat core 270 is in a raised (preheat) position and the water temperature inside the preheat core 270 is below the set-point temperature, the spring force exerted by the corrugated wall 281 of the bellows will apply a force to the first end plate 282 urging it towards the second end plate 283, and the first end plate 282 will apply an axial force on the pin 287 to insert the outer end of the pin 287 into the recess 266 and maintain the preheat core 270 in a raised (preheat) position.

When the water temperature in the preheat core 270 reaches the set-point temperature, the wax 286 inside the bellows melts and expands. As the wax 286 expands, it presses the first end plate 282 away from the first end plate 283, the corrugated wall 281 of the bellows elongates in the axial direction of the bellows, and the outer end of the pin 287 is pulled inwards relative to the position shown in FIG. 56 to disengage the pin 287 from the recess 266 and allow the preheat core 270 to return to a lowered (normal) position under the downwards force exerted by the compression spring 277. Due to the engagement between the lifter shaft 222 and the preheat core 270 when the lifter shaft 222 is in its preheat rotational range, the lifter shaft 222 is pulled downwards from a raised position to a lowered position when the preheat core 270 is pushed downwards to a lowered (normal) position by the compression spring 277. The downwards movement of the lifter shaft 222 to a lowered position at this time can serve as a visual indication to the user that the preheat mode has been completed.

The shapes of the recess 266 and the outer end of the pin 287 are not restricted as long as the detent mechanism can maintain the preheat core 270 in the raised position when the water temperature inside the preheat core 270 is below the set-point temperature. However, the recess 266 and the outer end of the pin 287 are preferably shaped such that a user can disengage the pin 287 from the recess 266 and terminate the preheat mode when desired by exerting a downwards axial force on the lifter shaft 222. Specifically, the shape of the outer end of the pin 287 is preferably selected such that if the outer end of the pin 287 is pressed downwards into contact with the lower edge of the recess 266, the reaction force applied to the outer end of the pin 287 by the recess 266 has a component acting in the axial direction of the pin 287 and tending to push the outer end of the pin 287 out of the recess 266. As an example, the outer end of the pin 287 may have a hemispherical shape similar to the shape of the ball of a ball plunger. When the downwards force applied to the preheat core 270 by the lifter shaft 222 reaches a prescribed level, the outer end of the pin 287 will slip out of the recess 266 and allow the preheat core 270 to move downwards to a lowered (normal) position. The downwards force at which the outer end of the pin 287 disengages from the recess 266 is selected to be larger than the downwards force which is applied to the preheat core 270 by the compression spring 277 when the preheat core 270 is in a raised (preheat) position but small enough that it can easily be applied to the lifter shaft 222 by a user of the module 200. Formulas for calculating the force to dislodge a spring-loaded detent ball from a recess are well known in the art, and similar formulas can be employed to determine the downwards force applied to the lifter shaft 222 necessary to disengage the outer end of the pin 287 from the recess 266 in accordance with the shape of the recess 266 and the outer end of the pin 287.

FIGS. 58 and 59 are cross-sectional elevations of another example of a thermal detent mechanism 290 which can be used in a flow switching module according to the present invention. This example employs a thermal actuator made of a shape memory alloy for releasably maintaining the preheat core 270 in a preheat position when the water temperature inside the preheat core 270 is below the predetermined set-point water temperature. The illustrated thermal detent mechanism 290 includes a housing 291 having a first end secured to the peripheral wall of the preheat core 270 and a second end spaced from the first end. The first end opposes a through hole 278 formed in the wall of the preheat core 270. The housing 291 contains a detent member such as a small ball 292 and a thermal actuator in the form of a spring 293, such as a helical compression spring, disposed between the ball 292 and the second end of the housing 291. Spring 293 is made of a shape memory alloy such as Nitinol (a Ni—Ti based alloy). Spring 293 has a contracted shape and an elongated shape in which spring 293 is elongated with respect to the contracted shape. The shape memory alloy has a predetermined transition temperature, which is selected such that spring 293 transitions from the contracted shape to the elongated shape at the desired set-point temperature of the module 200. The interior of the housing 291 may be sealed against water within the preheat core 270, or it may fluidly communicate with the interior of the preheat core 270. In either case, the structure of the housing 291 is such that spring 293 is exposed to the temperature of the water within the preheat core 270, either directly or through the walls of the housing 291. A flexible diaphragm 294 may be installed across the through hole 278 in the wall of the preheat core 270 to prevent leakage of fluid and to retain the ball 292 inside the housing 291. When spring 293 is in its elongated shape and the preheat core 270 is in its preheat position, spring 293 pushes the ball 292 radially outwards into engagement with the recess 266 in the lower casing 260 of the preheat assembly 240 to hold the preheat core 270 in the preheat position against the downwards force exerted on the preheat core 270 by compression spring 277. When spring 293 is in its contracted shape, the radially outward force, if any, exerted on the ball 292 by spring 293 is insufficient to hold the preheat core 270 in the preheat position against the force exerted by compression spring 277. In the same manner as with the bellows of thermal detent mechanism 280, the shape of the ball 292 of the thermal detent mechanism 290 and the shape of the recess 266 in the lower casing 260 are selected such that a user can disengage the ball 292 from the recess 266 by applying a moderate downwards force on the preheat core 270 when the user wishes to terminate the preheat mode of operation.

The thermal detent mechanism 290 shown in FIGS. 58 and 59 is not restricted to use in the present embodiment and may be employed in any embodiments of a flow switching module according to the present invention equipped with a thermal detent mechanism.

The normal mode and the preheat mode of operation of this embodiment will be briefly described while referring to the drawings.

In the normal mode, the lifter shaft 222 is in its normal rotational range in which the lifter assembly 220 is engaged with the valve cartridge 210 by the lever 230 of the lifter assembly 220. Therefore, in the normal mode, the module 200 can be operated by a user in essentially the same was as a conventional mixing valve. The user can vary the flow rate from the mixing valve assembly 201 by translating the lifter shaft 222 with respect to the valve casing 202 in the longitudinal direction of the lifter shaft 222 and can vary the temperature of water which is discharged from the mixing valve assembly 201 by rotating the lifter shaft 222 about its longitudinal axis within the normal rotational range. The cross-sectional elevations of the module 200 in FIGS. 46 and 47 show the lifter shaft 222 in its normal rotational range.

FIG. 46 shows the lifter shaft 222 at a position within its off range in the longitudinal direction in the longitudinal direction, and FIG. 47 shows the lifter shaft 222 raised to a position within its on range in the longitudinal direction. When the lifter shaft 222 is raised from the off range in the longitudinal direction shown in FIG. 46 to the on range in the longitudinal direction shown in FIG. 47, the cartridge 210 translates along with the lifter shaft 222, and the mixing valve assembly 201 is switched between the off state and the on state. During the normal mode of operation, the bracket 225 of the lifter assembly 220 is not engaged with the preheat shaft 275, so the preheat core 270 remains stationary in a lowered (normal) position as the preheat shaft 275 translates in its longitudinal direction.

In order to initiate the preheat mode, the user of the module 200 rotates the lifter shaft 222 from its normal rotational range to its preheat rotational range and then raises the lifter shaft 222 from a lowered position to a raised position. The cross-sectional elevations of the module 200 in FIGS. 49 and 50 show the lifter shaft 222 in the preheat rotational range and a lowered position, and the longitudinal cross-sectional view of the module 200 in FIGS. 48 and 54 show the lifter shaft 222 in the preheat rotational range and in a raised position. When the lifter shaft 222 is in the preheat rotational range, the lever 230 of the lifter assembly 220 is disengaged from the mixing valve assembly 201, while the bracket 225 on the bottom of the base 221 of the lifter assembly 220 is engaged with the arm 276 of the preheat shaft 275. Therefore, as shown in FIGS. 48 and 54, the valve cartridge 210 remains stationary in a position in which the mixing valve assembly 201 is in an off state when the lifter shaft 222 is moved to its raised position. At the same time, the preheat core 270 is pulled upwards by the lifter shaft 222 to a raised (preheat) position when the lifter shaft 222 is raised to its raised position. If the water temperature in the preheat core 270 is below the set-point temperature when the lifter shaft 222 is raised to its raised position shown in FIGS. 48 and 54, the thermal detent mechanism 280 will engage with the lower casing 260 of the preheat assembly 240 and hold the preheat core 270 in the raised position against the biasing force exerted by compression spring 277. In this state, the module 200 will operate in its preheat mode in which water supplied to the hot water supply port 261 of the preheat assembly 240 is diverted to the return passageway instead of being supplied to the mixing valve assembly 201.

The preheat mode will continue in the state shown in FIGS. 48 and 54 until either the water temperature inside the preheat core 270 reaches the set-point temperature and the thermal detent mechanism 280 releases the engagement between the preheat core 270 and the lower casing 260, or the user manually terminates the preheat mode by pressing down on the lifter shaft 222 to disengage the thermal detent mechanism 280 from the lower casing 260. The lifter shaft 222 and the preheat core 270 will then return to the lowered positions shown in FIGS. 49 and 50, and the torque generated by the torsion spring 235 of the lifter assembly 220 will automatically rotate the lifter shaft 222 back to its normal rotational range, and the module 200 can again be operated in the normal mode. Throughout the time when the lifter shaft 222 is in its preheat rotational position, the mixing valve assembly 201 is in the off state. As a result, there is no discharge of water from the mixing valve assembly 201 when the module 200 returns from the preheat mode to the normal mode unless the operator raises the lifter shaft 222 to its on range in the longitudinal direction and switches the mixing valve assembly 201 to its on state.

If a user raises the lifter shaft 222 from the lowered position shown in FIGS. 49 and 50 to the raised position shown in FIGS. 48 and 54 when the water temperature in the preheat core 270 has already reached the set-point temperature, the pin 287 of the thermal detent mechanism 280 will not engage with the recess 266 in the lower casing 260, so if the user releases his hand from the lifter shaft 222, the preheat core 270 and the lifter shaft 222 will return to the lowered positions shown in FIGS. 49 and 50, and the lifter shaft 222 will then automatically rotate from the preheat rotational range back to the normal rotational range. If the user wishes to continue the preheat mode even when the water temperature in the preheat core 270 has reached the set-point temperature, the user can apply an upwards force on the lifter shaft 222 by hand to hold the preheat core 270 in a raised (preheat) position.

In the present embodiment, the lifter shaft 222 is automatically rotated from the preheat rotational range back to the normal rotational range when the preheat core 270 has returned from a raised (preheat) position to a lowered (normal) position either at the completion of preheating or when preheating is manually terminated by the user due to the clockwise torque applied to the lifter shaft 222 as a result of biasing force exerted on the lever 230 by the torsion spring 235. Alternatively, the torsion spring 235 of the lifter assembly 220 could be one having a spring constant such that any clockwise torque which is applied to the lifter shaft 222 as a result of the torsion spring 235 is insufficient to rotate the lifter shaft 222 from its preheat rotational range to its normal rotational range. In this case, the lifter shaft 222 can remain in the preheat rotational range until the user manually rotates the lifter shaft 222 back to the normal rotational range. Alternatively, a mechanism other than one relying on the torsion spring 235 of the lifter assembly 220 can be used to automatically rotate the lifter shaft 222 back to the normal rotational range. For example, a torsion spring similar to the torsion spring in the preceding embodiment can be mounted on the upper casing 241 of the preheat assembly 240 so as to engage some portion of the lifter assembly 220, such as the base 221, when the lifter shaft 222 is rotated from the normal rotational range to the preheat rotational range, and the deformation of the torsion spring 235 at this time can apply a torque to the lifter assembly 220 in a direction tending to rotate the lifter shaft 222 back to the normal rotational range.

It will be appreciated that latching mechanisms which are different from those described above can be used to detachably connect the lifter assembly 220 to the valve cartridge 210 of the mixing valve assembly 201 or the preheat core 270 of the preheat assembly 240. For example, a push button or lever 230 which is operated by the user could be employed to switch the flow switching module 200 between the normal mode and the preheat mode of operation. Similarly, a different action by the user, such as further depressing the lifter shaft 222 below its off range in the longitudinal direction could be used to switch the flow switching module 200 to the preheat mode without the need for uncoupling the lifter assembly 220 from the mixing valve assembly 201 or by pushing and then twisting the lifter shaft 222.

In the same manner as in the previous embodiment, in the normal mode of operation, a user can operate the flow switching module 200 in substantially the same manner as a conventional mixing valve for a faucet or other plumbing fixture by rotating and translating the valve cartridge 210 of the mixing valve assembly 201, and when the user desires to switch to the preheating mode of operation, the user can simply rotate the lifter shaft 222 past the full hot position to the preheat rotational range and then raise the lifter shaft 222 to its raised position. Thus, like the previous embodiment, this embodiment is easy and intuitive for a user to operate.

FIGS. 60-82 illustrate another embodiment of a flow switching module 300 according to the present invention. Like the preceding embodiments, this embodiment is capable of being integrated into the structure of a hot water plumbing fixture and being used as the main flow control device for the plumbing fixture, although it is also capable of being used as an auxiliary flow control device for a plumbing fixture having a control valve which is separate from the flow switching module 300. The module 300 can be employed in a hot water recirculation system according to the present invention, such as the system schematically illustrated in FIG. 1.

Like the previous embodiments, this embodiment has a normal mode of operation and a preheat mode of operation. In the normal mode of operation, the flow switching module 300 functions in essentially the same manner as a conventional single-handle faucet to perform mixing and flow rate control of water supplied to a plumbing fixture. In the preheat mode of operation, instead of directing hot water to a plumbing fixture, the flow switching module 300 diverts water coming from a hot water supply passage to an unillustrated return passage until water flowing into the module 300 from a hot water supply passage reaches a predetermined set-point temperature.

As shown in FIG. 60, which is an axonometric elevation of this embodiment, this embodiment of a flow switching module 300 includes a mixing valve assembly 301, a preheat assembly 340, and a selector assembly 380. During the normal mode of operation, the mixing valve assembly 301 functions in the same manner as a conventional mixing valve to adjust the temperature and the flow rate of water supplied to the discharge opening of an unillustrated plumbing fixture. The preheat assembly 340 is essentially a valve which directs hot water from a source of hot water either to the mixing valve assembly 301 or back to the source of hot water. During the normal mode of operation, hot water passes through the preheat assembly 340 before being supplied to the mixing valve assembly 301, while during the preheat mode of operation, the preheat assembly 340 diverts hot water to a return passage instead of allowing the hot water to be supplied to the plumbing fixture. The selector assembly 380 enables a user of the flow switching module 300 to control the operation of the mixing valve assembly 301 and the preheat assembly 340 and to switch the flow switching module 300 between the normal mode and the preheat mode of operation.

Although the flow switching module 300 is illustrated in FIG. 60 as being vertically disposed, it may have any desired orientation with respect to the vertical, as is the case with respect to the preceding embodiments.

The mixing valve assembly 301 can have any structure which enables it to perform mixing of hot and cold water and to adjust the flow rate of the mixed water. For example, it may have a structure similar to any of a wide variety of conventional mixing valves commonly used in single-handle mixing valves for faucets, showers, or other type of plumbing fixture.

The mixing valve assembly 301 in this embodiment is similar in structure to the mixing valve assemblies in the previous embodiments. The structure of the mixing valve assembly 301 is best shown in FIGS. 61 and 68. FIG. 61 is an exploded axonometric view of the entire flow switching module 300, and FIG. 68 is a cross-sectional elevation of the entire module 300 incorporating the mixing valve assembly 301 shown in FIG. 61 and showing the module 300 during the normal mode of operation. As shown in these figures, the mixing valve assembly 301 includes a valve cartridge 320 which is movably disposed inside a valve casing 311 so as to be able to translate with respect to the valve casing 311 in the longitudinal direction of the valve casing 311 and rotate inside the valve casing 311 around the longitudinal axis of the valve casing 311. Like the valve cartridge in the previous embodiment, the valve cartridge 320 in this embodiment includes a tubular mixing core 321 which is open at its upper end and partially closed off at its lower end. The upper end of the mixing core 321 is secured to an elongated shaft 330 (referred to below as a mixing shaft) by a plurality of spokes 323 which extend radially between the mixing shaft 330 and the wall of the mixing core 321 so that water can flow between the spokes 323 through the upper end of the mixing core 321. The mixing core 321 also includes an inlet 322 formed through the wall of the mixing core 321 between its inner and outer surfaces and an outlet 324 defined by the spaces between the spokes 323 at the open upper end of the mixing core 321.

As in the previous embodiment, the valve casing 311 is a hollow cylindrical member having a hot water supply port 312, a cold water supply port 313, and one or more water delivery ports 314 formed through the wall of the valve casing 311 between its inner and outer surfaces. The upper and lower ends of the valve casing 311 are partially closed off but each end includes a hole through which a shaft 370 (referred to below as a preheat shaft and described in detail below) can pass.

As in the previous embodiments, a disk-shaped baffle 331 is secured to the mixing shaft 330 above the mixing core 321 inside the valve casing 311 to control the flow rate of water discharged from the interior of the valve casing 311 through the one or more water delivery ports.

The mixing core 321 may be in sliding contact with the inner surface of the valve casing 311, as in the previous embodiments. Alternatively, as shown in FIG. 61 and as is common in conventional mixing valves, a protective sleeve 325 may disposed around the mixing core 321 between the outer surface of the mixing core 321 and the inner surface of the valve casing 311. The illustrated sleeve 325 has a hot water supply port 326, a cold water supply port 327, and one or more water delivery ports 328 overlapping with the hot water supply port 312, the cold water supply port 313, and the water delivery ports 314, respectively, of the valve casing 311. The sleeve 325 is typically detachably mounted inside the valve casing 311 so as to remain stationary with respect to the valve casing 311 during operation of the mixing valve assembly 301 but so that it can be removed from the valve casing 311 together with the valve cartridge 320 when it is necessary to replace the valve cartridge 320. The sleeve 325 protects the inner surface of the valve casing 311 against abrasion which might be caused by movement of the mixing core 321 within the valve casing 311.

Like a typical mixing cartridge, the valve cartridge 320 can be translated with respect to the valve casing 311 in the longitudinal direction of the valve casing 311 to control the flow rate of water through the water delivery ports 314 of the valve casing 311. The valve cartridge 320 has at least one lowered or off position in the longitudinal direction of the valve casing 311 in which water is prevented from being discharged from the water delivery ports 314 of the valve casing 311 and at least one raised or on position in the longitudinal direction in which water can be discharged from the water delivery ports 314, with the rate of discharge varying with the position of the valve cartridge 320 in the longitudinal direction. FIG. 68 illustrates the valve cartridge 320 in a raised position.

In addition, like a typical mixing cartridge, the valve cartridge 320 can be rotated within the valve cartridge 320 about its longitudinal axis to adjust the ratio of cold water and hot water which are mixed inside the mixing care. The valve cartridge 320 includes a full cold rotational range water can enter the valve cartridge 320 from the cold water supply port 313 of the valve casing 311 but not from the hot water supply port 312, a full hot rotational range in which water can enter the valve cartridge 320 from the hot water supply port 312 of the valve casing 311 but not from the cold water supply port 313, and an intermediate rotational range in which water can enter the valve cartridge 320 from both the hot water supply port 312 and the cold water supply port 313 and be mixed in a ratio determined by the rotational position of the valve cartridge 320 with respect to the valve casing 311.

The mixing shaft 330 is a rigid elongated member having a lower end which extends into the valve casing 311 through the hole in the upper end of the valve casing 311 and an upper end which is disposed inside the selector assembly 380. It comprises a cylindrical tube 332 which is secured to the upper end of the mixing core 321 by the spokes 323 of the mixing core 321. It further includes a bifurcated portion 333 which is secured to the upper end of the tube 332. The bifurcated portion 333 comprises two elongated fingers 334 which are diametrically opposed to each other with respect to the longitudinal axis of the tube 332 and which extend parallel to the longitudinal axis away from the mixing core 321. A generally fan-shaped externally splined region 335 is formed at the upper end of each finger 334.

The preheat assembly 340 is similar in structure to the preheat assembly of the previous embodiment. It includes a hollow preheat casing 341 and a hollow preheat core 350 which is movably disposed inside the preheat casing 341 for reciprocation with respect to the preheat casing 341 in the longitudinal direction of the preheat casing 341.

Like the lower casing and the preheat core of the previous embodiment, the preheat casing 341 and the preheat core 350 in this embodiment can have any cross-sectional shapes which enable the preheat core 350 to reciprocate within the preheat casing 341 in the longitudinal direction of the preheat casing 341. For example, in the present embodiment, both the preheat casing 341 and the preheat core 350 have a cylindrical peripheral wall.

In FIG. 68, the preheat casing 341 is shown as being integrally formed with the valve casing 311, with the two casings being formed from two half shells which are joined to each other in a liquid-tight manner around the valve cartridge 320, the valve sleeve 325, and the preheat core 350. However, the two casings may formed separately from each other, and they may be spaced from each other in the longitudinal direction with suitable unillustrated sealing members being provided to prevent liquid from leaking out of the lower end of the valve casing 311 or the upper end of the preheat casing 341 to the exterior of the module 300.

The valve casing 311 and the preheat casing 341 are supported by unillustrated structure so as to remain stationary during the operation of the module 300.

Figure 72:
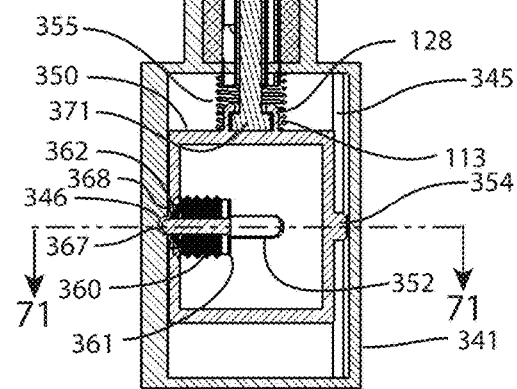
FIG. 72 is another cross-sectional elevation of the embodiment of FIG. 60 when the preheat core is in a raised (preheat) position as viewed from another angle.

As shown in FIG. 72, which is a cross-sectional elevation of the entire module 300 during the preheat mode of operation, the preheat casing 341 includes a hot water supply port 342, a water delivery port, and a return port which are formed through the peripheral wall of the preheat casing 341 between its inner and outer surfaces. The hot water supply port 342 is fluidly connected by an unillustrated hot water supply passage to a source of hot water such as a hot water heater. The water delivery port is connected by an unillustrated passage to the hot water supply port 342 of the preheat casing 341 of the mixing valve assembly 301. The return port is connected to an unillustrated return passage which returns water to the hot water heater when the flow switching module 300 is in the preheat mode of operation.

Like the preheat core of the previous embodiment, the preheat core in this embodiment includes a first port 351, a second port 352, and a third port 353 each extending through the wall of the preheat casing 341 between its inner and outer surfaces as shown in FIG. 72. For ease of manufacture and assembly, the preheat core 350 is frequently formed of multiple components which are secured together either detachably or permanently in a liquid-tight manner. For example, as shown in FIG. 61, it may be formed from two half shells which are joined to each other in a liquid-tight manner in the same manner as the valve casing 311 and the preheat casing 341.

The preheat core 350 has at least one lowered or normal position and at least one raised or preheat position in the longitudinal direction of the preheat casing 341. The preheat core 350 is in a lowered (normal) position during the normal mode of operation and is in a raised (preheat) mode during the preheat mode of operation. When the preheat core 350 is in a lowered (normal) position, the first port 351 of the preheat core 350 fluidly communicates with the hot water supply port 342 of the preheat casing 341, the second port 352 of the preheat core 350 fluidly communicates with the water delivery port of the preheat casing 341, and the third port 353 of the preheat core 350 is blocked by the inner surface of the preheat casing 341.

When the preheat core 350 is in a raised (preheat) position, the first port 351 of the preheat core 350 is blocked by the inner surface of the preheat casing 341, the second port 352 of the preheat core 350 fluidly communicates with the return port of the preheat casing 341, and the third port 353 of the preheat core 350 fluidly communicates with the hot water supply port 342 of the preheat casing 341. FIG. 72 illustrates an example of the preheat core 350 as it appears in a raised (preheat) position. An example of a lowered (normal) position of the preheat core 350 is a position in which the lower outer surface of the preheat core 350 is in contact with the bottom inner surface of the preheat casing 341. FIG. 68 shows the preheat core 350 in a lowered position, and FIG. 72 shows the preheat core 350 in a raised position.

Accordingly, during the normal mode of operation in which the preheat core 350 is in a lowered (normal) position, hot water from the source of hot water enters the preheat assembly 340 through the hot water supply port 342 and the first port 351 of the preheat core 350, flows through the interior of the preheat core 350, and then is supplied to the hot water supply port 312 of the mixing valve assembly 301 through the second port 352 of the preheat core 350 and the water delivery port of the preheat casing 341. During the preheat mode of operation in which the preheat core 350 is in a raised (preheat) position, hot water from the source of hot water enters the preheat assembly 340 through the hot water supply port 342 and the second port 352 of the preheat core 350, flows through the interior of the preheat core 350, and then is diverted to the return passage through the third port 353 of the preheat core 350 and the return port of the preheat casing 341.

As in the previous embodiment, the preheat assembly 340 may include a biasing member for biasing the preheat core 350 towards a lowered (normal) position. In the present embodiment, the biasing member comprises a biasing spring, such as a compression spring 355 disposed between the upper exterior surface of the preheat core 350 and the upper interior surface of the preheat casing 341. In the absence of a force holding the preheat core 350 in a raised (preheat) position, the compression spring 355 in the present embodiment presses the preheat core 350 downwards within the preheat casing 341 until the lower end of the preheating core contacts the lower inner surface of the preheat casing 341. However, the compression spring 355 may be sized to move the preheat core 350 downwards by a shorter distance as long as the preheat core 350 can be moved by the compression spring 355 to a lowered (normal) position.

Figure 71:
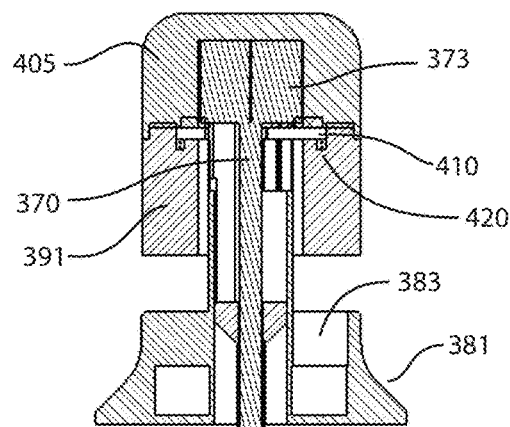
FIG. 71 is a cross-sectional elevation of the embodiment of FIG. 60 when the preheat core is in a raised (preheat) position.

As in the previous embodiment, the preheat assembly 340 may include structure for guiding the preheat core 350 as the preheat core 350 reciprocates within the preheat casing 341 between a raised (preheat) position and a lowered (normal) position so as to prevent misalignment between the ports of the preheat core 350 and the corresponding ports of the preheat casing 341. For example, in the same manner as in the preceding embodiment and as shown in FIG. 71, an elongated linear groove 345 which extends in the longitudinal direction of the preheat casing 341 is formed on the interior of the preheat casing 341, and a tab 354 which extends into and slidably engages the groove 345 is formed on the exterior of the preheat core 350 to guide the preheat core 350 as it reciprocates within the preheat casing 341. However, if the preheat casing 341 and the preheat core 350 have non-cylindrical shapes, such as oval or elliptical shapes, which prevent their relative rotation, the groove 345 and the tab 354 can be eliminated.

In the illustrated embodiment, the preheat core 350 travels along a linear path between a raised (preheat) position and a lowered (normal) position. However, as long as the hot water supply port 342 and the water delivery port communicate with the interior of the preheat core 350 and the return port is blocked when the preheat core 350 is in a lowered (normal) position and the hot water supply port 342 and the return port communicate with the interior of the preheat core 350 and the water delivery port is blocked when the preheat core 350 is in a raised (preheat) position, the preheat core 350 may travel along a nonlinear path between a raised (preheat) and a lowered (normal) position. For example, the preheat core 350 may be made to travel along a helical path between a raised (preheat) and a lowered (normal) position by forming the groove 345 in the inner surface of the preheat casing 341 with a helical shape. If the preheat core 350 travels along a helical path between a raised and a lowered position, the locations of the ports of the preheat casing 341 and the preheat core 350 can be suitably chosen so that the ports fluidly communicate with each other in the manner described above in the raised or the lowered position of the preheat core 350.

As in the previous embodiment, the preheat assembly 340 may be equipped with a thermal detent mechanism for releasably holding the preheat core 350 in a raised (preheat) position when the temperature of water inside the preheat core 350 is below a predetermined set-point temperature. The present embodiment includes a thermal detent mechanism 360 having the same structure as the thermal detent mechanism 280 employed in the previous embodiment. It includes a bellows which is disposed inside the preheat core 350 and comprises a first end plate 361, a second end plate 362, and a flexible corrugated wall 363 extending between the first and second end plates 361 and 362 and connected to the end plates in a liquid-tight manner. The second end plate 362 is secured to the peripheral wall of the preheat core 350, and the first end plate 361 is disposed inside the preheat core 350 and spaced from the second end plate 362. A detent member such as a pin 367 corresponding to the pin 287 in the previous embodiment is secured to the first end plate 361. As in the previous embodiment, the pin 367 can pass through a through hole 365 formed in the second end plate 362 and detachably engage with a recess 346 formed in the inner surface of the preheat casing 341 when the preheat core 350 is in a raised (preheat) position. The bellows contains a temperature-sensitive material such as a conventional wax in the same manner as described with respect to the previous embodiment. As is the case with respect to the previous embodiment, the shape of the outer end of the pin 367 of the thermal detent mechanism 360 and the shape of the recess 346 in the preheat casing 341 which is engaged by the pin 367 are preferably selected such that the user can disengage the pin 367 from the recess 346 when desired by pressing down on the knob 390. The structure and operation of the thermal detent mechanism 360 are the same as that of the thermal detent mechanism 280 of the previous embodiment, so a further explanation of the thermal detent mechanism 360 will be omitted. As is the case with respect to the previous embodiment, a thermal detent mechanism is not limited to one employing a bellows, and any of the thermal detent mechanisms described in the previous embodiments can be employed in this embodiment.

The preheat assembly 340 further includes a rigid elongated preheat shaft 370 through which the preheat core 350 can be raised and lowered by the selector assembly 380. The preheat shaft 370 is concentrically disposed inside the mixing shaft 330 and extends longitudinally through the mixing shaft 330 in a manner allowing the mixing shaft 330 and the preheat shaft 370 to translate independently of each other in the longitudinal direction of the shafts. The lower end of the preheat shaft 370 passes through a hole in the upper end of the preheat casing 341 and is connected to the preheat core 350 in a manner enabling the preheat shaft 370 to freely rotate with respect to the preheat core 350 while enabling the preheat shaft 370 to apply a force to the preheat core 350 in the longitudinal direction of the preheat shaft 370 to raise and lower the preheat core 350 within the preheat casing 341. For example, in the present embodiment, the lower end of the preheat shaft 370 has a circular flange 371 which rotatably engages with a cylindrical bracket or collar 357 secured to or formed as part of the top surface of the preheat core 350 to enable the preheat shaft 370 to rotate with respect to the preheat core 350 while enabling the preheat core 350 and the preheat shaft 370 to translate together in the longitudinal direction of the preheat shaft 370.

As viewed in plan, the upper end of the preheat shaft 370 is divided into two generally triangular portions 372 which together have generally a butterfly shape. Each of the triangular portions 372 has an externally splined region 373 including a plurality of spline teeth and spline grooves extending parallel to each other in the longitudinal direction of the preheat shaft 370.

Each of the elongated fingers at the upper end of the mixing shaft 330 extends in the longitudinal direction into in one of the spaces between the two triangular portions 372 at the upper end of the preheat shaft 370. The number of spline teeth and spline grooves formed in the shafts and the spacing between adjacent spline teeth is not critical, but in the present embodiment, the splined regions 335 and 373 of the two shafts 330 and 370 together define a total of 12 spline teeth evenly spaced at intervals of 30 degrees around a circle in the circumferential direction of the shafts as measured between the centers of adjoining spline teeth.

As shown in FIG. 61, the selector assembly 380 includes a stationary base 381 and a manual control member which is movably mounted on the base 381 and which can be grasped and manipulated by a user to control the operation of the flow switching module 300.

FIG. 64 is an axonometric view of the selector assembly 380 as seen from below. As shown in this figure, the base 381 of the selector assembly 380 has a flat bottom surface which normally is placed against a surface on which the flow switching module 300 is mounted, such as the wall of a shower stall, a countertop, or the top surface of a sink. Although it is shown flat in this embodiment the bottom surface may be contoured to meet the shape of a sink, plumbing fixture, or countertop if desired. The base 381 also includes a cylindrical guide tube 382 at its center extending in the longitudinal direction of the base 381. The inner surface of the guide tube 382 can act as a bearing surface for the mixing shaft 330 as the mixing shaft 330 rotates or translates with respect to the base 381. The guide tube 382 is partially surrounded by an arcuate cavity 383. A first wall 384 formed at one end of the cavity 383 in the circumferential direction functions as a cold stop surface for limiting rotation of the manual control member in a first direction (the clockwise direction in the present embodiment), and a second wall 385 formed at the other end of the cavity 383 in the circumferential direction functions as a hot stop surface for limiting rotation of the manual control member in the opposite direction (the counterclockwise direction in this embodiment).

The manual control member is not limited to any particular structure. In the present embodiment, it comprises a knob 390 having a generally cylindrical outer surface, but it may instead be in the form of a lever or other convenient shape. The illustrated knob 390 includes a lower portion 391 and an upper portion 405 which is detachably or permanently mounted atop the lower portion 391. If the upper portion 405 is detachably connected to the lower portion 391, the connection between the two is sufficiently strong that a user can manipulate the knob 390 when grasping either the upper or the lower portion 391. FIG. 62A is an exploded axonometric view of the lower portion 391 of the knob 390, FIG. 62B is a cutaway axonometric view of the lower portion 391 of the knob 390, and FIG. 63 is an axonometric view of the upper portion 405 of the knob 390. As shown in these figures, the upper portion 405 of the knob 390 is a generally cylindrical member which has a flat bottom surface 406, a rim 407 which extends partway around the bottom surface 406, and a central bore 409 which extends from the bottom surface partway through the height of the upper portion 405. The bore 409 is internally splined with a plurality of spline teeth and spline grooves which extend in the longitudinal direction of the knob 390 and are shaped to enable spline engagement with the externally splined regions 335 of the mixing shaft 330 and the preheat shaft 370. Here, "spline engagement" of two members (or of spline teeth and spline grooves) means that the spline teeth of a first member (such as the knob 390) extend into the spline grooves of a second member (such as the mixing shaft 330 or the preheat shaft 370) and the spline teeth of the second member extend into the spline grooves of the first member to enable torque to be transmitted between the first and second members while maintaining the relative angular positions of the two members but allowing relative translation of the members with respect to one another along the direction of the spline grooves.

The lower portion 391 of the knob 390 is also a generally cylindrical member having a top surface 392 and a ledge 393 which extends around the top surface 406 in the circumferential direction of the lower portion 391. When the upper portion 405 of the knob 390 is mounted on the lower portion 391, the rim 407 of the upper portion 405 sits atop the ledge 393 of the lower portion 391, and a tab 394 formed on the outer periphery of the lower portion 391 for the purpose of aligning the upper and lower portions fits into a gap 408 in the rim 407 of the upper portion 405. Other methods of alignment known in the art such as screws or pins could also be used. The lower portion 391 has an internally splined central bore 395 which extends over the length of the lower portion 391. The bore 395 is formed with a plurality of spline teeth and spline grooves which extend over the length of the bore 395 in the longitudinal direction of the bore 395. When the upper portion 405 of the knob 390 is mounted on the lower portion 391 of the knob 390 with the tab 394 of the lower portion 391 received in the gap 408 in the upper portion 405, the spline teeth and the spline grooves of the lower portion 391 are aligned with the spline teeth and spline grooves, respectively, of the upper portion 405. The bore 395 is surrounded by a flat annular surface 396 which is recessed with respect to the top surface 406 of the lower portion 391. The flat annular surface 396 is surrounded by an annular groove 397 which is recessed with respect to the flat annular surface 396.

The knob 390 is capable of being rotated with respect to the base 381 about the longitudinal axis of the base 381 and translating with respect to the base 381 in the longitudinal direction of the base 381. The knob 390 has a normal rotational range which it assumes during the normal mode of operation and a preheat rotational range which it assumes during the preheat mode. When the knob 390 is in the normal rotational range, the knob 390 can be raised and lowered with respect to the base 381 to raise and lower the mixing shaft 330 with respect to the base 381 while the preheat shaft 370 remains in a lowered position without translating. Within the normal rotational range, the knob 390 can be rotated between a full cold position in which the valve cartridge 320 is in its full cold rotational range and a full hot position in which the valve cartridge 320 is in its full hot rotational range. When the knob 390 is in the preheat rotational range, the knob 390 can be raised and lowered with respect to the base 381 to raise and lower the preheat shaft 370 while the mixing shaft 330 remains in a lowered position without translating.

When the module 300 is in an assembled state, the upper ends of the mixing shaft 330 and the preheat shaft 370 are disposed inside the knob 390 in spline engagement with one or both of the upper portion 405 and the lower portion 391 of the knob 390. The spline engagement between the knob 390 and the upper ends of the shafts is such that rotation of the knob 390 with respect to the base 381 also rotates both of the shafts as a single unit together with the knob 390 with respect to the base 381 about the longitudinal axis of the base 381. At the same time, there is sufficient play in the spline engagement between the knob 390 and the splined regions of the shafts 330 and 370 that the knob 390 can translate in the longitudinal direction of the base 381 without the spline engagement pulling the shafts 330 and 370 along with the knob 390. While there is invariably friction between the knob 390 and the upper ends of the shafts 330 and 370 which has a tendency to pull the shafts along with the knob 390 as the knob 390 translates, the force acting on the shafts in the longitudinal direction of the shafts due to the friction is less than the resistance to longitudinal translation of the shafts caused by friction between the shafts and sealing members or bearings within the flow switching module 300. In other words, the spline engagement between the knob 390 and the upper ends of the shafts 330 and 370 is capable of transmitting torque from the knob 390 to the shafts without producing translation of the shafts in the longitudinal direction.

The selector assembly 380 further includes an operating member which can selectively raise either the mixing shaft 330 or the preheat shaft 370 to operate the mixing valve assembly 301 or the preheat assembly 340. The operating member is not restricted to any particular shape, but in the present embodiment it comprises a flat member (referred to below as a selector plate 410) which is disposed inside the knob 390 and which translates vertically together with the knob 390 when the knob 390 is raised or lowered. The illustrated selector plate 410 comprises a flat ring 411 which is slidably disposed between the lower and upper portions 391 and 405 of the knob 390. The ring 411 includes a central bore 412 and two tabs 414 which extend radially outwards from the outer periphery of the ring 411. The lower surface of the ring 411 is slidably supported atop the flat annular surface of the lower portion 391 of the knob 390 which functions as a bearing surface for the selector plate 410. The upper surface of the ring 411 of the selector plate 410 opposes the bottom surface of the upper portion 405 of the knob 390. The selector assembly 380 further includes a biasing spring, which in the present embodiment is a torsion spring 420 which is received in the annular groove formed in the lower portion 391 of the knob 390. The spring 420 has a first end 421 which fits into a hole 415 formed in the selector plate 410 and a second end 422 which fits into a hole 398 formed in the bottom of the groove 397 to secure the first end of the spring 420 to the selector plate 410 and the second end of the spring 420 to the lower portion 391 of the knob 390.

The lower portion 391 of the knob 390 includes two grooves 399 which extend in the longitudinal direction of the lower portion 391 between its upper and lower ends. When the selector plate 410 is seated on the flat annular surface of the lower portion 391 of the knob 390, each of the tabs 394 of the selector plate 410 is loosely received in one of the grooves 399. Each groove 399 has a width measured in the circumferential direction of the lower portion 391 of the knob 390 which is larger than the width of the tab 414 received in the groove 399 to enable the selector plate 410 and the knob 390 to undergo a certain amount of relative rotation. The torsion spring 420 applies a biasing torque to the selector plate 410 to urge the selector plate 410 to rotate in the counterclockwise direction as seen from above with respect to the knob 390 to urge each tab 414 into contact with a first side 400 of the corresponding groove 399. The selector plate 410 and the lower portion 391 of the knob 390 can undergo relative rotation until each tab 414 contacts a second side 401 of the corresponding groove 399. In the illustrated example, the selector plate 410 can rotate with respect to the knob 390 by approximately 15 degrees about the axis of the knob 390 between a position in which the tabs 394 contact the first sides 400 of the grooves 399 and a position in which the tabs 394 contact the second sides 401 of the grooves 399.

The number of tabs 394 and grooves 399 is not restricted to the number shown in the drawings. There may be a single tab 394 on the selector plate 410 and a single groove 399 formed in the lower portion 391 of the knob 390, or there may be three or more tabs 394 and grooves 399.

As shown in FIG. 62B, each groove 399 forms a gap in the periphery of the bore 395 in the lower portion 391 of the knob 390 where no spline teeth or spline grooves 399 are present. However, the width of the grooves 399 is sufficiently small that enough of the lower portion 391 of the knob 390 remains in spline engagement with the upper ends of the mixing shaft 330 and the preheat shaft 370 in order for the shafts to rotate together with the knob 390 when the knob 390 is rotated.

As shown in FIG. 61, the selector plate 410 further includes a rigid member, such as a rod 416, which is partially disposed in one of the grooves 399 and extends from the outer periphery of the selector plate 410 in the longitudinal direction of the knob 390 through the length of the groove 399 out of the lower end of the knob 390 and into the cavity 383 in the base 381. The rod 416 restricts the rotation of the selector plate 410 about the longitudinal direction between a position in which the rod 416 contacts the first wall 384 of the cavity 383 in the base 381 and a position in which the rod 416 contacts the second wall 385 of the cavity 383 in the base 381.

Figure 74:
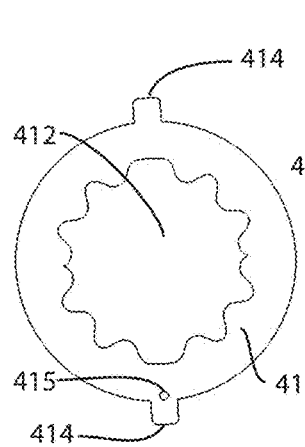
FIG. 74 is a plan view of the selector plate of the embodiment of FIG. 60.

FIG. 74 is a top plan view of the selector plate 410. As shown in this figure, the bore 412 of the selector plate 410 is internally splined with a plurality of spline teeth and spline grooves extending in the longitudinal direction of the selector plate 410 and capable of selective spline engagement with the externally splined regions 335 of the mixing shaft 330 or the preheat shaft 370. In contrast to the externally splined regions 335 of the mixing shaft 330 and the preheat shaft 370 which have spline teeth and spline grooves formed at constant intervals around the circumference of the shafts, the spline teeth and spline grooves of the selector plate 410 have an irregular spacing and irregular width in the circumferential direction, with some of the spline grooves being wider than others as measured in the circumferential direction of the selector plate 410. The spacing and width of the spline teeth and spline grooves of the selector plate 410 are selected such that the selector plate 410 has a rotational position with respect to the knob 390 in which the selector plate 410 is capable of spline engagement with the mixing shaft 330 but not with the preheat shaft 370 and another rotational position in which the selector plate 410 is capable of spline engagement with the preheat shaft 370 but not the mixing shaft 330.

Specifically, in the present embodiment, when the selector plate 410 is in a rotational position with respect to the knob 390 in which the tabs 394 of the selector plate 410 contact the first sides 400 of the corresponding grooves 399, the selector plate 410 is capable of spline engagement with the preheat shaft 370 but not with the mixing shaft 330. On the other hand, when the selector plate 410 is in a rotational position with respect to the knob 390 in which the tabs 394 of the selector plate 410 contact the second sides 401 of the grooves 399, the selector plate 410 is capable of spline engagement with the mixing shaft 330 but not with the preheat shaft 370.

The shape and size of the spline teeth and spline grooves of the selector plate 410 is chosen such that when the selector plate 410 is in spline engagement with one of the shafts (either the mixing shaft 330 or the preheat shaft 370), torque can be transmitted between the selector plate 410 and the shaft with which it is in spline engagement. At the same time, there is sufficient play between the engaged spline teeth and spline grooves that the selector plate 410 can translate with respect to the shaft with which it is spline engaged in the longitudinal direction of the shaft without pulling that shaft along with it.

Figure 75:
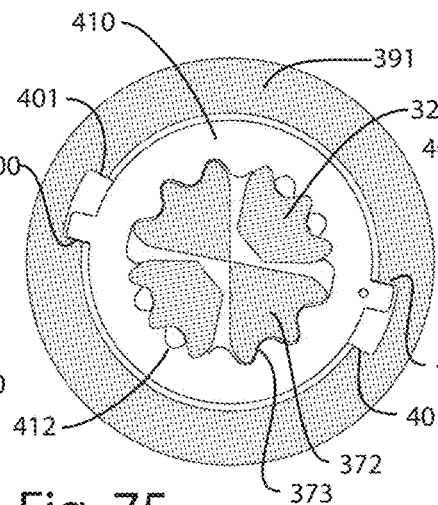
FIG. 75 is a transverse cross-sectional view of the embodiment of FIG. 60 when the knob is in the normal rotational range.
Figure 76:
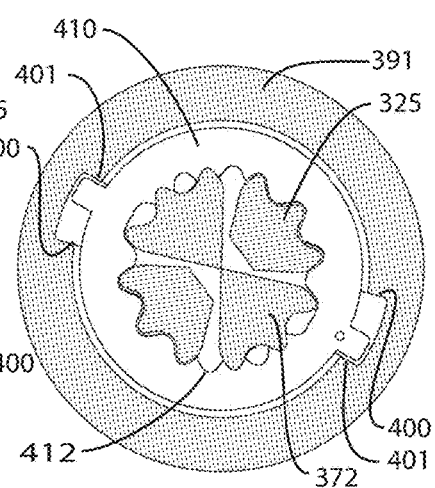
FIG. 76 is a transverse cross-sectional view of the embodiment of FIG. 60 when the knob is in the preheat rotational range.

FIGS. 75 and 76 are transverse cross-sectional views taken though the lower portion 391 of the knob 390 just above the level of the selector plate 410, illustrating how the selector plate 410 interacts with the upper ends of the shafts 330 and 370 when the knob 390 is in the normal rotational range and the preheat rotational range. FIG. 75 shows the relative rotational positions of the lower portion 391 of the knob 390, the selector plate 410, and the upper ends of the shafts when the knob 390 is in the normal rotational range, while FIG. 76 shows the relative rotational positions of these members when the knob 390 is in the preheat rotational position.

As shown in FIG. 75, when the knob 390 is in the normal rotational range, each tab of the selector plate 410 is pressed into contact with the first side 400 of the corresponding groove 399 in the lower portion 391 of the knob 390 by the torsion spring 420 for the selector plate 410. In this state, each of the spline teeth and the spline grooves of the preheat shaft 370 is in spline alignment with a corresponding spline groove or spline tooth of the selector plate 410, while at least a portion of the spline teeth and the spline grooves of the preheat shaft 370 are misaligned with the spline grooves and the spline teeth, respectively, of the selector plate 410. Here, "spline alignment" of spline teeth and spline grooves means that the rotational position of the spline teeth of a first member (such as the selector plate 410) with respect to the splines grooves of a second member (such as the mixing shaft 330 or the preheat shaft 370) is such that the spline teeth of the first member can be inserted into the spline grooves of the second member and the spline teeth of the second member can be inserted into the spline grooves of the first member by relative movement of the first and second members in the longitudinal direction. Similarly, two members can be in spline alignment if their respective spline teeth and spline grooves are in spline alignment with each other. Two members can be in spline alignment without being in spline engagement. If the knob 390 is raised when the knob 390 is in this rotational position, the selector plate 410 can slide over the upper end of the preheat shaft 370 without producing translation of the preheat shaft 370, while the selector plate 410 presses against the lower surface of the upper end of the mixing shaft 330 and raises the mixing shaft 330 along with it.

On the other hand, when the knob 390 is in the preheat rotational range as shown in FIG. 76, each tab 414 of the selector plate 410 is pressed into contact with the second side 401 of the corresponding groove 399 in the lower portion 391 of the knob 390. In this state, each of the spline teeth and the spline grooves of the mixing shaft 330 is in spline alignment with a corresponding spline groove or spline tooth of the selector plate 410, while at least a portion of the spline teeth and the spline grooves of the mixing shaft 330 are misaligned with the spline grooves and the spline teeth, respectively, of the selector plate 410. If the knob 390 is raised when in the rotational position shown in FIG. 76, the selector plate 410 can slide over the upper ends of the mixing shaft 330 without producing translation of the mixing shaft 330, while the top surface 406 of the selector plate 410 presses against the lower surface of the upper end of the preheat shaft 370 and raises the preheat shaft 370 along with it.

Figure 83:
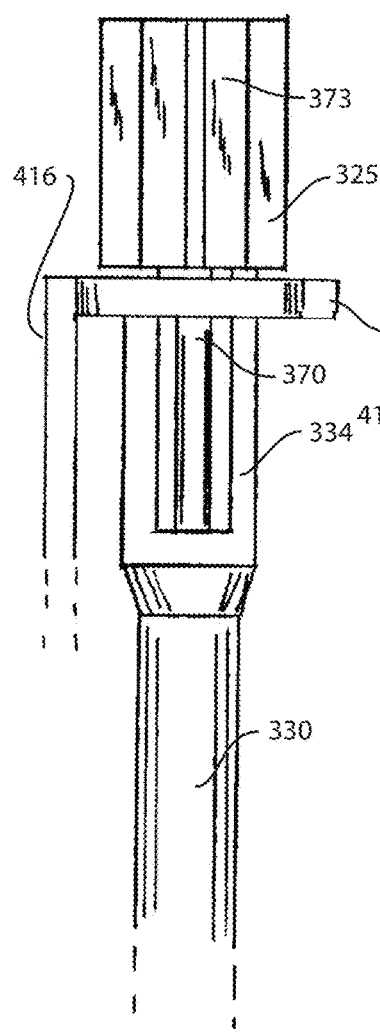
FIG. 83 is a schematic elevation of the mixing shaft and the preheat shaft of the embodiment of FIG. 60 when the knob is in a lowered position.
Figure 84:
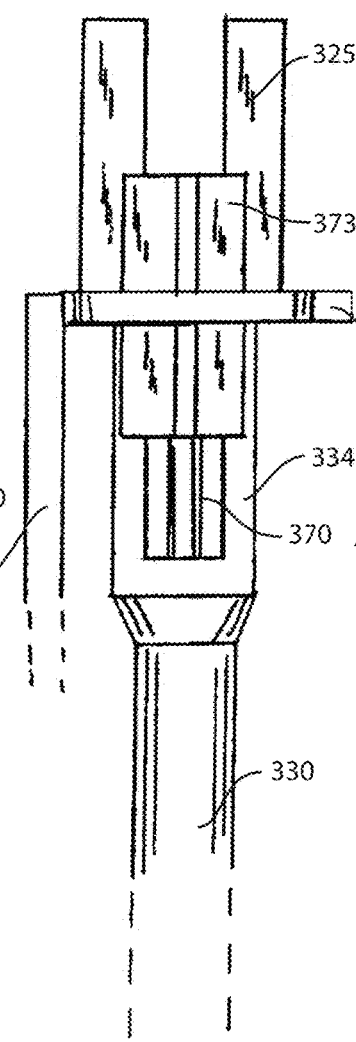
FIG. 84 is a schematic elevation of the mixing shaft and the preheat shaft of the embodiment of FIG. 60 when the knob is in a raised position in the normal rotational range.
Figure 85:
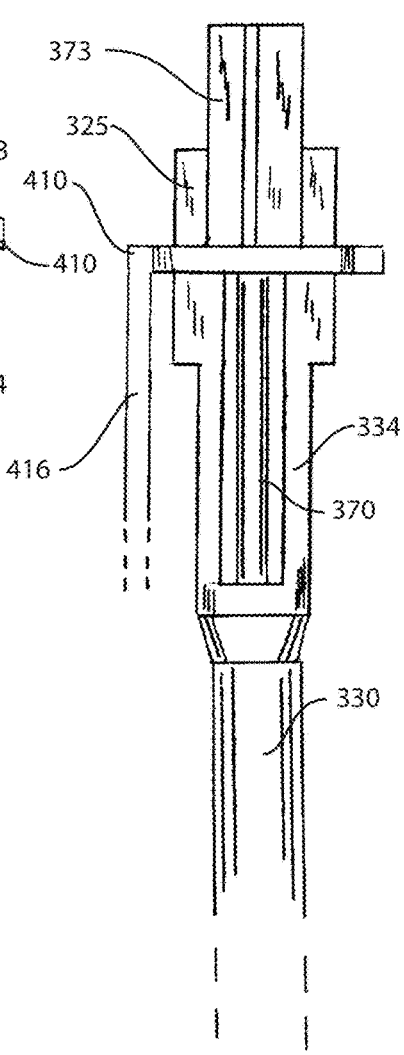
FIG. 85 is a schematic elevation of the mixing shaft and the preheat shaft of the embodiment of FIG. 60 when the knob is in a raised position in the preheat rotational range.

FIGS. 83-85 are schematic elevations showing the interaction between the selector plate 410 and the upper ends of the preheat shaft 370 and the mixing shaft 330. In each of these figures, portions of the module 300 other than the selector plate 410 and the upper ends of the shafts have been omitted for clarity.

FIG. 83 shows the selector plate 410 when the knob 390 is in a lowered position in which the selector plate 410 is disposed below the splined regions 335 at the upper ends of the mixing shaft 330 and the preheat shaft 370 so that the selector plate 410 is not in spline engagement with either the mixing shaft 330 or the preheat shaft 370. In this state, the selector plate 410 is capable of rotating with respect to both the shafts and the knob 390 between the rotational position shown in FIG. 75 in which the tabs 394 of the selector plate 410 contact the first sides 400 of the grooves 399 and the rotational position shown in FIG. 76 in which the tabs 394 contact the second sides 401 of the grooves 399. In FIG. 83, the shafts are shown with a gap between the lower surface of the upper end of each shaft and the top surface 406 of the selector plate 410, but the lower surfaces of the shafts may be contacting the upper surface of the selector plate 410 as long as the selector plate 410 is not prevented from rotating with respect to the shafts by the contact. This state can occur when the knob 390 is in the normal rotational range and the valve cartridge 320 is in an off position or when the knob 390 is in the preheat rotational range and the preheat shaft 370 is in a lowered (normal) position.

FIG. 84 illustrates a state in which the knob 390 is in the normal rotational range and the knob 390 has been raised to raise the selector plate 410 from the position shown in FIG. 83. When the knob 390 is in the normal rotational range, the selector plate 410 is in spline alignment with the preheat shaft 370 but is at least partially misaligned with respect to the mixing shaft 330. Therefore, when the knob 390 is raised to raise the selector plate 410, the selector plate 410 slides along the upper end of the preheat shaft 370 in spline engagement with it without producing translation of the preheat shaft 370. At the same time, the upper surface of the selector plate 410 abuts against the lower surface of the upper end of the mixing shaft 330 and pushes the mixing shaft 330 upwards from the position shown in FIG. 83. Due to the spline engagement between the preheat shaft 370 and the selector plate 410 at this time, the selector plate 410 is unable to rotate with respect to the shafts, and since the preheat shaft 370 is spline engaged with the knob 390, the selector plate 410 is prevented from rotating with respect to the knob 390.

FIG. 85 illustrates a state in which the knob 390 is in the preheat rotational range and has been raised to raise the selector plate 410 from the position shown in FIG. 83. When the knob 390 is in the preheat rotational range, the selector plate 410 is in spline alignment with the mixing shaft 330 but is at least partially misaligned with respect to the preheat shaft 370. As a result, when the knob 390 is raised to raise the selector plate 410, the selector plate 410 slides along the upper end of the mixing shaft 330 in spline engagement with it without producing translation of the mixing shaft 330, while the upper surface of the selector plate 410 abuts against the lower surface of the upper end of the preheat shaft 370 and pushes the preheat shaft 370 upwards from the position shown in FIG. 83. As the mixing shaft 330 is in spline engagement with the selector plate 410 at this time, the selector plate 410 is unable to rotate with respect to the shafts, and since the both shafts are spline engaged with the knob 390, the selector plate 410 is unable to rotate with respect to the knob 390, just as is the case in the state shown in FIG. 84.

FIG. 69 is a cutaway axonometric view of the entire module 300 when the selector plate 410 and the shafts are in the state shown in FIG. 84, and FIG. 66 is a cutaway axonometric view of just the selector assembly 380 when the selector plate 410 and the shafts are in the state shown in FIG. 85, In the state shown in FIG. 69, the knob 390 is in a raised position in the normal rotational range. In this state, the bottom surfaces of the upper end of the mixing shaft 330 abuts against the top surface 406 of the selector plate 410, while the preheat shaft 370 is shown in spline engagement with the selector plate 410. The mixing shaft 330 has been raised from a completely lowered position by raising the knob 390, while the preheat shaft 370 remains in a lowered position.

In the state shown in FIG. 66, the knob 390 is in a raised position in the preheat rotational range. In this state, the bottom surfaces of the upper end of the preheat shaft 370 abut against the top surface 406 of the selector plate 410, while the mixing shaft 330 is shown in spline engagement with the selector plate 410. With the knob 390 in a raised position, the preheat shaft 370 has been raised from a lowered position, while the mixing shaft 330 remains in a lowered position.

When a user presses down on the knob 390 to lower the knob 390 from the raised positions shown in FIG. 69 or 66, the upper inner surface of the upper portion 405 of the knob 390 abuts against the top surface 406 of whichever shaft is in a raised position and pushes the shaft downwards to the lowered position shown in FIG. 83 in which neither shaft is in spline engagement with the selector plate 410.

FIGS. 86A-86D are schematic top plan views of the lower portion 391 of the knob 390, the upper end of the mixing shaft 330, and the upper end of the preheat shaft 370 as the knob 390 is rotated from the full cold position to the preheat rotational range, and FIGS. 87A-87D are schematic top plan views of the base 381 of the selector assembly 380 illustrating the position of the rod 416 of the selector plate 410 with respect to the base 381 when the knob 390 is in the positions shown by FIGS. 86A-86D, respectively. In FIGS. 86A-86D, the upper portion 405 of the knob 390 and portions of the module 300 below the knob 390 have been omitted for clarity. Similarly, in FIGS. 87A-87D, components of the module 300 other than the base 381 of the selector assembly 380 and the rod 416 of the selector plate 410 have been omitted.

Figure 86A:
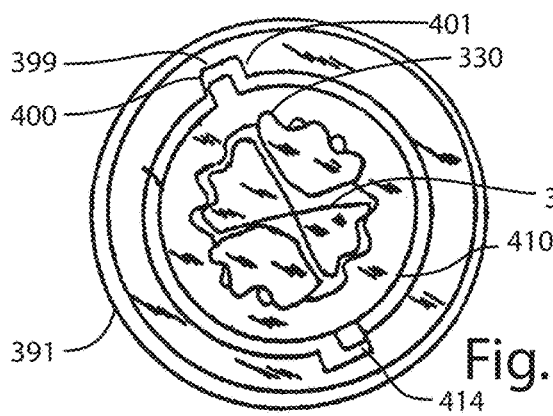
FIGS. 86A-86D are schematic plan views of the selector plate and the upper ends of the mixing shaft and the preheat shaft of the embodiment of FIG. 60 when the knob is in various rotational positions.
Figure 87A:
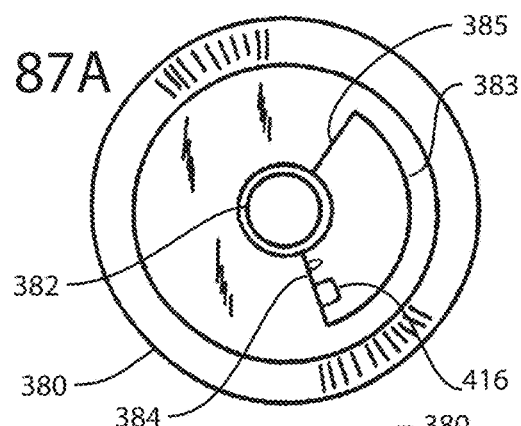
FIGS. 87A-87D are schematic plan views of the base of the selector assembly when the knob is in the rotational positions shown in FIGS. 86A-86D.

FIGS. 86A and 87A illustrate the state in which the knob 390 is in the full cold position. In this position, the rod 416 of the selector plate 410 (schematically indicated by a small rectangle) contacts the first wall 384 of the cavity 383 in the base 381 of the selector assembly 380. When the knob 390 is in the normal rotational range, the selector plate 410 is in a rotational position with respect to the knob 390 in which each tab of the selector plate 410 is pressed against the first side 400 of the corresponding groove 399 in the lower portion 391 of the knob 390 by the torque applied to the selector plate 410 by the torsion spring 420. As a result of the contact between the tabs 394 and the first sides 400 of the grooves 399 and the contact between the rod 416 of the selector plate 410 and the first wall 384 of the arcuate cavity 383, the knob 390 is prevented from rotating in the clockwise direction past the full cold position whether the knob 390 is in a raised position or a lowered position.

Figure 86B:
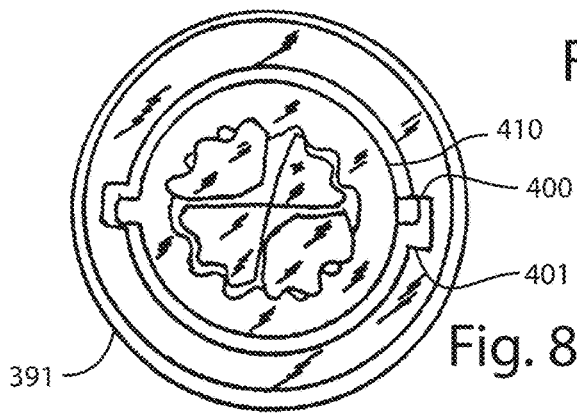
Figure 87B:
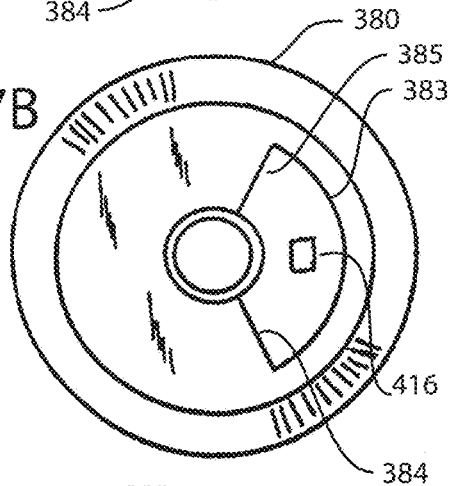

FIGS. 86B and 87B illustrate the state in which the knob 390 has been rotated in the counterclockwise direction from the full cold position shown in FIG. 86A to a position roughly midway between the full cold position and the full hot position. In this rotational position of the knob 390, the rod 416 of the selector plate 410 is spaced from both the first all 384 and the second wall 385 of the cavity 383 in the base 381 of the selector assembly 380, so the knob 390 can be rotated in either the clockwise or counterclockwise direction from this position.

Figure 86C:
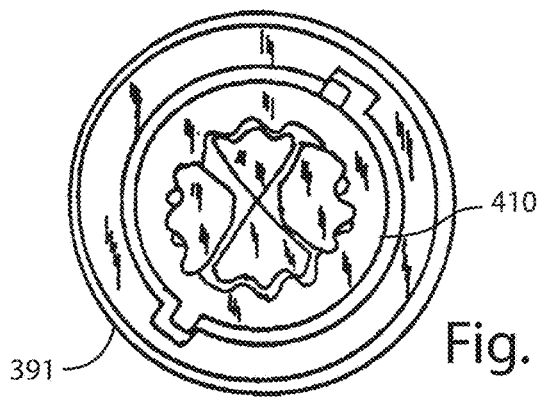
Figure 87C:
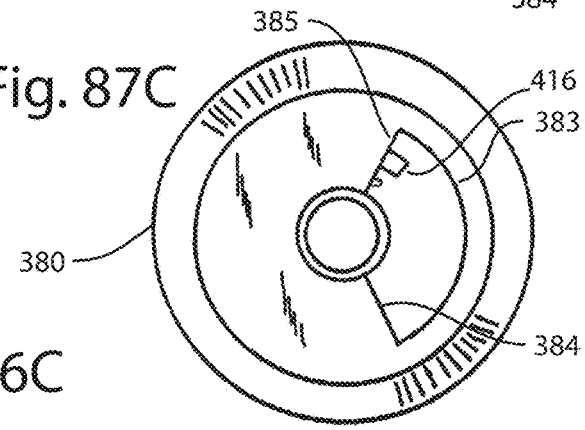

FIGS. 86C and 87C illustrate the state in which the knob 390 has been rotated in the counterclockwise direction from the position shown in FIG. 86B to the full hot position. In this rotational position of the knob 390, the rod 416 of the selector plate 410 contacts the second wall 385 of the cavity 383 in the base 381 of the selector assembly 380.

Figure 86D:
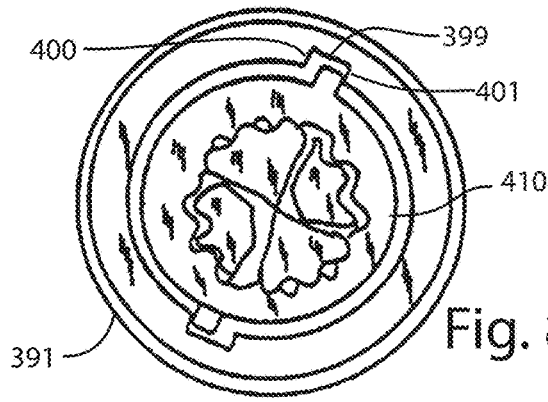
Figure 87D:
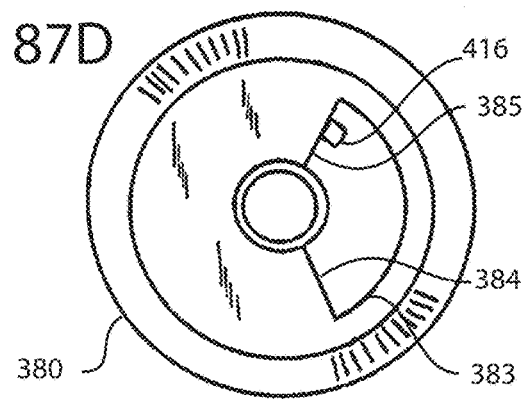

FIGS. 86D and 87D illustrate the state in which the knob 390 has been rotated in the counterclockwise direction from the full hot position shown in FIG. 86C to the preheat rotational range.

When the knob 390 is in the normal rotational range, each tab of the selector plate 410 remains pressed against the first side 400 of the corresponding groove 399 of the lower portion 391 of the knob 390 due to the torque applied to the selector plate 410 by the torsion spring 420. Therefore, as the knob 390 rotates from the full cold position shown in FIG. 86A to the full hot position shown in FIG. 86C, the selector plate 410 rotates along with the knob 390 while maintaining a constant angular relationship to the knob 390. However, when the knob 390 is rotated from the full hot position to the preheat rotational range, the selector plate 410 remains in the same rotational position as when the knob 390 is in the full hot position. A comparison of FIGS. 86D and 87D with FIGS. 86C and 86D shows that when the knob 390 is in the preheat rotational range, the knob 390 is rotated in the counterclockwise direction with respect to the full hot position shown in FIG. 86C, while the selector plate 410 remains in the same rotational position in FIG. 87D as in FIG. 87C due to the contact between the rod 416 of the selector plate 410 and the second wall 385 of the cavity 383 in the base 381, which prevents the selector plate 410 from rotating further in the counterclockwise direction past the position shown in FIG. 87C.

As described above with respect to FIG. 75 and as shown in FIGS. 86A-86C, when the knob 390 is in the normal rotational range, the spline teeth and the spline grooves of the selector plate 410 are in spline alignment with the spline grooves and spline teeth of the preheat shaft 370, while at least a portion of the spline teeth and the spline grooves of the selector plate 410 are misaligned with the spline grooves and spline teeth of the mixing shaft 330. Therefore, when the knob 390 is in the normal rotational range, raising and lowering the knob 390 with respect to the base 381 of the selector assembly 380 in the longitudinal direction of the shafts raises and lowers the mixing shaft 330 while the preheat shaft 370 remains in a lowered position. Specifically, when the knob 390 is raised with respect to the base 381, the selector plate 410 pushes the mixing shaft 330 upwards, and when the knob 390 is lowered with respect to the base 381, the upper inner surface of the upper portion 405 of the knob 390 pushes the mixing shaft 330 downwards.

On the other hand, when the knob 390 is in the preheat rotational range shown in FIG. 75 and FIG. 86D, the rotational position of the selector plate 410 with respect to the shafts is such that the spline teeth and the spline grooves of the selector plate 410 are in spline alignment with the spline grooves and the spline teeth of the mixing shaft 330, while at least a portion of the spline teeth and the spline grooves of the selector plate 410 are misaligned with the spline grooves and the spline teeth of the preheat shaft 370 so that the selector plate 410 cannot be spline engaged with the preheat shaft 370. Accordingly, when the knob 390 is in the preheat rotational range, raising and lowering the knob 390 with respect to the base 381 of the selector assembly 380 in the longitudinal direction of the shafts raises and lowers the preheat shaft 370 while the mixing shaft 330 remains in a lowered position. Namely, when the knob 390 is raised, the selector plate 410 pushes the preheat shaft 370 upwards, and when the knob 390 is lowered, the upper inner surface of the upper portion 405 of the knob 390 pushes the preheat shaft 370 downwards.

When the knob 390 is in the full hot position shown in FIG. 86C, if the knob 390 is in a raised position in which the preheat shaft 370 is in spline engagement with the selector plate 410, the knob 390 and the selector plate 410 are unable to rotate with respect to each other, so the contact between the rod 416 of the selector plate 410 and the second wall 385 of the cavity 383 in the base 381 prevents the knob 390 from being rotated in the counterclockwise direction past the full hot position.

On the other hand, if the knob 390 is in a lowered position in which the selector plate 410 is not in spline engagement with the preheat shaft 370 when the knob 390 is in the full hot position shown in FIG. 86C, the knob 390 is able to rotate in the counterclockwise direction with respect to the selector plate 410. As a result, the knob 390 can be rotated from the full hot position shown in FIG. 86C to the preheat rotational range shown in FIG. 86D. The knob 390 can be rotated by the user with respect to the selector plate 410 until each tab of the selector plate 410 contacts the second side 401 of the corresponding groove 399 in the lower portion 391 of the knob 390 as shown in FIG. 86D. This contact between the tabs 394 and the second sides 401 of the grooves 399 prevents further rotation of the knob 390 in the counterclockwise direction.

The spline teeth and spline grooves of the shafts and the selector plate 410 are not restricted to the forms illustrated in FIGS. 75 and 76, and a wide number of variations are possible with respect to the shape, number, and placement of the spline teeth and spline grooves of these members as long as they are capable of transmitting torque between the selector plate 410 and the shafts and between the shafts and the knob 390. For example, while the illustrated spline teeth and spline grooves have a generally involute shape, they may instead have a shape with straight sides such as a trapezoidal shape. In addition, although the spline teeth and spline grooves of the shafts in this embodiment have a regular spacing while those of the selector plate 410 have an irregular spacing, the opposite can by the case, with the spline teeth and spline grooves of the selector plate 410 having a regular spacing and those of the shafts having an irregular spacing.

Figure 77:
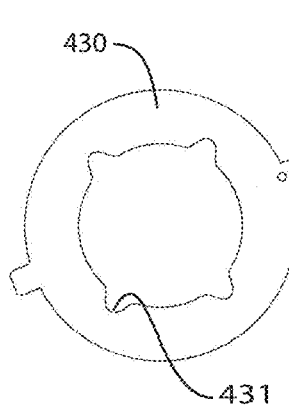
FIG. 77 is a plan view of a variation of the selector plate shown in FIG. 74.
Figure 78:
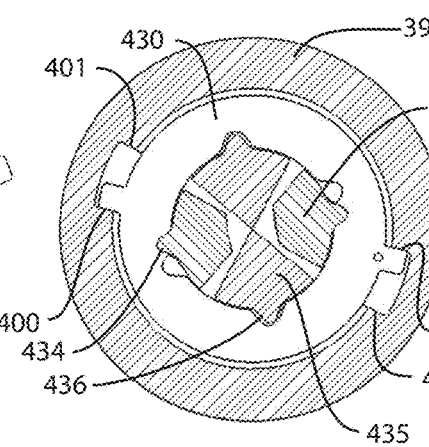
FIG. 78 is a transverse cross-sectional view of an embodiment employing the selector plate of FIG. 77 when the knob is in the normal rotational range.
Figure 79:
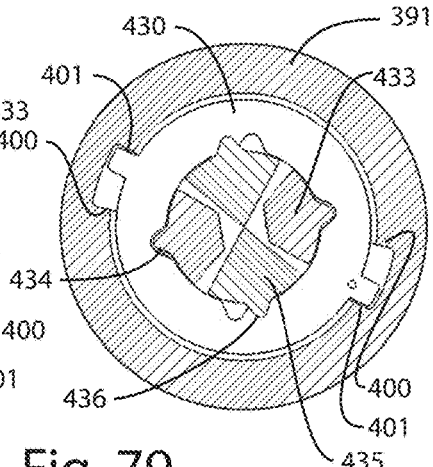
FIG. 79 is a transverse cross-sectional view of the embodiment of FIG. 77 when the knob is in the preheat rotational range.
Figure 80:
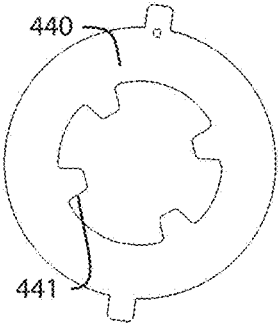
FIG. 80 is a plan view of another variation of the selector plate shown in FIG. 74.

FIGS. 77-82 are schematic illustrations of a few examples of alternative shapes for a selector plate and for the upper ends of the mixing shaft and the preheat shaft for use with the illustrated selector plates. FIGS. 77 and 80 are plan views of a selector plate, and FIGS. 78, 79, 81, and 82 are transverse cross-sectional views taken though the upper end of a knob along the same cutting plane as for FIGS. 74-76. For simplicity, components other than the selector plates, the lower portion 391 of the knob 390, and the upper ends of the shafts have been omitted from the drawings.

FIG. 77 schematically illustrates an example of a selector plate 430 which includes a plurality of spline grooves 431 but no spline teeth, and FIGS. 78 and 79 schematically illustrate the upper ends of a mixing shaft 433 and a preheat shaft 435 which each have one or more spline teeth 434 and 436, respectively, capable of engagement with the spline grooves 431 of the selector plate 430 but no spline grooves. FIG. 78 shows the knob 390 in the normal rotational range, and FIG. 79 shows the knob 390 in the preheat rotational range. The shape of the splined portions of the knob 390 can be selected so that the spline teeth of the shafts can be in spline engagement with the interior of the knob 390. The operation of this selector plate 430 is essentially the same as that of the selector plate 410 shown in FIG. 74, so a detailed description of its operation will be omitted.

Figure 81:
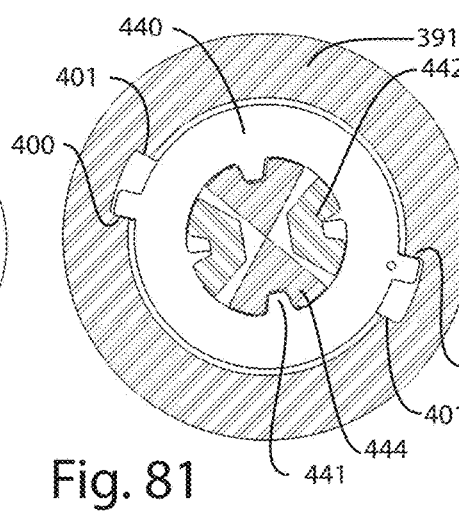
FIG. 81 is a transverse cross-sectional view of an embodiment employing the selector plate of FIG. 80 when the knob is in the normal rotational range.
Figure 82:
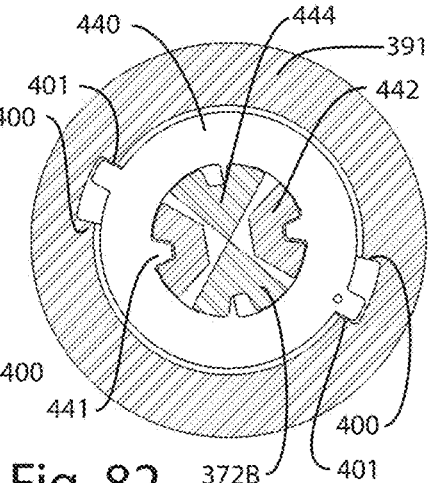
FIG. 82 is a transverse cross-sectional view of the embodiment of FIG. 80 when the knob is in the preheat rotational range.

FIG. 80 schematically illustrates an example of a selector plate 440 which includes a plurality of spline teeth 441 but no spline grooves, and FIGS. 81 and 82 schematically illustrate the upper ends of a mixing shaft 442 and a preheat shaft 444 which each have one or more spline grooves 443 and 445, respectively, capable of engagement with the spline teeth 441 of the selector plate 440 but no spline teeth. FIG. 81 shows the knob 390 in the normal rotational range, and FIG. 82 shows the knob 390 in the preheat rotational range. In FIGS. 80-82, each of the spline teeth and spline grooves is illustrated with a trapezoidal profile instead of an involute profile, but any other profile commonly used for spline engagement can also be employed. The shape of the splined portions of the knob 390 can be selected so that the spline grooves of the shafts can be in spline engagement with the interior of the knob 390. The operation of this selector plate 440 is essentially the same as that of the selector plate 410 shown in FIG. 74.

In each of these examples, the selector plate can rotate with respect to the knob 390 and the shafts between a first position and a second position. In the first position which the selector plate assumes during normal operation, the selector plate 410 is in spline alignment with the preheat shaft 370 but at least partially misaligned with respect to the mixing shaft 330, so that raising and lowering the knob 390 of the selector assembly 380 raises and lowers the mixing shaft 330 but not the preheat shaft 370. In the second position which the selector plate assumes during the preheat mode, the selector plate 410 is in spline alignment with the mixing shaft 330 but at least partially misaligned with respect to the preheat shaft 370 so that raising and lowering the knob 390 of the selector assembly 380 raises and lowers the preheat shaft 370 but not the mixing shaft 330.

For each of the examples shown in FIGS. 77-82, the internal spline teeth and grooves of the knob 390 can be appropriately shaped so that the knob 390 is capable of spline engagement with the upper ends of the mixing shaft 330 and the preheat shaft 370.

From the standpoint of a user, the operation of this embodiment is very similar to the operation of the previous embodiment.

During the normal mode of operation, the module 300 functions in much the same way as a conventional mixing valve. A user can adjust the flow rate of water discharged from the mixing valve assembly 301 by raising and lowering the knob 390 with respect to the base 381 of the selector assembly 380, and the user can adjust the ratio of hot water to cold water which is mixed in the mixing valve assembly 301 by varying the rotational position of the knob 390 between the full cold position and the full hot position. In the normal mode of operation, the preheat core 350 is in a normal (lowered) position, so hot water which is supplied to the hot water supply port 342 of the preheat assembly 340 flows through the preheat core 350 and is then supplied to the hot water supply port 312 of the mixing valve assembly 301.

In order to switch from the normal mode to the preheat mode, with the knob 390 in a lowered position in which the mixing shaft 330 is in a lowered (off) position and the selector plate 410 is in a lowered position in which it is not in spline engagement with either the mixing shaft 330 or the preheat shaft 370, the user rotates the knob 390 from the normal rotational range to the preheat rotational range. When the knob 390 is rotated in the counterclockwise direction past the full hot position towards the preheat rotational range, the torsion spring 420 for the selector plate 410 applies a clockwise torque to the knob 390 which resists the rotation of the knob 390 towards the preheat rotational range. Due to this torque, the user feels a greater resistance to rotation of the knob 390 than when rotating the knob 390 in the normal rotational range. The increased resistance to rotation of the knob 390 can provide a tactile clue to the user that he has rotated the knob 390 past the full hot position. Once the knob 390 reaches the preheat rotational range, the user raises the knob 390 with respect to the base 381 to raise the preheat shaft 370 and the preheat core 350 to a raised (preheat) position. Once the preheat core 350 is in a raised (preheat) position, water which enters the preheat casing 341 through the hot water supply port 342 flows through the interior of the preheat core 350 and is discharged from the return port of the preheat casing 341 and then into the unillustrated return passage instead of being supplied to the mixing valve assembly 301 through the water delivery port. The flow of water into the return passageway triggers a pump control module corresponding to the pump control module shown in FIG. 1 to turn on a return pump corresponding to the return pump shown in FIG. 1. The thermal detent mechanism is exposed to the water flowing through the preheat core 350. If the water temperature in the preheat core 350 when the preheat core 350 is moved to a raised (preheat) position is below the predetermined set-point temperature, the thermal detent mechanism within the preheat core 350 will engage with the recess 346 in the preheat casing 341 and hold the preheat core 350 in a raised (preheat) position in the same manner as in the previous embodiment.

The preheat core 350 will remain in a raised (preheat) position and the preheat mode will continue until either the water temperature inside the preheat core 350 reaches the set-point temperature (at which time the thermal detent mechanism will automatically disengage from the preheat casing 341) or the user manually terminates the preheat mode by pressing down on the knob 390 with sufficient force to disengage the thermal detent mechanism from the preheat casing 341. In either case, when the thermal detent mechanism no longer holds the preheat core 350 in a raised (preheat) position, the preheat core 350 will be pushed down to a lowered (normal) position by the compression spring 355, and the preheat shaft 370 and the knob 390 will be pulled downwards by the downwards movement of the preheat core 350. When the preheat core 350 returns to a lowered (normal) position, the selector plate 410 will return to the position relative to the shafts shown in FIG. 83 in which the selector plate 410 is no longer spline engaged with either shaft. At this point, the knob 390 will be able to rotate with respect to the selector plate 410, and the torque applied to the knob 390 by the torsion spring 420 will cause the knob 390 to rotate from the preheat rotational range back to the full hot position.

Throughout the preheat mode of operation, the mixing shaft 330 and the remainder of the valve cartridge 320 remain in a lowered (off) position in which the mixing valve assembly 301 is in an off state, since raising the knob 390 when the knob 390 is in the preheat rotational range does not raise the mixing shaft 330. Therefore, when the knob 390 returns to the full hot position at the completion of the preheat mode, the mixing shaft 330 is still in a lowered (off) position, and the mixing valve assembly 301 will remain in an off state until the user raises the mixing shaft 330 to a raised (on) position. As a result, a user is protected against scalding by hot water being unexpectedly discharged from the flow switching module 300 when the knob 390 returns to the full hot position at the completion of the preheat mode.

If the water temperature in the preheat core 350 is already at least the set-point temperature when the user attempts to initiate the preheat mode by pulling up on the knob 390 to raise the preheat core 350 to a raised (preheat) position, the thermal detent mechanism will not engage with the preheat casing 341, and the preheat core 350 will return to a lowered (normal) position under the downwards force applied by the compression spring 355 unless the user maintains the preheat core 350 in a raised (preheat) position by continuing to pull upwards on the knob 390.

Similarly, if the user rotates the knob 390 to the preheat rotational range without also raising the preheat core 350 to a raised (preheat) position and then releases the knob 390, the knob 390 will rotate back to the full hot position under the torque exerted by the torsion spring 420.

FIGS. 88-120 illustrate still another embodiment of a flow switching module 500 according to the present invention which is suitable for use in a hot water recirculation system according to the present invention. As is the case with respect to the preceding embodiments, this embodiment can be integrated into the structure of a hot water plumbing fixture and be used as the main flow control device for the plumbing fixture, or it can be used as an auxiliary flow control device for a plumbing fixture having a control valve which is separate from the flow switching module 500.

As is the case with respect to the previous embodiments, this embodiment has a normal mode of operation and a preheat mode of operation. In the normal mode of operation, the flow switching module 500 functions in basically the same manner as a conventional single-handle faucet to perform mixing and flow rate control of water supplied to a plumbing fixture, while in the preheat mode of operation, the flow switching module 500 diverts water coming from a hot water supply passage to an unillustrated return passage until water flowing into the module 500 from a hot water supply passage reaches a predetermined set-point temperature. As will be described below, the principal difference from the standpoint of a user between this embodiment and the previous embodiment is the manner in which the user switches from the normal mode to the preheat mode of operation.

Figure 96:
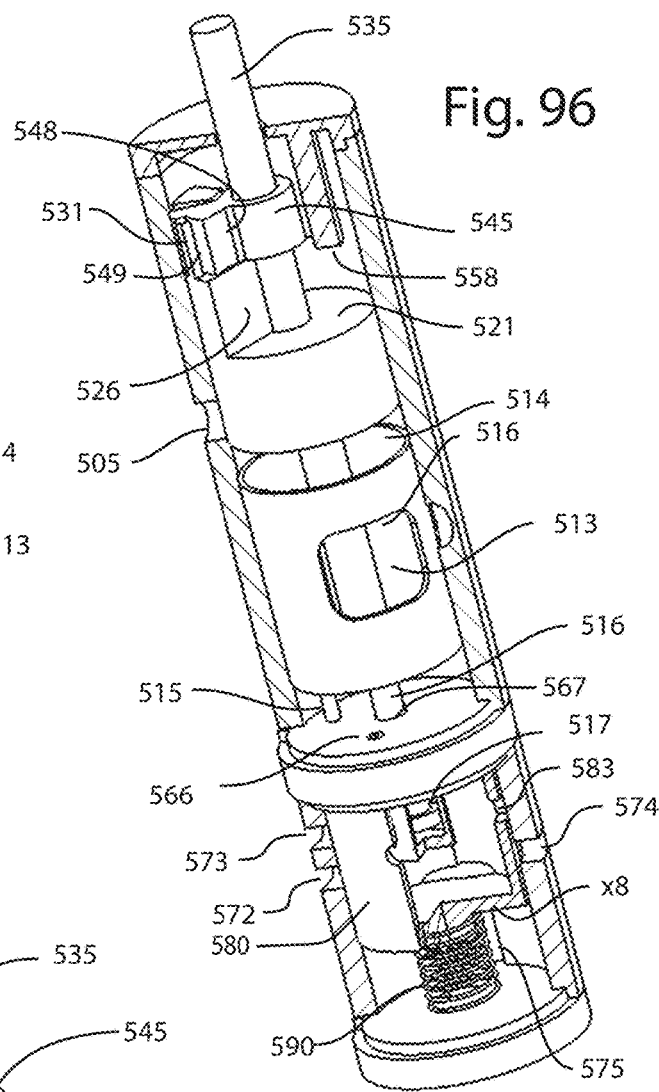
FIG. 96 is a cutaway axonometric view of the embodiment of FIG. 88 showing the valve cartridge in the normal rotational range.

FIG. 88 is an exploded axonometric view of this embodiment, while FIG. 96 is a cutaway axonometric view of this embodiment in an assembled state. As shown in these figures, the flow switching module 500 includes a mixing valve assembly 501, a preheat assembly 570, and a partition 565 separating the two assemblies. During the normal mode of operation, the mixing valve assembly 501 functions in the same manner as a conventional mixing valve to adjust the temperature and the flow rate of water supplied to the discharge opening of an unillustrated plumbing fixture. In the same manner as in the previous embodiment, the preheat assembly 570 directs hot water from a source of hot water either to the mixing valve assembly 501 or back to the source of hot water. When the module 500 is in the normal mode of operation, water from a source of hot water passes through the preheat assembly 570 before being supplied to the mixing valve assembly 501, and when the module 500 is in the preheat mode of operation, the preheat assembly 570 diverts water from the source of hot water to a return passage instead of supplying the hot water to the plumbing fixture.

As is the case with respect to the preceding embodiments, although the flow switching module 500 is illustrated in FIG. 88 as being vertically disposed, it may have any desired orientation with respect to the vertical.

As shown in FIG. 88, the mixing valve assembly 501 includes a valve casing 502, a valve cartridge 510 which is movably disposed inside the valve casing 502 so as to be able to translate with respect to the valve casing 502 in the longitudinal direction of the valve casing 502 and rotate inside the valve casing 502 around the longitudinal axis of the valve casing 502, and an upper end cap 555 which closes off the upper end of the valve casing 502.

FIG. 92 is an axonometric view of the valve casing 502. As shown in this figure, the valve casing 502 is a hollow cylindrical member which is open at both ends and which has a hot water supply port 503, a cold water supply port 504, and one or more water delivery ports 505 formed through the wall of the valve casing 502 between its inner and outer surfaces. The upper end of the valve casing 502 is closed off by the upper end cap 555, while the lower end of the valve casing 502 is closed off by the partition 565.

The partition 565 is a disk-shaped member which separates the mixing valve assembly 501 and the preheat assembly 570 from each other. In the present embodiment, it is formed separately from both the mixing valve assembly 501 and the preheat assembly 570, but it is also possible for the partition 565 to be integrally formed with one or both of the two assemblies. It includes a first through hole 566 which extends between the upper and lower surfaces of the partition 565 and which is offset from the rotational axis of the valve cartridge 510.

As shown in FIGS. 93 and 94, which are axonometric views of the valve cartridge 510, the valve cartridge 510 includes an upper portion 520, a lower portion 511 separated from the upper portion 520 by a gap 514, and a shaft 535 (referred to below as a mixing shaft) which is secured to one or both of the upper and lower portions 520 and 511. The upper and lower portions 520 and 511 are secured to each other and/or to the mixing shaft 535 such that the upper and lower portions can be translated and rotated as a single unit with respect to the valve casing 502 when the mixing shaft 535 is translated or rotated. Although not shown in the drawings, a manual control member such as a knob or a lever is typically secured to the upper end of the mixing shaft 535 to enable a user to translate and rotate the valve cartridge 510 by hand.

The lower portion 511 of the valve cartridge 510 performs essentially the same function as the mixing core of the valve cartridge of the previous embodiment and adjusts the ratio or hot water to cold water which is discharged from the mixing valve assembly 501. The upper portion 520 of the valve cartridge 510 controls the flow rate of water discharged from the mixing valve assembly 501 as well as cooperates with the upper end cap 555 to limit translation and rotation of the valve cartridge 510 with respect to the valve casing 502.

As shown in FIG. 94, the lower portion 511 of the valve cartridge 510 comprises a tubular mixing core 512 which is open at its upper end and closed off at its lower end by a bottom surface which is secured to the lower end of the mixing core 512. The lower portion 511 includes an inlet 513 which extends through the wall of the mixing core 512 between its inner and outer surfaces. Water which enters the lower portion 511 through the inlet 513 can flow through the open upper end of the lower portion 511 and then leave the valve cartridge 510 through the gap 514 between the upper and lower portions. In the present embodiment, the mixing shaft 535 extends over the entire length of the lower portion 511, but it may extend for a shorter distance and be secured to the lower portion 511 in a different manner. For example, the mixing shaft 535 can be secured to the lower portion 511 by a plurality of spokes between which water can flow in the lengthwise direction of the valve cartridge 510.

The lower portion 511 of the valve cartridge 510 further includes a projection such as a pin 515 which extends downwards from the bottom surface of the lower portion 511 towards the partition 565. The pin 515 is radially offset with respect to the rotational axis of the valve cartridge 510. The diameter of the pin 515 is selected such that the pin 515 is capable of being inserted into the first through hole 566 in the partition 565 when aligned with the first through hole 566.

Figure 95:
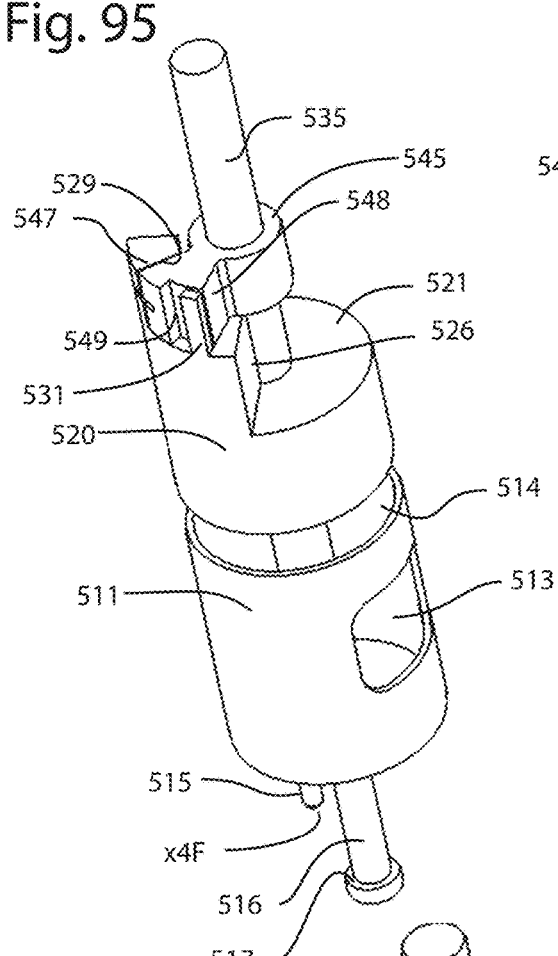
FIG. 95 is an axonometric view of the valve cartridge of FIG. 88 with the collar in a rotational position corresponding to the preheat rotational range of the valve cartridge.
Figure 97:
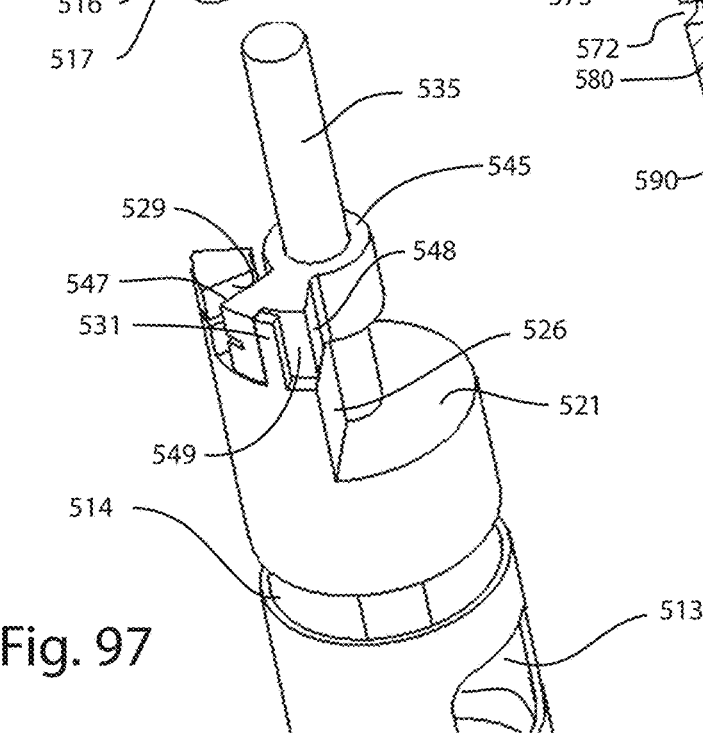
FIG. 97 is an axonometric view of the upper portion of the valve cartridge of the embodiment of FIG. 88 with the collar in a rotational position corresponding to the normal rotational range of the valve cartridge.

FIGS. 95 and 97 are axonometric views of the upper portion 520 of the valve cartridge 510 as seen from different angles. The upper portion 520 of the valve cartridge 510 includes a first level or base 521 having a cylindrical outer surface which opposes the cylindrical inner surface of the valve casing 502. A second level 523 which is generally wedge-shaped as viewed in plan projects upwards from the top surface 522 of the first level 521. The second level 523 includes a top surface 524, a first lateral surface 525 which extends inwards 525, such as radially, from the outer periphery of the second level 523 towards the radial center of the upper portion 520, and a second lateral surface 526 which is spaced from the first lateral surface 525 in the circumferential direction of the second level 523 and which extends inwards, such as radially, from the outer periphery of the second level 523 towards the radial center of the upper portion 520. The mixing shaft 535 also extends upwards from the first level 521 in the longitudinal direction of the valve casing 502. The first lateral 525 surface of the second level 523 functions as a cold stop surface for limiting rotation of valve cartridge 510 in the clockwise direction, while the second lateral surface 526 of the second level 523 functions as a hot stop surface for limiting rotation of valve cartridge 510 in the counterclockwise direction.

The upper portion 520 further includes a first projection 527 and a second projection 531 which each project upwards from the top surface 524 of the second level 523. The first projection 527 has a first lateral surface 528 and a second lateral surface 529 which each extend inwards, such as radially, from the outer periphery of the second level 523 towards the radial center of the upper portion 520. The first lateral surface 528 of the first projection 527 is flush with the first lateral surface 525 of the second level 523 and also serves as a cold stop surface for limiting rotation of the valve cartridge 510 in the clockwise direction, while the second lateral surface 529 of the first projection 527 serves as a preheat stop surface for limiting rotation of the valve cartridge 510 in the counterclockwise direction during the preheat mode of operation. The second projection 531 serves as a stop for limiting rotation of a below-described collar 545 of the valve cartridge 510 about the axis of the valve cartridge 510. The radially inner end of the second level 523 may extend all the way to the mixing shaft 535, but the radially inner end of the first projection 527 is spaced from the outer surface of the mixing shaft 535.

The mixing valve assembly 501 may include a biasing member for resisting rotation of the valve cartridge 510 from the normal rotational range to the preheat rotational range and returning the valve cartridge 510 to the normal rotational range at the completion of the preheat mode of operation. In the present embodiment, the biasing member operates in conjunction with a collar 545 of the valve cartridge 510 and which is supported by the collar 545.

FIGS. 90 and 91 are axonometric views of the collar 545 as seen from different angles. As shown in these figures, the collar 545 has generally the shape of a keyhole as viewed in plan and is rotatably mounted on the mixing shaft 535. The collar 545 has a through hole 546 which fits around the mixing shaft 535 sufficiently loosely that the collar 545 can rotate with respect to the mixing shaft 535. The collar 545 translates together with the rest of the valve cartridge 510 as the valve cartridge 510 translates in the longitudinal direction without the collar 545 translating with respect to the other portions of the valve cartridge 510. For example, the bottom surface of the collar 545 may rest atop the second level 523 of the upper portion 520 of the valve cartridge 510. The collar 545 may be prevented from translating with respect to the upper portion 520 of the valve cartridge 510 in the lengthwise direction of the mixing shaft 535 by engagement between the torsion spring 540 and the collar 545. Alternatively, other suitable structure, such as an unillustrated circlip mounted on the mixing shaft 535 above the collar 545, can be employed to prevent the collar 545 from translating with respect to the mixing shaft 535. The collar 545 includes a first lateral surface 547 and a second lateral surface 548 which each extend generally radially from the outer periphery of the collar 545 towards its center. The first lateral surface 547 opposes the second lateral surface 529 of the first projection 527 of the valve cartridge 510, and the second lateral surface 548 of the collar 545 opposes the second lateral surface 560 of the wall 557 of the upper end cap 555 when the valve cartridge 510 is rotated to a full hot position. A cutout 549 adjoining the second lateral surface 548 is formed in the outer peripheral surface of the collar 545 for receiving the second projection 531 of the upper portion 520 of the valve cartridge 510.

As shown in FIG. 88, the biasing member in the present embodiment comprises a hairpin-shaped torsion spring 540 having a bight 541 with a diameter large enough for the bight 541 to pass loosely over the mixing shaft 535 and two legs 542 and 543 which extend radially from the bight 541. The bight 541 extends partway around the circumference of the mixing shaft 535 with one leg 542 of the torsion spring 540 disposed in a groove 530 formed in the second lateral surface 529 of the first projection 527 of the upper portion 520 of the valve cartridge 510 and with the other leg 543 of the torsion spring 540 disposed in another groove 551 formed in the first lateral surface 547 of the collar 545. The groove 551 formed in the first lateral surface 547 of the collar 545 extends around the through hole 546 in the collar 545 to enable the bight 541 to be inserted into the collar 545 to a position in which the mixing shaft 535 can extend through the bight 541.

When the torsion spring 540 is deformed from a relaxed (undeformed) state such that the two legs 542 and 543 of the torsion spring 540 are pushed towards each other, the torsion spring 540 applies a torque to the collar 545 which urges the collar 545 to rotate in the counterclockwise direction around the axis of the mixing shaft 535 away from the first projection 527 of the valve cartridge 510. The amount by which the collar 545 is able to rotate in the counterclockwise direction is limited by the second projection 531. The collar 545 can rotate in the counterclockwise direction only until the inner end surface 550 of the cutout 549 in the collar 545 contacts the second projection 531 of the cartridge 510. When the inner end surface 550 of the cutout 549 contacts the second projection 531 of the cartridge 510, the second lateral surface 548 of the collar 545 is substantially flush with the second lateral surface 526 of the second level 523 of the valve cartridge 510. At this time, the torsion spring 540 may be in a relaxed state, but preferably it is in a compressed state in which the legs 542 and 543 of the torsion spring 540 are squeezed between the first projection 527 of the valve cartridge 510 and the collar 545 so that the torsion spring 540 presses the inner end surface of the cutout 549 in the collar 545 firmly against the second projection 531 of the valve cartridge 510.

The valve cartridge 510 has a normal rotational range within which it can rotate in the valve cartridge 510 during the normal mode of operation and a preheat rotational range which it assumes during the preheat mode. Between the normal rotational range and the preheat rotational range, the valve cartridge 510 may also have an intermediate rotational range through which it passes when switching between the normal mode and the preheat mode of operation. The normal rotational range includes a full cold rotational range in which water can enter the valve cartridge 510 from the cold water supply port 504 of the valve casing 502 but not from the hot water supply port 503, a full hot rotational range in which water can enter the valve cartridge 510 from the hot water supply port 503 of the valve casing 502 but not from the cold water supply port 504, and an intermediate rotational range in which water can enter the valve cartridge 510 from both the hot water supply port 503 and the cold water supply port 504 and be mixed in a ratio determined by the rotational position of the valve cartridge 510 with respect to the valve casing 502. The full cold rotational range includes a full cold position which is the farthest position in the cold direction to which the valve cartridge 510 can be rotated when in the normal rotational range, and the full hot rotational range includes a full hot position which is the farthest position in the hot direction to which the valve cartridge 510 can be rotated when in the normal rotational range.

The valve cartridge 510 has at least one lowered or off position and at least one raised or on position in the longitudinal direction of the valve casing 502. When the valve cartridge 510 is in a lowered (off) position, the radially inner ends of the water delivery ports 505 are blocked by the peripheral surface of the first level 521 of the upper portion 520 of the valve cartridge 510, so water is prevented from being discharged from the mixing valve assembly 501 through the water delivery ports 505. When the valve cartridge 510 is in a raised (on) position, the lower level of the upper portion 520 of the valve cartridge 510 is raised to a level in which the radially inner ends of the water delivery ports 505 are partially or fully open to allow water to be discharged from the water delivery ports 505. The rate of discharge varies with the position of the valve cartridge 510 in the longitudinal direction. The valve cartridge 510 also has a preheat position in the longitudinal direction of the valve casing 502 to which it can be translated when in the preheat rotational range. The valve cartridge 510 is in its preheat position in the longitudinal direction during the preheat mode of operation.

FIG. 89 is an axonometric view of the upper end cap 555. As shown in this figure, the upper end cap 555 is a generally disk-shaped member which closes off the upper end of the valve casing 502 in order to prevent foreign matter from entering the mixing valve assembly 501 and possibly to prevent fluids from leading out of the upper end of the valve casing 502. The upper end cap 555 may be detachably or permanently attached to the upper end of the valve casing 502. A through hole 556 which the mixing shaft 535 can pass while being able to translate and rotate with respect to the upper end cap 555 is formed in the center of the upper end cap 555. When it is desired to prevent liquids from leaking to the exterior of the valve casing 502 along the mixing shaft 535, a sealing member may be disposed around the mixing shaft 535 at the through hole 556.

In this embodiment, the upper end cap 555 is used to close off the upper end of the valve casing 502. However, as an alternative to an upper end cap 555, the valve casing 502 may have an upper end wall which is integrally formed with the peripheral wall of the valve casing 502 and which closes off the upper end of the valve casing 502.

The mixing valve assembly 501 includes stationary rotation limiting surfaces (also referred to as stop surfaces) which cooperate with the movable hot and cold stop surfaces of the valve cartridge 510 to limit the rotation of the valve cartridge 510 within the valve casing 502 to prescribed rotational ranges. The stationary rotation limiting surfaces can be provided on any stationary portion of the mixing valve assembly 501. In the present embodiment, the stationary rotation limiting surfaces are provided on the upper end cap 555, but alternatively all or a portion of the stationary rotation limiting surfaces can be provided on the valve casing 502. As shown in FIG. 89, in this embodiment, the upper end cap 555 includes an arcuate wall 557 which projects downwards from the upper end of the upper end cap 555 into the interior of the valve casing 502 in the longitudinal direction of the valve casing 502. The wall 557 extends along an arc partway around the circumference of the upper end cap 555. The wall 557 may be spaced by a gap from the inner peripheral surface of the valve casing 502 along at least a portion of its circumference to enable the second projection 531 of the valve cartridge 510 to pass between the wall 557 and the inner peripheral surface of the valve casing 502. The wall 557 has a first lateral surface 559 and a second lateral surface 560 at opposite ends of the wall 557 in the circumferential direction which respectively define rotation limiting surfaces in the form of a cold stop surface and a hot stop surface. The first lateral surface 559 of the upper end cap 555 lies along a path of movement of the first lateral surfaces 525 and 528 of the valve cartridge 510 as the valve cartridge 510 rotates about its axis within the valve casing 502 when the valve cartridge 510 is in either an on position or an off position in the longitudinal direction. The second lateral surface 560 of the upper end cap 555 lies along a path of movement of the second lateral surface 526 of the second level 523 of the valve cartridge 510 as the valve cartridge 510 rotates about its axis within the valve casing 502 when the valve cartridge 510 is in an on position in the longitudinal direction. However, when the valve cartridge 510 is in an off position in the longitudinal direction, the lower end of the second lateral surface 560 of the upper end cap 555 is located above the path of movement of the second lateral surface 526 of the valve cartridge 510.

FIGS. 98, 101, 103, and 115 illustrate how the movable stop surfaces of the valve cartridge 510 cooperate with the stationary stop surfaces of the upper end cap 555 in various rotational positions of the valve cartridge 510 to limit rotation of the valve cartridge 510. These figures are cutaway axonometric views of the upper end of the module 500 taken from various angles. For ease of illustration, only the outline of the valve casing 502 is shown in these figures.

FIG. 98 illustrates a state in which the valve cartridge 510 is in an off position in the longitudinal direction of the module 500 and is in a full cold rotational position. In this state, the first lateral surfaces 527 and 528 of the valve cartridge 510 contact the first lateral surface 559 of the upper end cap 555. The contact between these surfaces prevents the valve cartridge 510 from being further rotated in the clockwise direction past the full cold rotational position. The first lateral surface 525 of the valve cartridge 510 also contacts the first lateral surface 559 of the upper end cap 555 when the valve cartridge 510 is in an on position in the longitudinal direction and in the full cold rotational position. FIG. 99 is a cross-sectional elevation of the module 500 when the valve cartridge 510 is in the state shown in FIG. 98, and FIG. 100 is a cross-sectional elevation of the module 500 when the valve cartridge 500 is in the full cold rotational position but in an on position in the longitudinal direction.

Figure 101:
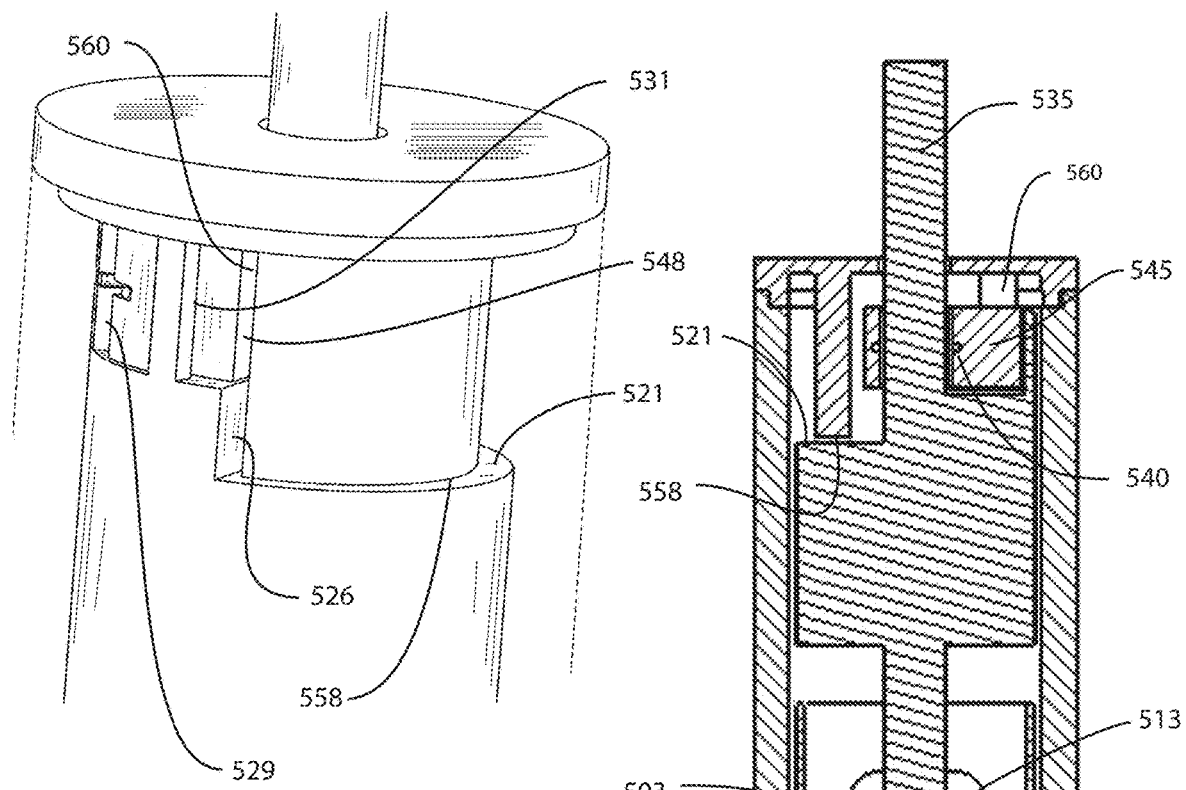
FIG. 101 is a schematic axonometric view of the upper portion of the embodiment of FIG. 88 when the valve cartridge is in an on position in the longitudinal direction and in the full hot rotational position with the valve casing shown in outline.
Figure 102:
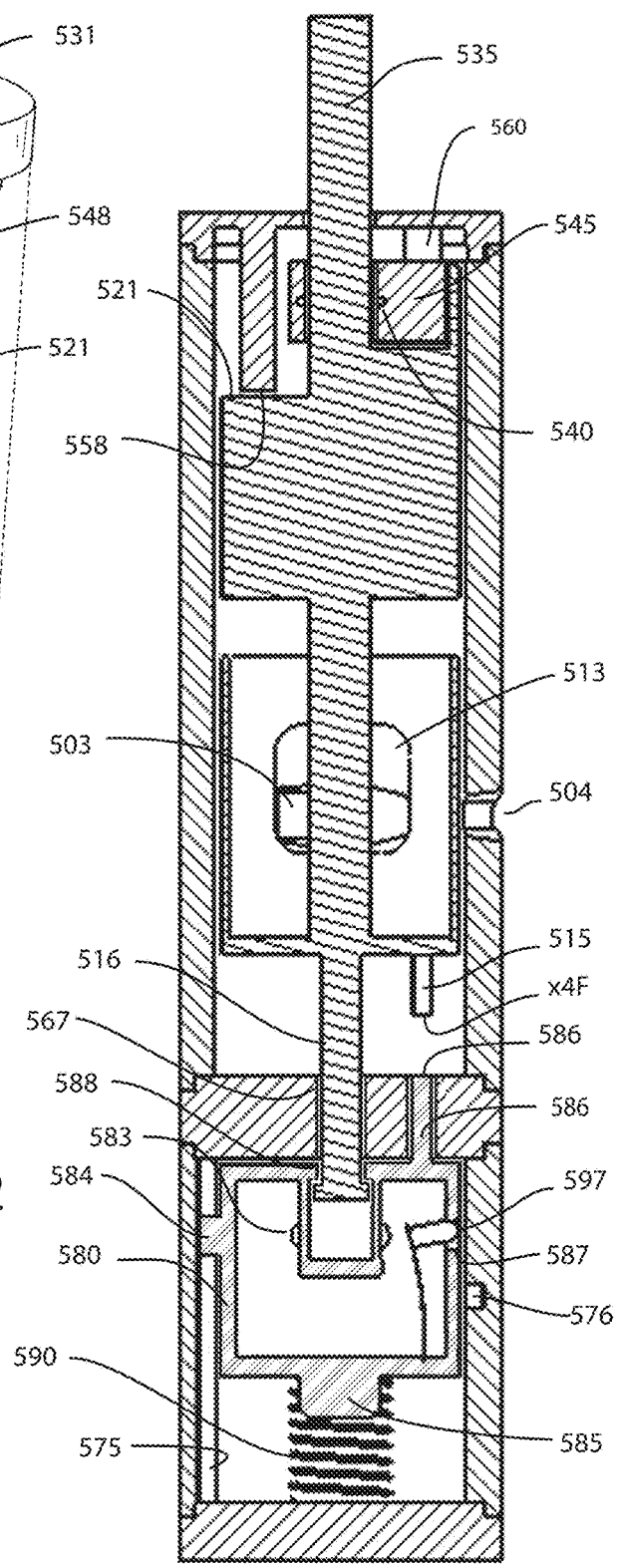
FIG. 102 is a cross-sectional elevation of the embodiment of FIG. 88 when the valve cartridge is in an on position in the longitudinal direction and in the full hot rotational position.

FIG. 101 illustrates a state in which the valve cartridge 510 is in an on position in the longitudinal direction of the module 500 and in a full hot rotational position. At this time, the second lateral surface 526 of the valve cartridge 510 contacts the second lateral surface 560 of the upper end cap 555, so the valve cartridge 510 is prevented from being further rotated in the counterclockwise direction past the full hot rotational position. FIG. 102 is a cross-sectional elevation of the module 500 when the valve cartridge 500 is in the state shown in FIG. 101.

Figure 103:
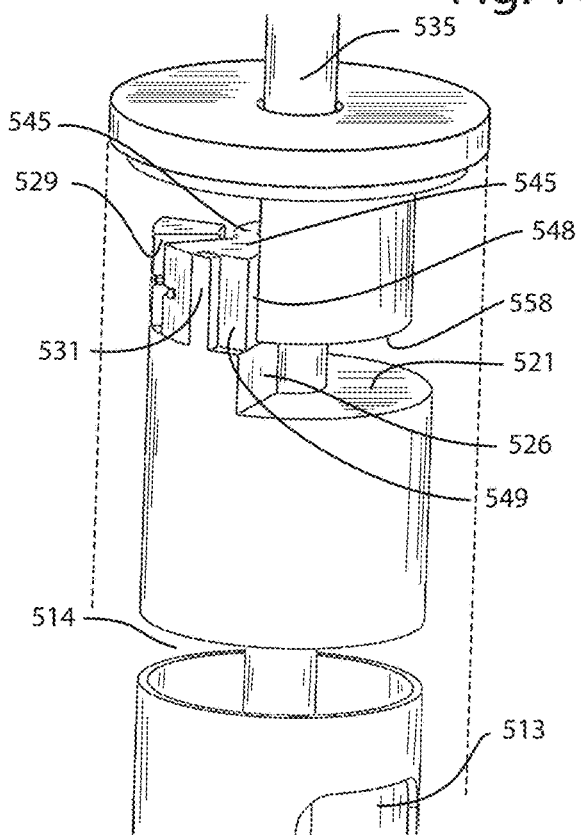
FIG. 103 is a schematic axonometric view of the upper portion of the embodiment of FIG. 88 when the valve cartridge is in an off position in the longitudinal direction and in the full hot rotational position with the valve casing shown in outline.
Figure 104A:
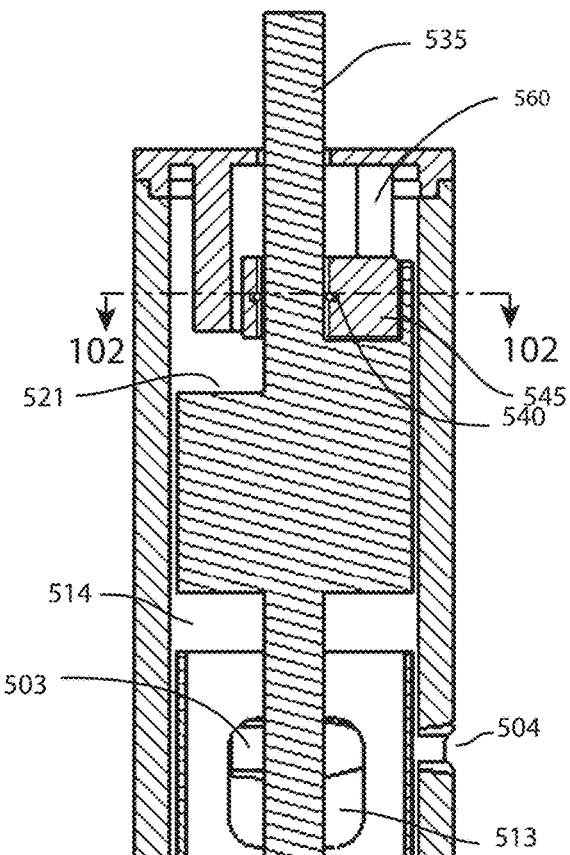
FIG. 104A is a cross-sectional elevation of the embodiment of FIG. 88 when the valve cartridge is in an off position in the longitudinal direction and in the full hot rotational position.

FIG. 103 illustrates the module 500 when the valve cartridge 510 has been moved downwards from the position shown in FIG. 101 to an off position in the longitudinal direction of the module 500 and is in the full hot rotational position. When the valve cartridge 510 is in an off position in the longitudinal direction of the module 500, the second lateral surface 526 of the valve cartridge 510 is disposed below the lower end of the second lateral surface 560 of the upper end cap 555. As a result, the second lateral surface 560 of the upper end cap 555 does not contact the second lateral surface 526 of the valve cartridge 510 and does not prevent counterclockwise rotation of the valve cartridge 510 past the full hot position. Instead, at this time, the second lateral surface 560 of the upper end cap 555 contacts or is in close proximity to the second lateral surface 548 of the collar 545 of the valve cartridge 510. If the user rotates the valve cartridge 510 further in the counterclockwise direction past the full hot rotational position, the torsion spring 540 applies a clockwise torque to the valve cartridge 510 to resist the counterclockwise torque being applied by the user. The torque exerted by the torsion spring 540 provides the user with a tactile clue that he has reached the full hot rotational position. FIG. 104A is a cross-sectional elevation of the module 500 when the valve cartridge 510 is in the state shown in FIG. 103.

Figure 115:
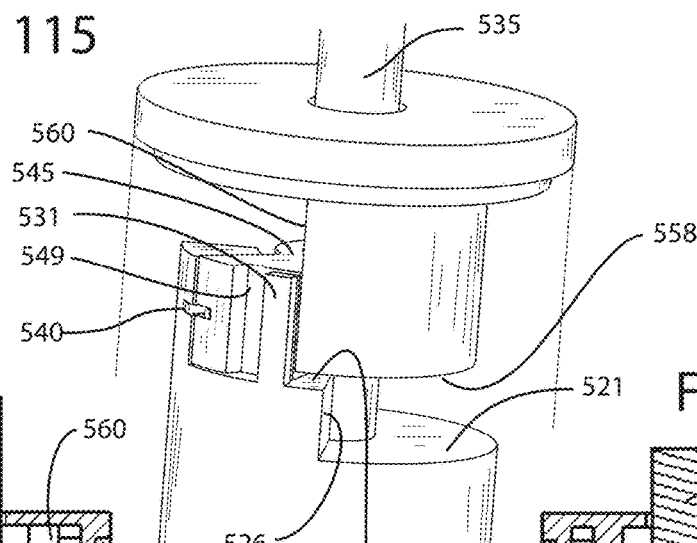
FIG. 115 is a schematic axonometric view of the upper portion of the embodiment of FIG. 88 when the valve cartridge is in an off position in the longitudinal direction and in the preheat rotational range with the valve casing shown in outline.
Figure 116:
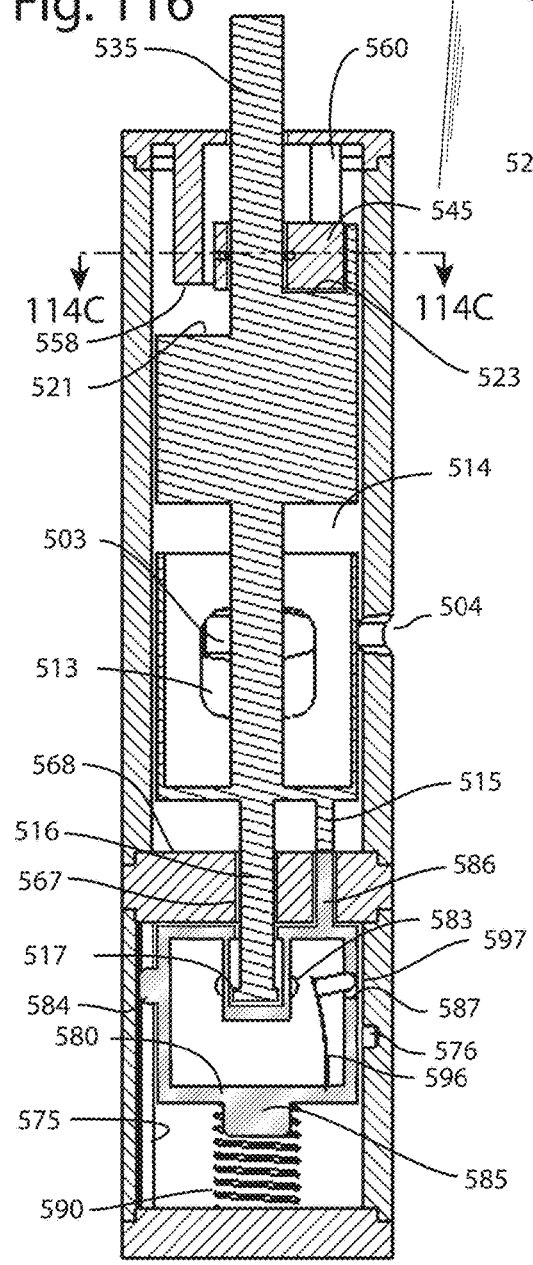
FIG. 116 is a cross-sectional elevation of the embodiment of FIG. 88 when the valve cartridge is in an off position and in the preheat rotational range.

FIG. 115 illustrates the state when the valve cartridge 510 is in an off position in the longitudinal direction of the module 500 and the valve cartridge 510 has been rotated in the counterclockwise direction from the full hot position shown in FIG. 103 to the preheat rotational range. In this view, the first lateral surface 547 of the collar 545 is contacting the second lateral surface 529 of the first projection 527 of the valve cartridge 510, and the second lateral surface 548 of the collar 545 is contacting the second lateral surface 560 of the upper end cap 555. As a result, the valve cartridge 510 is prevented from further rotation in the counterclockwise direction. FIG. 116 is a cross-sectional elevation of the module 500 when the valve cartridge 510 is in the position shown in FIG. 115.

Figure 118C:
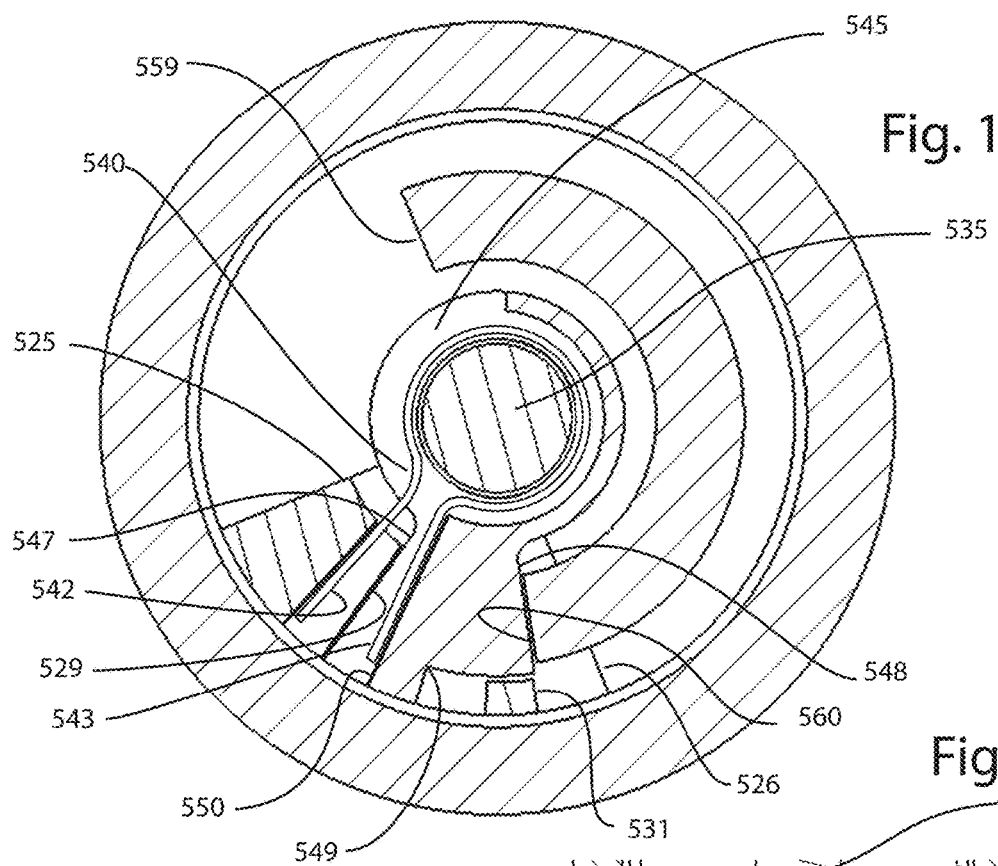

FIG. 118A is a cutaway axonometric view of the lower end of the valve cartridge 510 when the valve cartridge 510 is in an off position in the longitudinal direction and is in a rotational position outside of the preheat rotational range. When the rotational position of the valve cartridge 510 is outside of the preheat rotational range, such as when it is in the normal rotational range, the pin 515 at the lower end of the valve cartridge 510 is offset in the circumferential direction of the valve casing 502 from the first through hole 566 in the partition 565 by an amount such that if a downwards force is applied to the valve cartridge 510, the lower end of the pin 515 will abut against the top surface of the partition 565, and the valve cartridge 510 will be prevented from translating to a preheat position by contact between the pin 515 and the top surface of the partition 565.

FIG. 118B is a cutaway axonometric view similar to FIG. 118A but showing the lower end of the valve cartridge 510 when the valve cartridge 510 is in an off position in the longitudinal direction and is in a rotational position within the preheat rotational range. At this time, the pin 515 at the lower end of the valve cartridge 510 is disposed above the first through hole 566 in the partition 565 and is sufficiently aligned with the first through hole 566 that if a downwards force is applied to the valve cartridge 510, the pin 515 can be inserted into the first through hole 566 and the valve cartridge 510 can move downwards from an off position in the longitudinal direction to a preheat position. The lower end of the pin 515 or the upper end of the first through hole 566 may be beveled to enable the pin 515 to still be inserted into the first through hole 566 when the pin 515 is just slightly misaligned with respect to the first through hole 566.

Figure 104B:
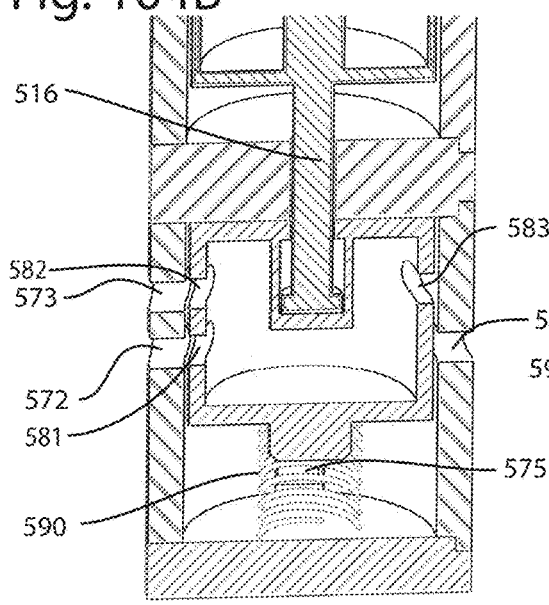
FIG. 104B is a cutaway axonometric view of the preheat assembly of the embodiment of FIG. 88.
Figure 117A:
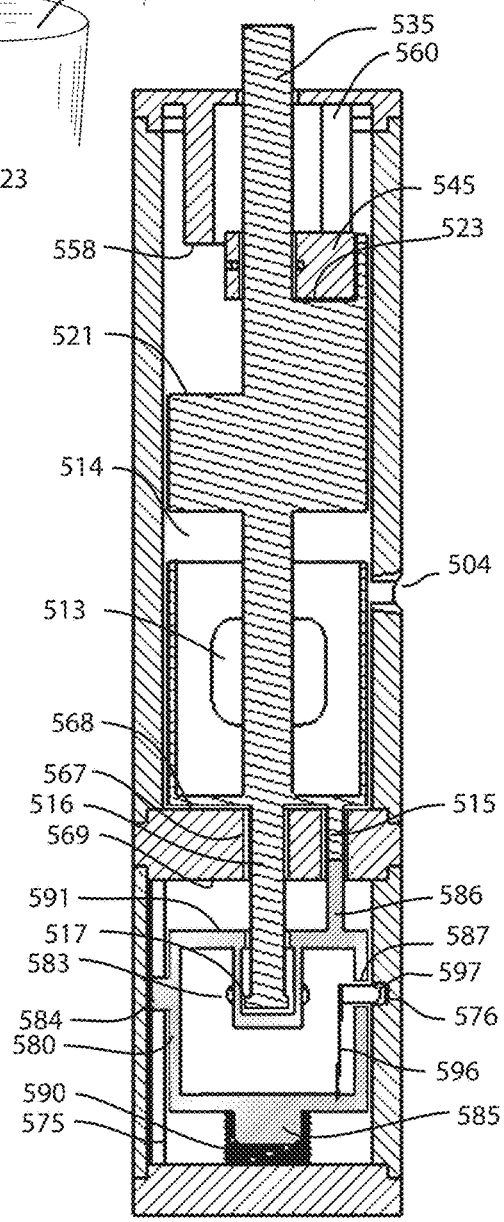
FIG. 117A is a cross-sectional elevation of the embodiment of FIG. 88 when the valve cartridge is the preheat rotational range and in a preheat position in the longitudinal direction.

FIGS. 104B and 117B are cutaway axonometric views of the preheat assembly 570. Like the preheat assembly in the previous embodiment, the preheat assembly 570 in this embodiment includes a hollow preheat casing 571 and a hollow preheat core 580 which is movably disposed inside the preheat casing 571 for reciprocation with respect to the preheat casing 571 in the longitudinal direction of the preheat casing 571. The preheat assembly 570 also includes a lower end cap 577 which closes off the lower end of the preheat casing 571.

As in the previous embodiment, the preheat casing 571 and the preheat core 580 in this embodiment can have any cross-sectional shapes which enable the preheat core 580 to reciprocate within the preheat casing 571 in the longitudinal direction of the preheat casing 571. For example, in the present embodiment, both the preheat casing 571 and the preheat core 580 have a cylindrical peripheral wall.

In the present embodiment, the valve casing 502, the preheat casing 571, and the partition 565 are formed as separate members. However, it is possible for the partition 565 to be integrally formed with one or both of the valve casing 502 and the preheat casing 571. Similarly, it is possible to omit the lower end cap 577 and to form the preheat casing 571 with a bottom surface which is integrally formed with the peripheral wall of the preheat casing 571 and closes off the lower end of the preheat casing 571.

As shown in FIGS. 104B and 117B, like the preheat casing 571 in the previous embodiment, the preheat casing 571 in this embodiment includes a hot water supply port 572, a water delivery port 573, and a return port 574 which are formed in and extend through the peripheral wall of the preheat casing 571 between its inner and outer surfaces. The hot water supply port 572 is fluidly connected by an unillustrated hot water supply passage to a source of hot water such as a hot water heater. The water delivery port 573 is connected by an unillustrated passage to the hot water supply port 503 of the valve casing 502 of the mixing valve assembly 501. The return port 574 is connected to an unillustrated return passage which returns water to the hot water heater when the flow switching module 500 is in the preheat mode of operation.

The preheat core 580 in this embodiment may be similar to the preheat core in the previous embodiment. As shown in FIGS. 104B and 117B, it includes a first port 581, a second port 582, and a third port 583 each extending through the wall of the preheat core 580 between its inner and outer surfaces. For ease of manufacture and assembly of the module 500, the preheat core 580 may comprise multiple sections which can be secured to each other either detachably or permanently in a liquid-tight manner. For example, as shown in FIG. 88, in the present embodiment, the preheat core 580 comprises two semi-cylindrical half-shells which are secured to each other in a liquid-tight manner.

As in the previous embodiment, the preheat core 580 has at least one lowered and at least one raised position in the longitudinal direction of the preheat assembly 570. In contrast to the preheat core 580 in the previous embodiment, a raised position in this embodiment is a normal position which the preheat core 580 assumes during the normal mode of operation, and a lowered position is a preheat position which the preheat core 580 assumes during the preheat mode of operation. FIG. 104B shows the preheat core 580 in a raised (normal) position. When the preheat core 580 is in a raised (normal) position, the first port 581 of the preheat core 580 fluidly communicates with the hot water supply port 572 of the preheat casing 571, the second port 582 of the preheat core 580 fluidly communicates with the water delivery port 573 of the preheat casing 571, and the third port 583 of the preheat core 580 is blocked by the inner surface of the preheat casing 571.

On the other hand, as shown in FIG. 117B, when the preheat core 580 is in a lowered (preheat) position, the first port 581 of the preheat core 580 is blocked by the inner surface of the preheat casing 571, the second port 582 of the preheat core 580 fluidly communicates with the hot water supply port 572 of the preheat casing 571, and the third port 583 of the preheat core 580 fluidly communicates with the return port 574 of the preheat casing 571.

During the normal mode of operation in which the preheat core 580 is in a raised (normal) position, hot water from the source of hot water enters the preheat assembly 570 through the hot water supply port 572 of the preheat casing 571 and the first port 581 of the preheat core 580, flows through the interior of the preheat core 580, and then is supplied to the hot water supply port 503 of the mixing valve assembly 501 through the second port 582 of the preheat core 580 and the water delivery port 573 of the preheat casing 571. During the preheat mode of operation in which the preheat core 580 is in a lowered (preheat) position, hot water from the source of hot water enters the preheat assembly 570 through the hot water supply port 572 of the preheat casing 571 and the second port 582 of the preheat core 580, flows through the interior of the preheat core 580, and then is diverted to a return passage through the third port 583 of the preheat core 580 and the return port 574 of the preheat casing 571.

The preheat assembly 570 further includes a biasing member for biasing the preheat core 580 towards a raised (normal) position. As shown in FIGS. 104B and 117B, in the present embodiment, the biasing member comprises a biasing spring, such as a helical compression spring 590 disposed between the lower exterior surface of the preheat core 580 and the upper surface of the lower end cap 577. In the absence of a force holding the preheat core 580 in a lowered (preheat) position, the compression spring 590 presses the preheat core 580 upwards within the preheat casing 571 until the upper end of the preheat core 580 contacts the upper inner surface of the preheat casing 571. However, the compression spring 590 may be sized to move the preheat core 580 upwards by a shorter distance as long as the preheat core 580 can be moved by the compression spring 590 to a raised (normal) position. A positioning member may be provided on one or both of the preheat core 580 and the lower end cap 577 to maintain the compression spring 590 in a desired location. For example, in the present embodiment, a short cylindrical projection 585 for positioning the compression spring 590 extends downwards from the bottom surface of the preheat core 580 into the interior of the compression spring 590.

Figure 120:
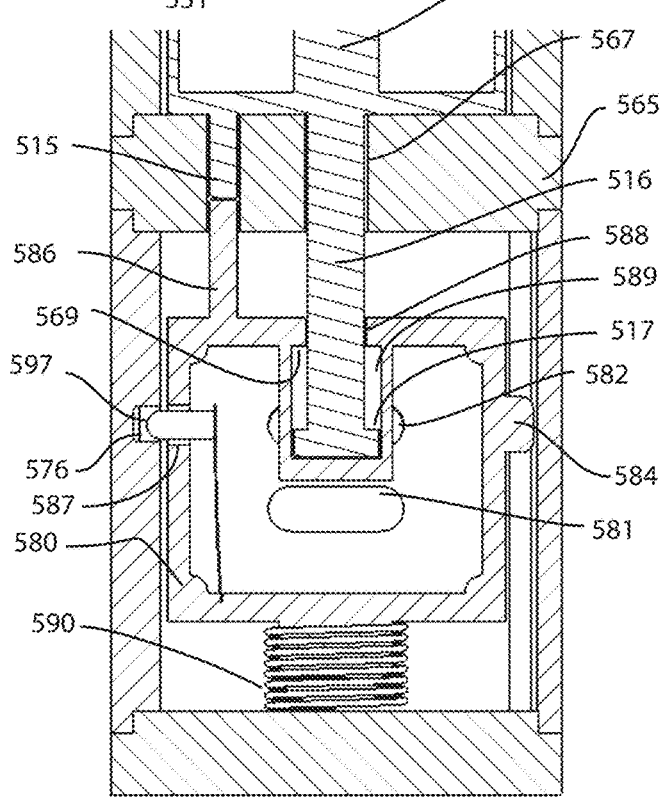

As in the previous embodiment, the preheat assembly 570 may include a guide structure for guiding the preheat core 580 as it reciprocates within the preheat casing 571 between a raised (normal) position and a lowered (preheat) position so as to prevent misalignment between the ports of the preheat core 580 and the corresponding ports of the preheat casing 571. For example, as shown in FIG. 120, which is a cross-sectional elevation of the preheat assembly 570 taken along the same cutting plane as FIG. 104A, in the same manner as in the preceding embodiment, an elongated linear groove 575 which extends in the longitudinal direction of the preheat casing 571 is formed on the interior of the preheat casing 571, and a tab 584 which extends into and slidably engages the groove 575 is formed on the exterior of the preheat core 580 to guide the preheat core 580 as it reciprocates within the preheat casing 571. As is the case with respect to the previous embodiment, a guide structure may be omitted if the preheat casing 571 and the preheat core 580 have non-cylindrical shapes, such as oval or elliptical shapes, which prevent their relative rotation. In addition, as is the case with respect to the previous embodiment, it is not necessary for the preheat core 580 to translate along a linear path between its raised (normal) and lowered (preheat) positions.

As shown in FIG. 120, a projection such as a pin 586 extends upwards from the top surface of the preheat core 580 in alignment with the first through hole 566 in the partition 565. The pin 586 has a size such that it can be inserted from below into the first through hole 566 and translate within the hole under the upwards force exerted on the preheat core 580 by the biasing spring until the upper end of the pin 586 is flush or close to flush with the top surface of the partition 565 when the preheat core 580 is in a raised (normal) position. A portion of the pin 586 may remain in the first through hole 566 when the preheat core 580 is in a lowered (preheat) position, or the upper end of the pin 586 may be disposed below the lower end of the first through hole 566 when the preheat core 580 is in a lowered (preheat) position.

As in the previous embodiment, the preheat assembly 570 may be equipped with a thermal detent mechanism 595 for releasably holding the preheat core 580 in a lowered (preheat) position when the temperature of water inside the preheat core 580 is below a predetermined set-point temperature. The thermal detent mechanism 595 is not limited to any particular type. For example, it may have a structure similar to that of the thermal detent mechanisms employed in any of the preceding embodiments. In this embodiment, the thermal detent mechanism 595 is similar in structure to the thermal detent mechanism 160 shown in FIGS. 14 and 15. As shown in FIG. 120, the thermal detent mechanism 595 in this embodiment includes a temperature sensitive actuator in the form of a leaf spring 596 which is made of a bimetallic strip and which is disposed inside the preheat core 580 where it is exposed to water flowing through the preheat core 580. A first end of the leaf spring 596 is secured to a suitable location on the interior of the preheat core 580, such as to the bottom inner surface of the preheat core 580, while a second end of the leaf spring 596 is disposed in the vicinity of a through hole 587 formed in the wall of the preheat core 580. A detent member 597 such as a pin, a detent ball, a projection, or the like is mounted on the second end of the leaf spring 596. The detent member 597 can pass through the through hole 587 in the wall of the preheat core 580. A recess 576 for receiving the radially outer end of the detent member 597 is formed in the inner wall of the preheat casing 571. When the preheat core 580 is in a lowered (preheat) position, the through hole 587 in the preheat core 580 overlaps the recess 576 in the preheat casing 571 such that the detent member 597 can be inserted into the recess 576 to detachably hold the preheat core 580 in a lowered (preheat) position against the biasing force applied by the compression spring 590. As is the case with respect to the preceding embodiments, the shape of the radially outer end of the detent member 597 of the thermal detent mechanism 595 and the shape of the recess 576 in the preheat casing 571 which is engaged by the detent member 597 are preferably selected such that the user can disengage the detent member 597 from the recess 576 when desired by applying an upwards force on the preheat core 580.

The flow switching module 500 may include structure for enabling a user of the module 500 to terminate the preheat mode of operation before the water temperature inside the preheat core 580 has reached the set-point temperature. In the present embodiment, the valve cartridge 510 includes a rod 516 which extends downwards from the bottom surface of the lower portion 511 of the valve cartridge 510 through a second through hole 567 formed in the partition 565 and a through hole 588 formed in the top surface of the preheat core 580. The rod 516 is coaxial with respect to the rotational axis of the valve cartridge 510 and is able to rotate and translate with respect to the second through hole 567 in the partition 565 and the through hole 588 in the top surface of the preheat core 580 as the valve cartridge 510 rotates or translates. The rod 516 may be a continuation of the mixing shaft 535, or it may be a separate member. The rod 516 passes through the through hole 588 in the top surface of the preheat core 580 sufficiently loosely that any friction between the rod 516 and the through hole 588 does not cause the preheat core 580 to translate between its raised (normal) and lowered (preheat) positions as the valve cartridge 510 translates within the valve casing 502.

A member such as a flange 517 capable of engaging with the interior of the preheat core 580 is formed on the lower end of the rod 516. When the preheat core 580 is in a raised (normal) position, the flange 517 does not contact any portion of the interior of the preheat core 580 as the valve cartridge 510 is raised or lowered in the longitudinal direction. However, when the preheat core 580 is in a lowered (preheat) position, if a user pulls up on the mixing shaft 535 to raise the valve cartridge 510 by a certain amount, the flange 517 will contact a portion of the interior of the preheat core 580 (such as the upper inner surface of the preheat core 580) and apply an upwards force to the preheat core 580. If the upwards force is greater than a predetermined level which a typical user can easily exert, the detent member 597 of the detent mechanism 595 will disengage from the recess 576 in the preheat casing 571, and the compression spring 590 at the bottom of the preheat casing 571 will push the preheat core 580 upwards to a raised (normal) position. As the preheat core 580 move upwards, the pin 586 projecting upwards from the upper end of the preheat core 580 will push upwards on the pin 515 projecting downwards from the valve cartridge 510, and the valve cartridge 510 will be pushed upwards with the preheat core 580 until the valve cartridge 510 is in an off position in the longitudinal direction and the pin 515 of the valve cartridge 510 is raised sufficiently far to enable the pin 515 to disengage from the first through hole 566 in the partition 565.

Figure 119:
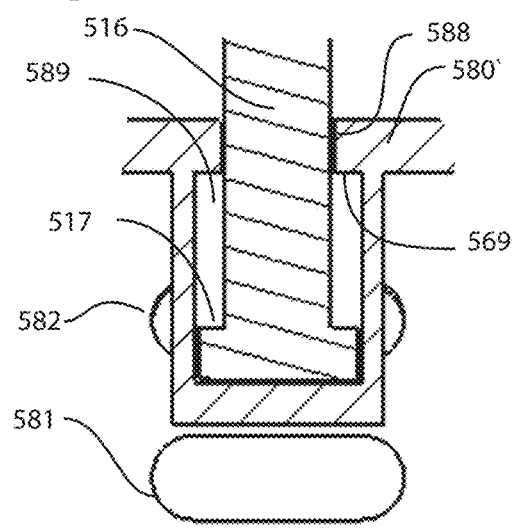

As shown in FIG. 120 and FIG. 119, which is an enlarged view of a portion of FIG. 120, in the present embodiment, the preheat core 580 includes a cup-shaped compartment 589 which is secured to the upper inner surface of the preheat core 580 and surrounds the lower end of the rod 516 of the valve cartridge 510 in order to prevent water from flowing out of the through hole 588 in the upper surface of the preheat core 580 along the outer surface of the rod 516, but this compartment 589 is optional, and leakage of water along the rod 516 can be prevented in other ways, such as by the provision of suitable sealing members.

Figure 105:
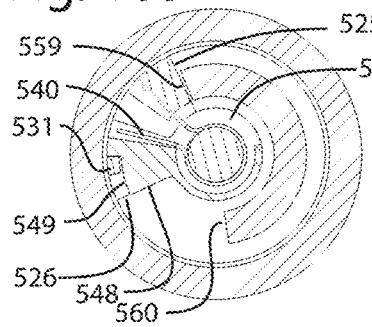
FIG. 105 is a transverse cross-sectional view of the embodiment of FIG. 88 taken along line 105-105 of FIG. 99 when the valve cartridge is in an off position in the longitudinal direction and in the full cold rotational position.
Figure 106:
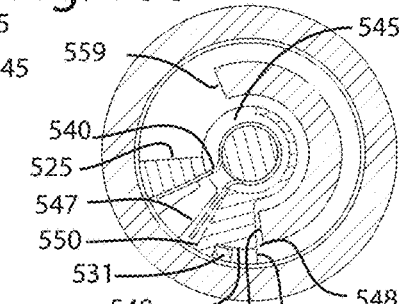
FIG. 106 is a transverse cross-sectional view similar to FIG. 105 but showing the valve cartridge in the full hot rotational position.
Figure 107:
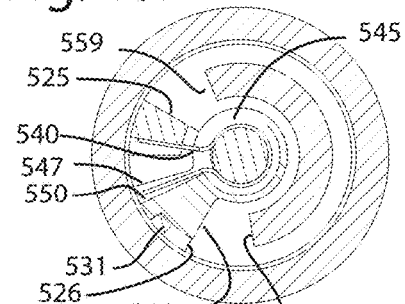
FIG. 107 is a transverse cross-sectional view similar to FIG. 105 but showing the valve cartridge in a rotational position between the full hot and the full cold rotational positions.

FIGS. 105-107 are transverse cross-sectional views of the module 500 when the valve cartridge 510 is in various rotational positions in the normal rotational range. FIG. 105, which is taken along line 105-105 of FIG. 99, shows a state when the valve cartridge 510 is in the full cold position. FIG. 106, which is taken along line 106-106 of FIG. 104A, shows a state when the valve cartridge 510 is in the full hot rotational range. FIG. 107, which is taken along the same cutting planes as FIGS. 105 and 106, shows a state when the valve cartridge 510 is in an intermediate rotational range between the full cold rotational range and the full hot rotational range.

FIGS. 108-110, 113, and 114 are schematic elevations of the midportion of the mixing valve assembly 501 when the valve cartridge 510 is in a variety of positions. In these figures, the location of the inlet 513 of the valve cartridge 510 and the gap 514 between the upper and lower portions of the valve cartridge 510 are shown by cross hatching, but other portions of the mixing valve assembly 501 have been omitted for ease of illustration.

Figure 108:
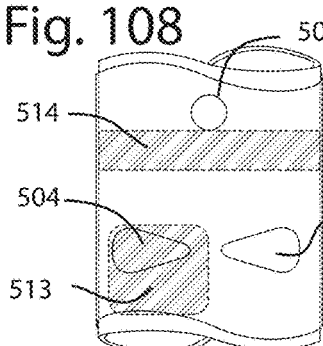
FIG. 108 is a schematic elevation of the mixing valve assembly of the embodiment of FIG. 88 schematically illustrating the position of the inlet and the gap between the upper and lower portions of the valve cartridge with respect to the valve casing when the valve cartridge is an off position in the longitudinal direction and in the full cold rotational position shown in FIG. 105.

FIG. 108 schematically illustrates a state when the valve cartridge 510 is in an off position in the longitudinal direction and in the full cold rotational range. When the valve cartridge 510 is in the full cold rotational range, the inlet 513 of the valve cartridge 510 overlaps the cold water supply port 504 of the valve casing 502 in the circumferential direction of the valve casing 502 but not the hot water supply port 503, so water can enter the valve cartridge 510 only through the cold water supply port 504. When the valve cartridge 510 is in an off position in the longitudinal direction, the gap 514 between the upper and lower portions of the valve cartridge 510 is positioned below the water delivery port 505 of the valve casing 502 in the longitudinal direction, so the upper portion 520 of the valve cartridge 510 blocks the water delivery port 505 of the valve casing 502, and water cannot be discharged from the water delivery port 505.

Figure 109:
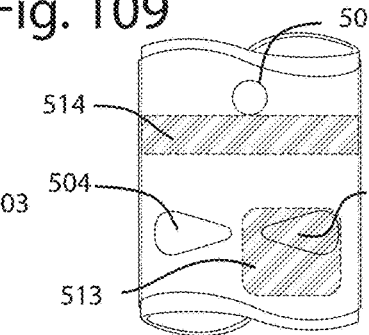
FIG. 109 is a schematic illustration similar to FIG. 108 illustrating the position of the inlet and the gap between the upper and lower portions of the valve cartridge with respect to the valve casing when the valve cartridge is an off position in the longitudinal direction and in the full cold rotational position illustrated in FIG. 106.

FIG. 109 schematically illustrates a state when the valve cartridge 510 is in an off position in the longitudinal direction and in the full hot rotational range. When the valve cartridge 510 is in the full hot rotational range, the inlet 513 of the valve cartridge 510 overlaps the hot water supply port 503 of the valve casing 502 in the circumferential direction of the valve casing 502 but not the cold water supply port 504, so water can enter the valve cartridge 510 only through the hot water supply port 503. In FIG. 109, since the valve cartridge 510 is in an off position in the longitudinal direction, the gap 514 in the valve cartridge 510 is positioned below the water delivery port 505 of the valve casing 502, so water cannot be discharged from the water delivery port 505 in this state.

Figure 110:
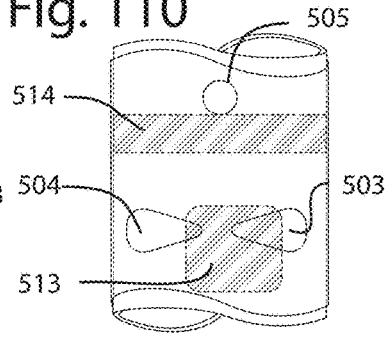
FIG. 110 is a schematic illustration similar to FIG. 108 illustrating the position of the inlet and the gap between the upper and lower portions of the valve cartridge with respect to the valve casing when the valve cartridge is in the position illustrated in FIG. 107.
Figure 111:
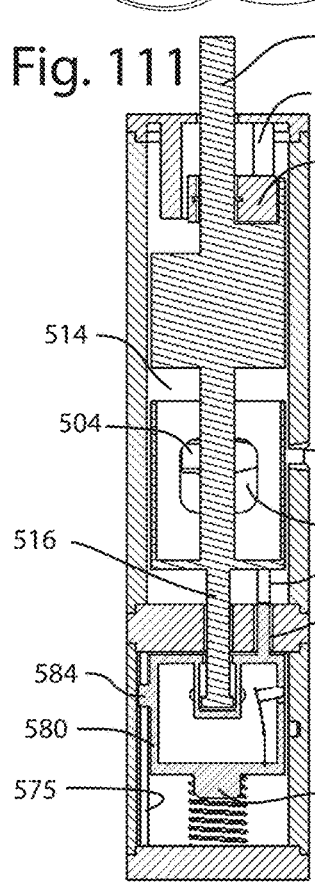
FIG. 111 is a cross-sectional elevation of the embodiment of FIG. 88 showing the state when the valve cartridge is in an off position in the longitudinal direction and in a rotational position slightly outside of the preheat rotational range.
Figure 112:
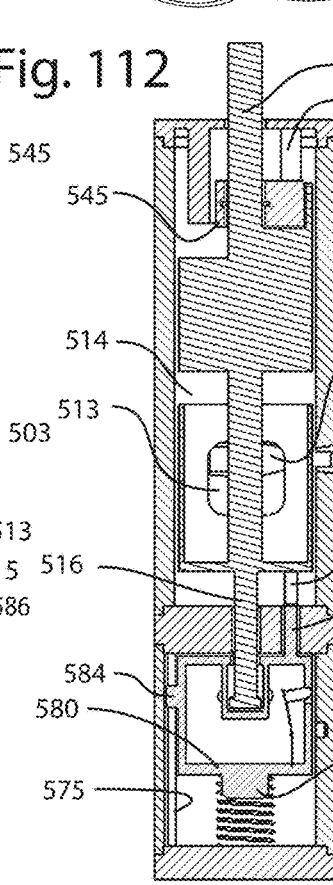
FIG. 112 is a cross-sectional elevation of the embodiment of FIG. 88 showing the state when the valve cartridge is in an off position in the longitudinal direction and in the preheat rotational range.
Figure 113:
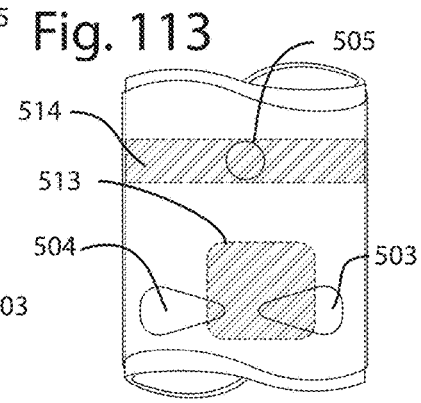
FIG. 113 is a schematic illustration similar to FIG. 108 illustrating the position of the inlet and the gap between the upper and lower portions of the valve cartridge with respect to the valve casing when the valve cartridge is in an on position in the longitudinal direction and in the rotational position illustrated in FIG. 107.
Figure 114:
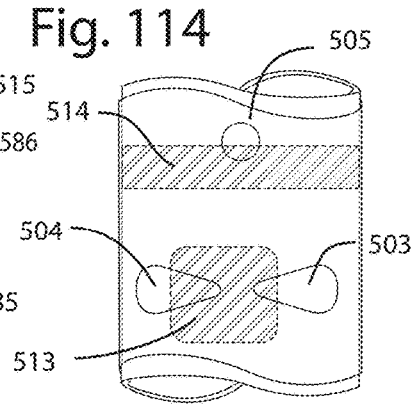
FIG. 114 is a schematic illustration similar to FIG. 113 showing a state in which the valve cartridge is a partially on position in the longitudinal direction and in a rotational position between the full cold rotational position and the full hot position.

FIGS. 110, 113, and 114 schematically illustrate states when the valve cartridge 510 is in an intermediate rotational range between the full hot rotational range and the full cold rotational range. As shown in these figures, in the intermediate rotational range, the inlet 513 of the valve cartridge 510 overlaps both the hot water supply port 503 and the cold water supply port 504 of the valve casing 502 in the circumferential direction, so water can enter the valve cartridge 510 through both the hot water supply port 503 and the cold water supply port 504 of the valve casing 502. In FIG. 110, the valve cartridge 510 is shown in an off position in the longitudinal direction in which the gap 514 in the valve cartridge 510 does not overlap the water delivery port 505 of the valve casing 502 so that water is prevented from being discharged from the water delivery port 505. In contrast, in FIGS. 113 and 114, the valve cartridge 510 is shown in a position in the longitudinal direction in which the gap 514 in the valve cartridge 510 overlaps the water delivery port 505 of the valve casing 502 so that water can be discharged from the water delivery port 505. The amount of overlap in the longitudinal direction between the gap 514 in the valve cartridge 510 and the water delivery port 505 of the valve casing 502 can be varied by raising or lowering the valve cartridge 510 in the longitudinal direction. For example, FIG. 113 shows a complete overlap in the longitudinal direction between the gap 514 in the valve cartridge 510 and the water delivery port 505, and FIG. 510 shows a partial overlap in the longitudinal direction between the gap 514 in the valve cartridge 510 and the water delivery port 505.

During the normal mode of operation, a user can operate the module 500 in much the same way as a conventional mixing valve. A user can adjust the flow rate of water discharged from the mixing valve assembly 501 by raising and lowering the valve cartridge 510 with respect to the valve casing 502 by raising and lowering the mixing shaft 535, and the user can adjust the ratio of hot water to cold water which is mixed in the mixing valve assembly 501 by varying the rotational position of the valve cartridge 510 with respect to the valve casing 502 between the full cold position and the full hot position by rotating the mixing shaft 535. In the normal mode of operation, the preheat core 580 is in a normal (raised) position, so hot water which is supplied to the hot water supply port 572 of the preheat assembly 570 flows through the preheat core 580 and is then supplied to the hot water supply port 503 of the mixing valve assembly 501.

In order to switch from the normal mode to the preheat mode of operation, with the valve cartridge 510 in a lowered (off) position, the user rotates the valve cartridge 510 by means of the mixing shaft 535 from the normal rotational range to the preheat rotational range against the resistance to rotation exerted by the torsion spring 540. In order for the valve cartridge 510 to rotate to the preheat rotational range, the top surface of the second level 523 of the upper portion 520 of the valve cartridge 510 must be able to pass underneath the lower end of the arcuate wall 557 of the upper end cap 555, and it is able to do so only when the valve cartridge 510 is in an off position in the longitudinal direction.

FIG. 116 shows the valve cartridge 510 when it is in an off position in the longitudinal direction and has been rotated to the preheat rotational range. When the valve cartridge 510 is in the preheat rotational range, the pin 515 at the lower end of the valve cartridge 510 is disposed above the first through hole 566 in the partition 565, so if the user presses down on the mixing shaft 535 at this time, the pin 515 will be inserted into the first through hole 566, and the user can move the valve cartridge 510 downwards to a preheat position. As the valve cartridge 510 moves downwards, the pin 515 at the lower end of the valve cartridge 510 presses downwards on the upper end of the pin 586 of the preheat core 580, and the preheat core 580 is pushed downwards from a raised (normal) position towards a lowered (preheat) position. FIG. 117 shows the preheat core 580 in a lowered (preheat) position. When the preheat core 580 reaches a lowered (preheat) position, the module 500 will operate in the preheat mode in which water which enters the preheat casing 571 through the hot water supply port 572 flows through the interior of the preheat core 580 and is discharged from the return port 574 of the preheat casing 571 and then into the unillustrated return passage instead of being supplied to the mixing valve assembly 501 through the water delivery port 573. The flow of water into the return passageway can triggers a pump controller to turn on a return pump connected to the return passageway in the same manner as described with respect to FIG. 1.

When the preheat core 580 is in a lowered (preheat) position, the through hole 587 for the detent member 597 in the preheat core 580 overlaps the recess 576 for the detent member 597 in the preheat casing 571. If the water temperature in the preheat core 580 at this time is below the predetermined set-point temperature, the detent member 597 will engage with the recess 576 in the preheat casing 571 as shown in FIG. 117 and hold the preheat core 580 in a lowered (preheat) position against the upwards biasing force exerted by the compression spring 590.

The preheat core 580 will remain in a lowered (preheat) position and the preheat mode will continue until either the water temperature inside the preheat core 580 reaches the set-point temperature (at which time the thermal detent mechanism 595 will cause the detent member 597 to automatically disengage from the preheat casing 571) or the user manually terminates the preheat mode by pulling up on the mixing shaft 535 until the flange 517 on the lower end of the rod 516 of the valve cartridge 510 contacts the upper inner surface of the preheat core 580 and applies a sufficiently large upwards force to the preheat core 580 to cause the detent member 597 to disengage from the preheat casing 571. In either case, when the thermal detent mechanism 595 no longer holds the preheat core 580 in a lowered (preheat) position, the preheat core 580 will be pushed upwards to a raised (normal) position by the compression spring 590. As the preheat core 580 is pushed upwards by the compression spring 590, the pin 586 of the preheat core 580 will push upwards on the pin 515 at the lower end of the valve cartridge 510 until the valve cartridge 510 is pushed upwards to an off position in the longitudinal direction such as shown in FIG. 116. When the valve cartridge 510 is in a preheat position, the valve cartridge 510 is prevented from rotating about its axis by the pin 515 of the valve cartridge 510 being inserted into the first through hole 566 in the partition 565 However, when the valve cartridge 510 returns to an off position in the longitudinal direction, the pin 515 of the valve cartridge 510 can disengage from the first through hole 566 of the partition 565, and the valve cartridge 510 will rotate in the counterclockwise direction from the preheat rotational range back to the full hot position in the normal rotational range under the torque applied by the torsion spring 540.

When the valve cartridge 510 is in the preheat rotational range, the top surface of the second level 523 of the upper portion 520 of the valve cartridge 510 is disposed underneath the bottom surface of the arcuate wall of the upper end cap 555. The bottom surface of the arcuate wall prevents the valve cartridge 510 from being moved upwards to a raised (on) position when in the preheat rotational range. As a result, a user is protected against scalding by hot water being unexpectedly discharged from the module 500 if the user pulls upwards on the mixing shaft 535 to terminate the preheat mode.

If the water temperature in the preheat core 580 is already at least the set-point temperature when a user attempts to initiate the preheat mode by pushing down on the valve cartridge 510 to lower the preheat core 580 to a lowered (preheat) position, the thermal detent mechanism 595 will not engage with the preheat casing 571, and the preheat core 580 will return to a raised (normal) position under the upwards force applied by the compression spring 590 unless the user maintains the preheat core 580 in a lowered (preheat) position by continuing to push downwards by hand on the mixing shaft 535.

Similarly, if the user rotates the valve cartridge 510 to the preheat rotational range without then pushing down on the mixing shaft 535 to lower the preheat core 580 to a lowered (preheat) position and then releases the mixing shaft 535, the valve cartridge 510 will rotate back to the full hot position under the torque exerted by the torsion spring 540.

Like the previous embodiments, this embodiment enables a user to easily switch between a normal mode and a preheat mode of operation. Because a user of this embodiment can initiate the preheat mode by simply pressing down on the mixing shaft 535 when the valve cartridge 510 is in the preheat rotational range instead of having to pull it upwards, this embodiment is particularly easy for a user to operate.

FIGS. 121-144 illustrate another embodiment of a flow switching module 600 according to the present invention which is suitable for use in a hot water recirculation system according to the present invention. Like the previous embodiments, this embodiment can be integrated into the structure of a hot water plumbing fixture and be used as the main flow control device for the plumbing fixture, or it can be used as an auxiliary flow control device for a plumbing fixture having a control valve which is separate from the flow switching module 600.

As with the previous embodiments, this embodiment has a normal mode of operation and a preheat mode of operation. In the normal mode of operation, the flow switching module 600 functions in basically the same manner as a conventional single-handle faucet to perform mixing and flow rate control of water supplied to a plumbing fixture. In the preheat mode of operation, the flow switching module 600 diverts water coming from a hot water supply passage to an unillustrated return passage until water flowing into the module 600 from the hot water supply passage reaches a predetermined set-point temperature.

FIG. 121 is an exploded axonometric view of this embodiment. As shown in this figure, the flow switching module 600 includes a stationary valve casing 601 and a valve cartridge 610 which is movably installed in the valve casing 601 so as to be able to reciprocate with respect to the valve casing 601 in the longitudinal direction of the valve casing 601 and rotate with respect to the valve casing 601 around the longitudinal axis of the valve casing 601.

As is the case with respect to the preceding embodiments, the flow switching module 600 may have any desired orientation with respect to the vertical and is not limited to the orientation shown in the drawings.

The valve casing 601 is similar to the valve casing of the previous embodiment. As shown in FIGS. 125 and 126 which are respectively an axonometric view and a cross-sectional elevation of the valve casing 601, the valve casing 601 comprises a hollow cylindrical member which is open at both ends and which has a hot water supply port 602, a cold water supply port 603, and one or more water delivery ports 604 (one in the illustrated embodiment) formed through the wall of the valve casing 601 between its inner and outer surfaces. The valve casing 601 further includes a return port 605 which is formed through the wall of the valve casing 601 between its inner and outer surfaces. The upper end of the valve casing 601 is closed off by an upper end cap 655, while the lower end of the valve casing 601 is closed off by a lower end cap 665. The hot water supply port 602 and the cold water supply port 603 are fluidly connected by unillustrated passageways on the exterior of the valve casing 601 to a source of hot water, such as a hot water heater, and a source of cold water, respectively. The water delivery port 604 is fluidly connected by an unillustrated passage on the exterior of the valve casing 601 to the discharge opening of a plumbing fixture with which the valve module 600 is being used, such as the spout of a faucet or a shower head. The return port 605 is fluidly connected by an unillustrated passageway on the exterior of the valve casing 601 to an unillustrated return passage which returns water to the hot water heater when the flow switching module 600 is in the preheat mode of operation.

The lower end cap 665 may have any structure which enables it to close off the lower end of the valve casing 601 in a water-tight manner, and it may be detachably or permanently secured to the valve casing 601. It is also possible to omit the lower end cap 665 and for the valve casing 601 to have a bottom surface which is integrally formed with the peripheral wall of the valve casing 601 and closes off the lower end of the valve casing 601.

FIG. 127 is a cutaway axonometric view of the valve cartridge 610. As shown in this figure, the overall structure of the valve cartridge 610 may be similar to the structure of the valve cartridge 510 of the previous embodiment. Like that valve cartridge 510, the valve cartridge 610 of FIG. 127 includes a lower portion 611, an upper portion 620 separated from the lower portion 611 by a gap 614, and a shaft 635 (referred to as a mixing shaft) which is secured to one or both of the upper and lower portions. The upper and lower portions of the valve cartridge 610 are secured to each other and/or to the mixing shaft 635 such that the upper and lower portions can be translated and rotated as a single unit with respect to the valve casing 601 when the mixing shaft 635 is translated or rotated. An unillustrated manual control member such as a knob or a lever is typically secured to the upper end of the mixing shaft 635 to enable a user to translate and rotate the valve cartridge 610 by hand.

Like the valve cartridge 510 in the previous embodiment, during the normal mode of operation, the lower portion 611 of the valve cartridge 610 in this embodiment adjusts the ratio of hot water to cold water which is discharged from the valve cartridge 610. During the normal mode of operation, the upper portion 620 of the valve cartridge 610 controls the flow rate of water discharged from the water delivery port 604 as well as cooperates with the upper end cap 655 to limit translation and rotation of the valve cartridge 610 with respect to the valve casing 601. In addition, during the preheat mode of operation, the lower portion 611 of the valve cartridge 610 directs water from the hot water supply port 602 to the return port 605 of the valve casing 601.

As in the previous embodiment, the lower portion 611 of the valve cartridge 610 in this embodiment comprises a tubular mixing core 612 which is open at its upper end and closed off at its lower end by a bottom surface which is secured to the lower end of the mixing shaft 635. The lower portion 611 includes an inlet 613 which extends through the wall of the mixing core 611 between its inner and outer surfaces. Water which enters the lower portion 611 through the inlet 613 can flow through the open upper end of the lower portion 611 and then leave the valve cartridge 610 through the gap 614 between the upper and lower portions. As in the previous embodiment, the mixing shaft 635 extends over the entire length of the lower portion 611, but it may extend for a shorter distance and be secured to the lower portion 611 in a different manner, such as by spokes extending between the mixing shaft 635 and the peripheral wall of the mixing core 612.

The upper portion 620 may be identical in structure to the upper portion 520 of the valve cartridge 510 in the previous embodiment, so a detailed explanation of the components of the upper portion 620 will be omitted. Portions of the upper portion 620 in FIG. 127 which correspond to portions of the upper portion 520 of the valve cartridge 510 in the previous embodiment are affixed with reference numbers which are 100 higher than the reference numbers of the corresponding parts in the previous embodiment. Like the valve cartridge 510 of the previous embodiment, the valve cartridge 610 of this embodiment includes a collar 645 mounted on the mixing shaft 635 and a biasing member in the form of a torsion spring 640 which fits inside the collar 645. FIGS. 123 and 124 are axonometric views of the collar 645. As shown in these figures, the collar 645 may have the same structure as the collar 545 in the previous embodiment. Similarly, the torsion spring 640 may have the same structure as the torsion spring 540 in the previous embodiment.

FIG. 122 is an axonometric view of the upper end cap 655. As shown in this figure, the upper end cap 655 may have the same structure as the upper end cap 555 in the previous embodiment. As in the previous embodiment, it includes an arcuate wall 657 having lateral surfaces 659 and 660 which function as stationary stop surfaces to limit the rotation of the valve cartridge 610 about its longitudinal axis. The lateral surfaces 659 and 660 of the upper end cap 655 cooperate with the various movable stop surfaces of the valve cartridge 610 in the same manner as described with respect to the previous embodiment.

The valve cartridge 610 is capable of translating in the longitudinal direction of the valve casing 601 and has at least one lowered or off position in the longitudinal direction and at least one raised or on position in the longitudinal direction of the valve casing 601. When the valve cartridge 610 is in a lowered (off) position, the radially inner end of the water delivery port 604 (or of each water delivery port 604 when there is more than one water delivery port 604) is blocked by the peripheral surface of the first level 621 of the upper portion 620 of the valve cartridge 610, so water is prevented from being discharged from the valve casing 601 through the water delivery port 604. When the valve cartridge 610 is in a raised (on) position, the lower level of the upper portion 620 of the valve cartridge 610 is raised to a level in which the gap 614 between the upper and lower portions of the valve cartridge 610 overlaps the water delivery port 604 in the longitudinal direction of the valve casing 601 and the radially inner end of the water delivery port 604 is partially or fully open to allow water to be discharged from the water delivery port 604. The rate of discharge of water from the water delivery port 604 varies with the position of the valve cartridge 610 in the longitudinal direction.

Structure may be provided to limit the translation of the valve cartridge 610 in the longitudinal direction of the valve casing 601. In the present embodiment, the valve cartridge 610 can be translated upwards within the valve casing 601 until the top surface 622 of the first level 621 of the upper portion 620 of the valve cartridge 610 abuts against the bottom surface 658 of the arcuate wall 657 of the upper end cap 655, while the valve cartridge 610 can be translated downwards within the valve casing 601 until the bottom surface of the valve cartridge 610 abuts against the top surface of the lower end cap 665.

The valve cartridge 610 has a normal rotational range within which it can rotate in the valve cartridge 610 during the normal mode of operation and a preheat rotational range in which it is positioned during the preheat mode. As in the previous embodiment, there may be an intermediate rotational range between the normal rotational range and the preheat rotational range through which the valve cartridge 610 passes when switching between the normal mode and the preheat mode of operation. The normal rotational range includes a full cold rotational range in which the inlet 613 of the valve cartridge 610 overlaps the cold water supply port 603 in the circumferential and longitudinal directions but the hot water supply port 602 is blocked by the peripheral wall of the valve cartridge 610 so that water can enter the valve cartridge 610 from the cold water supply port 603 of the valve casing 601 but not from the hot water supply port 602, a full hot rotational range in which the inlet 613 of the valve cartridge 610 overlaps the hot water supply port 602 of the valve casing 601 in the circumferential and longitudinal directions but the cold water supply port 603 is blocked by the peripheral wall of the valve cartridge 610 so that water can enter the valve cartridge 610 from the hot water supply port 602 of the valve casing 601 but not from the cold water supply port 603, and an intermediate rotational range in which the inlet 613 overlaps both the cold water support and the hot water supply port 602 in the circumferential and longitudinal directions so that water can enter the valve cartridge 610 from both the hot water supply port 602 and the cold water supply port 603 and be mixed in a ratio determined by the rotational position of the valve cartridge 610 with respect to the valve casing 601. The full cold rotational range includes a full cold position which is the farthest position in the cold direction to which the valve cartridge 610 can be rotated when in the normal rotational range, and the full hot rotational range includes a full hot position which is the farthest position in the hot direction to which the valve cartridge 610 can be rotated when in the normal rotational range. As is the case with respect to the previous embodiment, the valve cartridge 610 is in the full cold position when one of the first lateral surfaces 625 or 628 of the valve cartridge 610 contacts the first lateral surface 659 of the upper end cap 655, and the valve cartridge 610 is in the full hot position when second lateral surface 626 of the valve cartridge 610 contacts the second lateral surface 660 of the upper end cap 655.

When the valve cartridge 610 is in the normal rotational range, the peripheral wall of the valve cartridge 610 blocks the return port 605 of the valve casing 601 so that no water flows through the return port 605. When the valve cartridge 610 is in the preheat rotational range, the cold water supply port 603 of the valve casing 601 is blocked by the peripheral wall of the valve cartridge 610 while the inlet 613 of the valve cartridge 610 overlaps the hot water supply port 602 in the circumferential and longitudinal directions to enable water from the hot water supply port 602 to flow into the valve cartridge 610. In addition, when the valve cartridge 610 is in the preheat rotational range, the interior of the valve cartridge 610 fluidly communicates with the return port 605 of the valve casing 601 to enable water which enters the valve cartridge 610 from the hot water supply port 602 to flow into the return port 605. In the present embodiment, fluid communication between the interior of the valve cartridge 610 and the return port 605 of the valve casing 601 is achieved by positioning the return port 605 with respect to the hot water supply port 602 such that when the valve cartridge 610 is in the preheat rotational range, the inlet 613 overlaps both the hot water supply port 602 and the return port 605 of the valve casing 601 in the circumferential and radial directions so that water can enter the valve cartridge 610 through a portion of the inlet 613 and then be discharged into the return port 605 through another portion of the inlet 613. The portion of the inlet 613 through which water enters the valve cartridge 610 from the hot water supply port 602 and the portion of the inlet 613 through which water leaves the valve cartridge 610 and flows into the return port 605 are separated from each other by the portion of the peripheral wall of the valve cartridge 610 between the hot water supply port 602 and the return port 605.

As an alternative way of providing fluid communication between the interior of the valve cartridge 610 and the return port 605 of the valve casing 601, in the same manner as in the embodiment illustrated in FIG. 6, the valve cartridge 610 may have a dedicated return port which overlaps the return port 605 of the valve casing 601 in the circumferential and longitudinal directions only when the valve cartridge 610 is in the preheat rotational range.

Like the previous embodiment, this embodiment may include a thermal detent mechanism 670. Instead of being disposed in a preheat assembly as in the previous embodiment, the thermal detent mechanism 670 in this embodiment is disposed within the valve cartridge 610 and functions to releasably hold the valve cartridge 610 in the preheat rotational range during the preheat mode of operation when the water temperature within the valve cartridge 610 is below a predetermined set-point temperature. The thermal detent mechanism 670 is not limited to any particular type, and it may, for example, have a structure similar to that of the thermal detent mechanisms employed in any of the preceding embodiments. In this embodiment, the thermal detent mechanism 670 is similar in structure to the thermal detent mechanism 595 used in the preceding embodiment. Specifically, as shown in FIG. 127, the thermal detent mechanism 670 in this embodiment comprises a temperature sensitive actuator in the form of a leaf spring 671 which is made of a bimetallic strip and which is disposed inside the lower portion 611 of the valve cartridge 610 where it is exposed to water flowing into the valve cartridge 610 through the inlet 613 of the valve cartridge 610. A first end of the leaf spring 671 is secured to a suitable location on the interior of the valve cartridge 610, such as to the bottom inner surface of the valve cartridge 610. A second end of the leaf spring 671 is disposed in the vicinity of a through hole 615 formed in the peripheral wall of the lower portion 611 of the valve cartridge 610. A detent member 672 such as a detent pin, a detent ball, a projection, or the like is mounted on the second end of the leaf spring 671. The detent member 672 can pass through the through hole 615 in the wall of the valve cartridge 610. A first recess 606 (shown in FIGS. 125 and 126) for receiving the radially outer end of the detent member 672 is formed in the inner wall of the valve casing 601. When the valve cartridge 610 is in an off position in the longitudinal direction and rotated to the preheat rotational range, the through hole 615 in the valve cartridge 610 overlaps the first recess 606 in the valve casing 601 such that the detent member 672 can be inserted into the first recess 606 to detachably hold the valve cartridge 610 in the preheat rotational range against the clockwise torque applied to the valve cartridge 610 by the torsion spring 640. As in the previous embodiment, the shape of the radially outer end of the detent member 672 and the shape of the first recess 606 in the valve casing 601 are preferably selected such that the user can disengage the detent member 672 from the first recess 606 when desired by manually applying a counter-clockwise torque of at least a certain level to the valve cartridge 610 through the mixing shaft 635.

As in the previous embodiment, the characteristics of the leaf spring 671, such as its thermal properties, dimensions, and mounting location are selected such that when the water temperature in the lower portion 611 of the valve cartridge 610 to which the leaf spring 671 is exposed is below the set-point temperature, the shape of the leaf spring 671 is such that the detent member 672 can be inserted by the leaf spring 671 into the first recess 606 in the valve casing 601 when the valve cartridge 610 is in the preheat rotational range to resist rotation of the valve cartridge 610 from the preheat rotational range under the torque exerted by the torsion spring 640, and such that when the water temperature within the lower portion 611 of the valve cartridge 610 is at least the set-point temperature, the leaf spring 671 deforms to a shape such that the detent member 672 is no longer engaged with the first recess 606 or such that the engagement is not sufficient to hold the valve cartridge 610 in the preheat rotational range against the torque exerted by the torsion spring 640.

In the embodiment shown in FIG. 6, which also has a thermal detent mechanism disposed inside a valve cartridge, the radial outer end of the detent member is in sliding contact with the inner surface of a valve casing as the valve cartridge rotates or translates within the valve casing when the water temperature in the valve cartridge is below the set-point temperature. The sliding contact between the detent member and the valve casing can possibly produce undesirable abrasion of one or both of the detent member and the valve casing as well as frictional resistance to movement of the valve cartridge.

In order to avoid such abrasion and frictional resistance, in the present embodiment, the inner peripheral surface of the valve casing 601 may include a second recess 607 into which the detent member 672 can be inserted without contacting the inner peripheral surface of the valve casing 601 when the water temperature in the valve cartridge 610 is below the set-point temperature. FIGS. 125 and 126 show an example of the second recess 607. The second recess 607 has a length measured in the circumferential direction of the valve casing 601 such that the valve cartridge 610 can be rotated over the entirety of the normal rotational range without the radially outer end of the detent member 672 contacting the inner peripheral surface of the valve casing 601. In addition, it has a height measured in the longitudinal direction of the valve casing 601 such that the valve cartridge 610 can translate in the longitudinal direction of the valve casing 601 between a maximum raised position and a maximum lowered position without the radially outer end of the detent member 672 contacting the inner peripheral surface of the valve casing 601, The second recess 607 is separated from the first recess 606 by an unrecessed area defining a wall 608. In this embodiment, the first recess 606 is shown as having the same height measured in the longitudinal direction of the valve casing 601 as the second recess 607, but since the detent member 672 engages the first recess 606 only when the valve cartridge 610 is in an off position in the longitudinal direction and is not translating, the height of the first recess 606 does not need to be the same as the height of the second recess 607.

A gap in the radial direction of the valve casing 601 is present between the radially outer end of the detent member 672 and the peripheral surface of the second recess 607 when the water temperature inside the valve cartridge 610 is below the set-point temperature and the detent member 672 extends into the second recess 607. The detent member 672 can be prevented from contacting the peripheral surface of the second recess 607 in various ways. For example, the properties of the leaf spring 671 can be selected such that when the water temperature within the valve cartridge 610 is below the set-point temperature, the curvature of the leaf spring 671 is such that the detent member 672 extends only partway into the second recess 607. Alternatively, structure which limits the minimum distance between the leaf spring 671 and the inner peripheral surface of the valve cartridge 610 can be mounted on one or both of the valve cartridge 610 and the leaf spring 671. For example, a projection such as a pin can be secured to the inner peripheral surface of the valve cartridge 610 opposing the leaf spring 671. When the water temperature in the valve cartridge 610 is below the set-point temperature, the leaf spring 671 abuts against the radially inner end of the pin, and the detent member 672 is prevented from extending into the second recess 607 by a distance determined by the length of the pin.

As another alternative, the detent member 672 can have a shape such that it can extend only partway into the second recess 607. For example, the detent member 672 can have a first region at the radially outer end of the detent member 672 having a diameter such that the first region can extend into the through hole 615 in the valve cartridge 610 and a second region having a larger diameter than the through hole 615 to prevent the second region from extending into the through hole 615, thereby limiting the distance by which the detent member 672 can extend into the second recess 607.

As stated above, the shape of the first recess 606 is selected to engage with the detent member 672 in a manner which resists rotation of the valve cartridge 610 from the preheat rotational range under the torque exerted by the torsion spring 640, However, the second recess 607 does not need to provide any resistance to rotation of the valve cartridge 610 about its longitudinal axis. Therefore, the surface of the wall 608 within the second recess 607 may have a shape so as to reduce resistance to movement of the detent member 672 from the second recess 607 to the first recess 606 when the valve cartridge 610 is rotated from the normal rotational range to the preheat rotational range. For example, the end surface of the wall 608 within the second recess 607 may be beveled or rounded to enable the detent member 672 to more easily slide over the wall 608 and move between the second recess 607 and the first recess 606.

A recess corresponding to the second recess 607 for receiving the radially outer end of a detent member and preventing sliding contact between the detent member and an inner surface of a flow switching module can also be employed in any of the other embodiments of the present invention including a thermal detent mechanism having a detent member in sliding contact with an opposing surface.

FIGS. 128-131 are cross-sectional elevations of the module 600 showing the valve cartridge 610 in various rotational positions and at various positions in the longitudinal direction of the valve casing 601 during the normal mode of operation, and FIGS. 132-135 are transverse cross-sectional views of the module 600 taken along lines 132-132, 133-133, 134-134, and 135-135 of FIGS. 128-131, respectively. In each of these figures, the detent member 672 is illustrated in a retracted position corresponding to a water temperature inside the valve cartridge 610 which is at least the set-point temperature. FIG. 128 shows the valve cartridge 610 in an off position in the longitudinal direction and in the full cold rotational range, FIG. 129 shows the valve cartridge 610 in an on position in the longitudinal direction and in the full cold rotational range, FIG. 130 shows the valve cartridge 610 in an off position in the longitudinal direction and in the full hot rotational range, and FIG. 131 shows the valve cartridge 610 in an on position in the longitudinal direction and in the full hot rotational range, As shown by FIGS. 128 and 130, when the valve cartridge 610 is in an off position in the longitudinal direction, the water delivery port 604 of the valve casing 601 is closed off by the upper portion 620 of the valve cartridge 610, and as shown by FIGS. 133 and 135, when the valve cartridge 610 is in an on position in the longitudinal direction, the upper portion 620 of the valve cartridge 610 is raised to a position such that the water delivery port 604 is at least partially open to that water can be discharged from the valve casing 601 through the water delivery port 604.

As shown by FIG. 133, when the valve cartridge 610 is in a full cold rotational range, the lower portion 611 of the valve cartridge 610 blocks the hot water supply port 602 of the valve casing 601 while the inlet 613 of the valve cartridge 610 overlaps the cold water supply port 603 of the valve casing 601 to enable cold water to enter the valve cartridge 610 through the cold water supply port 603. As shown by FIG. 135, when the valve cartridge 610 is in a full hot range, the lower portion 611 of the valve cartridge 610 blocks the cold water supply port 603 of the valve casing 601 while the inlet 613 of the valve cartridge 610 overlaps the hot water supply port 602 of the valve casing 601 to enable hot water to enter the valve cartridge 610 from the hot water supply port 602.

As shown by FIGS. 132-135, in the present embodiment, the valve cartridge 610 is rotated in the counterclockwise direction as viewed from above when rotating from the full cold rotational range to the full hot rotational range as is common in conventional mixing valves. However, the module 600 can instead have a structure such that the valve cartridge 610 is rotated in the opposite direction from the full cold rotational range to the full hot rotational range.

FIG. 140 is a transverse cross-sectional view of the module 600 when the valve cartridge 610 is in an intermediate rotational range between the full cold rotational range shown by FIG. 133 and the full hot rotational range shown by FIG. 135. This view is taken along the same cutting plane of the module 600 as FIGS. 133 and 135. As shown by FIG. 140, in the intermediate rotational range, the inlet 613 of the valve cartridge 610 fluidly communicates with both the hot water supply port 602 and the cold water supply port 603 of the valve casing 601.

FIG. 142 is a cross-sectional elevation of the module 600 showing the valve cartridge 610 in the preheat rotational range, and FIG. 143 is a transverse cross-sectional view taken along line 143-143 of FIG. 142. In these figures, the detent member 672 is illustrated in an extended position corresponding to a water temperature inside the valve cartridge 610 which is less than the set-point temperature. Therefore, the detent member 672 extends far enough into the first recess 606 of the valve casing 601 to resist rotation of the valve cartridge 610 from the preheat rotational range back to the normal rotational range under the torque exerted by the torsion spring 640.

As shown by FIG. 142, when the valve cartridge 610 is in the preheat rotational range, it is an off position in the longitudinal direction of the valve casing 601. Accordingly, the water delivery port 604 of the valve casing 601 is closed off by the upper portion 620 of the valve cartridge 610 to prevent water from being supplied to a plumbing fixture connected to the module 600 during the preheat mode of operation.

When the valve cartridge 610 is in the preheat rotational range, the cold water supply port 603 of the valve casing 601 is blocked by the peripheral wall of the valve cartridge 610, while the hot water supply port 602 and the return port 605 of the valve casing 601 overlap the inlet 613 of the valve cartridge 610 in the circumferential direction. As a result, water is prevented from entering the valve cartridge 610 through the cold water supply port 603 but can flow into the valve cartridge 610 through the hot water supply port 602. The water which enters the valve cartridge 610 through the hot water supply port 602 passes through the interior of the valve cartridge 610 and is discharged from the valve cartridge 610 through a portion of the inlet 613 and then flows into the return port 605 of the valve casing 601.

FIGS. 136-139, 141, and 143 are schematic elevations of the midportion of the valve casing 601 when the valve cartridge 610 is in a variety of positions. In these figures, the locations of the inlet 613 of the valve cartridge 610 and the gap 614 between the upper and lower portions of the valve cartridge 610 are shown by cross hatching, but other portions of the valve cartridge 610 have been omitted for ease of illustration.

FIG. 136 illustrates a state when the valve cartridge 610 is in an off position in the longitudinal direction and in the full cold rotational range, and FIG. 137 shows the state when the valve cartridge 610 is in an on position in the longitudinal direction and in the full cold rotational range. When the valve cartridge 610 is in the full cold rotational range, the inlet 613 of the valve cartridge 610 overlaps the cold water supply port 603 of the valve casing 601 in the circumferential direction of the valve casing 601, but it does not overlap the hot water supply port 602 of the valve casing 601. When the valve cartridge 610 is in an off position in the longitudinal direction as shown in FIG. 136, the gap 614 between the upper and lower portions of the valve cartridge 610 is positioned below the water delivery port 604 of the valve casing 601 in the longitudinal direction, so the upper portion 620 of the valve cartridge 610 blocks the water delivery port 604 of the valve casing 601, and water cannot be discharged from the water delivery port 604 of the valve casing 601. When the valve cartridge 610 is in an on position in the longitudinal direction as shown in FIG. 137, the gap 614 in the valve cartridge 610 overlaps the water delivery port 604 of the valve casing 601 in the longitudinal direction of the valve casing 601, so water can be discharged from the valve casing 601 through the water delivery port 604.

FIG. 138 illustrates a state when the valve cartridge 610 is in an off position in the longitudinal direction and in the full hot rotational range, and FIG. 139 illustrates a state when the valve cartridge 610 is in an on position in the longitudinal direction and in the full hot rotational range. When the valve cartridge 610 is in the full hot rotational range, the inlet 613 of the valve cartridge 610 overlaps the hot water supply port 602 of the valve casing 601 in the circumferential direction of the valve casing 601, but it does not overlap the cold water supply port 603 of the valve casing 601. In FIG. 138, since the valve cartridge 610 is in an off position in the longitudinal direction, the gap 614 in the valve cartridge 610 is positioned below the water delivery port 604 of the valve casing 601, and in FIG. 139, since the valve cartridge 610 is in an on position in the longitudinal direction, the gap 614 in the valve cartridge 610 overlaps the return port 605 of the valve casing 601 in the longitudinal direction.

FIG. 141 illustrates a state when the valve cartridge 610 is in an on position in the longitudinal direction and in an intermediate rotational range between the full cold rotational range and the full hot rotational range. In this position of the valve cartridge 610, the inlet 613 of the valve cartridge 610 overlaps both the cold water supply port 603 and the hot water supply port 602 of the valve casing 601 in the circumferential of the valve casing 601. As a result, water can enter the valve cartridge 610 through both the hot water supply port 602 and the cold water supply port 603 of the valve casing 601. In this figure, the gap 614 in the valve casing 601 is shown with less of an overlap in the longitudinal direction with respect to the water delivery port 604 of the valve casing 601 than in FIG. 139, but the amount of overlap can be varied by raising or lowering the valve cartridge 610 from this position.

FIG. 144 illustrates a state when the valve cartridge 610 is in an off position in the longitudinal direction and in the preheat rotational range. In this position of the valve cartridge 610, the inlet 613 of the valve cartridge 610 overlaps both the hot water supply port 602 and the return port 605 of the valve casing 601 in the circumferential direction of the valve casing 601 to enable water to enter the interior of the valve cartridge 610 through the hot water supply port 602 of the valve casing 601 and then be discharged from the valve cartridge 610 through the return port 605 of the valve casing 601. Since the valve cartridge 610 is in an off position in the longitudinal direction when in the preheat rotational range, the gap 614 in the valve cartridge 610 is positioned below the water delivery port 604 of the valve casing 601 to prevent water from being discharged from the water delivery port 604 at this time.

The normal mode of operation of this embodiment is similar to the normal mode of operation of the previous embodiment, and from the standpoint of a user, the manner of operation is similar to that for a conventional mixing valve. In order to adjust the flow rate of water discharged through the water delivery port 604, a user raises or lowers the valve cartridge 610 with respect to the valve casing 601 by raising or lowering the mixing shaft 635, and in order to adjust the ratio of hot water to cold water which is mixed within the valve cartridge 610, a user varies the rotational position of the valve cartridge 610 with respect to the valve casing 601 between the full cold position and the full hot position by rotating the mixing shaft 635.

In order to switch from the normal mode to the preheat mode of operation, a user lowers the valve cartridge 610 to a lowered (off) position within the valve casing 601 and then rotates the valve cartridge 610 by means of the mixing shaft 635 in the counterclockwise direction past the full hot position to the preheat rotational range against the resistance to rotation exerted by the torsion spring 640. As the valve cartridge 610 is rotated counterclockwise past the full hot position, the top surface of the second level of the upper portion 620 of the valve cartridge 610 passes underneath the lower end of the arcuate wall 657 of the upper end cap 655 to prevent the valve cartridge 610 from being raised from an off position in the longitudinal direction.

When the valve cartridge 610 reaches the preheat rotational range, the cold water supply port 603 of the valve casing 601 is blocked by the peripheral wall of the valve cartridge 610, while the hot water supply port 602 and the return port 605 of the valve casing 601 communicate with each other through the inlet 613 and the interior of the valve cartridge 610. As a result, the module 600 will operate in the preheat mode in which water which enters the valve casing 601 through the hot water supply port 602 flows through the interior of the valve cartridge 610 and is discharged from the return port 605 of the valve casing 601 and then into an unillustrated return passage connected to the return port 605. The flow of water into the return passageway can triggers a pump controller to turn on a return pump connected to the return passageway in the same manner as described with respect to FIG. 1.

When the valve cartridge 610 is in the preheat rotational range, the detent member 672 opposes the first recess 606 in the valve casing 601 in the radial direction. If the water temperature within the valve cartridge 610 to which the leaf spring 671 is exposed is below the set-point temperature, the leaf spring 671 will hold the detent member 672 in an extended position in which it extends into an engages with the first recess 606 in the valve casing 601 as shown in FIG. 143 so as to hold the valve cartridge 610 in the preheat rotational range against the clockwise torque applied to the valve cartridge 610 by the torsion spring 640.

The valve cartridge 610 will remain in the preheat rotational range until either the water temperature inside the valve cartridge 610 reaches the set-point temperature (at which time the thermal detent mechanism will cause the detent member 672 to automatically disengage from the valve casing 601) or the user manually terminates the preheat mode by rotating the valve cartridge 610 in the clockwise direction with sufficient force to disengage the detent member 672 from the first recess 606. In either case, when the valve cartridge 610 is no longer held in the preheat rotational range by the detent member 672, the valve cartridge 610 will rotate back to the full hot position in the normal rotational range due to the torque exerted by the torsion spring 640, and the module 600 will return to the normal mode of operation.

If the water temperature in the preheat core is already at least the set-point temperature when the user attempts to initiate the preheat mode by rotating the valve cartridge 610 to the preheat rotational range, the detent member 672 will not engage with the first recess 606 in the valve casing 601, and the valve cartridge 610 will rotate back to the full hot position under the torque applied by the torsion spring 640 unless the user manually retains the valve cartridge 610 in the preheat rotational range using the mixing shaft 635.

Like the previous embodiment, this embodiment enables a user to easily switch between a normal mode and a preheat mode of operation. Because this embodiment does not require a preheat assembly, it has a simpler structure than the previous embodiment and can be manufactured and assembled more economically.

FIG. 145 is a schematic representation of another embodiment of a flow switching module 700 according to the present invention. While the previous embodiments include a manual control member such as a knob or a lever by which a user can control the flow rate of water through the module, control the ratio of hot to cold water which are mixed in the module, and switch the module between a normal mode and a preheat mode of operation, this embodiment automatically switches between a normal mode and a preheat mode of operation in response to the operating state of a hot water plumbing fixture with which the flow switching module 700 is associated and the temperature of water being supplied to the module 700. Although the module 700 is capable of being incorporated into a hot water plumbing fixture, the module 700 is typically installed as a stand-alone unit separate from and in series with one or more hot water plumbing fixtures requiring hot water. The ability to install the flow switching module 700 independently of a hot water plumbing fixture makes the module 700 particularly suitable for retrofitting in buildings without the need to modify or replace existing plumbing fixtures. For example, the module 700 can be installed in a convenient location in proximity to an existing hot water plumbing fixture, such as under a sink or elsewhere in a kitchen, a bathroom, a laundry room, or other location.

In the previous embodiments in which the mixing valve assembly of the flow switching module performs mixing of hot and cold water for a hot water plumbing fixture, the mixing valve assembly is a manually-operated single-handle device in which flow volume control is performed by linearly translating a valve cartridge and adjusting the mixing ratio of hot to cold water is performed by rotating the valve cartridge about its longitudinal axis. In the present embodiment, there are no restrictions on the structure of a mixing valve for performing flow volume control or mixing hot and cold water. For example, the hot water plumbing fixture may have a linearly-acting one-handle mixing valve, a rotary mixing valve in which flow volume control and mixing are controlled by rotating a knob or handle, a joy-stick type of valve which can rotate about multiple axes, a multiple-handle valve with separate controls for hot and cold water, or a hands-free valve which employs a solenoid valve to turn the flow or water on or off.

As shown in FIG. 145, the flow switching module 700 in this embodiment is fluidly connected to hot water piping 6, a hot water delivery line 7, and return piping 8. The hot water piping 8 is fluidly connected to a source of hot water, such as a hot water heater. The hot water delivery line 7 is fluidly connected to an inlet for hot water of at least one hot water plumbing fixture 3. Only one hot water plumbing fixture 3 is illustrated in FIG. 145, but the module 700 may be connected to a plurality of hot water plumbing fixtures 3 by separate hot water delivery lines 7. The return piping 8 is fluidly connected back to the source of hot water in the manner shown in FIG. 1, for example, to enable water to be preheated prior to being supplied to the hot water plumbing fixture 3. The hot water plumbing fixture 3 may have only an inlet for hot water and no inlet for cold water, but typically the hot water plumbing fixture 3 will also have an inlet for cold water connected to a cold water piping fluidly communicating with a source of cold water.

In this embodiment, the flow switching module 700 senses if any of the one or more hot water plumbing fixtures 3 to which the module 700 is connected is open or closed with respect to hot water, i.e., whether the hot water plumbing fixture 3 is in a state in which water from the hot water delivery line 7 can enter the hot water plumbing fixture 3 (an open or on state) or a state in which hot water from the hot water delivery line 7 is prevented from entering the hot water plumbing fixture 3 (a closed or off state). The module 700 does not sense whether any of the hot water plumbing fixtures 3 to which the module 700 is connected is open or closed with respect to cold water, i.e., whether cold water is able to enter the hot water plumbing fixture 3 through the corresponding cold water piping. Thus, a hot water plumbing fixture 3 can be operated to discharge cold water even if the module 700 prevents hot water from being supplied to the module 700. For example, when the hot water plumbing fixture 3 is a faucet, it can be set to a full cold position in which only cold water enters the faucet without affecting the operation of the module 700. If the module 700 senses that any of the hot water plumbing fixtures 3 is open with respect to hot water, the module 700 then senses whether feed water being supplied to the module 700 through the hot water piping 6 is at least a predetermined set-point temperature. If the water temperature is at least the set-point temperature, the module 700 directs the incoming hot water from the hot water piping 6 to the hot water delivery line 7 to be supplied to the one or more hot water plumbing fixture 3 which is in an open state with respect to hot water. On the other hand, if the water entering the module 700 from the hot water piping 6 is below the set-point temperature, the module 700 directs the incoming hot water to the return piping 8 instead of to the hot water delivery line 7 to be reheated by the source of hot water. Once the water entering the module 700 is warmed up to the set-point temperature, the module 700 will direct incoming water to the open hot water plumbing fixture 3 through the hot water delivery line 7. As a result, no warm water will be wasted during the time required to purge cold water from the hot water piping 6 and bring the water supplied through the hot water piping 6 to the set-point temperature. When all the hot water plumbing fixtures 3 to which the module 700 is connected are closed with respect to hot water, the module 700 shuts off the flow of water into the module 700 from the hot water piping 6, and no water is discharged from the module 700 through either the hot water delivery line 7 or the return piping 8.

The illustrated flow switching module 700 includes a first valve 710 and a second valve 720 fluidly connected to each other in series. The first valve 710 has a first port 711 fluidly connected to the hot water piping 6 and a second port 712 connected to a first port of the second valve 720 by a passageway. In addition to the first port 721, the second valve 720 has a second port 722 fluidly connected to the hot water delivery line 7 and a third port 723 fluidly connected to the return piping 8.

The first valve 710 can be switched between a closed state shown in FIG. 145 in which water is prevented from flowing through the first valve 710 between the first and second ports 711 and 712 and an open state in which water can flow through the first valve 710 between the first and second ports 711 and 712. In FIG. 145, the first valve 710 is schematically illustrated as being biased towards the closed state by a biasing spring 713.

The second valve 720 can be switched between a normal state shown in FIG. 145 in which the first and second ports 721 and 722 of the second valve 720 are fluidly connected with each other while fluid communication between the first and third ports is cut off, and a preheat state in which the first and third ports are fluidly connected with each other through the second valve 720 while fluid communication between the first and second ports 721 and 722 is cut off. In this figure, the second valve 720 is schematically illustrated as being biased towards the normal state by a biasing spring 724. When the second valve 720 is in the normal state, hot water supplied to the second valve 720 by the first valve 710 is fed to the hot water piping 6, and when the second valve 720 is in the preheat state, hot water from the first valve 710 is instead fed to the return piping 8.

The first valve 710 is responsive to the operating state of the one or more hot water plumbing fixtures to which the module 700 is fluidly connected. When all of the hot water plumbing fixtures 3 are in a closed (off) state with respect to hot water, the first valve 710 assumes its closed state. On the other hand, when at least one of the hot water plumbing fixtures 3 to which the module 700 is fluidly connected is in an open (on) state with respect to hot water, the first valve 710 switches to its open state.

The second valve 720 is responsive to the temperature of hot water supplied to it from the first valve 710. If the water temperature is at least the set-point temperature, the second valve 720 assumes its normal state in which the water from the first valve 710 passes through the second valve 720 and is supplied to the hot water plumbing fixtures 3 which are in an open state with respect to hot water. On the other hand, if the temperature of water from the first valve 710 is below the set-point temperature, the second valve 720 assumes its preheat state in which water coming from the first valve 710 is diverted to the return piping 8 instead of being supplied to the one or more hot water plumbing fixtures 3 through the hot water delivery line 7.

The first valve 710 can be embodied by a variety of different structures. For example, it can be a linearly acting valve such as a poppet valve or a spool valve, or it can be a rotary valve. In addition, the first valve 710 can sense whether the hot water plumbing fixtures 3 are open or closed with respect to hot water by a variety of techniques. In the example shown in FIG. 145, the first valve 710 relies upon a pressure difference between the water pressure in the hot water piping 6 and the water pressure in the hot water delivery line 7 to detect whether any of the hot water plumbing fixtures 3 is open with respect to hot water. A first pressure line 730 containing water at the pressure of the hot water piping 6 is connected between the hot water piping 6 and the first valve 710, and a second pressure line 731 containing water at the pressure of the hot water delivery line 7 is connected between the hot water delivery line 7 and the first valve 710. The pressures in the two pressure lines 730 and 731 act on the first valve 710 in opposition to each other, with the pressure in the first pressure line 730 applying a force urging the first valve 710 towards its open state and the pressure in the second pressure line 731 applying a force urging the first valve 710 towards its closed state. The hot water piping 7 and the hot water delivery line 7 are fluidly connected with each other by a connecting passage 732 equipped with a bleed orifice 733. The bleed orifice 733 gradually equalizes the pressures in the hot water piping 6 and the hot water delivery line 7 when all of the hot water plumbing fixtures 3 are closed with respect to hot water. Therefore, when all of the hot water plumbing fixtures 3 to which the module 700 is connected are closed with respect to hot water, the pressures in the hot water piping 6 and the hot water delivery line 7 are close to being equal with each other, and the pressures applied to the first valve 710 through the first and second pressure lines 730 and 731 are close to being equal with each other. Under this condition, the first valve 710 is held in its closed state by the action of the biasing spring 724.

On the other hand, when any of the hot water plumbing fixtures 3 connected to the module 700 is opened with respect to hot water, the water pressure in the hot water delivery line 7 will drop towards atmospheric pressure and will be lower than the pressure in the hot water piping 6. Under this condition, the difference between the pressures in the first and second pressure lines 730 and 731 will force the first valve 710 to switch to the open state against the biasing force of the biasing spring 713.

The mechanism by which the pressures in the first and second pressure lines 730 and 731 act on the first valve 710 to switch the first valve 710 between its open and closed states is not restricted to a particular one. The first valve 710 can include an actuator on which the pressures act and which is mechanically linked to a movable portion of the first valve 710 which controls the flow between the first and second ports 711 and 712 of the first valve 710, such as a spool or other sliding member. Alternatively, the pressure in the first and second pressure lines 730 and 731 can act directly on a spool or other movable member inside the first valve 710 to translate the movable between an open position and a closed position.

Instead of being responsive to differential pressure, the first valve 710 could be switched between an open and closed state in response to the absolute pressure in the hot water delivery line 7. For example, the first valve 710 could be a solenoid valve, and a pressure sensor which senses the water pressure in the hot water delivery line 7 could provide an electrical or other signal to the first valve 710 to make the solenoid switch the first valve 710 from a closed state to an open state when the pressure sensed by the pressure sensor is below a prescribed level indicating that one of the hot water plumbing fixtures 3 is in an open state with respect to hot water.

As another alternative, if the hot water plumbing fixtures 3 are hands-free or similar types equipped with an electrically-operated mixing valve such as a solenoid valve, the first valve 710 could be a solenoid valve which responds to the operation of the solenoid valve for any of the hot water plumbing fixtures 3.

The second valve 720 can also be implemented in a variety of ways, and like the first valve 710 it can be either a linearly acting valve or a rotary valve which can be switched between its normal state and preheat state in response to a sensed water temperature. In FIG. 145, the second valve 720 is illustrated as being equipped with a temperature-sensitive actuator 725 which switches the second valve 720 between its normal and preheat states based on a sensed water temperature. The actuator 725 may be one which is directly exposed to water flowing through the second valve 720, or it may be one which is not itself exposed to water passing through the module 700 but which is connected to a remote sensor or probe installed in a location where it can sense the temperature of water supplied to the second valve 720 from the first valve 710. For example, a probe 726 or temperature sensor for the actuator 726 can be mounted on the passageway connecting the first valve 710 and the second valve 720. An example of an actuator which is directly exposed to water passing through the second valve 720 will be described below with respect to the subsequent drawings. Actuators which are capable of operating a valve in response to a water temperature sensed by a remote probe are commercially available from a variety of sources, such as various temperature regulators sold by Samson Controls, Inc. An example of an actuator which responds to a temperature sensor is a solenoid connected to a temperature sensor mounted on the passage between the first and second valves 710 and 720. A force which the actuator 725 exerts to switch the second valve 720 between its normal and preheat states can be generated in a variety of ways, such as by expansion of a material (such as a liquid or gas) with increasing temperature, a change in the shape of a material (such as a shape memory alloy or a bimetallic strip) with increasing temperature, or by operation of a solenoid or other electrical device.

FIGS. 146-151 illustrate another embodiment of a flow switching module 800 according to the present invention which is suitable for use in a hot water recirculation system according to the present invention, such as the system illustrated in FIG. 1. This embodiment is a more concrete example of the embodiment conceptually illustrated in FIG. 145. This module 800 has a normal mode of operation in which it supplies hot water directly to one or more hot water plumbing fixtures and a preheat mode of operation in which the module 800 diverts water fed to the module 800 to a source of hot water to be reheated. Like the embodiment of FIG. 145, the illustrated module 800 automatically switches between the normal mode and the preheat mode in accordance with the temperature of water being fed to the module 800.

In these figures, the module 800 is illustrated with its longitudinal axis extending horizontally, but the module 800 can be installed and operated at any orientation with respect to the vertical.

As shown in FIGS. 146-148, which are longitudinal cross-sectional views of this embodiment at different stages of operation, the illustrated module 800 includes a housing 801 and a plurality of movable components disposed inside the housing 801. The movable components include a first group of components which together with the housing 801 perform the function of the first valve 710 in FIG. 145 and a second group of components which together with the housing 801 perform the function of the second valve 720 in FIG. 145.

The housing 801 is supported by unillustrated structure so as to remain stationary during the operation of the module 800. For example, the housing 801 can be mounted within a wall, a ceiling, or floor of a building, or underneath a sink, a countertop, or other member. The illustrated module 800 has a single housing 801, but it is also possible for the module 800 to have multiple housings, such as a housing which contains the first group of movable components and another housing which contains the second group of movable components.

The illustrated housing 801 includes a housing body 802 and first and second end plates 803 and 804 which are secured to and close off opposite lengthwise ends of the housing body 802. The housing body 802 is not restricted to any particular shape. In FIGS. 146-148, the housing body 802 is schematically illustrated as being a one-piece member. However, for ease of manufacture and assembly of the module 800, the housing body 802 may comprise multiple sections which can be secured to each other either detachably or permanently in a liquid-tight manner. For example, as shown in FIG. 151, which is an exploded axonometric view of this embodiment, the housing body 802 may comprise two semi-cylindrical half-shells which are mirror images of each other and which are secured to each other in a liquid-tight manner around the movable components of the module 800, and the two end plates 803 and 804 can be attached to opposite lengthwise ends of the housing body 802 in a liquid-tight manner.

The housing body 802 in this embodiment includes three internal chambers disposed in series in the lengthwise direction of the housing 801. A first chamber 805 opens onto a first lengthwise end of the housing body 802 (the lefthand end in FIG. 146) and is closed off in a liquid-tight manner by the first end plate 803. A second chamber 810 adjoins the first chamber 805 and is separated from the first chamber 805 by a first end wall 811. A third chamber 815 opens onto a second lengthwise end of the housing body 802 on the opposite side of the second chamber 810 from the first chamber 805. One lengthwise end of the third chamber 815 (the lefthand end in FIG. 146) is separated from the second chamber 810 by a second end wall 812 of the second chamber 810, and the other lengthwise end of the third chamber 815 (the righthand end in FIG. 146) is closed off by the second end plate 804 in a liquid-tight manner. A passageway 813 for fluid is formed through the second end wall 812 of the second chamber 810 between the second and third chambers 810 and 815.

The housing body 802 further includes a hot water supply port 820, a water delivery port 821, and a return port 822 which open onto the exterior of the housing body 802. FIG. 146 shows one of each of the three ports 820-822, but there may be a plurality of any one or more of the three ports. Namely, there may be more than one hot water supply port 820, more than one water delivery port 821, and more than one return port 822. The hot water supply port 820 is fluidly connected by an unillustrated passageway to a source of hot water, such as a hot water heater. The water delivery port 821 is fluidly connected by an unillustrated passageway to one or more unillustrated plumbing fixtures to which the module 800 can supply hot water. The return port 822 is fluidly connected by an unillustrated passageway to the source of hot water.

The housing body 802 includes a plurality of internal passageways for connecting each of the chambers to one or more of the three ports. The hot water supply port 820 is fluidly connected to the interior of the first chamber 805 by a first passageway 825 and to the interior of the second chamber 810 by a second passageway 826. A bleed orifice 827 is formed between the first passageway 825 and the interior of the first chamber 805. The return port 822 fluidly connected to the interior of the third chamber 815 by a third passageway 828. The water delivery port 821 is also fluidly connected to the interior of the third chamber 815 by a fourth passageway 829, and a fifth passageway 830 extends between the fourth passageway 829 and the first chamber 805 to fluidly connect the water delivery port 821 with the first chamber 805.

The internal passageways in the housing 801 may have any shape or structure which provides fluid communication between the chambers and the corresponding ports of the housing 801. When the housing body 802 is formed of multiple sections which are joined to each other, a convenient way to form the passageways is to form a portion of each passageway in each section of the housing body 802 prior to joining the sections of the housing body 802 to each other. For example, in the exploded view shown in FIG. 151, one half of each passageway is formed as a recess in the face of each half-shell opposing the other half-shell, and the two halves of each passageway together form an entire passageway when the two half-shells are combined with each other.

In FIG. 146, the first and second passageways 825 and 826 are fluidly connected to a single hot water supply port 820, and the first chamber 805 and the third chamber 815 are fluidly connected to a single water delivery port 821. Alternatively, the housing body 802 may include two separate hot water supply ports 820 each fluidly connected to the source of hot water, with one of the hot water supply ports 820 being fluidly connected to the first chamber 805 through a passageway and with the other hot water supply port 820 being fluidly connected to the second chamber 810 by a separate passageway. Similarly, the housing body 802 may include two separate water delivery ports 821 each fluidly connected to one or more plumbing fixtures, with one of the water delivery ports 821 being fluidly connected to the first chamber 805 through a passageway and the other water delivery port 821 being fluidly connected to the third chamber 815 by another passageway.

The housing 801 and the first group of movable components together define a first valve 835 in the form of a poppet valve which is responsive to the difference in pressure between the hot water supply port 820 and the water delivery port 821. The first valve 835 opens when at least one plumbing fixture to which the module 800 is fluidly connected is open with respect to hot water, and it closes when all of the plumbing fixtures to which the module 800 is fluidly connected are closed with respect to hot water. As explained above with respect to FIG. 145, a plumbing fixture is open with respect to hot water when a flow control mechanism of the plumbing fixture, such as a mixing valve, is in a state in which hot water from the water delivery port 821 of the module 800 can be discharged from the plumbing fixture, and the plumbing fixture is closed with respect to hot water when the flow control mechanism of the plumbing fixture prevents hot water from the water delivery port 821 of the module 800 from being discharged from the plumbing fixture.

The housing 801 and the second group of movable components together define a second valve 850 in the form of a sliding valve which is responsive to the temperature of water entering the module 800 through the hot water supply port 820. When the first valve 835 is open and the temperature of water supplied to the third chamber 815 through the hot water supply port 820 is at least a predetermined set-point temperature, the second valve 850 directs the incoming hot water to the water delivery port 821 to be supplied to all of the plumbing fixtures which are fluidly connected to the module 800 and which are open with respect to hot water. On the other hand, when the first valve 835 is open and the temperature of water supplied to the third chamber 815 through the hot water supply port 820 is below the set-point temperature, the second valve 850 diverts the incoming water from the hot water supply port 820 to the return port 822 to be returned to the source of hot water in order to be reheated. When the first valve 835 is closed because all of the plumbing fixtures to which the module 800 is fluidly connected are closed with respect to hot water, the second valve 850 does not supply water to either the water delivery port 821 or the return port 822.

The first valve 835 includes a valve head 836 which is disposed in the third chamber 815 and which can translate in the lengthwise direction of the housing 801 to open or close the passageway 813 through the second end wall 812 of the second chamber 810 to fluid flow. The first valve 835 also includes a valve seat 837 which is formed at the righthand (downstream) end of the passageway 813 where it opens onto the interior of the third chamber 815 and which is shaped for sealing contact with the valve head 836 to enable the valve head 836 to close the passageway 813 to fluid flow when contacting the valve head 836. The first valve 835 further includes an actuator which can move the valve head 836 into and out of sealing contact with the valve seat 837 to open or close the passageway 813 to flow of fluid between the second and third chambers 810 and 815 in response to the difference between the water pressure at the hot water supply port 820 and the water pressure at the water delivery port 821.

In this embodiment, the actuator includes a diaphragm 840 which is disposed inside the first chamber 805 and which is secured to the inner periphery of the first chamber 805 in a manner which prevents water from flowing around the outer periphery of the diaphragm 840 between opposite sides of the diaphragm 840. The diaphragm 840 is not restricted to any particular shape, but in this embodiment it has a circular outer periphery which is received in a circumferentially-extending groove 806 formed in the inner periphery of the first chamber 805. The diaphragm 840 divides the first chamber 805 into a first compartment 807 and a second compartment 808 on opposite sides of the diaphragm 840. The first passageway 825 opens onto the interior of the first compartment 807 to fluidly connect the first compartment 807 with the hot water supply port 820, and the fifth passageway 830 opens onto the interior of the second compartment 808 to fluidly connect the second compartment 808 with the water delivery port 821 through the fourth passageway 829. As a result, the water within the first compartment 807 is at the pressure of the water at the hot water supply port 820, and the water within the second compartment 808 is at the pressure of the water at the water delivery port 821. The second compartment 808 also fluidly communicates with the first passageway 825 through the bleed orifice 827, which opens onto the interior of the first chamber 805 within the second compartment 808.

In response to the difference in water pressures in the first and second compartments 807 and 808, the diaphragm 840 varies between the bowed shape shown in FIG. 146 in which it is bowed into the first compartment 807 and the bowed shape shown in FIG. 147 in which it is bowed into the second compartment 808. The diaphragm 840 is connected to the valve head 836 in a manner such that the valve head 836 is pulled into sealing contact with the valve seat 837 when the diaphragm 840 has the bowed shape shown in FIG. 146 and such that the valve head 836 is moved out of sealing contact with the valve seat 837 when the diaphragm 840 has the bowed shape shown in FIG. 147. The diaphragm 840 can be connected to the valve head 836 in a variety of ways. In this embodiment, the diaphragm 840 is connected to the valve head 836 by a rigid rod 841. One end of the rod 841 is integrally formed with or otherwise secured to the valve head 836, and the other end of the rod 841 passes through a flanged cylindrical collar 842 which is attached to or integrally formed with one face of the diaphragm 840. As shown in the exploded view of FIG. 151, the rod 841 is connected to the diaphragm 840 by two circlips 843 which fit into grooves formed in the outer surface of the rod 841. The collar 842 is disposed between the two grooves and is restrained against translating in the lengthwise direction of the rod 841 by the circlips 843. The actuator further includes a biasing member for biasing the diaphragm 840 to the bowed shape shown in FIG. 146. The biasing member comprises a helical compression spring 844 which is disposed around the rod 841 and is partially received in a recess 809 of the first chamber 805 adjoining the second compartment 808. The left-hand end of the compression spring 844 fits over the collar 842 and presses against a flange formed at one end of the collar 842. The rod 841 slidably passes through a through hole in the first end wall 811 separating the first and second chambers 805 and 810. Unillustrated sealing members may be provided to prevent water from flowing along the exterior of the rod 841 through the through hole between the first and second chambers 805 and 810.

The second valve 850 includes a sliding valve member which is slidably disposed in the third chamber 815 and which can translate in the lengthwise direction of the housing 801 to selectively permit or block fluid flow between the interior of the third chamber 815 and the third passageway 828 or the fourth passageway 829 to control fluid communication between the third chamber 815 and the water delivery port 821 or the return port 822. The sliding member is not restricted to any particular shape, but in the present example it comprises a tubular spool 851 having a generally cylindrical outer shape. FIGS. 149 and 150 are axonometric views of the spool 851 as seen from different angles. The spool 851 includes first and second cylindrical lands 852 and 853 extending to opposite lengthwise ends of the spool 851 and a reduced-diameter portion 854 which is formed between the lands and has a smaller outer diameter than the lands. At least one hole 855 is formed in the reduced-diameter portion 854 between the inner and outer surfaces of the spool 851 to enable water to flow from the interior to the exterior of the spool 851. The left-hand end of the spool 851 (the end closer to the valve head 836) is open to allow water to enter into the spool 851 from the interior of the third chamber 815. The righthand end of the spool 851 in this embodiment also opens onto the interior of the third chamber 815 so that the fluid pressure on opposite lengthwise ends of the spool 851 will be balanced, but it is also possible for the righthand end of the spool 851 to be closed. A biasing member in the form of a compression spring 856 is disposed between the righthand end of the spool 851 and the second end plate 804 to apply a biasing force on the spool 851 towards the valve head 836.

The spool 851 can be moved to a plurality of positions in the lengthwise direction of the housing 801. FIG. 146 illustrates the spool 851 in what will be referred to as an off position in which the second land 853 of the spool 851 blocks the radially inner ends of both the third and fourth passageways 828 and 829 to prevent water from flowing from the third chamber 815 into either the water delivery port 821 or the return port 822. FIG. 147 illustrates the spool 851 in what will be referred to as a preheat position in which the second land 853 of the spool 851 blocks the radially inner end of the fourth passageway 829 while the reduced-diameter portion 854 of the spool 851 overlaps the radially inner end of the third passageway 828. When the spool 851 is in this position, water can flow from the interior of the third chamber 815 through the spool 851 and the third passageway 828 into the return port 822 but is prevented from flowing to the water delivery port 821. FIG. 148 illustrates the spool 851 in what will be referred to as an on position in which the first land 852 of the spool 851 blocks the radially inner end of the third passageway 828 while the reduced-diameter portion 854 of the spool 851 overlaps the radially inner end of the fourth passageway 829. When the spool 851 is in this position, water can flow from the interior of the third chamber 815 through the spool 851 and the fourth passageway 829 into the water delivery port 821 but is prevented from flowing to the return port 822.

The spool 851 is further equipped with a shaft 857 through which a force for translating the spool 851 can be transmitted to the spool 851. As best shown in FIG. 150, one end of the shaft 857 is secured to the interior of the spool 851 by a plurality of spokes 858 which extend between the shaft 857 and the interior surface of the spool 851, while the other end of the spool 851 extends out of the left-hand end of the spool 851 towards the valve head 836. Water which enters the third chamber 815 from the second chamber 810 can flow into the interior of the spool 851 through the spaces between adjoining spokes 858.

The second valve 850 further includes a temperature-sensitive actuator (referred to below as a thermal actuator 860) which is responsive to the temperature of water entering the third chamber 815 from the hot water supply port 820. The thermal actuator 860 can move the spool 851 from a preheat position to an on position when the temperature of water in the third chamber 815 reaches the predetermined set-point temperature. The thermal actuator 860 is not restricted to any particular type, but in the present example, the thermal actuator 860 is in the form of a wax motor. The thermal actuator 860 includes a tube 861 which is secured to the valve head 836 within the third chamber 815 on the opposite side of the valve head 836 from the rod 841 of the first valve 835. The tube 861 has a blind end (the left-hand end in FIG. 146) in proximity to the valve head 836 and an open end (the righthand end in FIG. 146) remote from the valve head 836. The shaft 857 of the spool 851 is slidably disposed in the open end of the tube 861 and can reciprocate within the tube 861 like a piston. A temperature-sensitive material in the form of wax 862, such as a wax pellet, which expands when it melts is disposed inside the tube 861 between the blind end and the shaft 857 of the spool 851. The left-hand end of the shaft 857 is pressed into contact with the wax 862 by the force of the biasing spring 856 acting on the remote end of the spool 851. The wax 862 is selected to have a melting temperature at the set-point temperature. When the wax 862 melts at the set-point temperature, it expands inside the tube 861 and pushes the shaft 857 and the spool 851 away from the valve head 836 against the biasing force of the biasing spring 856. A sealing member may be provided between the shaft 857 and the tube 861 to prevent the wax 862 from flowing along the shaft 857 to the exterior of the tube 861 when the wax 862 melts. The dimensions of the wax 862 and the locations of the third and fourth passageways 828 and 829 are selected such that when the wax 862 is in a solid state and the valve head 836 of the first valve 835 is closed, the spool 851 is in an off position as shown in FIG. 146, and such that when the wax 862 is in a solid state and the valve head 836 of the first valve 835 is open, the spool 851 is moved to a preheat position as shown in FIG. 147. Furthermore, when the valve head 836 of the first valve 835 is open and the wax 862 melts and expands due to the water temperature in the third chamber 815 reaching the set-point temperature, the spool 851 is pushed by the expansion of the wax 862 to an on position as shown in FIG. 148.

The operation of this embodiment will be described while referring to FIGS. 146-148. FIG. 146 shows the state of the module 800 when all of the one or more plumbing fixtures to which the water delivery port 821 of the module 800 is fluidly connected are closed with respect to hot water and the temperature of water within the third chamber 815 is below the set-point temperature. In this state, the static pressure at the hot water supply port 820 is substantially the same as the static pressure at the water delivery port 821, so the water pressures in the first and second compartments 808 and 809 of the first chamber 805 are substantially equal to each other. Accordingly, the diaphragm 840 assumes the shape shown in FIG. 146 in which it is bowed to the left into the first compartment 807, and the valve head 836 is pulled by the diaphragm 840 through the rod 841 connecting the diaphragm 840 with the valve head 836 into sealing contact with the valve seat 837, thereby closing the passageway 813 between the second and third chambers 810 and 815. Since the water temperature in the third chamber 815 at this time is below the set-point temperature, the wax 862 of the thermal actuator 860 is in a solid (contracted) state, and the spool 851 is in an off position in which it blocks the radially inner ends of both the third passageway 828 and the fourth passageway 829. As a result, there is no flow of water through the module 800.

FIG. 147 shows the state in which any one of the one or more plumbing fixtures to which the module 800 is fluidly connected has been opened with respect to hot water and the temperature of water within the third chamber 815 is still below the set-point temperature. Assuming that the plumbing fixtures discharge hot water into a region which is at atmospheric pressure, as is commonly the case with household plumbing fixtures such as faucets or showers, the opening of any one of the plumbing fixtures with respect to hot water causes an abrupt decrease in the water pressure at the water delivery port 821 towards atmospheric pressure. As a result, the water pressure in the second compartment 808 of the first chamber 805 falls sufficiently below the water pressure in the first compartment 807 to cause the diaphragm 840 to deform to the shape shown in FIG. 147 in which it is bowed into the second compartment 808. As the diaphragm 840 deforms from the shape shown in FIG. 146 to the shape shown in FIG. 147, it pushes the valve head 836 to the right in the figure out of sealing contact with the valve seat 837 and opens the passageway 813 connecting the second and third chambers 810 and 815, thereby allowing water to flow from the hot water supply port 820 through the second chamber 810 and into the third chamber 815. As the valve head 836 moves to the right, it pushes the spool 851 to the right. If the water entering the third chamber 815 from the hot water supply port 820 at this time is below the set-point temperature, the wax 862 in the thermal actuator 860 remains in a solid (contracted) state, so the movement of the valve head 836 to the right pushes the spool 851 to a preheat position shown in FIG. 147 in which the interior of the spool 851 fluidly communicates with the return port 822 through the third passageway 828 while the radially inner end of the fourth passageway 829 leading to the hot water supply port 820 is blocked by the second land 853 of the spool 851. When the spool 851 is in a preheat position, water which enters the third chamber 815 through the hot water supply port 820 is directed to the return port 822 instead of to the water delivery port 821. As in the previous embodiments, the flow of water from the return port 822 can trigger a pump controller to turn on a return pump which returns water from the module 800 to a hot water heater to be reheated in the manner described with respect to FIG. 1.

In the state shown in FIG. 147, fluid communication between the third chamber 815 and the water delivery port 821 is cut off by the spool 851, so the water pressure at the water delivery port 821 is still significantly lower than the water pressure at the hot water supply port 820, and the diaphragm 840 remains in the position shown in FIG. 147 in which it is bowed into the second compartment 808 of the first chamber 805.

When the spool 851 is in the preheat position shown in FIG. 147, the temperature of water entering the module 800 through the hot water supply port 820 and flowing through the third chamber 815 will gradually increase as water below the set-point temperature which was previously in piping leading to the hot water supply port 820 is returned to the source of hot water for reheating through the return port 822. When the water temperature in the third chamber 815 reaches the set-point temperature, the wax 862 in the thermal actuator 860 will melt and expand within the tube 861 and push the spool 851 to an on position as shown in FIG. 148. In this position, the interior of the spool 851 fluidly communicates with the water delivery port 821 through the fourth passageway 829, while the radially inner end of the third passageway 828 leading to the return port 822 is blocked by the first land 852 of the spool 851. With the spool 851 in this position, hot water at or above the set-point temperature is supplied through the water delivery port 821 to the one or more plumbing fixtures which is open with respect to hot water. At this time, the hot water supply port 820 fluidly communicates with the water delivery port 821 through the interior of the module 800, resulting in a decrease in the water pressure at the hot water supply port 820 compared to the state shown in FIG. 146 or FIG. 147 in which fluid communication between the hot water supply port 820 and the water delivery port 821 is cut off. However, due to pressure losses as water flows through the housing 801 between the hot water supply port 820 and the water delivery port 821, the water pressure at the water delivery port 821 will remain lower than the water pressure at the hot water supply port 820, and the diaphragm 840 will remain bowed into the second compartment 808 as shown in FIG. 148 to keep the passageway 813 connecting the second and third chambers 810 and 815 open.

When the module 800 is in the state shown in FIG. 148, if all the plumbing fixtures to which the module 800 is fluidly connected are then closed with respect to hot water, no water will flow through the module 800 from the hot water supply port 820 to the water delivery port 821, so the water pressure at the water delivery port 821 will abruptly rise to the water pressure at the hot water supply port 820, and the water pressures in the first and second compartments of the first chamber 805 will become substantially equal to each other. As a result, the diaphragm 840 will revert to the shape in which it is bowed into the first compartment 807, and the deformation of the diaphragm 840 from the shape shown in FIG. 148 to the shape shown in FIG. 146 will pull the valve head 836 back into sealing contact with the valve seat 837 to close the passageway 813 connecting the second and third chambers 810 and 815. As the valve head 836 moves to the left from the position shown in FIG. 148, the spool 851 will be also moved to the left under the force of the biasing spring 856. As long as the water temperature in the third chamber 815 remains above the set-point temperature, the wax 862 will remain in an expanded state. If the state in which all the plumbing fixtures are closed continues for a sufficiently long time, the water temperature in the third chamber 815 will gradually fall below the set-point temperature, and the wax 862 will resolidify and return to the contracted state shown in FIG. 146. When the wax 862 solidifies, the spool 851 will be pushed to the left under the force of the biasing spring 856 to return to the off position shown in FIG. 146.

If any of the plumbing fixtures to which the module 800 is fluidly connected is again opened with respect to hot water when the module 800 is in a state in which the water temperature in the third chamber 815 is at least the set-point temperature, the diaphragm 840 will again change to the bowed shape shown in FIG. 148 to open the passageway 813 between the second and third chambers 810 and 815, and the spool 851 will be pushed by the valve head 836 to an on position. As the spool 851 is moved to an on position as shown in FIG. 148, the spool 851 may momentarily pass through a preheat position but will not remain in a preheat position, so substantially no water will be discharged from the return port 822 as the spool 851 travels to the on position.

When all the plumbing fixtures to which the module 800 is fluidly connected are closed with respect to hot water, the bleed orifice 827 connecting the first passageway 825 with the second compartment 808 of the first chamber 805 maintains the water pressure in the first and second compartments substantially equal to each other. Therefore, even if there is leakage of water in any passageways fluidly connecting the water delivery port 821 with the plumbing fixtures which could result in a drop in water pressure in the second compartment 808 compared to the first compartment 807, the bleed orifice 827 can compensate for any leakage and maintain the water pressure in the second compartment 808 sufficiently high to keep the diaphragm 840 bowed into the first compartment 807 and thereby keep the valve head 836 sealed against the valve seat 837.

A pressure-sensitive actuator for operating the valve head 836 of the first valve 835 of FIG. 146 is not limited to a diaphragm. FIG. 152 is a longitudinal cross-sectional view of an embodiment of a flow switching module according to the present invention which is a modification of the embodiment of FIG. 146. In this embodiment, the diaphragm 840 of FIG. 146 has been replaced by a piston 865 which is disposed in the first chamber 805 and which can reciprocate in the longitudinal direction of the module to operate the valve head 836.

The piston 865 is connected to the rod 841 for the valve head 836 in a manner such that translation of the piston 865 within the first chamber 805 causes the valve head 836 to move into or out of sealing contact with the valve seat 837 to open or close the passageway 813 connecting the second and third chambers 810 and 815. Like the diaphragm 840 of FIG. 146, the piston 865 divides the interior of the first chamber 805 into a first compartment 807 which fluidly communicates with the hot water supply port 820 through the first passageway 825 and a second compartment 808 which fluidly communicates with the water delivery port 821 through the fourth and fifth passageways 829 and 830. As a result, the pressure at the hot water supply port 820 is applied to one end face of the piston 865 (the left-hand end face in the figure) through the first passage, and the pressure at the water delivery port 821 is applied to the opposite end face of the piston 865 (the righthand end in the figure) through the fourth and fifth passageways 829 and 830. As in the embodiment of FIG. 146, a bleed orifice 827 is formed between the first passageway 825 and the interior of the second compartment 808.

The distance by which the piston 865 can translate to the left in FIG. 152 is limited by contact between the valve head 836 and the valve seat 837. The distance by which the piston 865 can translate to the right in the FIG. may be limited by suitable structure, such as by a circlip mounted in a circumferentially-extending groove formed in the peripheral wall of the first chamber 805 on the righthand side of the piston 865. The biasing spring 844 surrounding the rod 841 applies a biasing force to urge piston 865 towards the left in the figure.

When all of the plumbing fixtures to which the module is fluidly connected are closed with respect to hot water, the water pressures in the first and second compartments 807 and 808 on opposite sides of the piston 865 are substantially equal, so the piston 865 is pressed by the biasing spring 844 into a position in which the valve head 836 closes off the passageway 813 between the second the third chambers. When any of the plumbing fixtures to which the module is fluidly connected is opened with respect to hot water, the water pressure in the first compartment 807 abruptly falls below the water pressure in the second compartment 808, and the difference in water pressure acting on opposite ends of the piston 865 moves the piston 865 to the right in the figure against the force of the biasing spring 844 to move the valve head 836 out of contact with the valve seat 837 as shown in FIG. 152 and open the passageway 813 between the second and third chambers 810 and 815. The structure and operation of this embodiment are otherwise the same as those of the embodiment of FIG. 146, and components of this embodiment which are the same as in the embodiment of FIG. 146 are affixed with the same reference numbers. This embodiment can be employed in a hot water recirculation system according to the present invention in the same manner as the embodiment of FIG. 146.

FIGS. 153 and 154 are cutaway axonometric views as seen from different angles of a portion of an embodiment of a flow switching module according to the present invention which is another variation of the embodiment illustrated in FIG. 146. The overall structure of this embodiment is similar to that of the embodiment of FIG. 146. In contrast to the embodiment of FIG. 146, the valve head 836 in this embodiment is not connected to the spool 851, so the valve head 836 can translate without producing translation of the spool 851.

This embodiment includes a wax motor thermal actuator 860 which is similar to the thermal actuator 860 of FIG. 146 except that the tube 861 of the thermal actuator is not secured to the valve head 836. Instead, the tube 861 of the thermal actuator is secured to the interior of the third chamber 815 to prevent the tube 861 from translating. For example, in the illustrated example, the end of the tube 861 remote from the spool 851 is secured by spokes 870 to a circular ring 871 having an outer periphery which is received in and restricted against movement by a circumferentially-extending groove 872 formed in the peripheral surface of the third chamber 815. The spaces between the spokes 870 enable water to freely pass through the ring 871 and flow into the interior of the spool 851. The structure of this embodiment is otherwise the same as that of the embodiment of FIG. 146, and it can be employed in the same manner as that embodiment.

When the water temperature in the third chamber 815 is below the set-point temperature, the wax 862 within the thermal actuator 860 is in a solid state, and the spool 851 is in a preheat position shown in FIG. 153 in which the second land 853 of the spool 851 blocks the radially inner end of the fourth passageway 829 while the reduced-diameter portion 854 of the spool 851 overlaps the radially inner end of the third passageway 828 to enable water to flow from the interior of the third chamber 815 to the return port 822 while preventing water from flowing from the interior of the third chamber 815 into the water delivery port 821. When the water temperature in the third chamber 815 reaches the set-point temperature, the wax 862 inside the tube 861 melts and expands to translate the spool 851 in the longitudinal direction of the housing 801 (to the right in FIG. 153) to an on position shown in FIG. 154 in which the first land 852 of the spool 851 blocks the radially inner end of the third passageway 828 while the reduced-diameter portion 854 of the overlaps the radially inner end of the fourth passageway 829 to allow water to flow from the interior of the third chamber 815 to the water delivery port 821 while preventing water from flowing into the return port 822. In contrast to the embodiment shown in FIG. 146, the spool 851 in this embodiment does not have an off position in which it blocks flow from the third chamber 815 to both the return port 822 and the water supply port. However, as long as the spool 851 blocks fluid communication between the return port 822 and the water supply port when the spool 851 is in either a preheat position or an on position, it is unnecessary for the spool 851 to have an off position. Except for the fact that the spool 851 is not mechanically linked to the valve head 836, the operation and structure of this embodiment are the same as that of the embodiment of FIG. 146.

Although not shown in FIGS. 153 and 154, this embodiment may employ any type of pressure-sensitive actuator for actuating the first valve, such as a diaphragm as shown in FIG. 146 or a piston as shown in FIG. 152.

A thermal actuator for the spool 851 of the second valve 850 is not limited to a wax motor. FIG. 155 is an exploded axonometric view of a portion of the movable components of an embodiment of a flow switching module which is a variation on the embodiment shown in FIG. 151. In this embodiment, a flow switching module includes a thermal actuator which employs a shape memory alloy. Specifically, in this embodiment, a helical compression spring 875 made of a shape memory alloy is used in place of the wax pellet used in the embodiment of FIG. 146. The components illustrated in FIG. 155 are substantially the same as the movable components shown in FIG. 151. For ease of illustration, the diaphragm 840, the circlips 843, biasing spring 844, and biasing spring 856 have been omitted from FIG. 155, but these unillustrated components can be connected to the components shown in FIG. 155 in the same manner as in FIG. 151. In addition, a pressure-sensitive actuator other than the diaphragm 840 shown in FIG. 151 may be employed, such as a piston 865 like the one shown in FIG. 152. The movable components shown in FIG. 155 can be installed within the housing body 802 of a flow switching module in the same manner as shown in FIG. 146.

Spring 875 is made of a shape memory alloy, such as Nitinol (a Ni-Ti based alloy). The shape memory alloy spring 875 is disposed inside the tube 861 extending from the valve head 836 in substantially the same location as the wax pellet between the blind end of the tube 861 and the lefthand end of the shaft 857 of the spool 851. The shaft 857 is urged into contact with the shape memory alloy spring 875 by an unillustrated biasing spring corresponding to biasing spring 856 of FIG. 151 located at the opposite end of the spool 851 in the same manner as in the embodiment of FIG. 151. Depending upon the inner diameter of the tube 861 and the outer diameter of the shape memory alloy spring 875, the shaft 857 of the spool 851 may be equipped with an enlarged head 857a to provide contact between the shaft 857 and the shape memory alloy spring 875 without the need to increase the diameter of the shaft 857 over its entire length.

The shape memory alloy spring 875 has a contracted shape and an elongated shape in which the shape memory alloy spring 875 is elongated with respect to the contracted shape. The shape memory alloy spring 875 transitions from the contracted shape to the elongated shape at a predetermined transition temperature. The shape memory alloy forming the shape memory alloy spring 875 is selected so that the transition temperature of the shape memory alloy spring 875 is the predetermined set-point temperature for the module 800. Helical springs made of a shape memory alloy having a desired transition temperature are readily available from multiple manufacturers. When the water temperature in the third chamber 815 is below the set-point temperature, the shape memory alloy spring 875 will remain in the contracted shape in which the separation between the valve head 836 and the spool 851 is a minimum. When the water temperature in the third chamber 815 reaches the set-point temperature, i.e., the transition temperature of the shape memory alloy, the shape memory alloy spring 875 abruptly transitions to its elongated shape and pushes the shaft 857 of the spool 851 away from the valve head 836 of the first valve 835. The shape memory alloy spring 875 will remain in its elongated shape until the water temperature in the third chamber 815 falls below the set-point temperature by a prescribed amount which depends upon the characteristics of the shape memory alloy, at which point biasing spring 856 will force the shape memory alloy spring 875 back to its contracted shape. Thus, in the same manner as the wax pellet of the thermal actuator 860 of FIG. 146, the shape memory alloy spring 875 varies the separation between the spool 851 and the valve head 836 in accordance with the water temperature in the third chamber 815. The operation of this embodiment may be otherwise the same as that of the embodiment of FIG. 146.

FIGS. 156-158 schematically illustrate another embodiment of a flow switching module according to the present invention which is a variation on the embodiment shown in FIG. 152. FIG. 158 is a longitudinal cross-sectional view of the entire module, FIG. 156 is a cutaway axonometric view of the right lengthwise end of the module, and FIG. 157 is an exploded axonometric view of portions of a second valve 880 of the module. The overall structure of this embodiment is similar to that of the embodiment shown in FIG. 146, and components of this embodiment corresponding to those of the embodiment of FIG. 146 are affixed with the same reference numerals as in FIG. 146.

Like the embodiment of FIG. 146, this embodiment includes a first valve 835 and a second valve 880 disposed in a housing 801. The first valve 835, which has the same structure as the first valve 835 in FIG. 146, is responsive to the pressure differential between a hot water supply port 820 and a water delivery port 821 of the housing 801. A valve head 836 of the first valve 835 can be moved between an open position shown in FIG. 158 and a closed position by an actuator comprising a piston 865 disposed in a first chamber 805 of the housing 801 in the same manner as shown in FIG. 152, although a different type of actuator, such as a diaphragm as shown, for example, in FIG. 146, may instead be employed.

The principal difference between this embodiment and the embodiment of FIG. 146 is the structure of the second valve 880. In this embodiment, the second valve 880 comprises a poppet valve having a poppet 881 which is movably disposed in a third chamber 815 of the housing 801. The illustrated poppet 881 has a generally cylindrical outer periphery, but a variety of shapes are possible. The poppet 881 has a first lengthwise end 882, a second lengthwise end 883, and a flange 884 located between the lengthwise ends 882 and 883. The poppet 881 can reciprocate within the third chamber 815 of the housing 801 between a preheat position shown in FIGS. 156 and 158 and an unillustrated on position.

When the poppet 881 is in the preheat position, the first lengthwise end 882 of the poppet 881 sealingly contacts a valve seat 890 formed in a recess 891 at the radially inner end of a fourth passageway 829 of the housing 801 to prevent flow of fluid from the third chamber 815 to the water delivery port 821 through the fourth passageway 829. At the same time, the second lengthwise end 883 of the poppet 881 is spaced from a valve seat 892 formed in a recess 893 at the radially inner end of a third passageway 828 of the housing 801 to allow fluid to flow from the third chamber 815 to the return port 822 through the third passageway 828

When the poppet 881 is in the on position, the first lengthwise end 882 of the poppet 881 is spaced from the valve seat 890 at the radially inner end of the fourth passageway 829 of the housing 801 to allow fluid to flow from the third chamber 815 to the water delivery port 821 through the fourth passageway 829. At the same time, the second lengthwise end 883 of the poppet 881 sealingly contacts the valve seat 892 at the radially inner end of the third passageway 828 of the housing 801 to prevent fluid from flowing from the third chamber 815 to the return port 822 through the third passageway 828.

In FIGS. 156 and 158, the poppet 881 is illustrated with its longitudinal axis extending at right angles to the longitudinal axis of the housing 801, but it can be disposed at any angle with respect to the longitudinal axis of the housing 801 which enables the poppet 881 to reciprocate between its preheat position and its on position.

The second valve 880 further includes a first biasing member and a second biasing member for urging the poppet 881 to reciprocate in opposite directions. The biasing members are not restricted to any particular structure, but in the present embodiment, the first biasing member is in the form of a first helical compression spring 885 which is mounted on the first lengthwise end 882 of the poppet 881, and the second biasing member is in the form of a second helical compression spring 886 mounted on the second lengthwise end 883 of the poppet 881. The first spring 885 is made of a shape memory alloy such as Nitinol, while the second spring 886 is made of a conventional material which does not exhibit the shape memory phenomenon. Like the shape memory alloy spring 861 in the embodiment of FIG. 155, the first spring 885 transitions from a contracted shape shown in FIGS. 156 and 158 to an unillustrated elongated shape at a predetermined transition temperature. As is the case with respect to the embodiment of FIG. 155, the shape memory alloy forming the first spring 885 is selected so that the transition temperature of the first spring 885 is a predetermined set-point temperature for the module.

The second spring 886 is disposed between the radially inner end of the third passageway 828 of the housing 801 and the flange 884 of the poppet 881. The second spring 886 exerts a biasing force on the poppet 881 in its axial direction which urges the poppet 881 towards the preheat position shown in FIGS. 156 and 158. When the water temperature within the third chamber 815 of the housing 801 is below the set-point temperature, the biasing force exerted by the second spring 886 is greater than a biasing force, if any, exerted by the first spring 885 in the opposite direction, and the poppet 881 is held in the preheat position by the second spring 886. When the water temperature in the third chamber 815 reaches the set-point temperature, the first spring 885 transitions from its contracted shape to its elongated shape. The spring properties of the first spring 885 are selected such that when the first spring 885 is in its elongated shape, it applies a biasing force to the flange 884 of the poppet 881 which is greater than the biasing force in the opposite direction applied by the second spring 886, and the poppet 881 is moved by the first spring 885 to the on position.

The operation of this embodiment is similar to that of the embodiment of FIG. 146. The water delivery port 821 of the module is connected by unillustrated piping to one or more hot water plumbing fixtures. When all of the hot water plumbing fixtures are closed with respect to hot water, the first valve 835 is held in a closed position in which it prevents water supplied to the hot water supply port 820 of the housing 801 from flowing from the second chamber 810 into the third chamber 815 of the housing 801, so there is no fluid flow through the module. If any of the hot water plumbing fixtures is opened with respect to hot water, the valve head 836 moves from a closed position to the open position shown in FIGS. 156 and 158, and water which enters the housing 801 though the hot water supply port 820 is able to flow through the second chamber 810 and into the third chamber 815. If the temperature of water in the third chamber 815 is below the set-point temperature, the poppet 881 of the second valve is held by the second spring 886 in the preheat position shown in FIG. 158, and water which enters the third chamber 815 is discharged from the housing 801 though the return port 822 and is returned to an unillustrated water heater by unillustrated piping. When the temperature of water in the third chamber 815 reaches the set-point temperature, the poppet 881 transitions from the contracted state to an elongated state and forces the poppet 881 to its open position in which water which enters the third chamber 815 is discharged from the housing 801 through the water delivery port 821 and supplied to any of the hot water plumbing fixtures which are open with respect to hot water. When all of the hot water plumbing fixtures are again closed with respect to hot water, the valve head 836 of the first valve 835 will return to its closed position, and flow through the module will be terminated until any of the hot water plumbing fixtures is again opened with respect to hot water. The operation of this embodiment is otherwise the same as that of the embodiment of FIG. 146, and this embodiment can be employed in a hot water recirculation system according to the present invention in the same manner as that embodiment.

FIGS. 159-161 are schematic axonometric cross-sectional views of another embodiment of a flow switching module 900 according to the present invention, showing the module 900 in different operating states. Like the embodiment conceptually illustrated in FIG. 145, this module 900 is responsive to both differential pressure and temperature. The module 900 senses whether a plumbing fixture to which the module 900 is fluidly connected is open or closed with respect to hot water based on a differential pressure. When the module 900 senses that a plumbing fixture is closed with respect to hot water based on the differential pressure, no water flows through the module 900. When the module 900 senses that a plumbing fixture is open with respect to hot water, the module 900 selectively directs water being supplied to the module 900 either to the plumbing fixture or diverts the water to a source of hot water to be reheated, depending on the temperature of the water being supplied to the module 900.

Like the embodiment of FIG. 145, this embodiment is capable of being incorporated into a plumbing fixture, but usually the module 900 is installed as a stand-alone unit separate from and in series with one or more hot water plumbing fixtures requiring hot water.

The illustrated module 900 has mirror image symmetry with respect to the cutting plane in the figures, so the unillustrated portions of the module 900 form a mirror image of the portions shown in FIGS. 159-161. In these figures, the module 900 is illustrated with its longitudinal axis extending vertically, but as is the case with respect to the preceding embodiments, the module 900 can be installed and operated at any orientation with respect to the vertical.

As shown in FIG. 159, the module 900 includes a housing 901 and a piston 910 movably disposed in the housing 901 for reciprocation in the longitudinal direction of the housing 901. The housing 901 can have any shape which enables the piston 910 to reciprocate inside it. In the present embodiment, the housing 901 has generally cylindrical inner and outer peripheries. The housing 901 is schematically illustrated as being a one-piece member, but it may comprise multiple sections which can be secured to each other either detachably or permanently in a liquid-tight manner in order to facilitate manufacture and assembly of the module 900. Like the housing of the embodiment of FIG. 146, the housing 901 is typically supported by unillustrated structure so as to remain stationary during the operation of the module 900.

The housing 901 includes a hot water supply port 902, a water delivery port 903, and a return port 904 which each fluidly communicate between the interior and the exterior of the housing 901. The return port 904 is formed in a peripheral wall of the housing 901, while the hot water supply port 902 and the water delivery port 903 are formed in opposite lengthwise end surfaces of the housing 901. However, the hot water supply port 902 and the water delivery port 903 can be formed in other portions of the housing 901 as long as water flowing through the housing 901 from the hot water supply port 902 to the water delivery port 903 passes through the piston 910.

The hot water supply port 902 is fluidly connected by an unillustrated passageway to a source of hot water, such as a hot water heater. The water delivery port 903 is fluidly connected by an unillustrated passageway to one or more hot water plumbing fixtures to which the module 900 can supply hot water. The return port 904 is fluidly connected by an unillustrated passageway to the source of hot water.

The housing 901 and the piston 910 together define a sliding valve for controlling fluid flow through the return port 904 of the housing 901. The piston 910 typically has an outer peripheral shape which matches the inner peripheral shape of the housing 901. For example, in the present embodiment, the piston 910 has a cylindrical peripheral wall 911 which matches the cylindrical peripheral wall of the housing 901. The piston 910 is schematically illustrated as being a one-piece member, but like the housing 901, it may comprise multiple sections which can be secured to each other either detachably or permanently in a liquid-tight manner. The piston 910 is at least partially open at one end (the lower end in FIG. 159) to allow water from the hot water supply port 902 of the housing 901 to flow into the interior of the piston 910. At its other end (the upper end in FIG. 159), the piston 910 has an end wall 912 across which differential pressure can act to apply a force for translating the piston 910 in the longitudinal direction of the housing 901. A through hole defining a water delivery port 903 is formed in the end wall 912, and a feed tube 914 extends downwards from the water delivery port 903 into the interior of the piston 910. A bleed orifice 915 in the form of a through hole is also formed in the end wall 912 of the piston 910 between the top and bottom sides of the end wall 912 to allow a limited amount of water to slowly pass from one side of the piston 910 to the other. Water can flow from the hot water supply port 902 to the water delivery port 903 of the housing 901 by flowing through either the bleed orifice 915 or the feed tube 914 and the water delivery port 903 of the piston 910. A return port 916 which extends between the inner and outer surface of the piston 910 is formed in the peripheral wall 911 of the piston 910.

The piston 910 divides the interior of the housing 901 into a first compartment 905 extending from the lower side of the end wall 912 of the piston 910 to the hot water supply port 902 of the housing 901 and including the interior of the piston 910, and a second compartment 906 extending from the top side of the end wall 912 to the water delivery port 903 of the housing 901. One or more unillustrated sealing members may be provided to prevent water from flowing between the first and second compartments 905 and 906 along a gap between the inner periphery of the housing 901 and the outer periphery of the piston 910.

The piston 910 can translate within the housing 901 in the longitudinal direction of the housing 901 between at least one lowered position in which the peripheral wall 911 of the piston 910 blocks the radially inner end of the return port 904 of the housing 901 and at least one raised position in which the return port 916 of the piston 910 overlaps the return port 904 of the housing 901 in the longitudinal direction of the housing 901 so that the two return port 904 and 916 fluidly communicate with each other. FIG. 159 shows the piston 910 in a lowered position, and FIGS. 160 and 161 show the piston 910 in a raised position. The piston 910 is biased towards a lowered position by a biasing member, such as a helical compression spring 917 disposed between the upper end of the piston 910 and the upper inner surface of the housing 901.

Structure may be provided for limiting the range of movement of the piston 910 as it translates within the housing 901. In the present embodiment, the piston 910 can move downwards within the housing 901 until the lower end of the piston 910 abuts against the lower inner surface of the housing 901, while the piston 910 can move upwards within the housing 901 until the upper end of the piston 910 abuts against a circumferentially-extending ledge formed on the inner peripheral surface of the housing 901.

The housing 901 may include structure for guiding the piston 910 as it reciprocates within the housing 901 between a raised and a lowered position so as to prevent misalignment of the return port 916 of the piston 910 and the return port 904 of the housing 901 when the piston 910 is in a raised position. For example, an elongated linear or curved groove which extends in the longitudinal direction of the housing 901 may be formed on the interior of the housing 901 or the exterior of the piston 910, and a tab 918 which extends into and slidably engages with the groove 908 may be formed on the exterior of the piston 910 or the interior of the housing 901 to guide the piston 910 as it reciprocates within the housing 901. However, if the housing 901 and the piston 910 have non-cylindrical shapes, such as oval or elliptical shapes, which prevent their relative rotation, structure for guiding the piston 910 as it translates within the housing 901 can be omitted.

The module 900 includes a temperature-sensitive valve 920 for selectively directing water entering the housing 901 through the hot water supply port 902 to either the water delivery port 903 or the return port 904 of the housing 901 based on the temperature of water inside the housing 901. When the temperature of water within the housing 901 is below a predetermined set-point temperature, the temperature-sensitive valve 920 closes the lower end of the feed tube 914 leading to the water delivery port 903 of the piston 910 to prevent water from flowing through the piston 910 from the hot water supply port 902 to the water delivery port 903 of the housing 901. When the temperature of water within the housing 901 is at least the set-point temperature, the temperature-sensitive valve 920 opens the lower end of the feed tube 914 to allow water from the hot water supply port 902 to flow through the piston 910 to the water delivery port 903 of the housing 901. In addition, when the water temperature in the housing 901 is at least the set-point temperature, the temperature-sensitive valve 920 closes the radially inner end of the return port 916 of the piston 910 to prevent water within the housing 901 from being discharged from the return port 904 of the housing 901.

The temperature-sensitive valve 920 is not restricted to any particular structure. In the present embodiment, it comprises a flapper valve including a flapper 921 and a temperature-sensitive actuator (a thermal actuator) which moves the flapper 921 in response to the water temperature in the housing 901. To facilitate an understanding of the structure, the flapper 921 and the thermal actuator are shown in their entirety rather than in cross section in FIGS. 159-161. The flapper 921 can be moved by the thermal actuator between a first or cold position shown in FIG. 159 in which the flapper 921 closes off the lower end of the feed tube 914 to fluid flow and a second or hot position shown in FIG. 161 in which it closes the radially inner end of the return port 916 of the piston 910 to fluid flow. The flapper 921 can have any structure which enables it to close off either the feed tube 914 or the return port 916 of the piston 910 to fluid flow. In the present embodiment, the flapper 921 comprises a generally flat disc, one face of which can sealingly contact the lower end of the feed tube 914 and the other face of which can sealingly contact the radially inner end of the return port 916 of the piston 910.

The thermal actuator is also not limited to any particular structure. In this embodiment, it comprises a leaf spring 922 formed from a bimetallic strip having an upper end secured to the end wall 912 of the piston 910 and a lower end secured to the flapper 921. Based on well-known formulas defining the temperature response of a bimetallic strip, the physical properties of the leaf spring 922 (the modulus of elasticity, the coefficients of thermal expansion, the thickness, etc. of the metals forming the bimetallic strip and the length of the leaf spring 922), can be selected such that the flapper 921 contacts and closes off the lower end of the feed tube 914 when the water temperature in the housing 901 is below the set-point temperature and such that the flapper 921 contacts and closes off the radially inner end of the return port 916 of the piston 910 when the water temperature in the housing 901 is at least the set-point temperature.

The operation of this embodiment will be described while referring to FIGS. 159-161. FIG. 159 shows the state of the module 900 when all of the one or more unillustrated plumbing fixtures to which the water delivery port 903 of the housing 901 is fluidly connected are closed with respect to hot water and the temperature of water within the housing 901 is below the set-point temperature. In this state, due to the fluid communication between the first and second compartments 905 and 906 of the housing 901 provided by the bleed orifice 915, the static pressure at the hot water supply port 902 is substantially the same as the static pressure at the water delivery port 903 of the housing 901, so the water pressures in the first and second compartments 905 and 906 of the housing 901 are substantially equal to each other. Accordingly, the piston 910 is held by the force of the compression spring 917 in a lowered position in which the return port 904 of the housing 901 is blocked by the peripheral wall 911 of the piston 910. Since the water temperature in the housing 901 at this time is below the set-point temperature, the flapper 921 is in its first (cold) position in which it closes off the lower end of the feed tube 914. As a result, no water flows out of the module 900 through either the water delivery port 903 or the return port 904 of the housing 901.

FIG. 160 shows the state in which any of the one or more hot water plumbing fixtures to which the module 900 is fluidly connected has been opened with respect to hot water and the temperature of water within the housing 901 is still below the set-point temperature. If the plumbing fixtures discharge hot water into a region which is at atmospheric pressure, the opening of any one of the plumbing fixtures with respect to hot water causes an abrupt decrease in the water pressure at the water delivery port 903 of the housing 901 towards atmospheric pressure. This causes the water pressure in the second compartment 906 of the housing 901 to fall sufficiently below the water pressure in the first compartment 905 to move the piston 910 in the longitudinal direction of the housing 901 against the force of the compression spring 917 to a raised position, such as the position shown in FIG. 160, in which the return port 916 of the piston 910 overlaps the return port 904 of the housing 901. If the water temperature in the housing 901 is below the set-point temperature, the flapper 921 will still be in its first (cold) position in which the lower end of the feed tube 914 is closed off by the flapper 921 while the return port 916 of the piston 910 is open. Therefore, water supplied to the hot water supply port 902 of the housing 901 is able to flow through the housing 901 from the hot water supply port 902 and out the water return port 904. The flow of water from the return port 904 can trigger a pump control module corresponding to the pump control module shown in FIG. 1 to turn on a return pump which returns water from the flow switching module 900 to a hot water heater to be reheated.

When the piston 910 is in a raised position such as the one shown in FIG. 160, the temperature of water flowing through the housing 901 from the hot water supply port 902 to the return port 904 of the housing 901 will gradually increase as water below the set-point temperature which was previously in passages leading to the hot water supply port 902 is returned through the return port 904 to the source of hot water for reheating. When the water temperature in the housing 901 reaches the set-point temperature, the lower end of the leaf spring 922 will deflect from the position shown in FIG. 160 to the position shown in FIG. 161 to move the flapper 921 from its first (cold) position to its second (hot) position in which the lower end of the feed tube 914 is uncovered while the radially inner end of the return port 916 of the piston 910 is covered by the flapper 921 to prevent water from flowing out the return port 904 of the housing 901. In this state, water supplied to the hot water supply port 902 of the housing 901 flows through the feed tube 914 and out of the water delivery port 903 of the piston 910 and the water delivery port 903 of the housing 901 and is delivered to the plumbing fixtures which are open with respect to hot water.

When all of the plumbing fixtures which had been open with respect to hot water are then closed when the module 900 is in the state shown in FIG. 161, the water pressures in the first and second compartments 905 and 906 of the housing 901 will become substantially equal to each other on account of the fluid communication between the two compartments 905 and 906 through the feed tube 914. As a result, the piston 910 will immediately return to a lowered position under the force of the compression spring 917. The flapper 921 will remain in its second (hot) position until the water temperature within the housing 901 gradually cools to below the set-point temperature, at which point the leaf spring 922 will deform back to a shape in which it moves the flapper 921 to its first (cold) position, thereby returning the module 900 to the state shown in FIG. 159. In this state, the fluid communication between the first and second compartments 905 and 906 provided by the bleed orifice 915 will prevent any substantial pressure difference from developing between the first and second compartments 905 and 906, and the piston 910 will remain in a lowered position until any of the plumbing fixtures is again opened with respect to hot water.

When the module 900 is in the state shown in FIG. 160 and all of the plumbing fixtures which had been open with respect to hot water are closed before the water temperature in the housing 901 reaches the set-point temperature, the water pressure at the water delivery port 903 of the housing 901 will initially be lower than the water pressure at the hot water supply port 902, and the piston 910 will initially remain in a raised position in which water which enters the hot water supply port 902 is discharged from the return port 904 of the housing 901 and returned to the source of hot water for reheating. However, due to the fluid communication between the first and second compartments 905 and 906 provided by the bleed orifice 915, the water pressure in the second compartment 906 will gradually increase towards the water pressure in the first compartment 905, and the compression spring 917 will gradually return the piston 910 to a lowered position, and the module 900 will return to the state shown in FIG. 159.

As described above, in the same manner as in the preceding embodiment, when water entering the module 900 through the hot water supply port 902 is at least the set-point temperature, the water is supplied to any of the plumbing fixtures fluidly connected to the module 900 which are open with respect to hot water, and when water entering the module 900 through the hot water supply port 902 is below the set-point temperature, the module 900 diverts the water back to the source of hot water for reheating until the water reaches the set-point temperature. As a result, water which is below the set-point temperature is conserved as it is warmed up to the set-point temperature.

This embodiment employs a flapper 921 valve as a temperature-sensitive valve for selectively controlling flow of water from the hot water supply port 902 to either the water delivery port 903 or the return port 904 of the housing 901 and employs a bimetallic strip as a temperature-sensitive actuator for the valve, However, it is possible for the module 900 to employ a different type of temperature-sensitive valve to perform this function and to employ a different type of temperature-sensitive actuator, such as a wax motor or an actuator equipped with a shape memory alloy.

FIG. 162 schematically illustrates another embodiment of a flow switching module 950 according to the present invention which is capable of being integrated into the structure of a hot water plumbing fixture and serving as a flow control valve for the plumbing fixture. This embodiment includes a first valve 951, a second valve 960, and a third valve 970 connected in series.

The first valve 951 is a two-port, two-position on-off valve. It includes a first port 952 fluidly connected to hot water piping 6 and a second port 953. The hot water piping 6 is fluidly connected to a source of hot water, such as a hot water heater. The first valve 951 has an off position shown in FIG. 162 in which water is prevented from flowing through the valve 951 between the first and second ports 952 and 953, and it also has an on position in which the first and second ports 952 and 953 are fluidly connected with each other within the valve 951. The first valve 951 is not restricted to any particular type. For example, it may be a linearly acting valve, a rotary valve, or a valve having a combined linear and rotary action. The valve 951 may have a snap action so that it is either fully off or fully on. The first valve 951 further includes a manual control mechanism 954 for switching the valve 951 between the on and off positions, such as a lever, a knob, a push-button, or other type of manual control device commonly used for valves.

The second valve 960 is a three-port, three-position thermally-actuated valve. Like the first valve 951, the second valve 960 is not restricted to any particular type, and it may, for example, be a linearly acting valve, a rotary valve, or a valve having a combined linear and rotary action. It includes a first port 961 which is fluidly connected to the second port 953 of the first valve 951, a second port 962 which is fluidly connected to the third valve 970, and a third port 963 which is fluidly connected to return piping 8, which in turn is fluidly connected to an unillustrated water heater. The second valve 960 has a first position or preheat shown in FIG. 162 in which the first port 961 is fluidly connected to the third port 963 and an unillustrated second or on position in which the first port 961 is fluidly connected to the second port 962 through the interior of the valve 960. The second valve 960 may include a return spring 964 for biasing the valve 960 towards the preheat position. The second valve 960 also includes a thermal actuator 965 which switches the valve 960 from the preheat position to the on position when the temperature of water entering the second valve 960 is below a predetermined set-point temperature. The second valve 960 is not restricted to any particular structure. For example, it may be a commercially available temperature sensitive valve, or it may have a structure similar to the second valve 850 in the embodiment shown in FIG. 146 or the second valve 880 in the embodiment shown in FIG. 158. The thermal actuator 965 may be responsive to the temperature of water within the second valve 960, or it may be responsive to the temperature of water somewhere on the upstream side of the second valve 960, such as between the first valve 951 and the second valve 960.

The third valve 970 is a proportional valve having an inlet fluidly connected to the second port 962 of the second valve 960 and an outlet fluidly connected to a discharge port of the hot water plumbing fixture with which the module 950 is associated. For example, the third valve 970 may be fluidly connected to the spout of a faucet or to the shower head of a shower fixture. The third valve 970 is mechanically coupled to the manual control mechanism 954 of the first valve 951. The third valve 970 enables a user to control the flow rate to the discharge port of the hot water plumbing fixture. In situations in which proportional control of the flow rate is not necessary, the third valve 970 may be omitted, and the second valve 960 can be connected directly to the discharge port of the hot water plumbing fixture.

When the first valve is in the off position, no water flows through the flow switching module 950, regardless of the position of the second valve 960. If a user switches the first valve to the on position, water in the hot water piping 6 flows through the first valve 951 and is supplied to the first port 961 of the second valve 960. If the temperature of the water supplied to the second valve 960 is below the set-point temperature, the second valve 960 will be in the preheat position shown in FIG. 162, so the module 950 will operate in a preheat mode in which water which is supplied to the second valve 960 from the first valve 951 will flow into the return piping 8 to be returned to the unillustrated hot water heater. If the first valve 951 remains in the on position, the temperature of water entering the module 950 will gradually increase as cold water is flushed from the hot water piping 6. When the temperature of water supplied to the second valve 960 reaches the set-point temperature, the thermal actuator 965 will switch the second valve 960 from the preheat position to the on position, and the module 950 will operate in a normal mode in which water entering the second valve 960 is supplied to the third valve 970 and then to the discharge port of the hot water plumbing fixture. In this state, the user can control the flow rate to the discharge port by adjusting the third valve 970. When the user is done using the hot water plumbing fixture, he switches the first valve 951 to the off position to terminate the flow of water through the module 950. The second valve 960 will remain in the on position as long as the water temperature sensed by the thermal actuator 965 is at least the set-point temperature. When the water temperature sensed by the thermal actuator 965 cools below the set-point temperature, the second valve 960 will return to the preheat position shown in FIG. 162 under the biasing force of the return spring 964.

As stated above, various criteria can be used to control a pump for returning water from a flow switching module to a water heater when the flow switching module is operating in a preheat mode. In the embodiment of a water recirculation system 1 shown in FIG. 1, a pump 9 is controlled based on the water pressure in return piping 8 leading to a water heater 4, with the pump 9 being energized when the water pressure in the return piping 8 is above a predetermined level and the pump 9 being turned off when the water pressure in the return piping 8 is below a predetermined level.

FIG. 163 schematically illustrates an embodiment of a flow switching module 880 according to the present invention in which a pump for returning water from the module 880 to a water heater through return piping is controlled based on whether fluid is flowing through the module 880 and on the temperature of water flowing through the module 880. The overall structure of this embodiment is similar to that of the embodiment shown in FIG. 145, and components of this embodiment which are the same as in FIG. 145 are affixed with the same reference numbers as in FIG. 145. This embodiment further includes a first detector 881 which can detect when there is fluid flow through the module 880 and a second detector 882 which can detect when the temperature of water flowing through the module 880 is below a set-point temperature. An unillustrated pump fluidly connected to return piping is energized when the first detector 881 detects that water is flowing through the module 880 and the second detector 882 detects that the temperature of water flowing through the module 880 is below the set-point temperature. Under any other condition, i.e., when the first detector 881 does not detect flow of water through the module 880 and/or the second detector 882 does not detect that the temperature of water flowing through the module 880 is below the set-point temperature, the pump is not energized.

The first and second detectors 881 and 882 are not restricted to any particular structure. For example, they can be devices which directly sense fluid flow and the water temperature within the module 880. By way of example, the first detector 881 may be any of a variety of conventional in-line flow meters, and the second detector 882 may be any of a variety of conventional temperature sensors, such as thermostats, thermistors, thermocouples, resistor temperature detectors, or semiconductor sensors.

Alternatively, one or both of the detectors 881 and 882 can be a device which indirectly detects fluid flow or the water temperature within the module 880 by detecting the operating state of the first valve 710 or the second valve 720 of the module 880. As described above with respect to FIG. 145, when water is flowing through the module 880, the first valve 710 is in an open state (a state in which water can flow through the first valve 710), and when the water temperature in the module 880 is below the set-point temperature, the second valve 720 is in a preheat state in which water entering the second valve 720 is diverted to return piping. Therefore, the first detector 881 could be a switch, such as a microswitch, which is mechanically coupled to the first valve 710 and switches between open and closed states when the first valve 710 switches between states, and the second detector 882 could be a similar switch which switches between open and closed states when the second valve 720 switches between normal and preheat states, although which state of each switch corresponds to which state of the corresponding valve is arbitrary and can be determined based on the manner in which the switches are connected to electrical circuitry.

In FIG. 163, the first detector 881 and the second detector 882 are schematically illustrated as being two on-off electrical switches which are connected to each other in series, although the switches and their manner of connection to each other in FIG. 163 are not intended to necessarily represent actual circuitry and rather illustrate that the output or the operating state of the two detectors 881 and 882 corresponds to operating conditions within the module 880. The detectors 881 and 882 can be connected to suitable electrical circuitry, such as logic circuitry, having a structure determined by the structure of the two detectors so that a pump run signal can be generated when water is flowing through the module 880 and the water temperature is below the set-point temperature but not at other times. As conceptually shown in FIG. 163, a pump run signal is generated when both of the switches schematically representing the detectors are closed but is not generated when either of the switches is open. Electrical circuitry appropriate to the structure of the detectors can be easily designed by those skilled in the art. A pump run signal can be transmitted to a controller for the pump in any suitable manner, such as by wire or by wireless or optical circuitry.

Except for the manner in which it is determined when to operate a pump connected to the return piping, the operation of this embodiment is basically the same as that of the embodiment of FIG. 145.

FIG. 164 schematically illustrates another embodiment of a flow switching module 1000 according to the present invention in which a pump for returning water from the flow switching module 1000 to a water heater is controlled based on the occurrence of flow of water through the module 1000 and the temperature of water passing through the module 1000. Namely, a pump is energized when there is flow of water through the module 1000 and the temperature of water passing through the module 1000 is below a set-point temperature. At other times, the pump remains off.

The illustrated module 1000 includes a three-port, two-position solenoid valve 1010, which may be a linearly-acting valve, a rotary valve, or a valve having a combined linear and rotary action. The valve 1010 includes a first port 1011, a second port 1012, and a third port 1013. The first port 1011 is fluidly connected to hot water piping 6 which is connected to the outlet of a water heater 4. The second port 1012 is fluidly connected to one or more hot water plumbing fixtures 3, only one of which is shown in FIG. 164. The third port 1013 is fluidly connected to return piping 8 which fluidly communicates with the water heater 4 through a pump 9 in the same manner as shown in FIG. 1. Cold water piping 5 fluidly communicates with the inlet of the water heater 4 through a check valve 14 in the same manner as in FIG. 1. The cold water piping 5 may also be connected to any hot water plumbing fixtures 3, including the illustrated one, which are of a type which uses both hot and cold water.

The valve 1010 has a first or normal position shown in FIG. 164 which the valve 1010 assumed during a normal mode of operation and an unillustrated second or preheat position which the valve 1010 assumed during a preheat mode of operation. In the normal position of the valve 1010, the first port 1011 is fluidly connected to the second port 1012 through the interior of the valve 1010. In the preheat position of the valve 1010, the first port 1011 is fluidly connected to the third port 1013 through the interior of the valve 1010. The valve 1010 includes a solenoid 1015 for operating the valve 1010. When the solenoid 1015 is energized, it switches the valve 1010 from the normal position to the preheat position. When the solenoid 1015 is not energized, the valve 1010 is returned to or maintained in the normal position by a return spring 1014. The operation of the solenoid 1015 is controlled by a solenoid controller 1016, which may, for example, be a conventional commercially available solenoid controller or a general purpose programmable controller.

The module 1000 further includes a flow sensor 1020 for sensing the occurrence of flow of water through the module 1000 and a temperature sensor 1021 which is responsive to the temperature of water flowing through the module 1000. The flow sensor 1020 and the temperature sensor 1021 are not restricted to any particular type. For example, they may be conventional devices which generate an output signal which indicates the flow rate through the module 1000 or the temperature of water within the module 1000. Alternatively, the flow sensor 1020 may be a device which indicates merely whether fluid flow is taking place through the module 1000 without indicating the flow rate, and the temperature sensor 1021 may be a device, such as a conventional thermostat, which indicates only whether the water temperature in the module 1000 is above or below the set-point temperature without indicating what the water temperature is. A wide variety of flow sensors suitable for use in this embodiment are well-known to those skilled in the art and widely available. The sensors are illustrated as being in-line sensors which are installed along hot water piping 6 connected to the first port 1011 of the valve 1010, but they may be installed in another convenient location, such as on or within the valve 1010.

The flow sensor 1020 and the temperature sensor 1021 generate output signals which are input to the solenoid controller 1016. When the solenoid controller 1016 determines, based on the input signals from the sensors, that there is flow of water through the module 1000 and that the water temperature in the module 1000 is below the set-point temperature, it energizes the solenoid 1015 to switch the valve 1010 from the normal position to the preheat position, thus causing water which enters the module 1000 through the hot water piping 6 to be diverted through the valve 1010 to the return piping 8. Under other conditions, the solenoid controller 1016 does not energize the solenoid 1015, and the valve 1010 remains in or returns to the normal position shown in FIG. 164.

At the same time that it energizes the solenoid 1015, the solenoid controller 1016 generates an output signal indicating that the solenoid 1015 is energized and transmits the signal by any suitable method, such as by wire or wirelessly, to a pump controller 1025 for the pump 9. The output signal from the solenoid controller 1016 can be any of a wide variety of signals commonly used in electronics, such as a signal which has one voltage when the solenoid 1015 is energized and a different voltage when the solenoid 1015 is not energized, a pulse or a series of pulses which indicate whether the solenoid 1015 is energized, or the like. When the pump controller 1025 receives this output signal from the solenoid controller 1016, the pump controller 1025 turns the pump 9 on to pump water through the return piping 8 and return it to the water heater 4.

When a hot water recirculation system according to the present invention includes a plurality of flow switching modules 1000 similar to the one shown in FIG. 164, each of the modules 1000 can transmit an output signal to the pump controller 1025 when the solenoid 1015 of the module 1000 is energized, and the pump controller 1025 can turn on the pump 9 when the output signals from all the modules 1000 indicate that the solenoid 1015 of at least one of the modules 1000 is energized and can turn off the pump 9 at other times. The output signals from the plurality of modules 1000 are schematically illustrated by dashed lines input to an OR gate 1026 connected between the modules 1000 and the pump controller 1025. However, the OR gate 1026 does not necessarily represent actual structure and is meant to illustrate the concept that the pump controller 1025 operates the pump 9 in response to output signals from multiple flow switching modules. The plurality of flow switching modules need not have the same design as each other and can be any modules which can generate a pump run signal. For example, one or more of the modules could have a structure illustrated in FIG. 163, while one or more other modules could have a structure like that illustrated in FIG. 164. Any arrangement by which the controller 1025 can be responsive to signals from a plurality of modules can be employed. For example, a multiplexing arrangement can be employed in which the pump controller 1025 sequentially checks the output signals from each of a plurality of modules.

In order to provide redundancy, the method of controlling a pump 9 illustrated in FIG. 164 can be combined with another method of controlling the pump 9, such as the control method described in connection with FIG. 1 in which the pump 9 is controlled based on the water pressure in return piping 8.

FIGS. 165-167 illustrate various examples of how a flow switching module according to the present invention can be connected to a hot water plumbing fixture. FIG. 165 is a schematic illustration of a flow switching module 300 according to the present invention can be connected to a typical kitchen faucet. The illustrated module 300 is the embodiment of a module shown in FIG. 60, but it could be any of the above-described embodiments which are capable of mixing hot and cold water. The module 300 is installed with the selector assembly 380 of the module 300 mounted atop a kitchen countertop 150 containing a sink 151, and with the remainder of the module 300 (the mixing valve assembly and the preheat assembly) mounted underneath the countertop 150 and supported by suitable hardware. The module 300 is fluidly connected to a cold water piping 5, hot water piping 6, a hot water delivery line 7, and return piping 8 in the same manner as described with respect to FIG. 1. The hot water delivery line 7 fluidly connects the module 300 to a faucet 152 mounted atop the countertop 150.

FIG. 166 schematically illustrates a flow switching module 200 according to the present invention connected to a typical showerhead 154 and bathtub spout 155. The module 200 shown is the embodiment illustrated in FIG. 28, but as is the case with respect to the example shown in FIG. 165, it could be any of the above-described embodiments which are capable of mixing hot and cold water. The module 200 is installed in the wall of a bathroom with the lifter shaft 222 of the module extending through the wall of the bathroom and having a handle 156 secured to its outer end. Hot water piping 6 and return piping 8 are connected to the preheat assembly 240 of the module 200, and cold water piping 5 is connected to the mixing valve assembly 220. A connecting pipe 153 for hot water is connected between the preheat assembly 240 and the mixing valve assembly 220. A hot water delivery line 7 is connected between the mixing valve assembly 220 and the shower head 154, and another hot water delivery line 7 is connected between the mixing valve assembly 220 and the bathtub spout 155.

FIG. 167 is a schematic illustration of a flow switching module 800 according to the present invention connected to a typical kitchen faucet 161 mounted on a countertop 150. The illustrated module 800 is the embodiment of a module illustrated in FIG. 146, but it could be any of the other above-described embodiments which are responsive to the operating state of a hot water plumbing fixture. The module 800 is supported underneath a kitchen countertop 160 by suitable unillustrated mounting fixtures. A hot water supply port of the module 800 is connected to hot water piping 6, a return port of the module 800 is connected to return piping 8, and a water delivery port is fluidly connected to the faucet 161 by a water delivery line 7 for hot water. The faucet 161 is also connected to cold water piping 5 for supplying cold water. The faucet 161 may be connected to a typical spray nozzle 162 in a conventional manner. The illustrated faucet 161 is a typical one-handle faucet commonly found in kitchens, but there are no particular limitations on the type of faucet. For example, it could be a multi-handle faucet or a hands-free faucet.

What is claimed is:

1. A flow switching apparatus for use in a hot water recirculation system comprising:

a housing having a first port through which water from a source of hot water can be introduced into the housing, a second port through which water within the housing can be supplied to a discharge opening of a plumbing fixture, and a third port through which water within the housing can be returned to the source of hot water;

a first valve disposed in the housing and fluidly connected to the first port and responsive to opening and closing of a plumbing fixture connected to the second port, the first valve opening in response to opening of the plumbing fixture with respect to hot water and closing in response to closing of the plumbing fixture with respect to hot water, the first valve opening only when the plumbing fixture is open with respect to hot water; and a second valve disposed in the housing and fluidly connected in series with the first valve and receiving water passing through the first valve and responsive to the temperature of water received from the first valve, the second valve having a normal setting in which it directs water received from the first valve to the second port when the temperature of the water is at least a predetermined temperature and a preheat setting in which it directs water received from the first valve to the third port when the temperature of the water is below the predetermined temperature, wherein only water which has passed through the first valve when the first valve is open can be discharged from the third port of the housing when the second valve is in the preheat setting.

2. A flow switching apparatus as claimed in claim 1 including a biasing member which biases the second valve towards the normal setting.

3. A flow switching apparatus as claimed in claim 1 wherein the first valve is responsive to the opening and closing of the plumbing fixture by sensing a differential pressure between the first port and the second port.

4. A flow switching apparatus as claimed in claim 1 wherein the first valve is opened and closed by an actuator selected from a diaphragm and a piston.

5. A hot water recirculation system comprising: a flow switching apparatus as claimed in claim 1;

a plumbing fixture having an inlet fluidly connected to the second port of the housing of the flow switching apparatus;

a hot water heater having an inlet for water to be heated in the hot water heater and an outlet for water heated in the hot water heater, the flow switching apparatus being installed between the outlet of the hot water heater and the inlet of the plumbing fixture with the outlet of the hot water heater being fluidly connected to the first port of the housing for supplying water which was heated in the hot water heater to the flow switching apparatus; and a pump fluidly connected between the third port of the housing and the inlet of the hot water heater for returning water from the flow switching apparatus to the hot water heater.

6. A flow switching apparatus for use in a hot water recirculation system comprising:

a housing having a first port through which water from a source of hot water can be introduced into the housing, a second port through which water within the housing can be supplied to a discharge opening of a plumbing fixture, and a third port through which water within the housing can be returned to the source of hot water;

a first valve disposed in the housing and fluidly connected to the first port and responsive to opening and closing of a plumbing fixture connected to the second port, the first valve opening when the plumbing fixture is open with respect to hot water and closing when the plumbing fixture is closed with respect to hot water; and a second valve disposed in the housing and fluidly connected in series with the first valve and receiving water passing through the first valve and responsive to the temperature of water received from the first valve, the second valve having a normal setting in which it directs water received from the first valve through the second valve to the second port when the temperature of the water is at least a predetermined temperature and a preheat setting in which it directs water received from the first valve through the second valve to the third port and blocks flow of water received from the first valve through the second Dort when the temperature of the water is below the predetermined temperature.

7. A flow switching apparatus for use in a hot water recirculation system comprising:

a housing having a first port through which water from a source of hot water can be introduced into the housing, a second port through which water within the housing can be supplied to a discharge opening of a plumbing fixture, and a third port through which water within the housing can be returned to the source of hot water;

a first valve disposed in the housing and fluidly connected to the first port and responsive to opening and closing of a plumbing fixture connected to the second port, the first valve opening when the plumbing fixture is open with respect to hot water and closing when the plumbing fixture is closed with respect to hot water; and a second valve disposed in the housing and fluidly connected in series with the first valve and receiving water passing through the first valve and responsive to the temperature of water received from the first valve, the second valve having a normal setting in which it directs water received from the first valve to the second port when the temperature of the water is at least a predetermined temperature and a preheat setting in which it directs water received from the first valve to the third port only when the plumbing fixture is open with respect to hot water and the temperature of the water received from the first valve is below the predetermined temperature, wherein the second valve blocks flow of water received from the first valve through the second port when the second valve is in the preheat setting, and only water which has passed through the first valve when the first valve is open can be discharged from the third port of the housing when the second valve is in the preheat setting.

8. A flow switching apparatus as claimed in claim 1 wherein the second valve prevents water from flowing from the third port to the second port.

9. A hot water recirculation system as claimed in claim 5 including a cold water line which is fluidly connected to the plumbing fixture for supplying cold water to the plumbing fixture and which bypasses the flow switching apparatus, the plumbing fixture including a mixing mechanism for mixing hot water received from the flow switching apparatus and cold water received through the cold water line.

10. A flow switching apparatus as claimed in claim 4 wherein the actuator comprises a diaphragm which is disposed within a chamber within the housing and divides the chamber into a first compartment at the fluid pressure of the first port and a second compartment at the fluid pressure of the second port, the diaphragm being deformable in response to a difference between the fluid pressure in the first compartment and the fluid pressure in the second compartment and being mechanically linked to the first valve such that the diaphragm can open or close the first valve when deforming in response to the pressure difference.

11. A flow switching apparatus as claimed in claim 10 wherein the diaphragm is mechanically linked to the first valve so as to open the first valve when the diaphragm is bowed into the second compartment and so as to close the first valve when the diaphragm is bowed into the first compartment.

12. A flow switching apparatus as claimed in claim 4 wherein the actuator comprises a piston which is slidably disposed for translation within a chamber inside the housing and divides an interior of the chamber into a first compartment at the fluid pressure of the first port and a second compartment at the fluid pressure of the second port,
the piston being mechanically linked to the first valve so as to open or close the first valve as the piston translates within the chamber in response to the differential pressure between the first and second compartments.

13. A flow switching apparatus as claimed in claim 1 including an actuator containing wax which expands and contracts in response to the temperature of the water received by the second valve from the first valve and which switches the second valve to the normal setting when the temperature of the water is at least the predetermined temperature.

14. A flow switching apparatus as claimed in claim 1 including an actuator comprising a shape memory alloy which deforms in response to the temperature of the water received by the second valve from the first valve and which switches the second valve to the normal setting when the temperature of the water is at least the predetermined temperature.

15. A flow switching apparatus for use in a hot water recirculation system comprising:
a first valve having a first port for receiving water from a source of hot water and a second port through which water passing through the first valve can be discharged from the first valve; and
a second valve having a first port fluidly connected to the second port of the first valve for receiving water discharged from the second port of the first valve, a second port through which water passing through the second valve can be supplied to a discharge opening of a plumbing fixture, and a third port through which water passing through the second valve can be returned to the source of hot water,
wherein the first valve opens in response to opening of the plumbing fixture with respect to hot water and closes in response to closing of the plumbing fixture with respect to hot water, the first valve opening only when the plumbing fixture is open with respect to hot water,
the second valve is responsive to the temperature of water received from the first valve, the second valve having a normal setting in which it discharges water received from the first valve through the second port of the second valve when the temperature of the water is at least a predetermined temperature and a preheat setting in which it discharges water received from the first valve through the third port of the second valve when the temperature of the water is below the predetermined temperature, and only water which has passed through the first valve when the first valve is open can be discharged from the third port of the second valve when the second valve is in the preheat setting.

16. A hot water recirculation system comprising:
a flow switching apparatus as claimed in claim 15;
a plumbing fixture having an inlet for hot water fluidly connected to the second port of the second valve of the flow switching apparatus so as to receive hot water from the flow switching apparatus;
a hot water heater having an inlet for water to be heated in the hot water heater and an outlet for water heated in the hot water heater, the flow switching apparatus being installed between the inlet of the plumbing fixture and the outlet of the hot water heater with the outlet of the hot water heater being fluidly connected to the first port of the first valve of the flow switching apparatus for supplying water which was heated in the hot water heater to the flow switching apparatus; and
a pump fluidly connected between the third port of the second valve of the flow switching apparatus and the inlet of the hot water heater for returning water from the flow switching apparatus to the hot water heater.

17. A hot water recirculation system as claimed in claim 16 including a cold water line which is fluidly connected to the plumbing fixture for supplying cold water to the plumbing fixture and which bypasses the flow switching apparatus, and a return line separate from the cold water line which returns water to the hot water heater, the plumbing fixture including a mixing mechanism for mixing hot water received from the flow switching apparatus and cold water received through the cold water line.

18. A flow switching apparatus for use in a hot water recirculation system comprising:
a housing having a first port through which water from a source of hot water can be introduced into the housing, a second port through which water within the housing can be supplied to a discharge opening of a plumbing fixture, and a third port through which water within the housing can be returned to the source of hot water;
a first valve movably disposed in the housing and fluidly connected to the first port and responsive to opening and closing of a plumbing fixture connected to the second port, the first valve opening in response to opening of the plumbing fixture with respect to hot water and closing in response to closing of the plumbing fixture with respect to hot water, the first valve opening only when the plumbing fixture is open with respect to hot water, the first valve being positioned within the housing so as to block flow through the third port when the first valve is closed and being positioned within the housing so that the first valve does not block flow through the third port when the first valve is open; and
a second valve disposed in the housing and responsive to the temperature of water entering the housing through the first port, the second valve having a normal setting in which it allows flow of water from the first port to the second port while blocking flow of water from the first port to the third port when water entering the housing through the first port is at least a predetermined temperature, and a preheat setting in which it blocks flow of flow of water from the first port to the second port while allowing flow of water from the first port to the third port when water entering the housing through the first port is below the predetermined temperature.

19. A flow switching apparatus as claimed in claim 18 wherein:
- the first valve comprises a hollow piston slidably disposed in the housing and having a peripheral wall with an opening formed therein;
- the opening in the peripheral wall of the piston overlaps the third port of the housing when the first valve is open so that the first valve does not block flow through the third port; the peripheral wall of the piston blocks the third port when the first valve is closed; and
- the second valve is disposed inside the hollow piston.

* * * * *